DATA COMMUNICATION SYSTEM

Filed May 26, 1961 95 Sheets-Sheet 1

INVENTORS: H. H. ABBOTT
A. B. BROWN, JR.
W. A. DEPP
R. D. FRACASSI
R. D. WILLIAMS

BY R. C. Winter
ATTORNEY

DATA COMMUNICATION SYSTEM

Filed May 26, 1961 95 Sheets-Sheet 2

Dec. 14, 1965 H. H. ABBOTT ETAL 3,223,976

DATA COMMUNICATION SYSTEM

Filed May 26, 1961 95 Sheets-Sheet 3

DATA COMMUNICATION SYSTEM

Filed May 26, 1961 95 Sheets-Sheet 4

Dec. 14, 1965 H. H. ABBOTT ET AL 3,223,976

DATA COMMUNICATION SYSTEM

Filed May 26, 1961 95 Sheets-Sheet 8

Dec. 14, 1965 H. H. ABBOTT ETAL 3,223,976

DATA COMMUNICATION SYSTEM

Filed May 26, 1961 95 Sheets-Sheet 9

Dec. 14, 1965 H. H. ABBOTT ETAL 3,223,976

DATA COMMUNICATION SYSTEM

Filed May 26, 1961 95 Sheets-Sheet 14

Dec. 14, 1965 H. H. ABBOTT ETAL 3,223,976

DATA COMMUNICATION SYSTEM

Filed May 26, 1961 95 Sheets-Sheet 21

Dec. 14, 1965 H. H. ABBOTT ETAL 3,223,976

DATA COMMUNICATION SYSTEM

Filed May 26, 1961 95 Sheets-Sheet 29

Dec. 14, 1965 H. H. ABBOTT ETAL 3,223,976

DATA COMMUNICATION SYSTEM

Filed May 26, 1961 95 Sheets-Sheet 31

Dec. 14, 1965 H. H. ABBOTT ETAL 3,223,976

DATA COMMUNICATION SYSTEM

Filed May 26, 1961 95 Sheets-Sheet 40

Dec. 14, 1965 H. H. ABBOTT ETAL 3,223,976

DATA COMMUNICATION SYSTEM

Filed May 26, 1961 95 Sheets-Sheet 43

DATA COMMUNICATION SYSTEM

Dec. 14, 1965 H. H. ABBOTT ETAL 3,223,976

DATA COMMUNICATION SYSTEM

Filed May 26, 1961 95 Sheets-Sheet 53

Dec. 14, 1965    H. H. ABBOTT ET AL    3,223,976

DATA COMMUNICATION SYSTEM

Filed May 26, 1961    95 Sheets-Sheet 54

Dec. 14, 1965 H. H. ABBOTT ETAL 3,223,976

DATA COMMUNICATION SYSTEM

Filed May 26, 1961 95 Sheets-Sheet 58

Dec. 14, 1965 H. H. ABBOTT ET AL 3,223,976

DATA COMMUNICATION SYSTEM

Filed May 26, 1961 95 Sheets-Sheet 60

Dec. 14, 1965 H. H. ABBOTT ETAL 3,223,976

DATA COMMUNICATION SYSTEM

Filed May 26, 1961 95 Sheets-Sheet 63

DATA COMMUNICATION SYSTEM

Filed May 26, 1961

Dec. 14, 1965 H. H. ABBOTT ETAL 3,223,976

DATA COMMUNICATION SYSTEM

Filed May 26, 1961 95 Sheets-Sheet 69

Dec. 14, 1965 H. H. ABBOTT ETAL 3,223,976

DATA COMMUNICATION SYSTEM

Filed May 26, 1961 95 Sheets-Sheet 70

Dec. 14, 1965 H. H. ABBOTT ETAL 3,223,976

DATA COMMUNICATION SYSTEM

Filed May 26, 1961 95 Sheets-Sheet 77

Dec. 14, 1965 H. H. ABBOTT ET AL 3,223,976

DATA COMMUNICATION SYSTEM

Filed May 26, 1961 95 Sheets-Sheet 79

Dec. 14, 1965 H. H. ABBOTT ETAL 3,223,976

DATA COMMUNICATION SYSTEM

Filed May 26, 1961 95 Sheets-Sheet 81

Dec. 14, 1965 H. H. ABBOTT ETAL 3,223,976

DATA COMMUNICATION SYSTEM

Filed May 26, 1961 95 Sheets-Sheet 82

Dec. 14, 1965 H. H. ABBOTT ETAL 3,223,976

DATA COMMUNICATION SYSTEM

Filed May 26, 1961 95 Sheets-Sheet 85

Dec. 14, 1965 H. H. ABBOTT ETAL 3,223,976

DATA COMMUNICATION SYSTEM

Filed May 26, 1961 95 Sheets-Sheet 88

Dec. 14, 1965 H. H. ABBOTT ETAL 3,223,976

DATA COMMUNICATION SYSTEM

Filed May 26, 1961 95 Sheets-Sheet 89

DATA COMMUNICATION SYSTEM

Filed May 26, 1961 95 Sheets-Sheet 91

(ALLOTTER 22 & MESSAGE CONTROL 27)

(TRUNK SCANNER 32)

(BIT CONTROL 28)

(BUFFER CODER 20)

(TRUNK CIRCUITS)

(TRUNK SELECTOR 31)

DATA COMMUNICATION SYSTEM

OFFICE CYCLE

FIG. 99

MESSAGE BIT ALLOCATION

| WORD ADDRESS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| 0000 | | | TRUNK NUMBER | | | | | | | | (A) | (B) | (C) | (A) | | WORD COUNT | | | | BIT COUNT | | | | ACKNOWLEDGMENT COUNT | | | |
| 0001 INCOMING MESSAGE | | | ACKNOWLEDGMENT | | | | | | | | | | | | | (D) | (E) | (F) | (D) | END OF AVERAGE OR LONG MESSAGE PLUS ONE | | | | END OF MESSAGE PLUS ONE | | | |
| 0001 OUTGOING MESSAGE | | | ACKNOWLEDGMENT | | | | | | | | | | | | | | (G) | | ALL TRUNK BUSY COUNT | | | | | | TIMES SENT COUNT | | |
| 0010 | | START CODE | | | (H) | | FOURTH DESTINATION ADDRESS | | | | | | | | | | | | | | | | | | | | |
| 0011 | | START CODE | | | (H) | | THIRD DESTINATION ADDRESS | | | | | | | | | | | | | | | | | | | | |
| 0100 | | START CODE | | | (H) | | SECOND DESTINATION ADDRESS | | | | | | | | | | | | | | | | | | | | |
| 0101 | | START CODE | | | (H) | | FIRST DESTINATION ADDRESS | | | | | | | | | | | | | | | | | | | | |
| 0110 | | START OF TEXT | | | (D) | | FIRST TEXT WORD | | | | | | | | | | | | | | | | | | | | |
| a | | | | | | | SECOND TEXT WORD | | | | | | | | | | | | | | | | | | | | |
| h | | | | | | | LAST TEXT WORD | | | | | | | | | | | | | | | | | | | | |

NOTE:
(A) - OVERFLOW
(B) - BUSY
(C) - SLOW SPEED
(D) - LENGTH OF MESSAGE
(E) - COMPLETE SHORT MESSAGE
(F) - LENGTH OF MESSAGE CHECK
(G) - BUFFER USED
(H) - ALTERNATE ROUTE

Dec. 14, 1965 H. H. ABBOTT ETAL 3,223,976

DATA COMMUNICATION SYSTEM

Filed May 26, 1961 95 Sheets-Sheet 94

FIG. 100

| PROGRAM A | | | | PROGRAM B | | | |
|---|---|---|---|---|---|---|---|
| TIME INTERVAL | FUNCTION | WORD ADDRESS | | TIME INTERVAL | FUNCTION | WORD ADDRESS | |
| Mt 1-5 | CLM | 0011 | | Mt 1-5 | CA | 0001 | |
| Mt 6-10 | CLM | 0100 | | Mt 6-10 | CA | 0000 | |
| Mt 11-15 | CLM | 0101 | | Mt 11-15 | CA | 0010 | |
| Mt 16-20 | CLM | 0110 | | Mt 16-20 | CA | 0011 | |
| Mt 21-25 | CLM | 0001 | | Mt 21-25 | CA | 0100 | |
| Mt 26-30 | CLM | 0000 | | Mt 26-30 | CA | 0101 | |
| Mt 31-35 | SA | 0001 | | Mt 31-35 | CA | 0000 | |
| Mt 36-40 | SA | 0000 | | Mt 36-40 | CA | 0000 | |
| Mt 41-45 | BTS | n 1111 | LAST TEXT WORD | Mt 41-45 | CA | 0001 | |
| Mt 46-50 | BTS | | | Mt 46-50 | CA | 0001 | |
| Mt 51-55 | BTS | | | Mt 51-55 | STB | 0001 | |
| Mt 56-60 | BTS | | | Mt 56-60 | STB | n EM | LAST TEXT WORD |
| Mt 61-65 | BTS | | | Mt 61-65 | STB | | |
| Mt 66-70 | BTS | | | Mt 66-70 | STB | | |
| Mt 71-75 | BTS | | | Mt 71-75 | STB | | |
| Mt 76-80 | BTS | | | Mt 76-80 | STB | | |
| Mt 81-85 | BTS | a | | Mt 81-85 | STB | | |
| Mt 86-90 | BTS | 0110 | FIRST TEXT WORD | Mt 86-90 | STB | | |
| Mt 91-95 | BTS | 0101 | | Mt 91-95 | STB | | |
| Mt 96-100 | BTS | 0100 | | Mt 96-100 | STB | | |
| Mt 101-105 | BTS | 0011 | | Mt 101-105 | STB | a | |
| Mt 106-110 | BTS | 0010 | | Mt 106-110 | STB | EM | FIRST TEXT WORD |
| Mt 111-115 | BTS | 0001 | | Mt 111-115 | STB | 0001 | |
| Mt 116-120 | BTS | 0000 | | Mt 116-120 | STB | 0010 | |
| | | | | Mt 121-125 | STB & CTS | 0000 | |
| | | | | Mt 126-130 | STB | | |

CLM - CHECK LENGTH OF MESSAGE

SA - SEND ACKNOWLEDGMENT

BTS - BUFFER-CODER TO STORE TRANSFER (OUTGOING MESSAGE)

CA - CHECK ACKNOWLEDGMENT

STB - STORE TO BUFFER-CODER TRANSFER

CTS - CHECK TRUNK SELECTOR ACCESS 3,223,976
DATA COMMUNICATION SYSTEM

Henry H. Abbott, Chatham, Alfred B. Brown, Jr., Montclair, Wallace A. Depp, Mountainside, Renato D. Fracassi, Chatham, and Robert D. Williams, Parsippany-Troy Hills, N.J., assignors to Bell Telephone Laboratories, Incorporated, New York, N.Y., a corporation of New York Filed May 26, 1961, Ser. No. 113,988
53 Claims. (Cl. 340—147)

This invention relates to communication systems and more particularly to the high speed transmission of digital data through a time division switching network.

Progress in the computer art and related fields has developed to such an extent that knowledge may now be converted into digital form, concentrated in a storage unit, and transmitted therefrom as desired, rapidly and with a high degree of accuracy. With the growth of this art and the ever-increasing use of its products, there is a recognition of the need for rapid interchange of such stored knowledge between units in various locations in order, for example, to keep all phases of a company's functions coordinated.

It is a general object of this invention to enable rapid and accurate transfer of data from one location to a selected plurality of remote locations.

In present day high speed, information-handling systems, a practice that may be employed in transferring information from one locality to another is time sharing, or time division multiplexing, which permits the simultaneous exchange of information between each of a plurality of sources and a corresponding one of a plurality of destinations via a common linking circuit. This practice requires that in successive, short time intervals, the source and destination terminals be assigned a frequently recurring, discrete time slot during which information may be sampled and received. In the interval between appearances of the time slot assigned to a particular pair of terminals, the common linking circuit is available to other pairs of terminals. Systems incorporating these time division principles are thus able to conserve expensive switching equipment by sharing certain of the equipment in common among all source and destination terminals of the system.

Such time division principles have been utilized in prior art telephone systems for voice transmission between pairs of telephone lines in communication. Systems of this type are described, for example, in E. T. Burton, A. L. Robinson and E. L. Younker Patent 2,917,583, December 15, 1959, and D. B. James, J. D. Johannesen, M. Karnaugh and W. A. Malthaner, Patent 2,957,949, October 25, 1960.

Data transmission between switching centers in contemporary data-handling systems is at relatively high speed, while the transmission between a terminal and its associated switching center is at relatively low speed. Thus storage facilities at the switching centers are required to act as an intermediary between transmission and control facilities operating at radically different speeds.

The storage media utilized in some data-handling systems have a potential to store huge quantities of data in transit or to store data controlling other data in transit. Thus in teletypewriter systems complete messages, together with their destination addresses, are stored and transmitted in sequence. In such systems, however, the operation is such that normally a complete message is processed and delivered before another message is processed. This frequently proves to be an inefficient use of the capacity of the storage media, not to mention delays incurred on trunks containing messages which must await assignment of storage space while other messages are processed.

Thus it is another object of this invention to provide for the rapid and accurate transmission and distribution of data through a time division communication system.

It is still another object of this invention to improve the traffic-handling capabilities of a time division, data transmission system.

It is a further object of this invention to provide a data-handling system with reliable and flexible storage and control facilities.

These and other objects of this invention are attained in one specific illustrative embodiment wherein the ability to retain large quantities of information in one compact storage device is exploited by the expedient of transferring all incoming and outgoing data messages concurrently between the storage device and the trunks on a time division basis, one bit of each message in transit being transferred in a discrete time interval or time slot in a repetitive cycle of time slots. Also complete messages are transferred between the store and the associated data terminal in parallel, a portion of each cycle in the repetitive cycle of time slots being allocated for the transfer of complete messages.

A plurality of data terminals and a plurality of trunks are each individually connected to a terminal switching center. The terminal switching center comprises facilities for storing messages received from the source terminals, together with routing information or addresses indicating one or more desired destination terminals for each particular message. These messages are received in the store in parallel and are transmitted one data bit at a time over distinct, selected trunks to the switching centers serving the selected destination terminals.

The interchange between store and trunks is implemented on a time division basis such that a data bit of each message is transferred to and from the corresponding trunks in one cycle, followed in the succeeding cycle by a transfer of a second data bit of each message, et cetera. Each cycle of operation also makes provision for the bulk transfer of a message between the store and a source or destination terminal. Thus the system concept is one in which a message is first stored at a terminal switching center in parallel, then is multiplexed with other messages stored therein for serial transmission, a data bit at a time, to a destination terminal switching center, and finally is transferred to its destination terminal in parallel.

In accordance with one aspect of this invention, each trunk circuit comprises a pair of lines, data being transmitted to a destination terminal over one of the lines and data being returned to the originating terminal over the other line for error checking purposes. Data is continually circulated and checked in idle trunks to increase the reliability of the system. Thus when a message is ready for transmission, the trunks are investigated to determine their idle or busy state by the condition of the data currently circulating through the lines. In this fashion the transmission quality of the trunks is readily apparent at all times.

In accordance with another aspect of this invention, a high degree of reliability is achieved in the provision of error checking facilities between the data terminals and the store. This circuitry comprises a buffer essential for preliminary storage of the data while awaiting the availability of a store in the terminal switching center. The buffer operation is combined with a unique coding operation to check the assigned addresses as well as the message text and to insure that the message is received in proper form prior to its transfer to the store from a source terminal or to a destination terminal from the store.

It is a feature of this invention that a communication system comprise means for transferring a complete data message between a data terminal and a storage medium in a part of an office cycle and means for transferring a discrete portion of each of a plurality of data messages between a plurality of corresponding trunks and the storage medium during the balance of the office cycle.

It is another feature of this invention that in a time division data switching system involving a data storage means, the data transfer operation during each office cycle be bidirectional; i.e., each office cycle may include the transfer to or from the storage means of a complete data message and the transfer to and/or from the storage means of a discrete portion of each of a plurality of data messages.

It is a further feature of this invention that each of the active incoming and outgoing trunks in a time division data switching system be connected to a data storage means by gates enabled selectively in a time sequence.

It is a feature in accordance with one aspect of this invention that each of the trunk circuits in a time division data switching system comprise forward and reverse transmission lines, that signals be continually circulated through these transmission lines while the trunks are in an idle condition, and that these signals be observed to determine the instantaneous operating condition of each of the trunks.

It is another feature according to this aspect of the invention that an idle trunk be seized for transmission of a message only upon determination of satisfactory operating characteristics, at which time the idle circulating signals are removed.

It is a feature in accordance with another aspect of this invention that data messages available for transfer between a source and the data store have their destination addresses and text checked for errors by interlaced parity checking circuits, while being properly coded or decoded for transfer to or from the data store respectively.

It is another feature in accordance with this aspect of the invention that messages transferred from the data store be checked for errors and that upon detection of an error, the error detection circuitry itself be examined by coding and decoding in sequence a subsequent outgoing message and comparing the original and decoded form.

It is another feature of this invention that a data switching system comprise circuitry for selecting an alternate trunk route for data messages encountering errors in transmission during an attempt to transmit the message over the first selected trunk and to limit the maximum number of successive alternate routes to which any one data message can be automatically switched.

It is a feature in accordance with another aspect of this invention that a time division data switching system comprise circuitry for permitting the parallel transfer and storage of messages of varying lengths.

It is an other feature in accordance with this aspect of the invention that the coding circuitry and store have a capacity to accommodate a pluralty of destination addresses for a single data message.

A complete understanding of this invention and of the above-noted and other features thereof may be gained from consideration of the following detailed description with reference to the accompanying drawing, in which.

Figure 2:
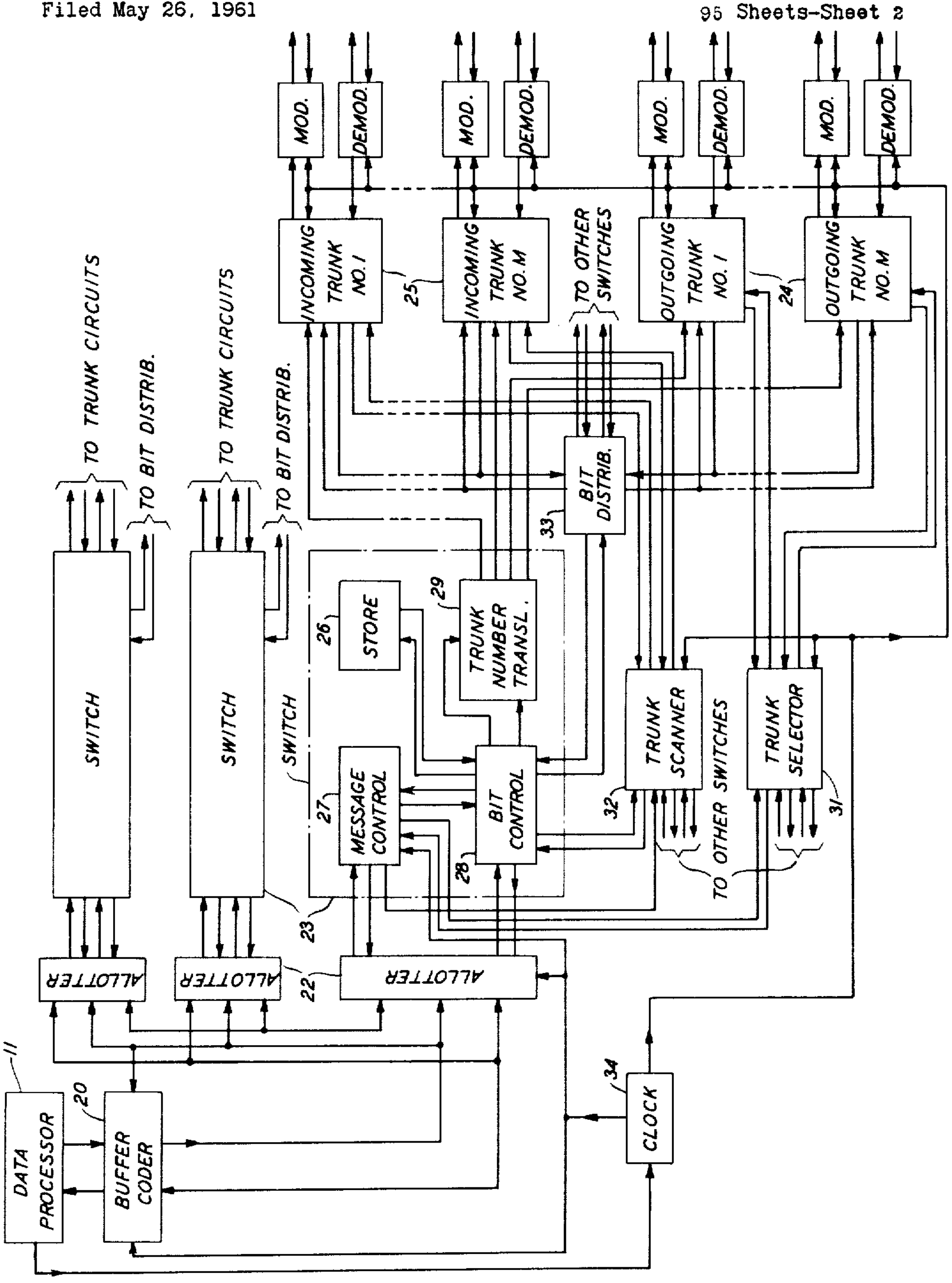
FIG. 2 is a simplified block diagram representation of one specific embodiment of a terminal switching center in accordance with this invention.
Figure 19:
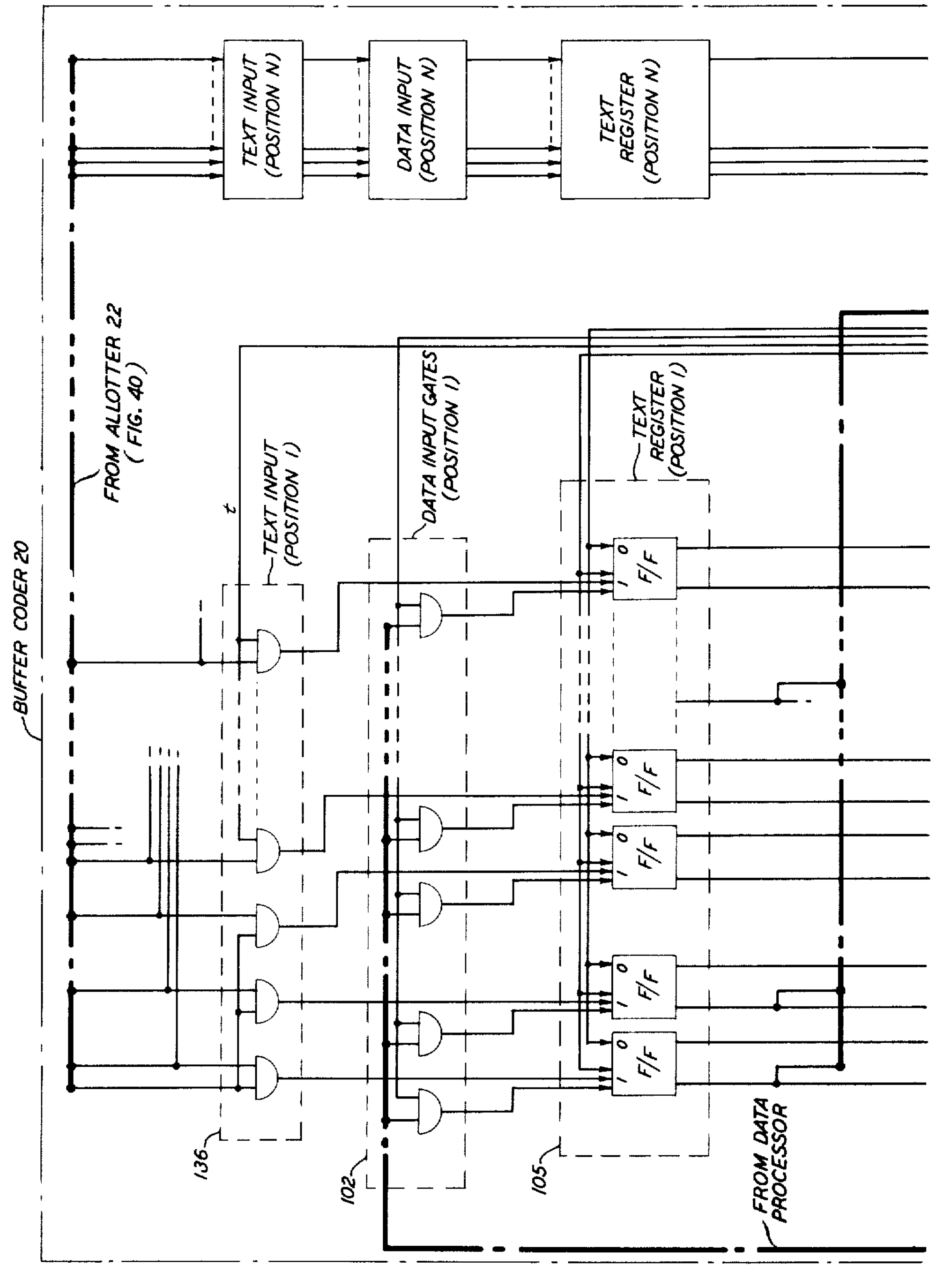
Figure 91:
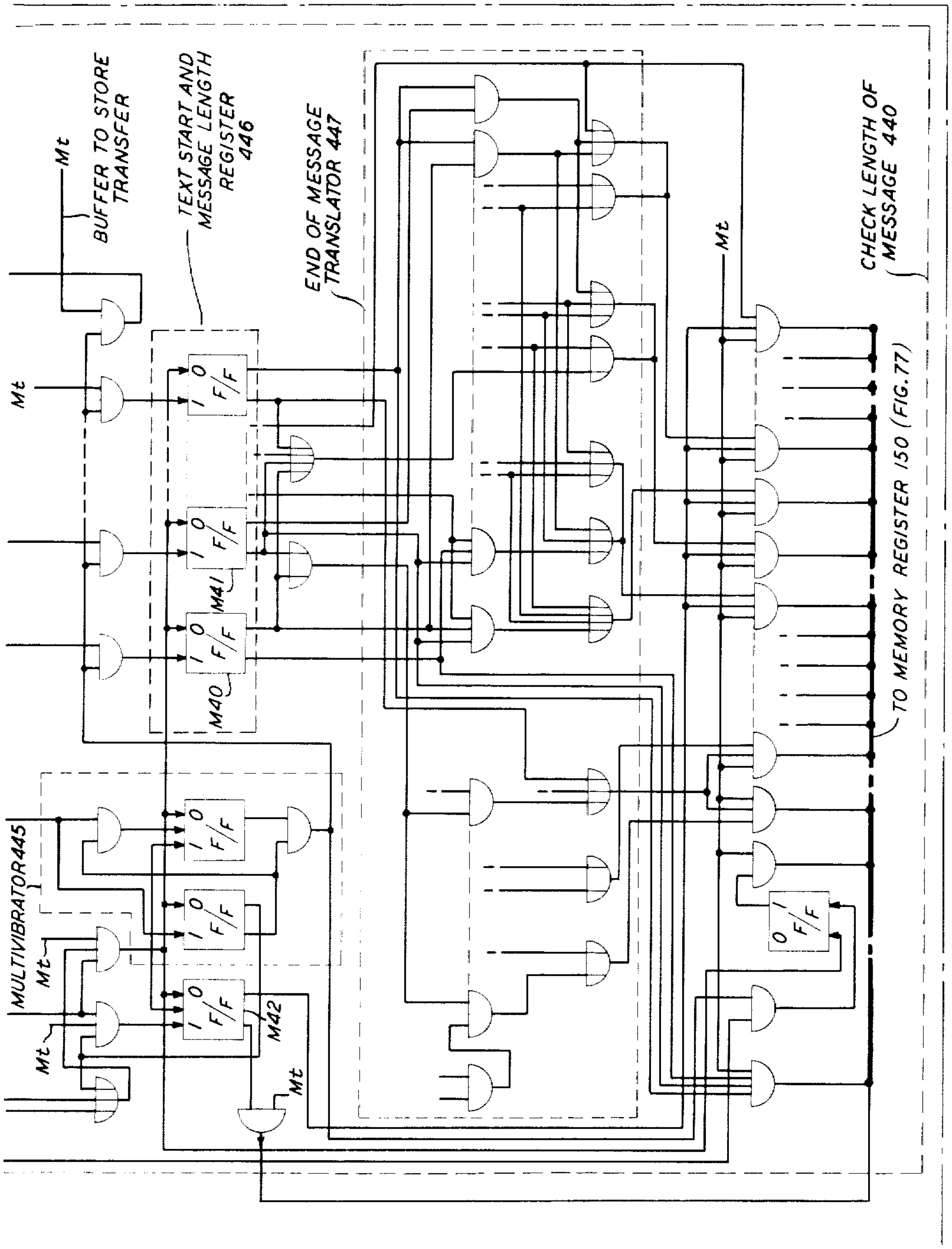
Figure 98:
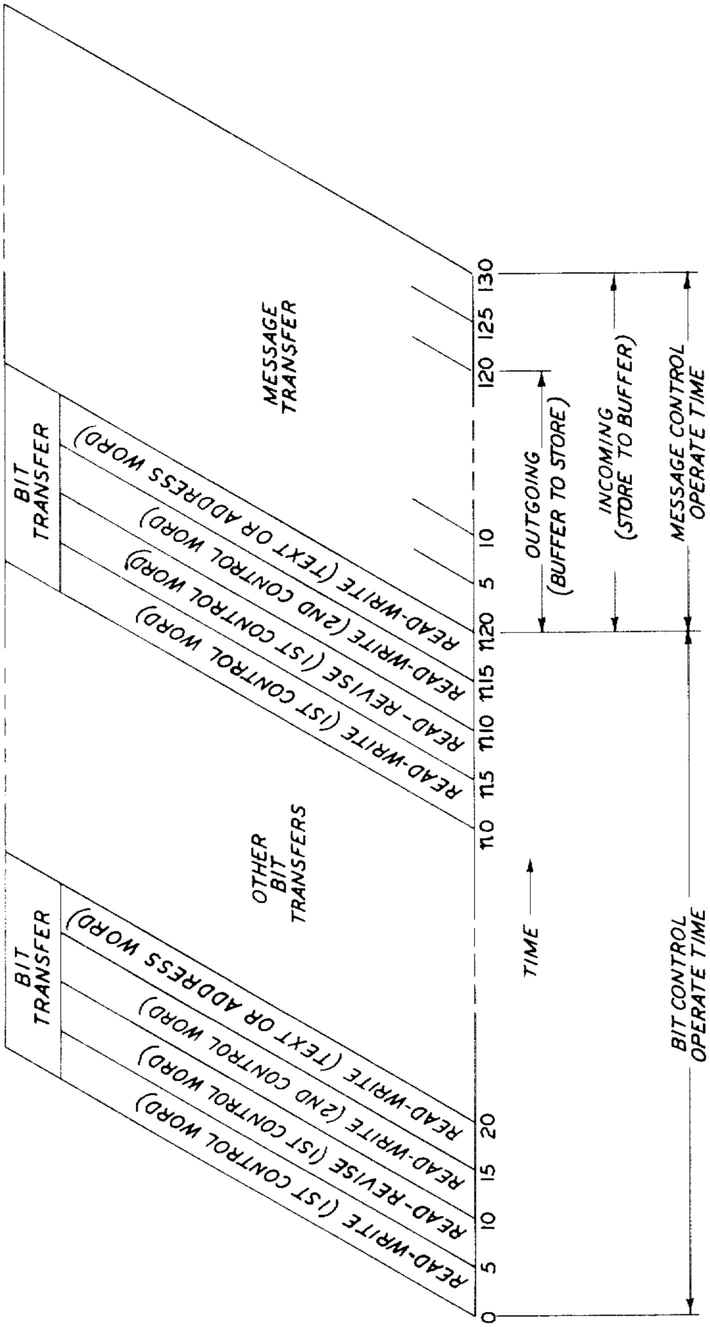

FIGS. 19 through 91 depict a schematic representation of the specific embodiment of FIG. 2, the arrangement of FIGS. 19 through 91 being shown in the key diagrams of FIGS. 92 through 97;

FIG. 98 depicts the cycle of operation of the central office;

FIG. 99 is a chart exemplifying the messages and addresses stored in the data store;

FIG. 100 depicts the program for the message control operation; and

Figure 101:
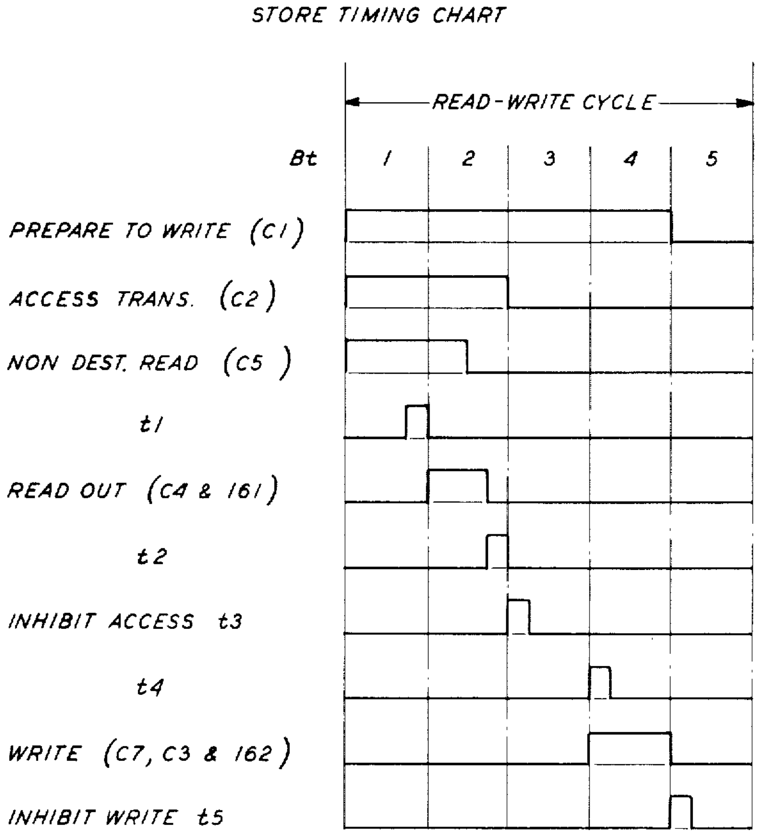

FIG. 101 is a time chart of the operation of the store in the establishment of a typical communication path for the transmission of data through the system.

Figure 1:
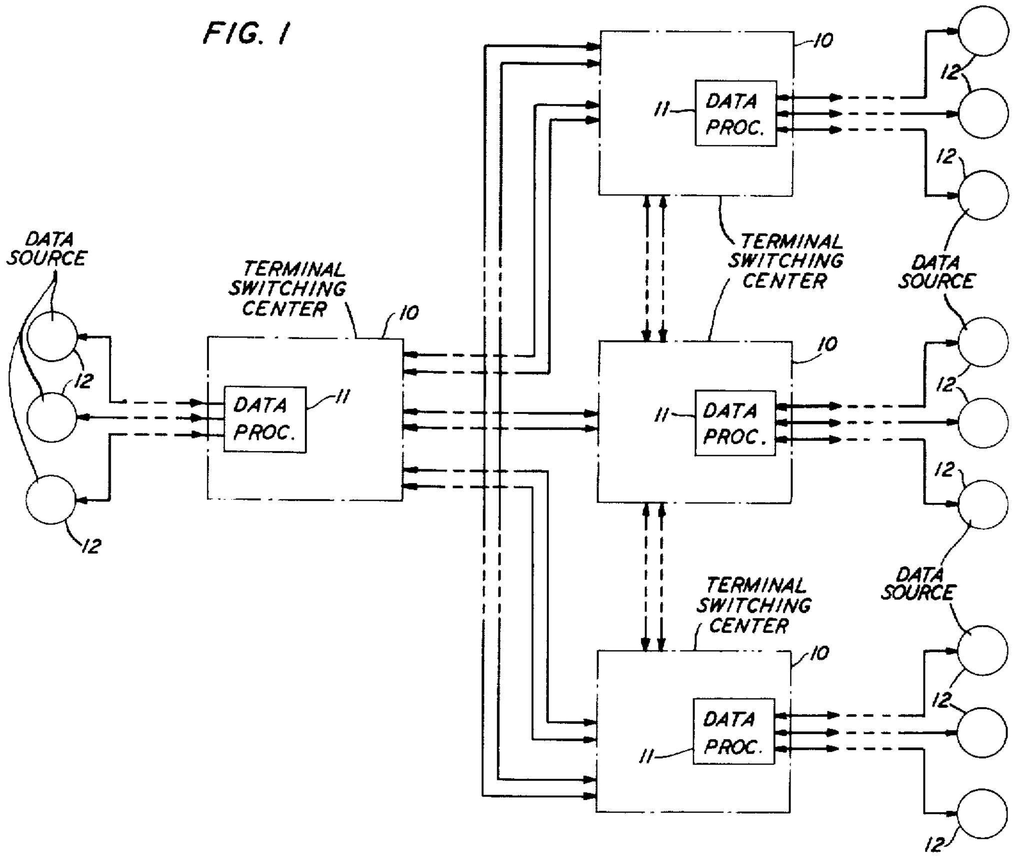
FIG. 1 is a diagrammatic representation of an integral time division data communication system.

Turning now to the drawing, the basic elements of a data communication system illustrative of one specific embodiment of this invention are depicted in FIG. 1.

Thus a number of termnial switching centers 10, depicted in more detail in FIG. 2, are interconnected by transmission lines or trunks so as to permit communication between each center and selected remote centers. Each terminal switching center is linked through a data processor 11 to a number of data sources or terminals 12. Thus any terminal 12 which, for example, may be a branch office of a large corporation, desiring to transmit various data to a number of other branch locations, feeds the data into the data processor 11 in its associated terminal switching center 10. After processing, the data is transmitted at high speed to the switching centers 10 associated with the desired terminal locations 12 and through the corresponding data processors 11 to the selected data terminals 12.

As seen in FIG. 2, a data processor 11 is connected to the other basic components of one terminal switching center. The data processor 11 receives raw data from the associated terminals and converts it into a form which can be utilized in the various other components of the terminal switching center 10. In this specific illustrative embodiment of the invention, the data is put in binary form with routing information provided at the end of each message. The terminal switching center is arranged such that messages incoming from other terminal switching centers are processed and transferred to the data processor 11 in the same binary form but of course with the routing information omitted.

The buffer coder 20 accepts outgoing messages from the data processor 11, encodes them in a form suitable for the subsequent circuitry in the system and transmits them to an available storage and control center, referred to hereinafter as a switch 23, under the direction of an allotter 22. The buffer coder 20 also accepts incoming messages from the switches 23 through the corresponding allotter 22, decodes them and transmits them to the data processor 11.

A switch 23 performs essentially two main functions; viz., transferring a message from the buffer coder 20 to the bit distributor 33 from which it will be sent to an outgoing trunk 24, and transferring a message which has come from an incoming trunk 25 to the buffer coder 20. The messages as they are transferred through the switches 23 are in binary code form consisting of a plurality of binary digits or bits. These bits are transferred in parallel form, a word at a time, between the buffer coder 20 and the switches 23, a binary word consisting of a group of bits. Between the switches 23 and the trunks 24 and 25 the messages are switched in a serial form and multiplexed such that a bit of one message is sent from a switch 23 to an outgoing trunk 24, followed, for example, by receipt at the same switch 23 of a bit of another message from an incoming trunk 25. When one bit of each message being transferred through the system has thus been processed, the subsequent bit of each message will be handled.

In order to assure that a message transmitted through the system has been received without error or that a trunk to a desired terminal center is operative and available to handle a message, each trunk circuit, both outgoing and incoming, comprises a forward and a reverse transmission line. Acknowledgments of transmitted messages or of special codes indicative of an idle trunk are transmitted from and returned to each terminal over the same trunk by means of these forward and reverse lines.

Each switch 23 comprises a store 26, a trunk number translator 29, a bit control 28, and a message control 27. The store 26 in this illustrative embodiment of the invention comprises a twistor memory of the type disclosed in a patent of A. H. Bobeck, No. 3,083,353, issued March 26, 1963. Specific areas of the store are set aside for outgoing and incoming messages. Each specific area, referred to hereinafter, as a message slot, will accommodate the words of each message up to a specified length transmitted through the system. For ease of understanding it may be visualized that each word is stored directly below the previous word of the same message analogous to a telegram; the bits corresponding to the letters of the alphabet, the message words corresponding to the lines of a telegram, and the message slot representing the paper on which the telegram is written. A typical message slot content at any moment is depicted in FIG. 99.

The message control 27, together with the store 26, performs the parallel switching functions of the system encountered between the buffer coder 20 and the switches 23. Similarly, the bit control 28, together with the store 26, performs the multiplex switching functions encountered between the switches 23 and the trunks 24 and 25. The trunk number translator 29 enables the particular trunk to which information is to be delivered or from which information is to be received during a selected distinct time interval in each office cycle.

The trunk selector 31 and the trunk scanner 32, as their names imply, assist in the assignment of trunks for the transfer of messages between terminal switching centers 10.

The synchronization of all of the switching and control elements in the terminal center is implemented by the clock 34, which in turn receives its reference time indication from the data processor 11. The timing requirements of the system revolve basically around the timing requirements of the switch 23. In a repetitive office cycle, as illustrated in FIG. 98, the switch transfers one binary digit or bit of each of a plurality of binary coded messages in sequence and may either receive one complete message from the buffer coder 20 or transfer one complete message to the buffer coder 20. Each office cycle is itself divided into discrete intervals to accommodate these various operations. For example, the transfer of one bit of each of a plurality of messages between a switch 23 and a trunk 24 or 25 is accomplished in distinct, small fractions of the cycle, referred to as time slots, while during another discrete portion of the office cycle occupying the equivalent of a number of time slots, the parallel transfer of an entire message between a switch 23 and the buffer coder 20 is effected.

The office cycle, FIG. 98, message bit allocation, FIG. 99, and programs, FIG. 100, may be referred to during the exposition of the circuitry involved to aid in appreciating the operation of that circuitry. It is thus intended for explanatory purposes, and no attempt has been made to depict actual time intervals, et cetera.

Figure 3:
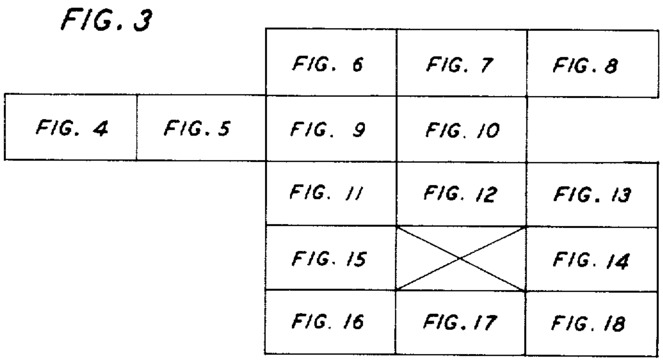

FIGS. 4 through 18, when assembled according to FIG. 3, present a more detailed block diagram of the specific illustrative embodiment of the invention described herein. The major components of the system and their operation will now be described with regard to that diagram, reference also being made to the detailed circuit schematic of this specific embodiment of the invention depicted in FIGS. 19 through 91 for consideration of the various exemplary circuit elements depicted therein.

*Buffer coder*

Figure 4:
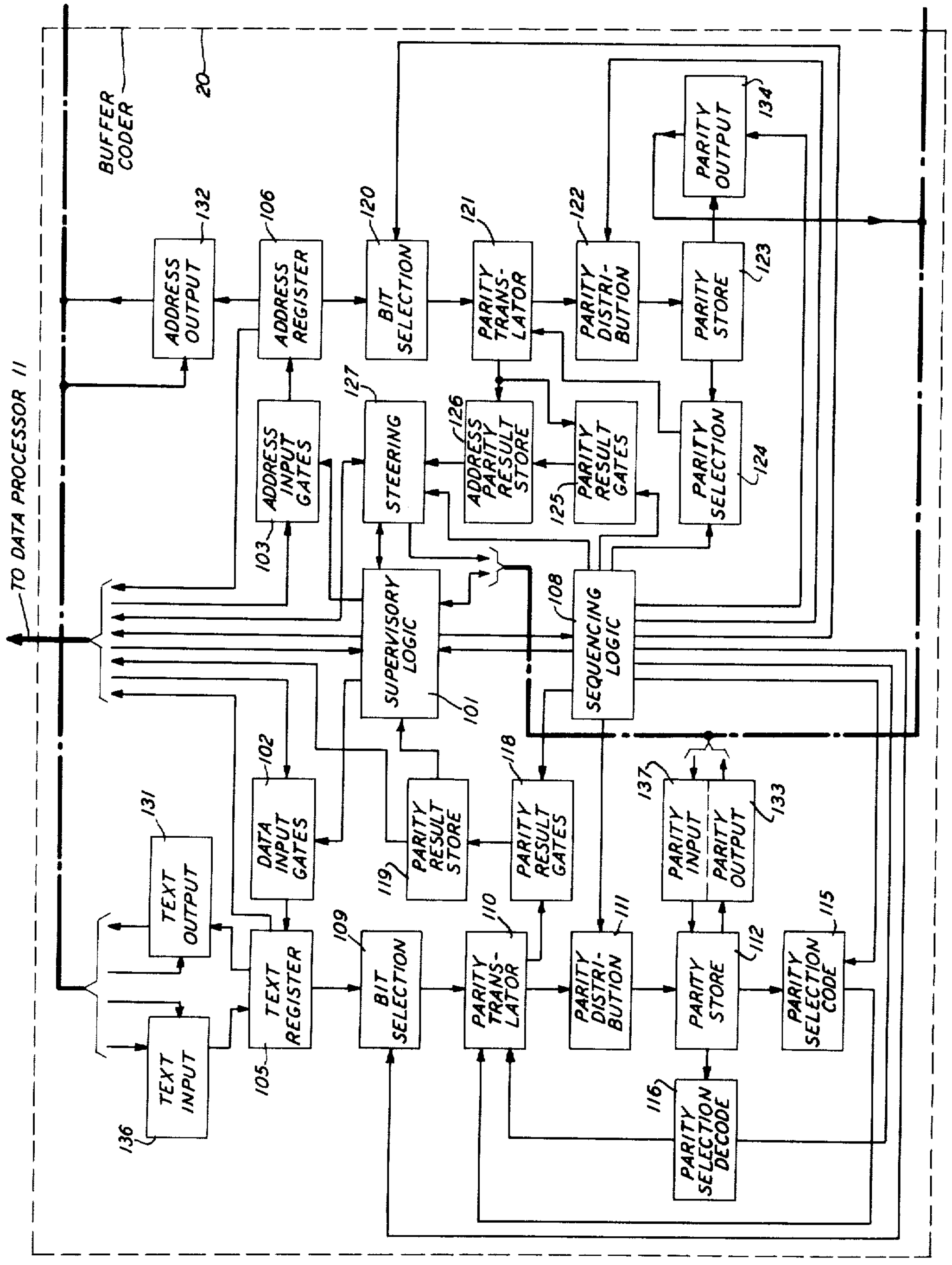
FIGS. 4 through 18 depict a more detailed block diagram representation of the specific illustrative embodiment of FIG. 2, the arrangement of FIGS. 4 through 18 being shown in the key diagram of FIG. 3.
Figure 5:
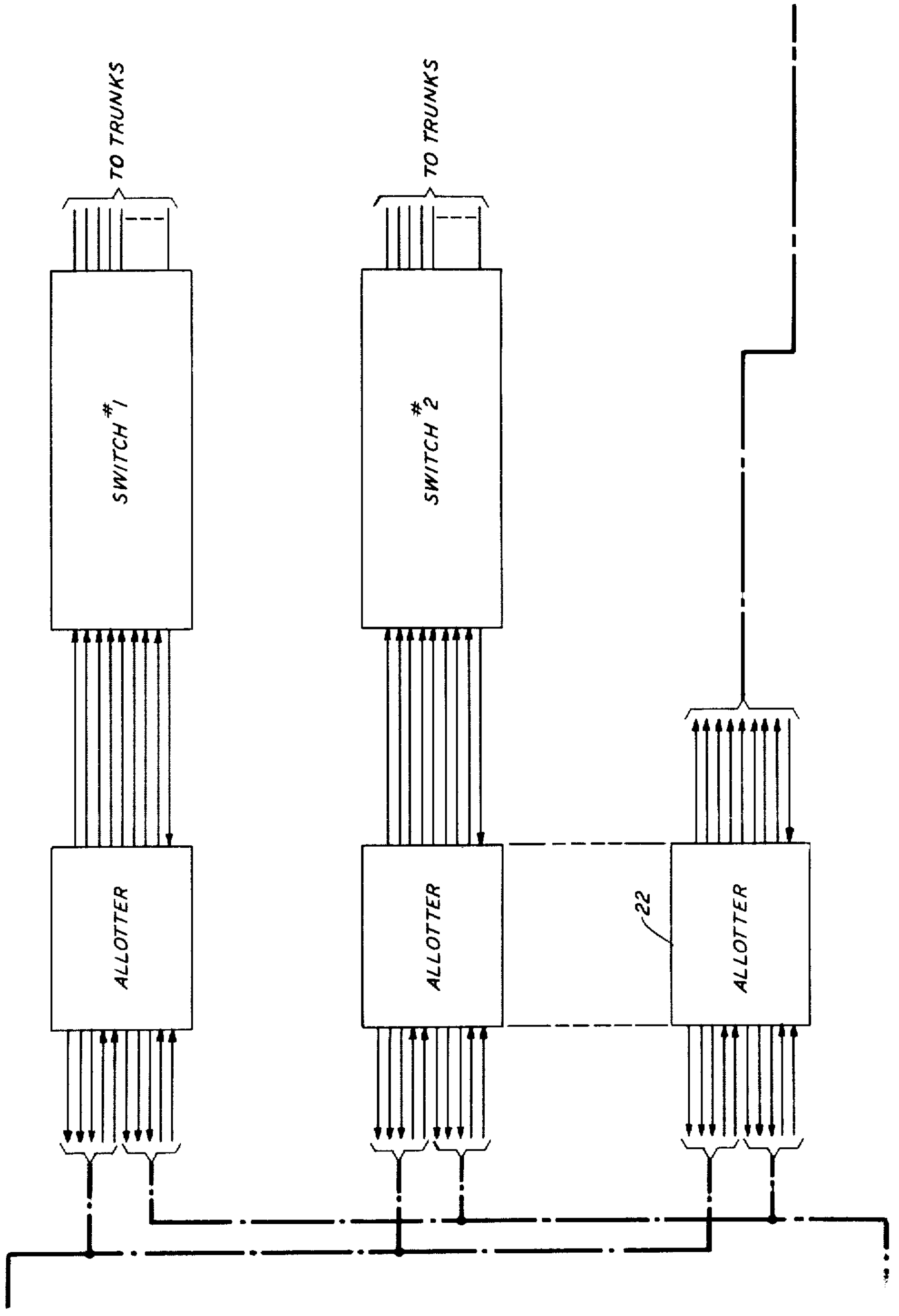

Messages which originate in the data processor 11 are transferred to the buffer coder 20, FIG. 4, after appropriate supervisory signals have been exchanged. The data is transferred to the buffer coder 20 in parallel form. Upon receiving a message, the buffer coder 20 adds to it the necessary parity bits for adequate error detection and checks the simple parity of the overall text to insure that the transfer of information was error free. In addition the buffer coder checks each of the message destination addresses to insure that they have the proper simple parity and generates appropriate error detection bits for each address. The buffer coder then notifies the allotter 22 to transfer the text of the message together with the addresses to a switch 23.

On messages incoming to the data processor 11, the buffer coder receives only the text portion of the message which it checks together with its parity bits for error-free transmission. If the message text is satisfactory, the buffer coder notifies the switch 23, which in turn gives a release acknowledgment to the transmitting terminal switching center, and both the transmitting and receiving switches are cleared. The buffer coder then transmits the message to the associated data processor 11 after another exchange of supervisory signals. The final release comes from the data processor.

If the message is not received error free by the buffer coder, the switch 23 would be so notified, and the corresponding switch 23 at the originating terminal switching center would be requested to retransmit the message.

Figure 27:
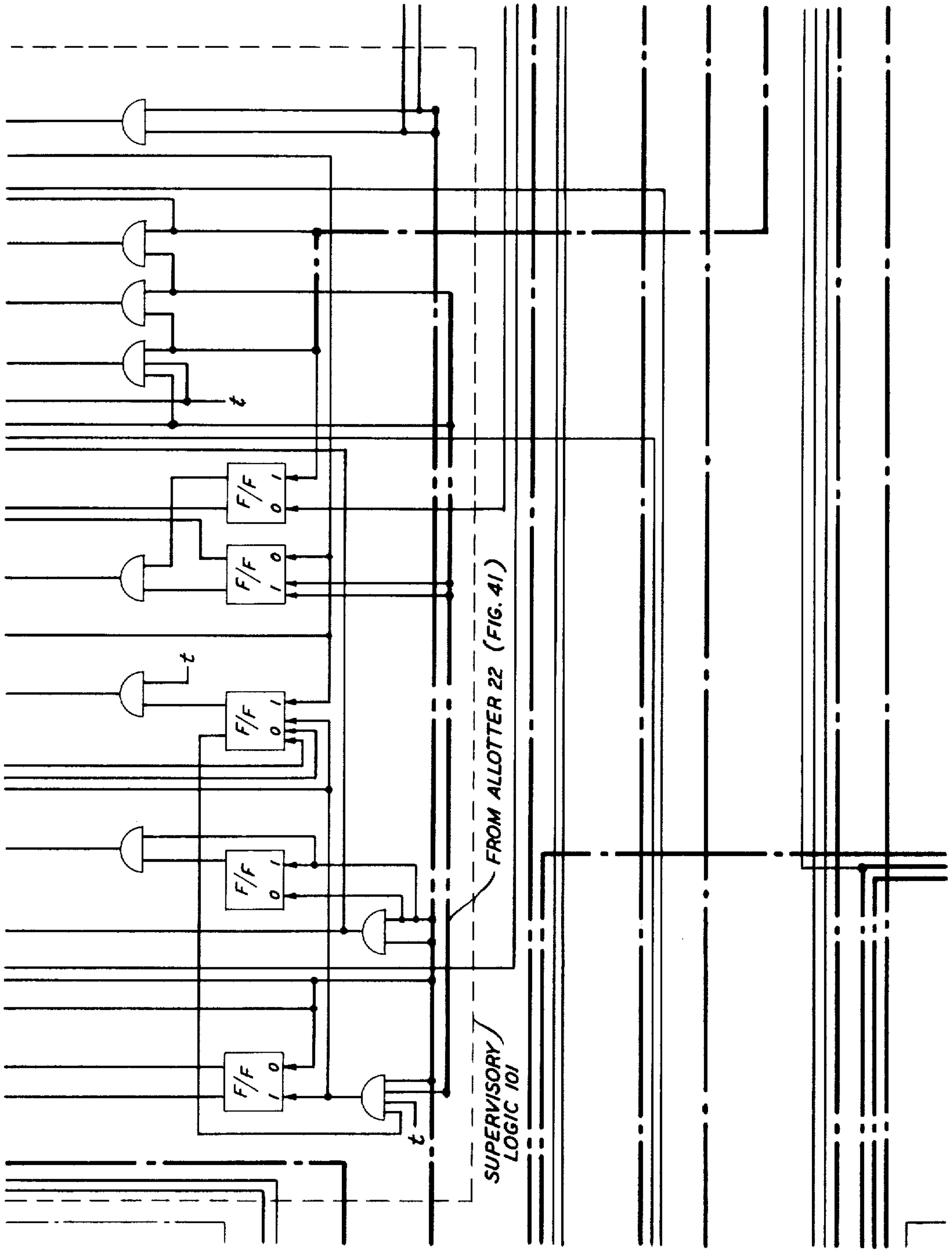
Figure 92:
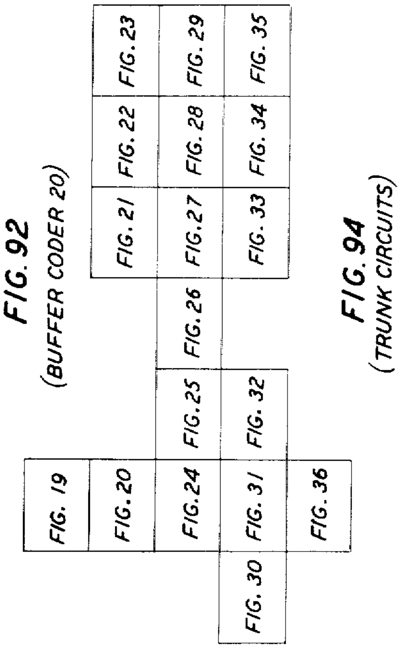
Figure 94:
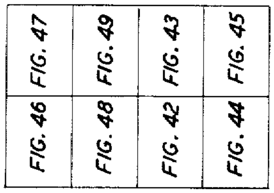
Figure 96:
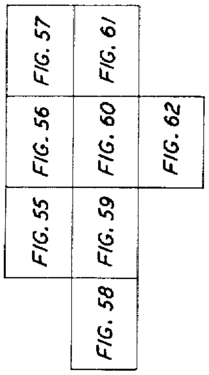

Considering the more detailed disclosure of the text portion of the buffer coder 20 in FIGS. 19–36, arranged according to the key chart of FIG. 92, as well as FIG. 4, appropriate supervisory signals are interchanged between the data processor 11 and the buffer coder 20 preceding transfer of a message. Such signals are received in the supervisory logic 101, comprising, in this specific embodiment, conventional logic circuitry including AND gates and flip-flop circuits, as shown in FIGS. 21 and 27. These signals, together with appropriate timing signals from the clock 34, actuate the supervisory logic 101 so as to enable data input gates 102, FIG. 19, and address input gates 103 to permit the text register 105, also a series of flip-flops, FIG. 19, and the address register 106, respectively, receive data from the data processor 11.

A coding cycle to facilitate error detection is thereupon initiated. The particular method of coding utilized in the buffer code 20 in this specific embodiment guarantees an overall even parity by utilizing multiple interleaved parity checks. Such an error checking scheme requires that the message to be checked be divided into repetitive numbered blocks, the parity checks being applied to the corresponding numbered bits of each block. Such groups of parity checking blocks are referred to as modulos.

Assume, for example, that a message is ten bits long and the bit positions of the message are numbered modulo 3. The message and the corresponding modulo 3 parity checking blocks would thus appear as follows:

| | | | | | | | | | | | | | |
|---|---|---|---|---|---|---|---|---|---|---|---|---|---|
| Message bit | 1 | 2 | 3 | 4 | 5 | 6 | 7 | 8 | 9 | 10 | $P_1$ | $P_2$ | $P_3$ |
| Modulo 3 | 1 | 2 | 3 | 1 | 2 | 3 | 1 | 2 | 3 | 1 | 2 | 3 | 1 |

The characters $P_1$, $P_2$ and $P_3$ noted above indicate the three parity bits which must be generated to permit error checking utilizing modulo 3. For instance, the parity bit $P_1$ may be chosen to make the parity of the binary digits stored in the corresponding numbered bit positions even. In this example parity bit $P_1$ corresponds to bit position 2 and thus serves the second bit position in each modulo 3 block of the text. If even parity is desired, the indication in the parity position $P_1$ is chosen so that the number of like indications in the bit positions of the text numbered 2 will be even. The same is true of each of the other parity bits with regard to their corresponding numbered positions of the modulo 3 blocks.

Such a scheme assures that no undetected error can be due to a single noise burst of three bits duration or less. However, this arrangement does not obviate the possibility of two or more independent errors occurring in distant blocks of the modulo rather than in adjacent bit positions of the same block. To guard against such occurrences, additional parity bits counted in modulos other than modulo 3 are interleaved with the modulo 3 parity bits. Thus while one device in the coding circuit may be counting modulo 3, another may be counting modulo 5.

The above example would appear as follows:

| Message bit | 1 | 2 | 3 | 4 | 5 | 6 | 7 | 8 | 9 | 10 | $P_1$ | $P_2$ | $P_3$ | $P_4$ | $P_5$ | $P_6$ | $P_7$ | $P_8$ |
|---|---|---|---|---|---|---|---|---|---|---|---|---|---|---|---|---|---|---|
| Modulo 3 | 1 | 2 | 3 | 1 | 2 | 3 | 1 | 2 | 3 | 1 | 2 | 3 | 1 | | | | | |
| Modulo 5 | 1 | 2 | 3 | 4 | 5 | 1 | 2 | 3 | 4 | 5 | | | | 1 | 2 | 3 | 4 | 5 |

In this instance, in order for an undetected error to occur, there must be at least one error in the message and two errors in the parity section compensating the error in the message. The likelihood of this occurring is of course considerably less than the likelihood of error from a single modulo checking scheme, and in turn the use of three interleaved modulos virtually eliminates the possibility of an error going undetected. Such a three modulo interleaved parity checking scheme is utilized in the specific illustrative embodiment of the invention.

Figure 20:
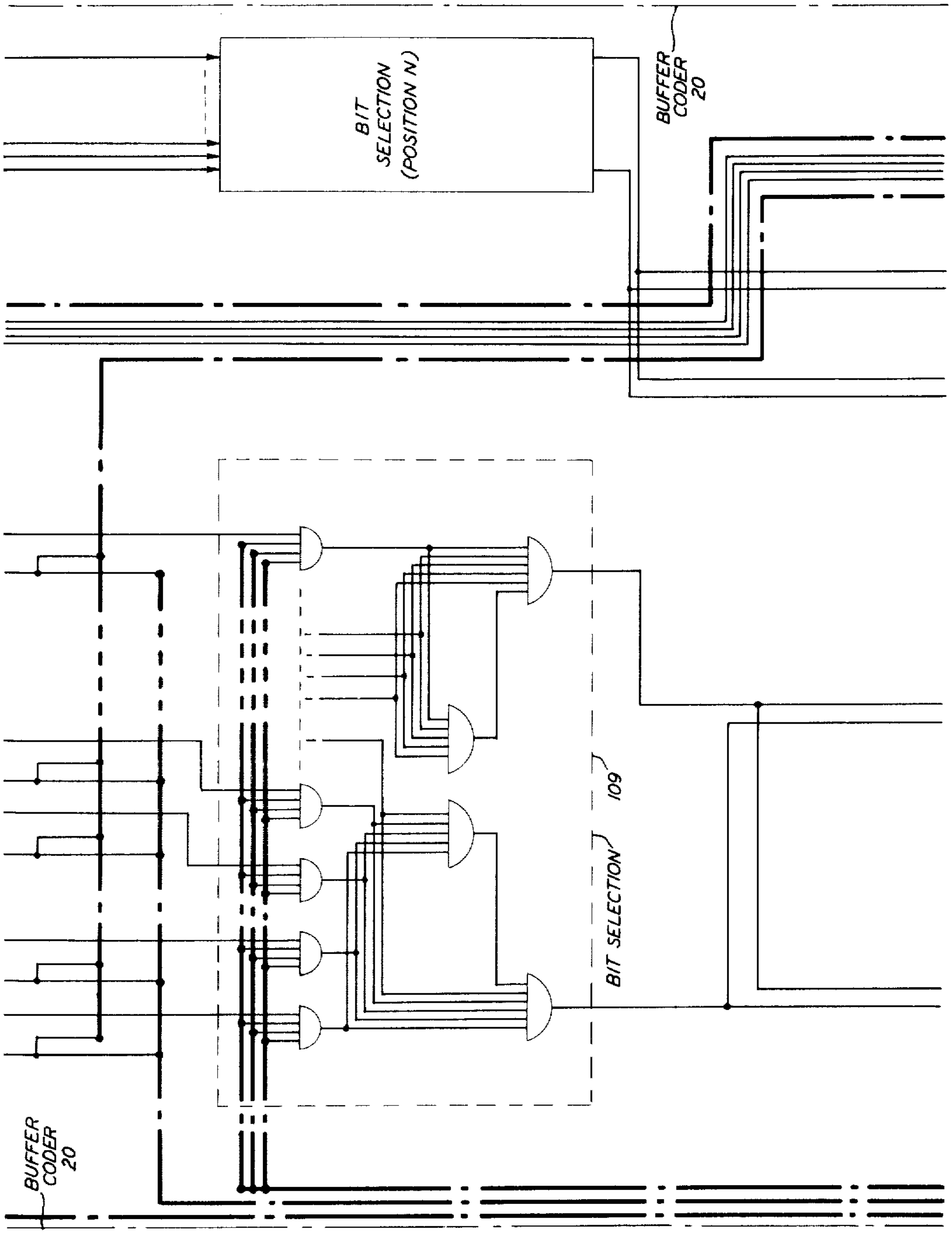
Figure 21:
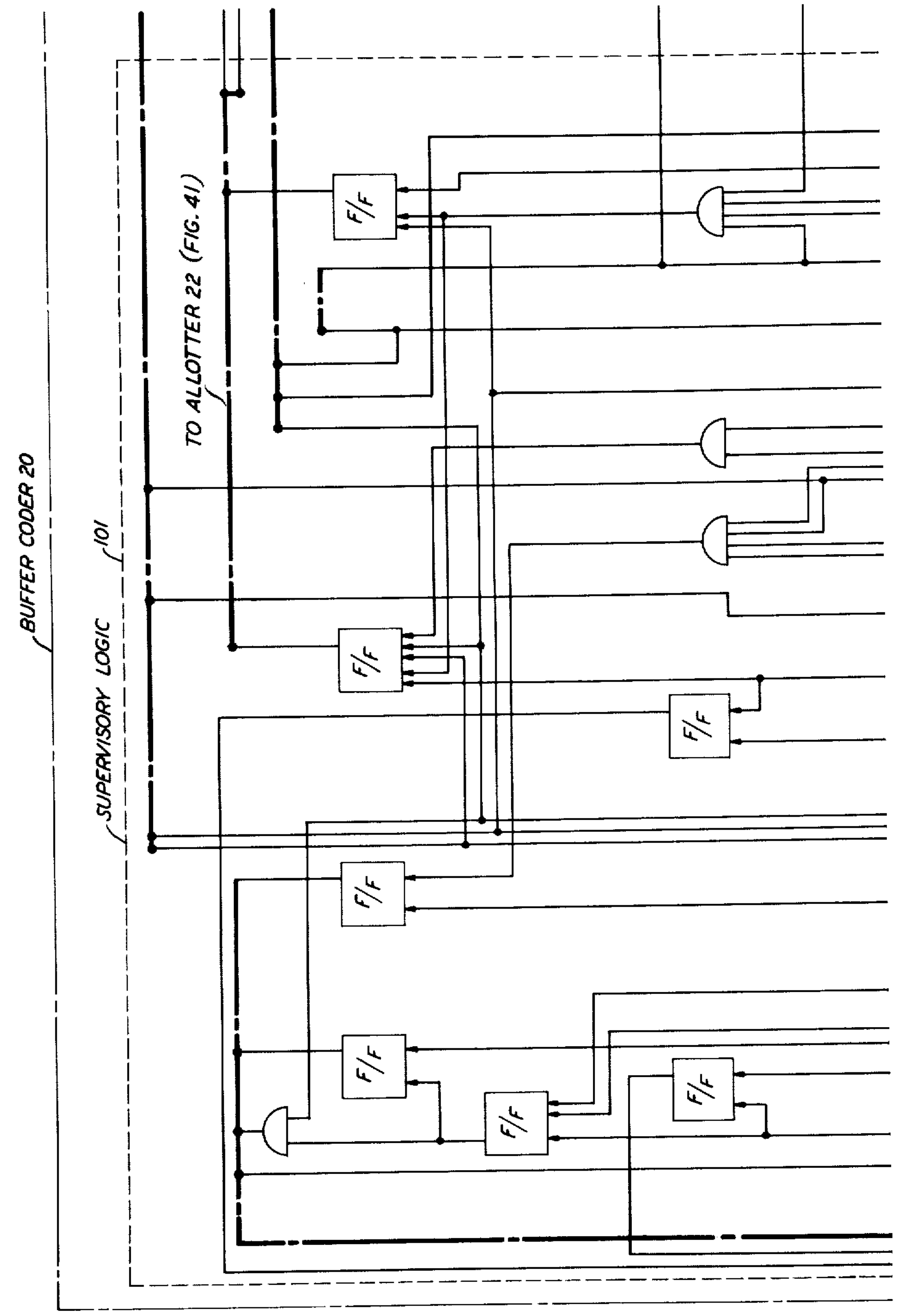
Figure 24:
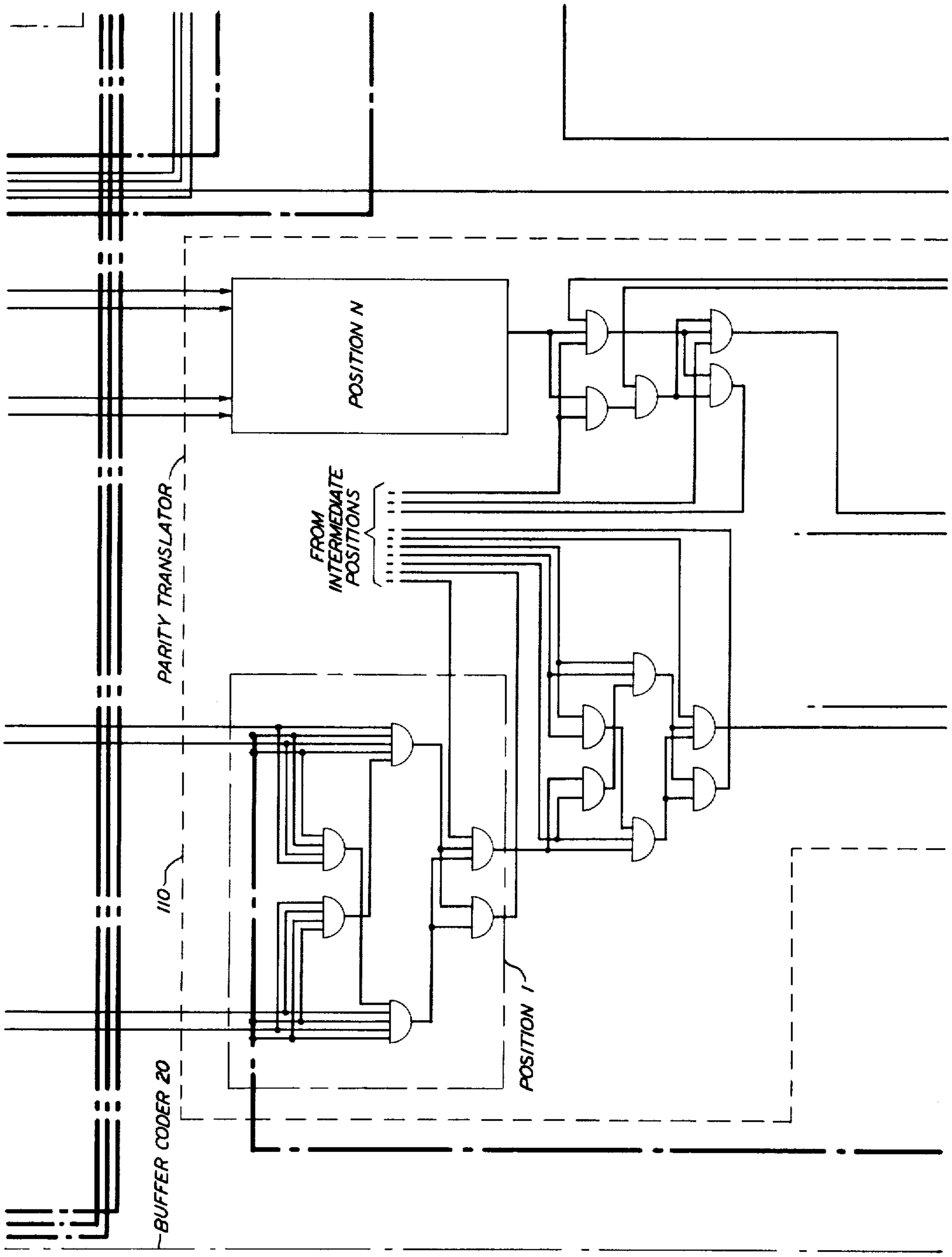
Figure 25:
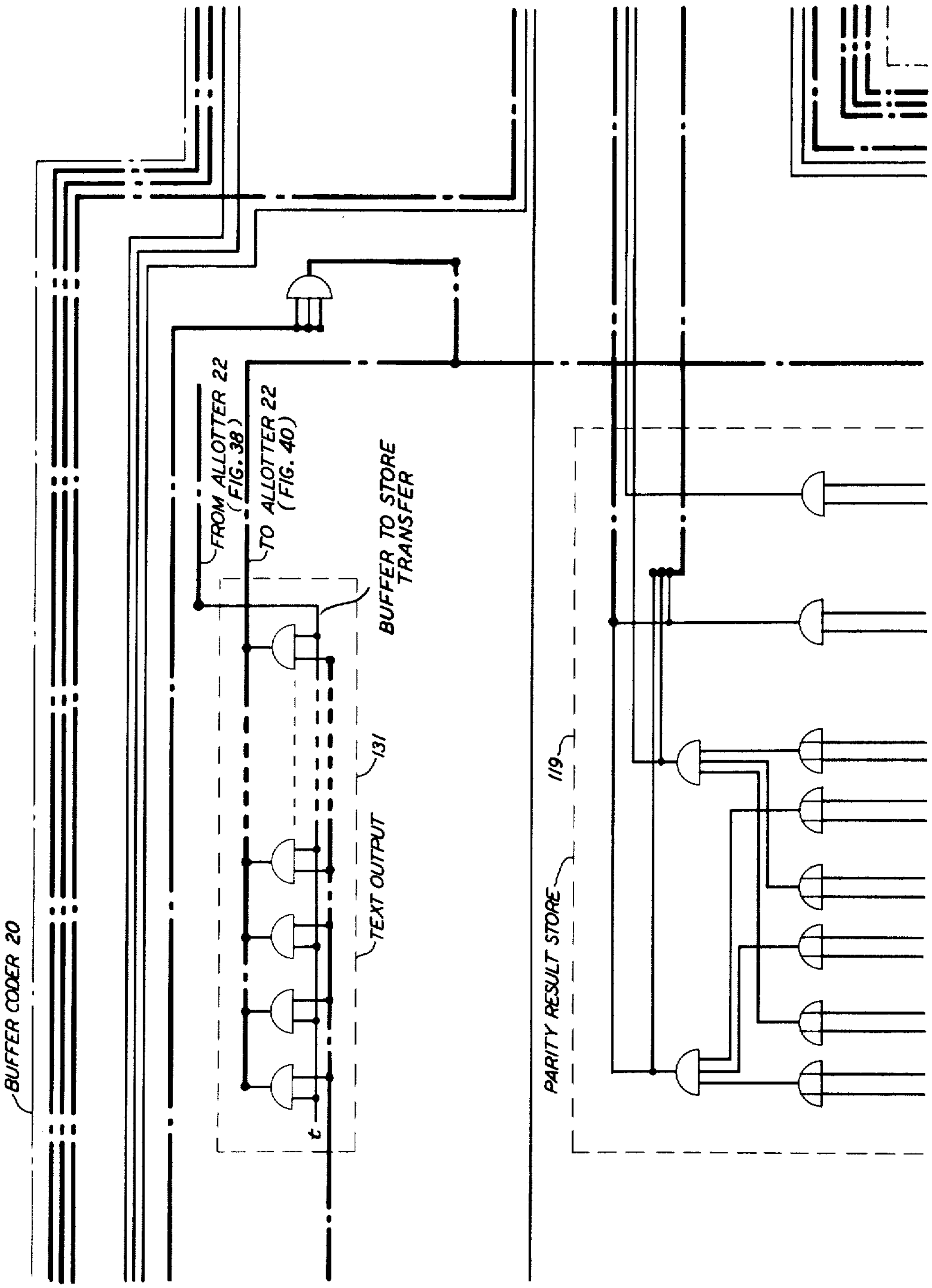
Figure 26:
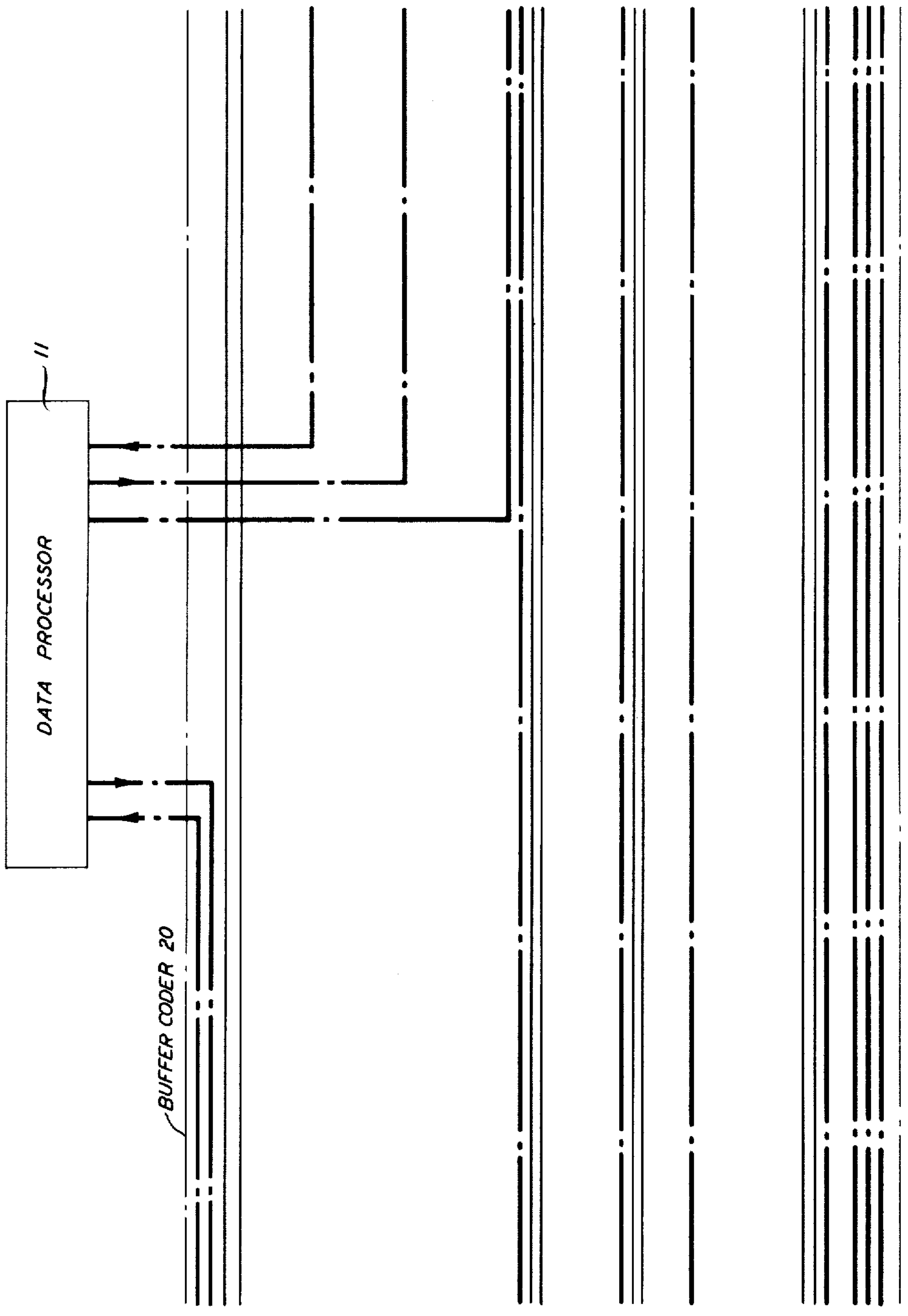
Figure 31:
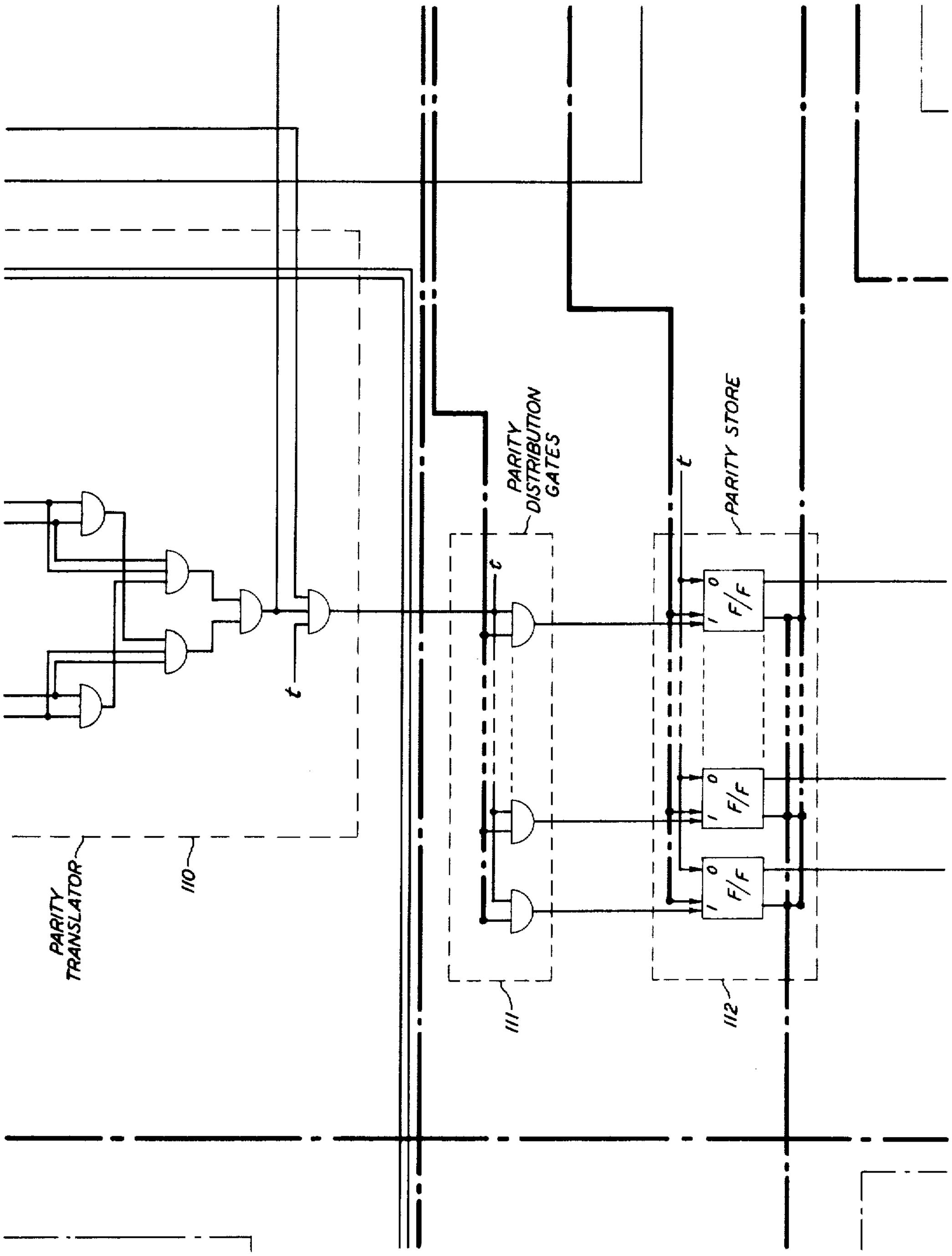
Figure 32:
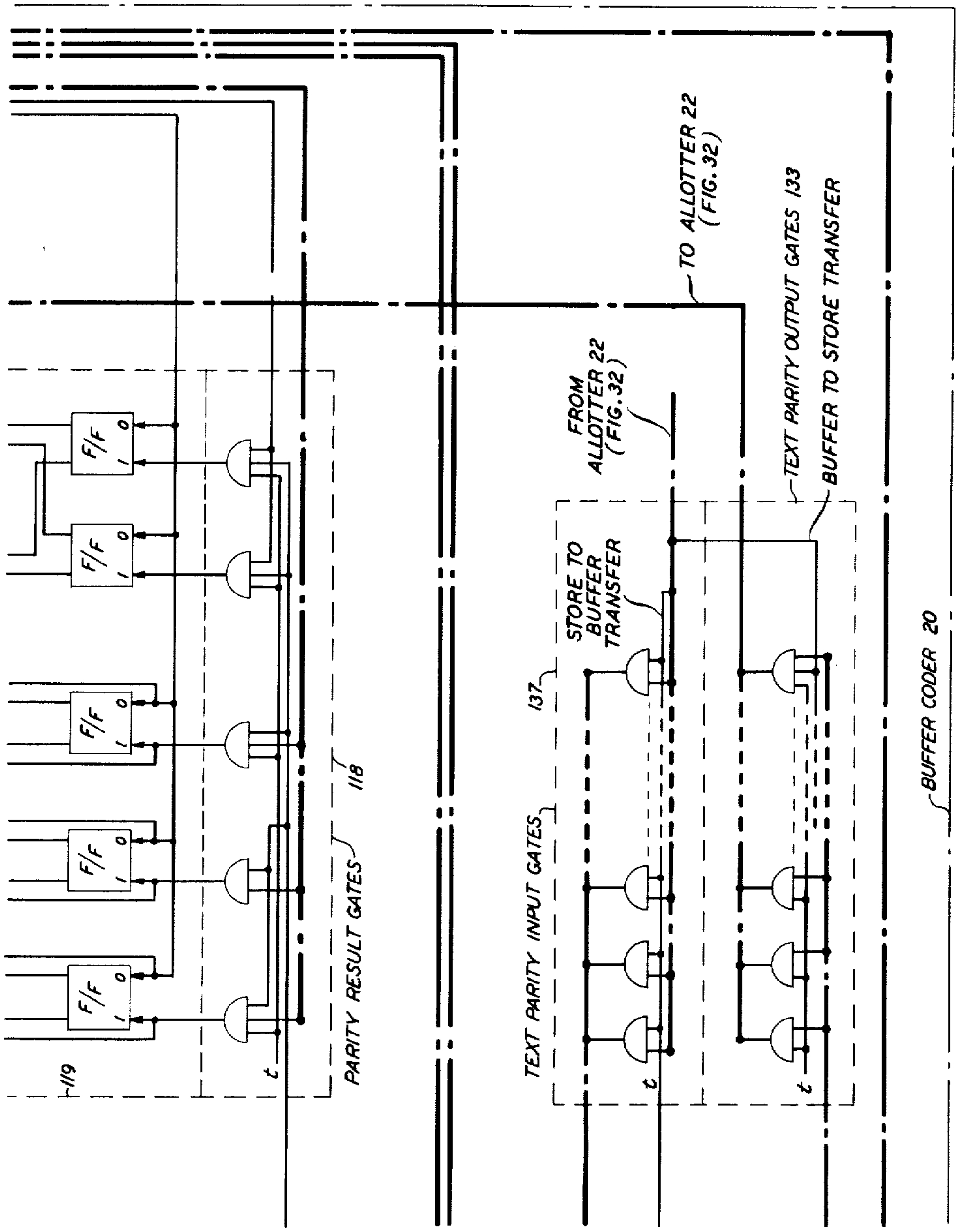
Figure 33:
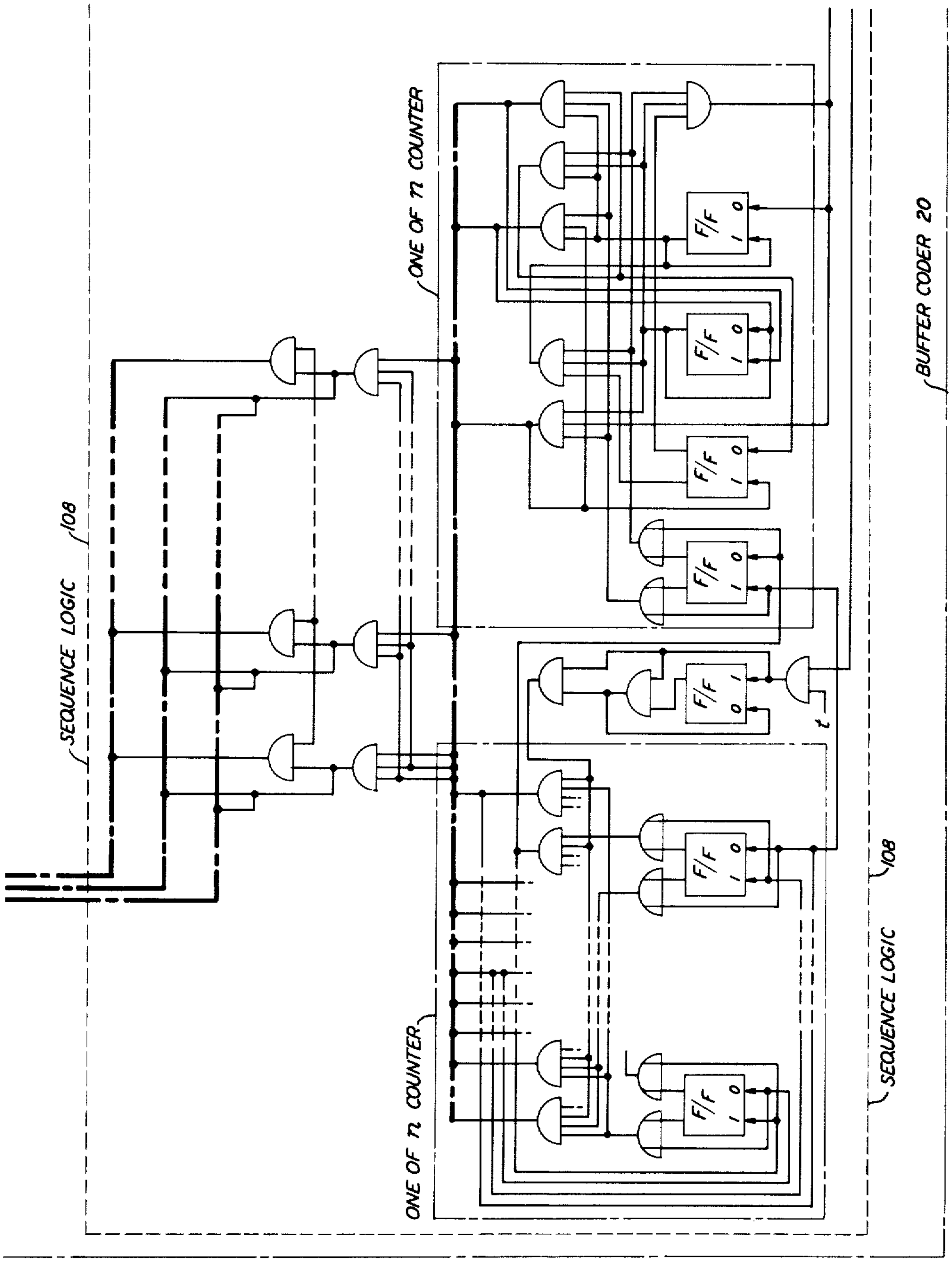
Figure 34:
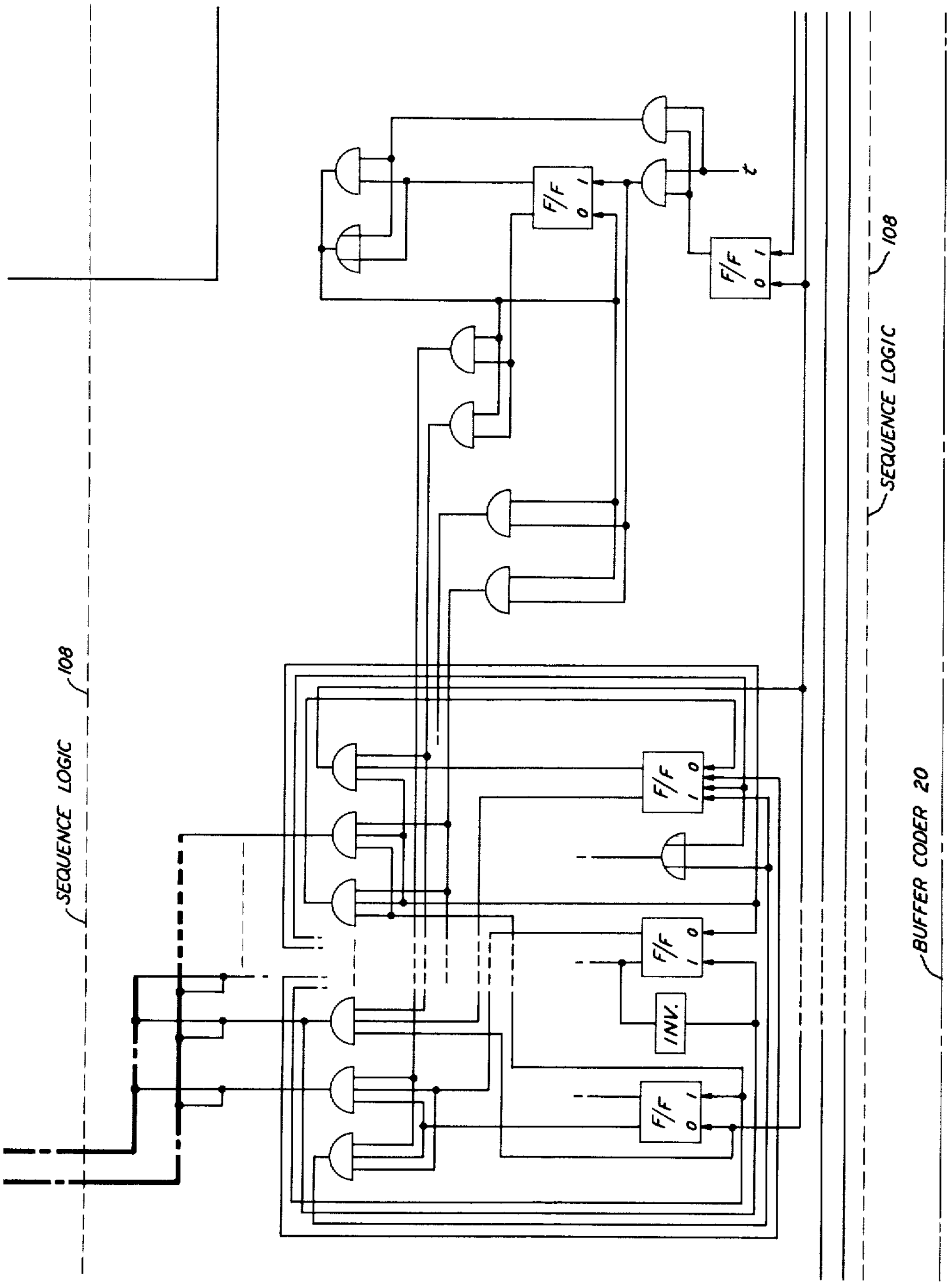
Figure 35:
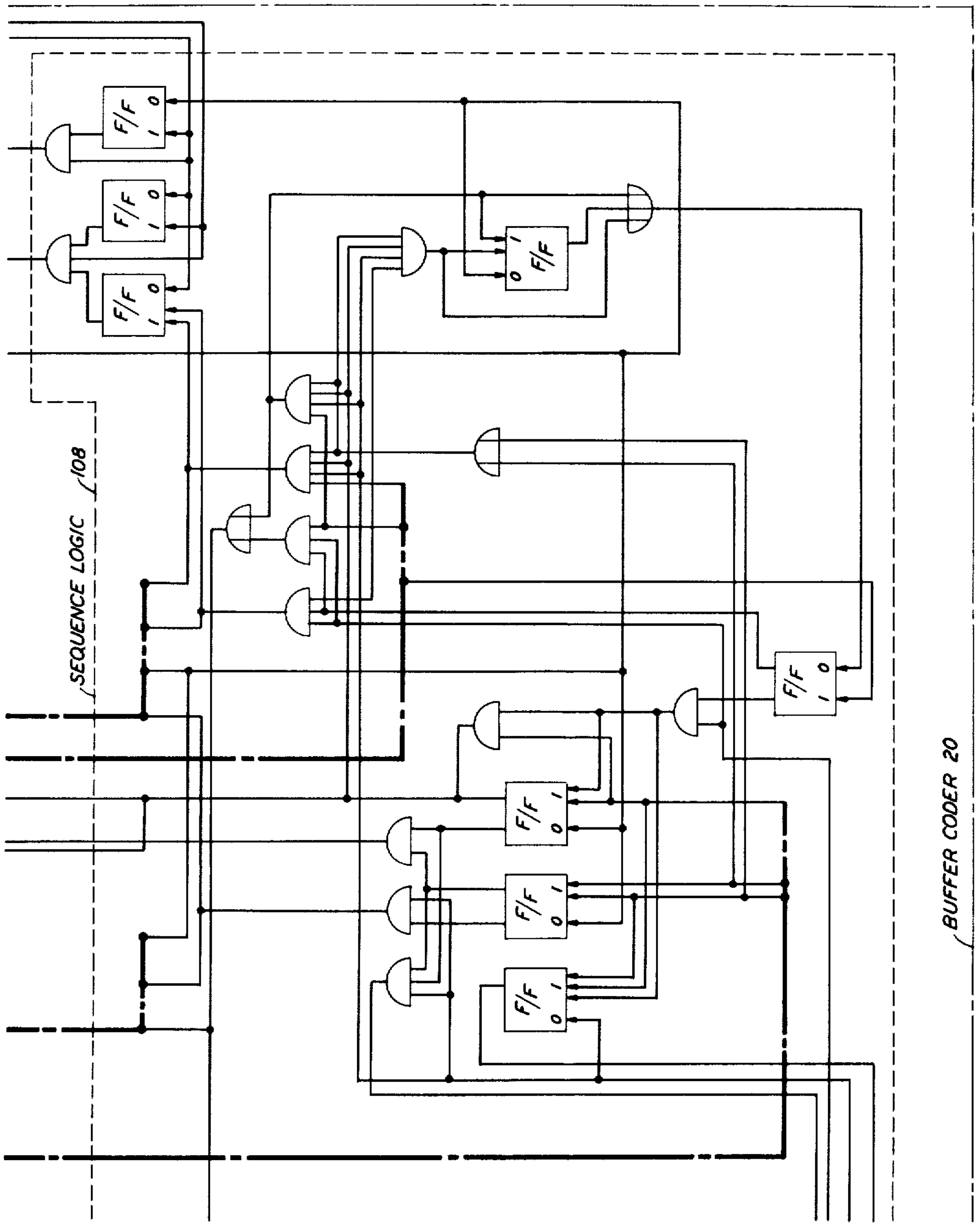
Figure 36:
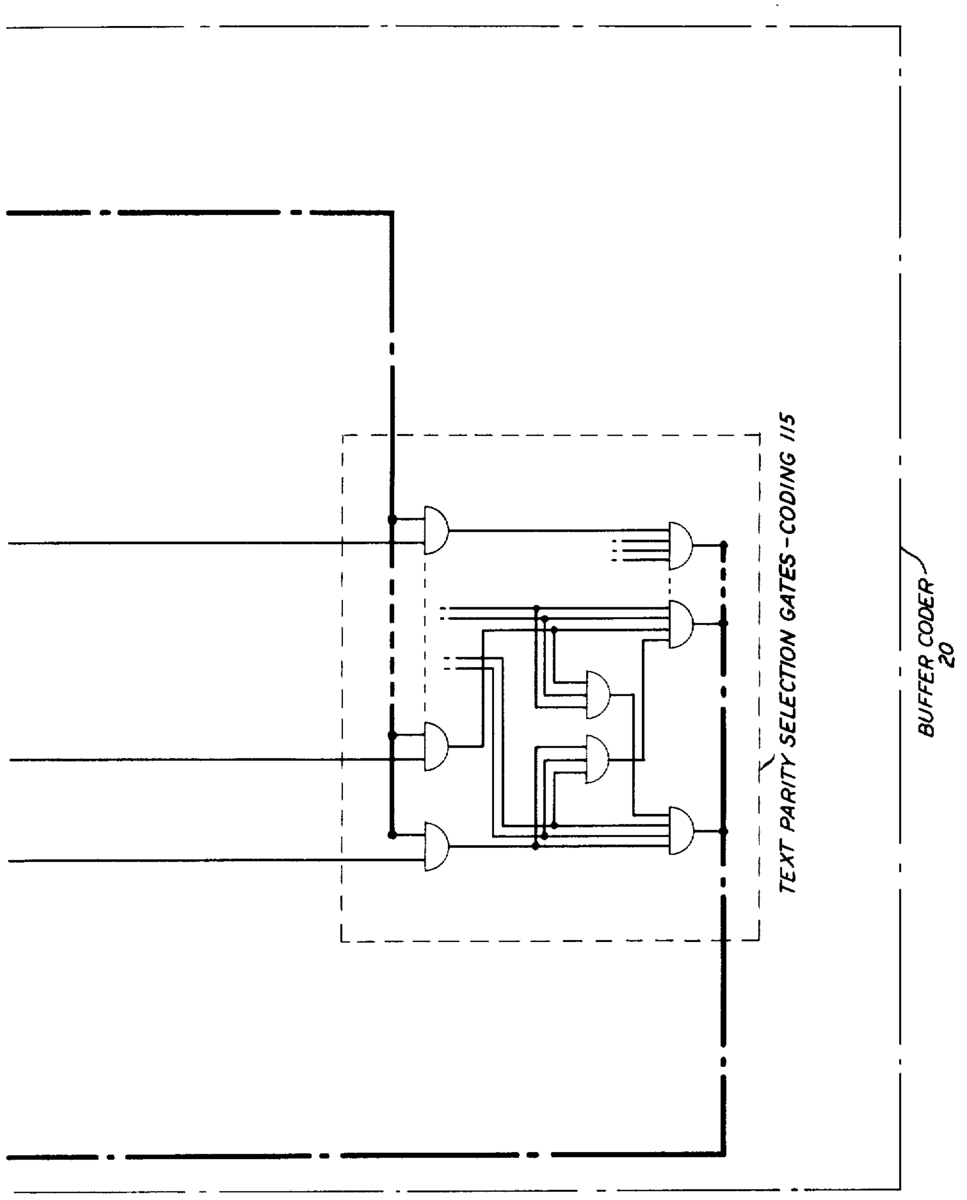

The particular circuitry involved includes, in this example, the text register 105, FIG. 19, comprising a series of flip-flops for storage of the individual message bits, means for generating the parity bits including the gates of the parity translator 110, FIGS. 24 and 31, the bit selection circuit 109, FIG. 20, including a series of logic gates, parity distribution gates 111, the parity store 112 including another series of flip-flops, FIG. 31, and a sequence logic circuit 108 comprising flip-flop counters and AND gates, FIGS. 33–35, for controlling the particular sequence of operations.

This arrangement permits the same parity generator or translator 110 to produce sequentially all of the parity bits required to check the message. Thus all of the message bits stored in the text register 105 which are required to produce the first parity bit $P_1$ are connected simultaneously through the bit selection circuit 109 to the parity translator 110, the gates in the bit selection circuit 109 being enabled selectively for this purpose upon signals received from the counters in the sequencing logic 108, FIG. 33. When this parity bit has been generated by action of the translator 110 and stored in the parity store 112, the process is repeated for generation of parity bit $P_2$, all of the message bits required for parity bit $P_2$ being gated simultaneously to the parity translator 110.

When all of the text parity check bits have been generated and stored in a predetermined order in the parity store 112, the text bit selection gates 109 are inhibited. Each modulo of the text parity check bits then is gated by means of the text parity selection gates 115, FIG. 36, into the text parity translator 110. The output of the translator 110 at this time, which provides a message check by checking the parity of the check bits themselves, is gated by means of the parity result gates 118, FIG. 32, to a parity result store 119 upon command from the sequencing logic 108.

If the text parity indicated by each modulo in this illustrative embodiment is even, an acknowledgement is gated from the parity result store 119 to the data processor 11 indicating errorless transmission into the buffer coder 20 and effecting a release. If the text parity registered in the parity result store 119 is odd, the message is discarded and an appropriate acknowledgement returned to the data processor 11 to effect a retransmission.

At the same time that the text parity check bits are being generated, the destination address check bits are being generated in a similar manner. The circuitry utilized corresponds to that illustrated for the message text so that detailed address circuitry is not illustrated. The addresses are gated from the data processor 11 into the address register 106, FIG. 4, through gates 103. Simultaneously, the sequencing logic 108 operates the address bit selection gates 120. The address bits are applied to the parity translator 121, the outputs of which are steered through parity distribution gates 122 to proper positions in the address parity store 123. The sequencing logic 108 generates the appropriate gating signals, as indicated hereinbefore with respect to the text parity gating signals.

When the address partiy check bits have been generated, they are gated by means of the address parity selection gates 124 back into the parity translator 121. The outputs from the parity translator 121 are in turn gated by means of the address result output gates 125 to the address parity result store 126. Here the parity results are compared with the parity of a selected bit, and if the address was received without error, a match should exist. The result of this comparison for each address is transmitted to the steering circuit 127.

Figure 22:
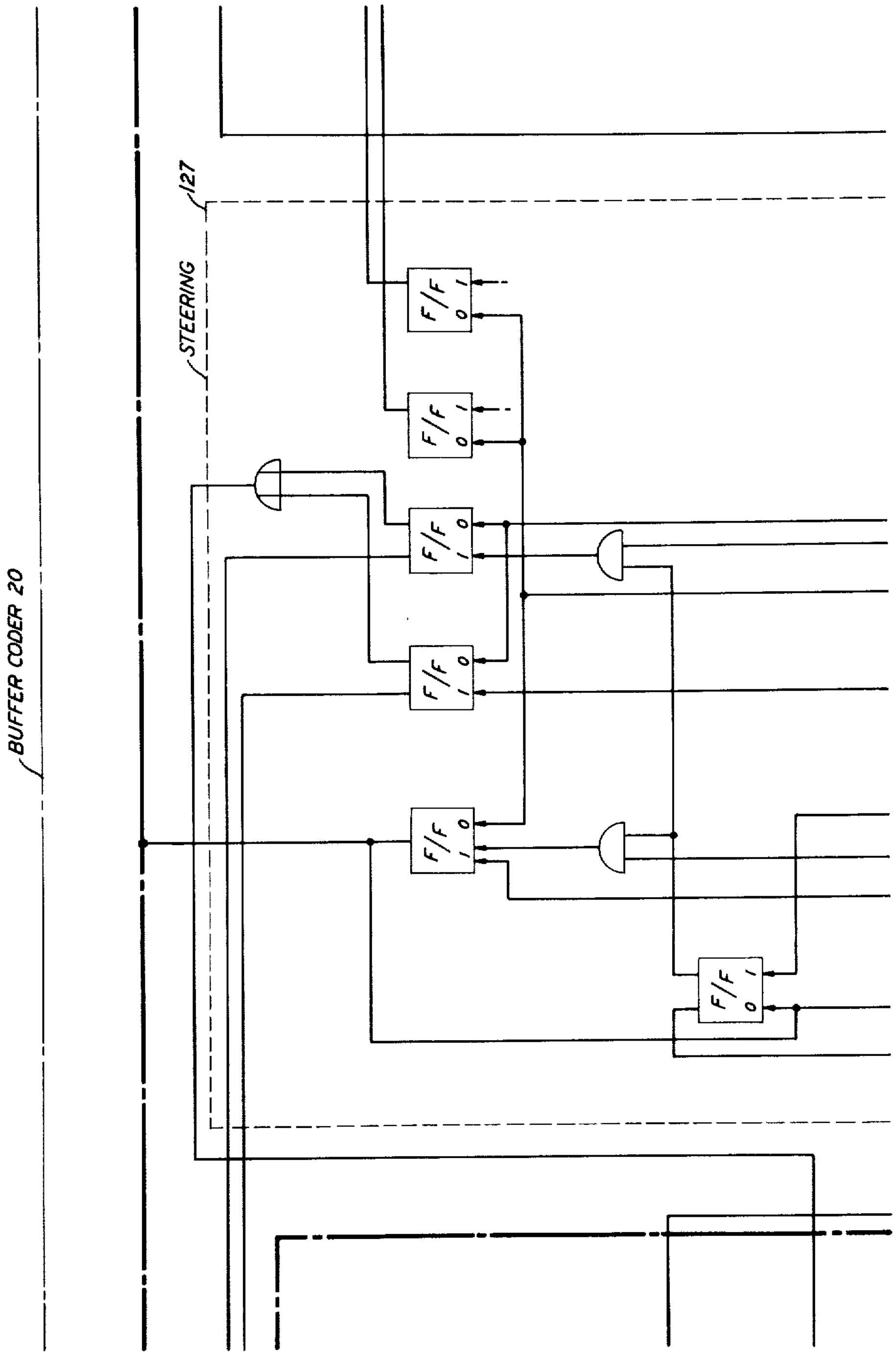
Figure 23:
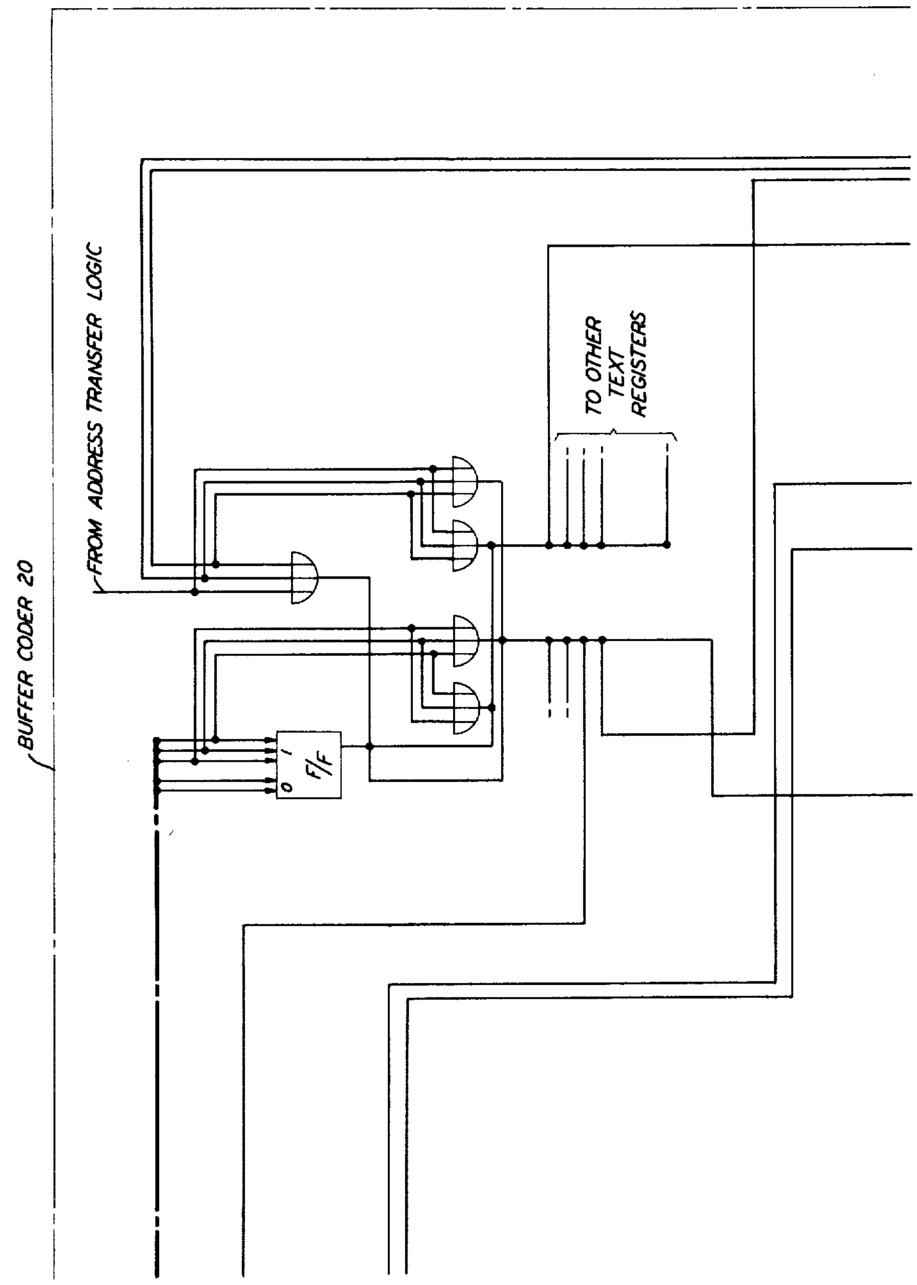
Figure 28:
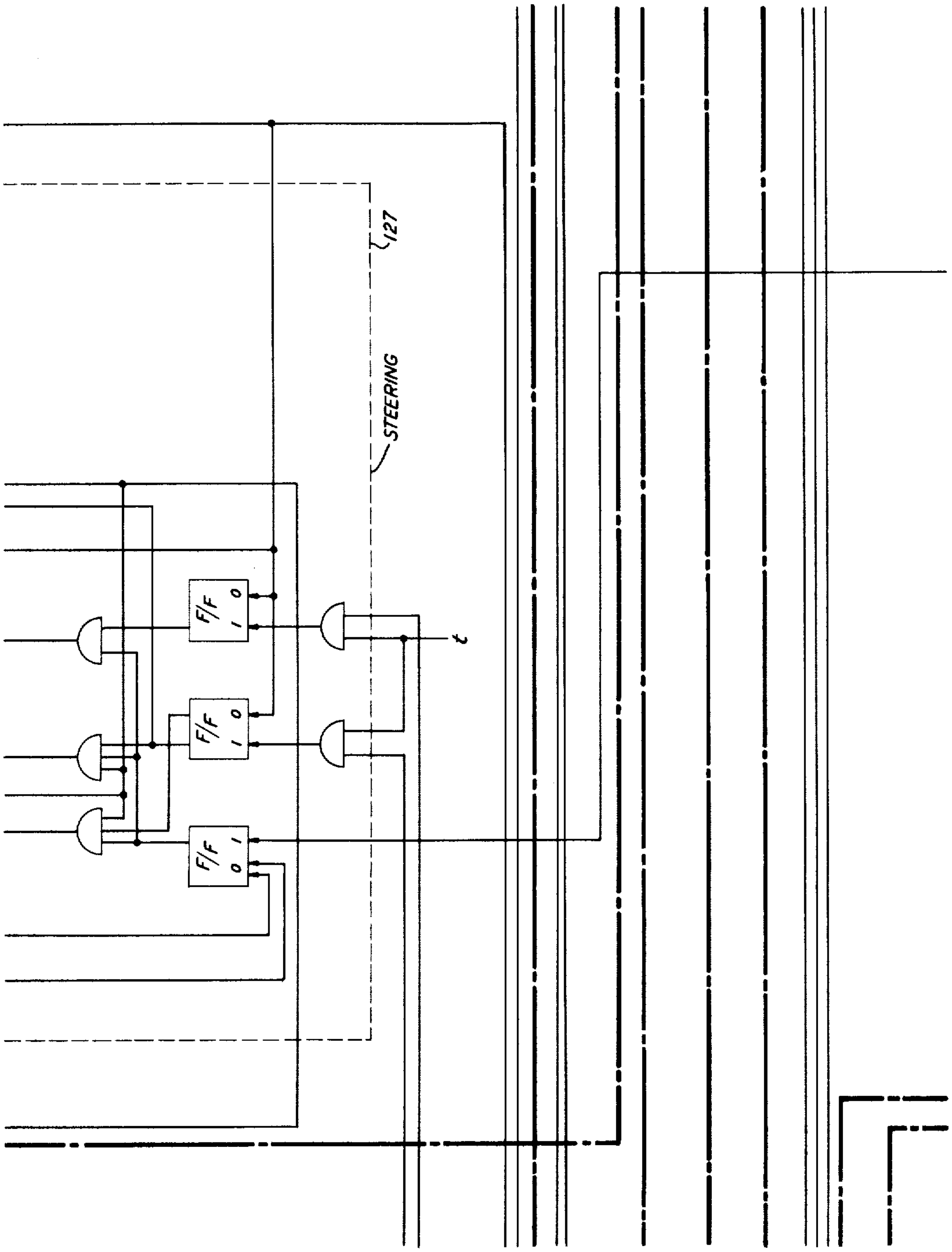
Figure 29:
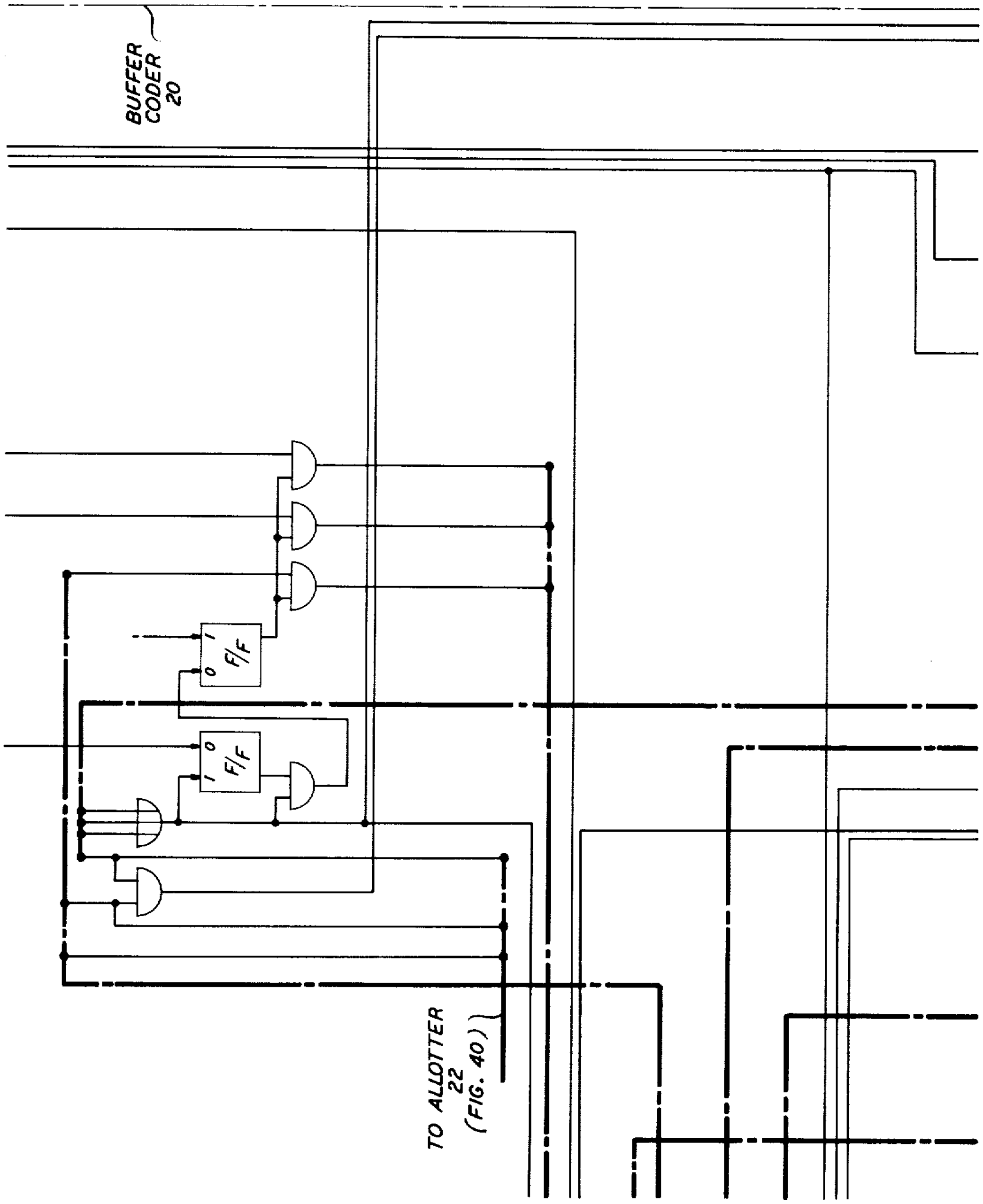
Figure 30:
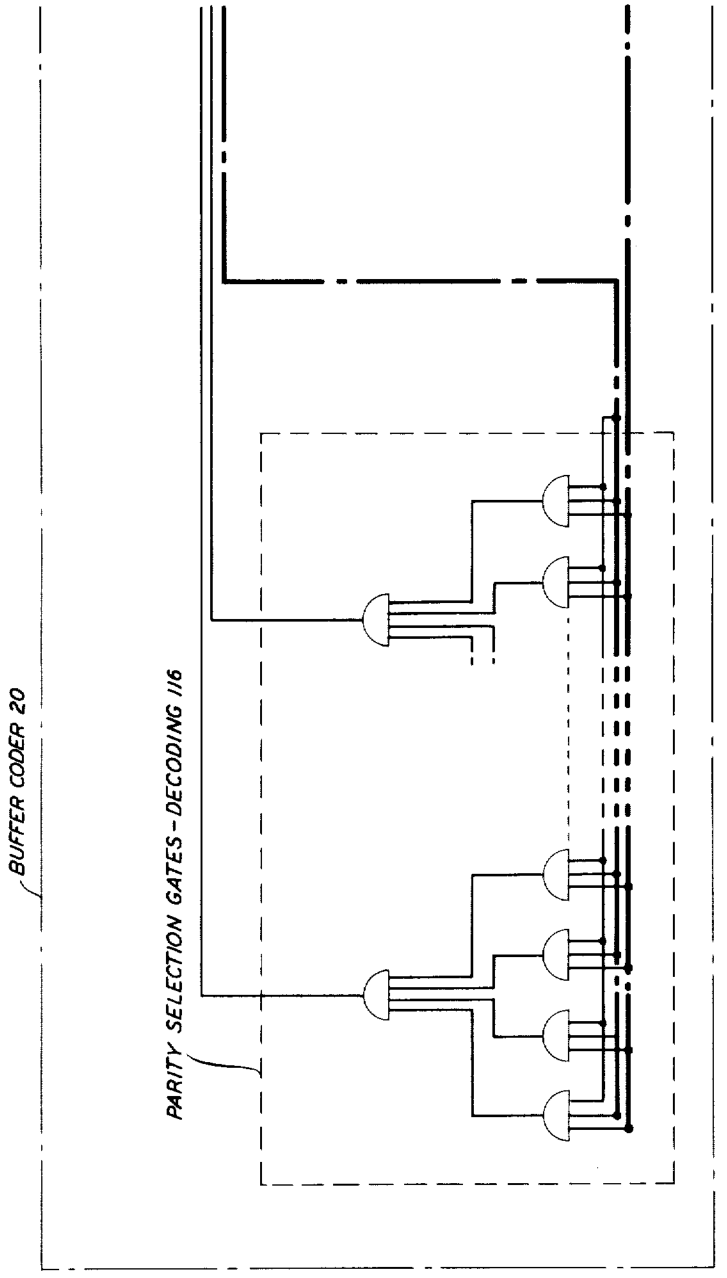

The steering circuit 127, FIGS. 22 and 28, combines the inputs consisting of the number of destination addresses associated with a particular message and the address parity results. The destination addresses are obtained directly from the data processor 11. From these inputs the steering circuit 127, comprising well-known register and gate elements, determines how many transfers of a single message will be required to send the message to every desired destination. In instances where defective parity comparisons are encountered, the steering circuit 127 notifies the data processor 11 of the incorrect address and transmits all other addresses for the particular message to the allotter 22.

Upon completion of the coding operation and initiation of appropriate acknowledgments, the data processor 11 is released. The allotter 22 is then notified that a message is waiting and, by means of the text, address and parity output gates 131–134 in the buffer coder 20, the allotter 22 transfers the message to the selected switch 23. This message consists of the text transferred from the text register 105, the text parity bits from the text parity store 112, the addresses from the address register 106, and the address parity bits from the address parity store 123.

Upon completion of the transfer, the allotter 22 signals the buffer coder 20 of this fact, which signal is transmitted to the steering circuit 127. If additional addresses are to be sent, the allotter 22 is then notified that another transfer is imminent. If not, the buffer coder 20 is reset and prepared to accept a new message.

When a message is received from an incoming trunk by a switch 23, the allotter 22 is notified of this fact, and it in turn seizes the buffer coder 20. Upon seizure, the buffer coder 20 is busied against receipt of any outgoing messages and is prepared to receive the incoming message. The allotter 22 transmits the text of the message to the text register 105 through the text input gates 136, FIG. 19, and also transfers the text parity bits into the text parity store 112 through the text parity input gates 137, FIG. 32.

Upon completion of the transfer, the allotter 22 signals the supervisory logic 101, which in turn notifies the sequencing logic 108 to begin the parity selection coding operation described hereinbefore utilizing decoder 116 instead of coder 115.

The results of the decoding operation are gated from the text parity translator 110 to the text parity result store 119 through gates 118. If the wrong parity is indicated in any portion of the message, the message is rejected, and the allotter 22 is notified to request a rerun of the message from the originating terminal. If the message decodes properly, the allotter 22 and the data processor 11 are so notified. Thereupon, the message is sent from the buffer coder 20 to the data processor 11, and a supervisory signal releases the buffer coder 20.

In accordance with one aspect of our invention, the buffer coder 20 is arranged to perform an internal diagnostic routine whenever an incoming message is decoded and found to be in error. To insure that this error is not the result of a fault in the decoding equipment, the buffer coder 20 automatically switches from a coding cycle to a decoding cycle when the next outgoing message is received from the data processor 11, thereby decoding a message it has just coded. If the message decodes properly, the buffer coder 20 is assumed to be trouble free, and it will proceed automatically with the normal coding cycle. However, if this test decoding operation indicates a trouble condition in the decoding equipment, an alarm signal is transmitted to alert maintenance personnel.

*Allotter*

Messages which originate at the data processor 11 are encoded in the buffer coder 20. Before they can be transmitted over the outgoing trunk they must first be transferred to a switch 23 for temporary storage. The function of the allotter 22 is to determine from all of the switches 23 available at the switching center which one can accommodate the current message, to connect the buffer coder 20 to the selected switch 23, and to supervise the transfer of the message from the buffer to the switch. For messages incoming from other switching centers, the allotter is effective, after storage of a complete message in one of the plurality of switches 23, to connect the buffer coder 20, when available, to the switch 23 containing the message and again to supervise transfer of the message.

Figure 37:
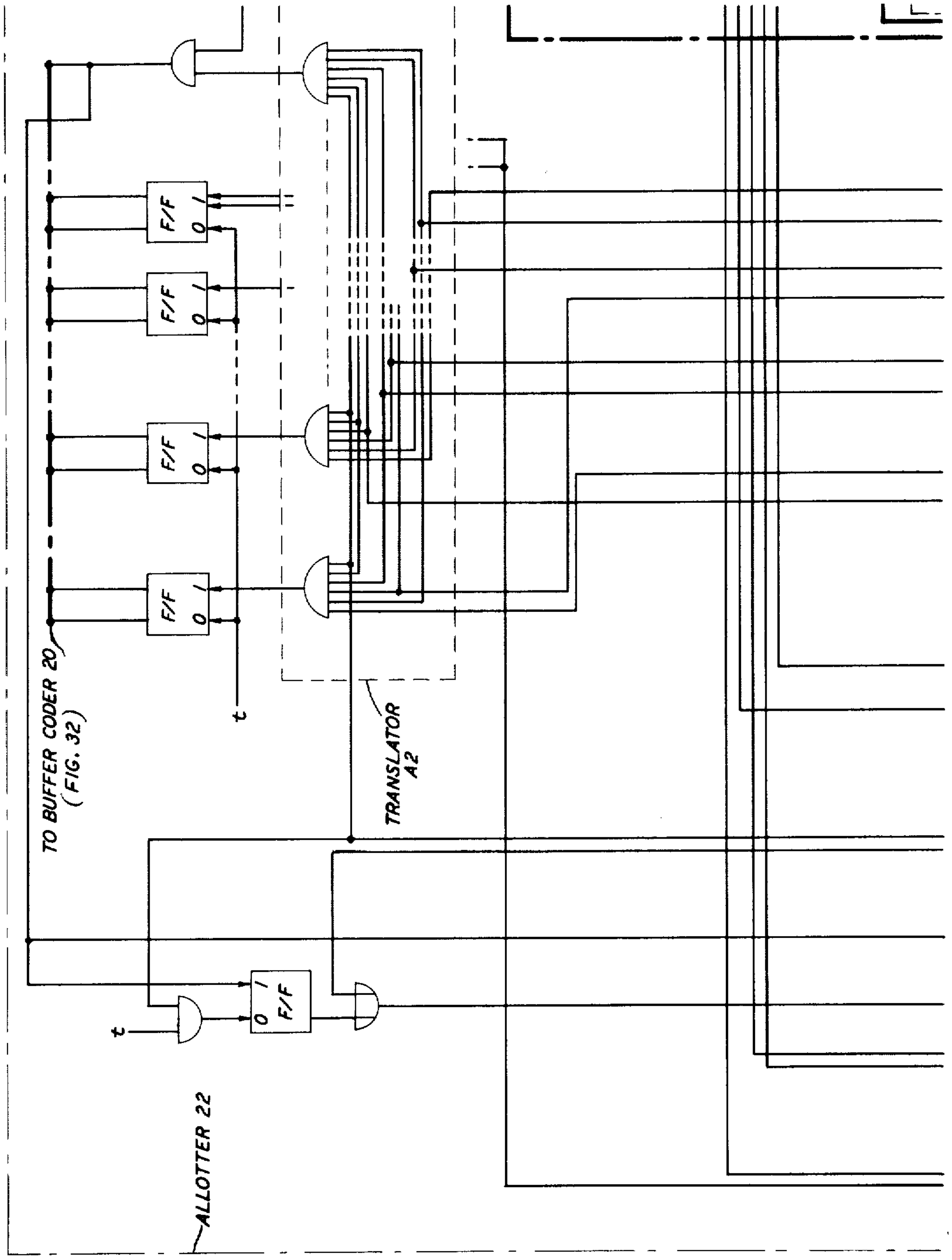
Figure 38:
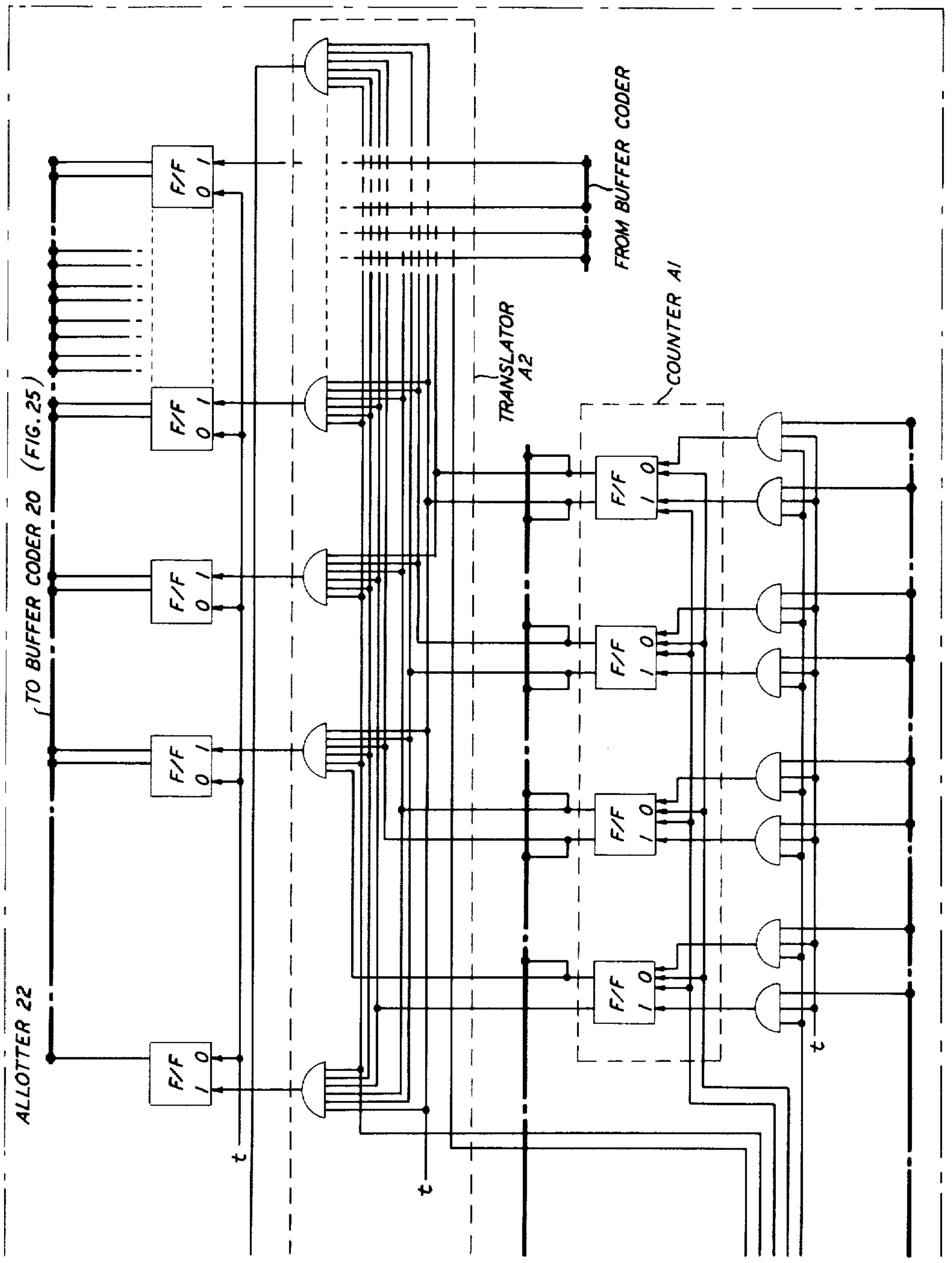
Figure 39:
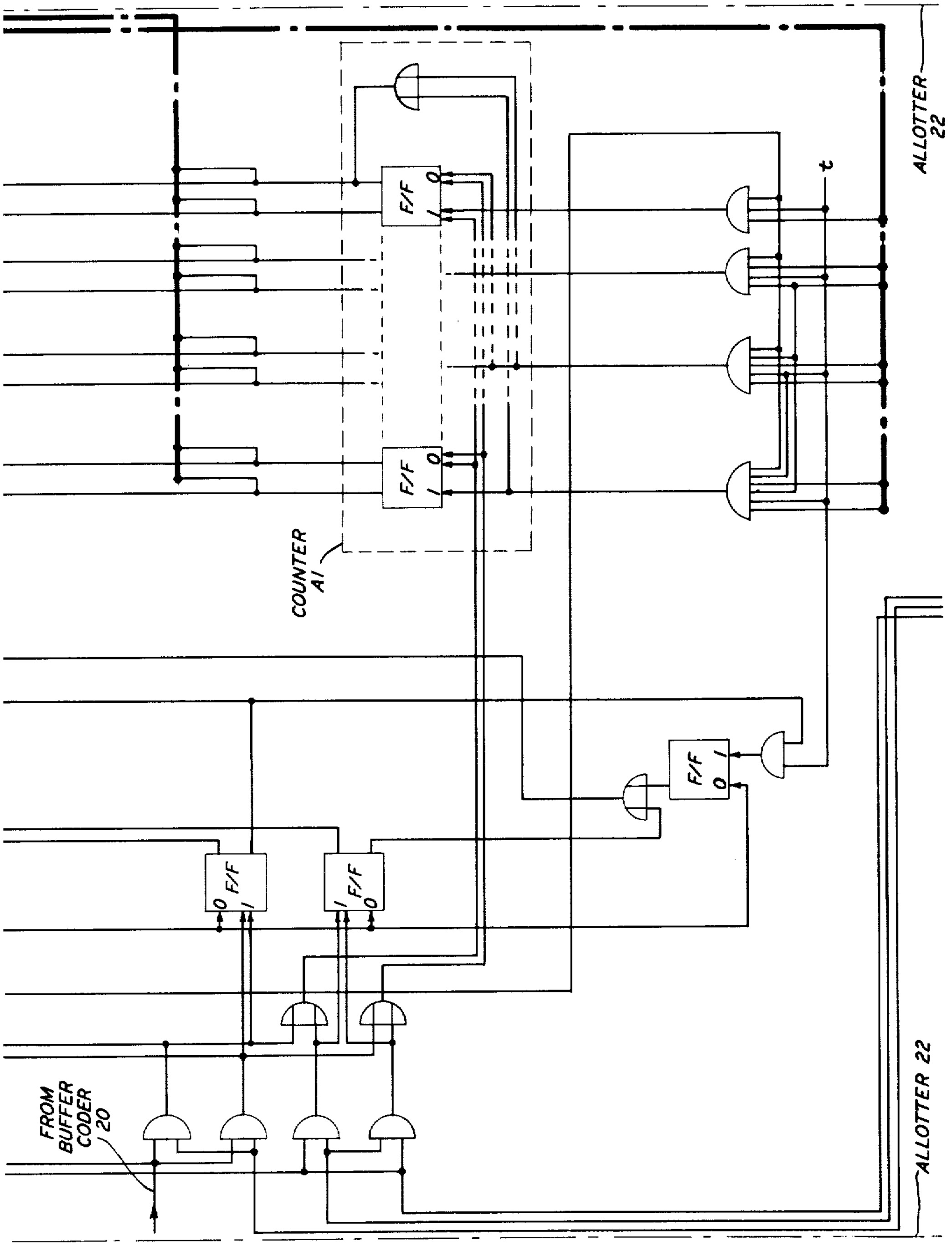
Figure 40:
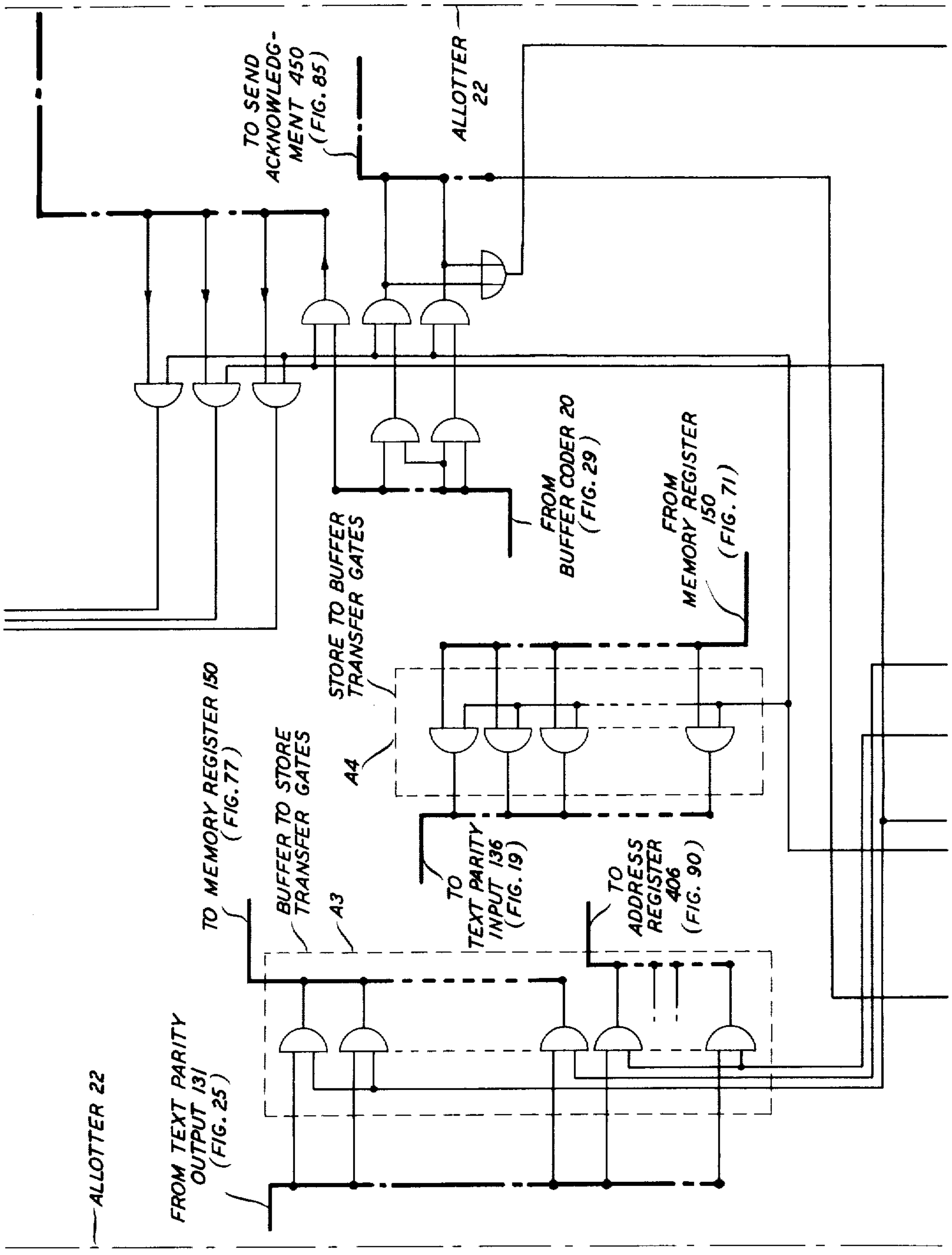

The allotter 22 comprises components associated directly with the buffer coder 20 common to all switches 23 and other components assciated with each particular switch 23. The portion associated with each switch 23 consists of flip-flop circuits and AND gates, FIGS. 40 and 41, directing messages and control information to and from the bit control 28 and message control 40. The portion of the allotter 22 associated with the buffer coder 20, FIGS. 37–39, comprises flip-flop counter circuits and AND gate translator circuits which, upon receipt of a signal from one of the switches 23, count off the prescribed number of bits of the message being transferred in either direction. The bilateral transfer requires that two translators be provided.

Figure 41:
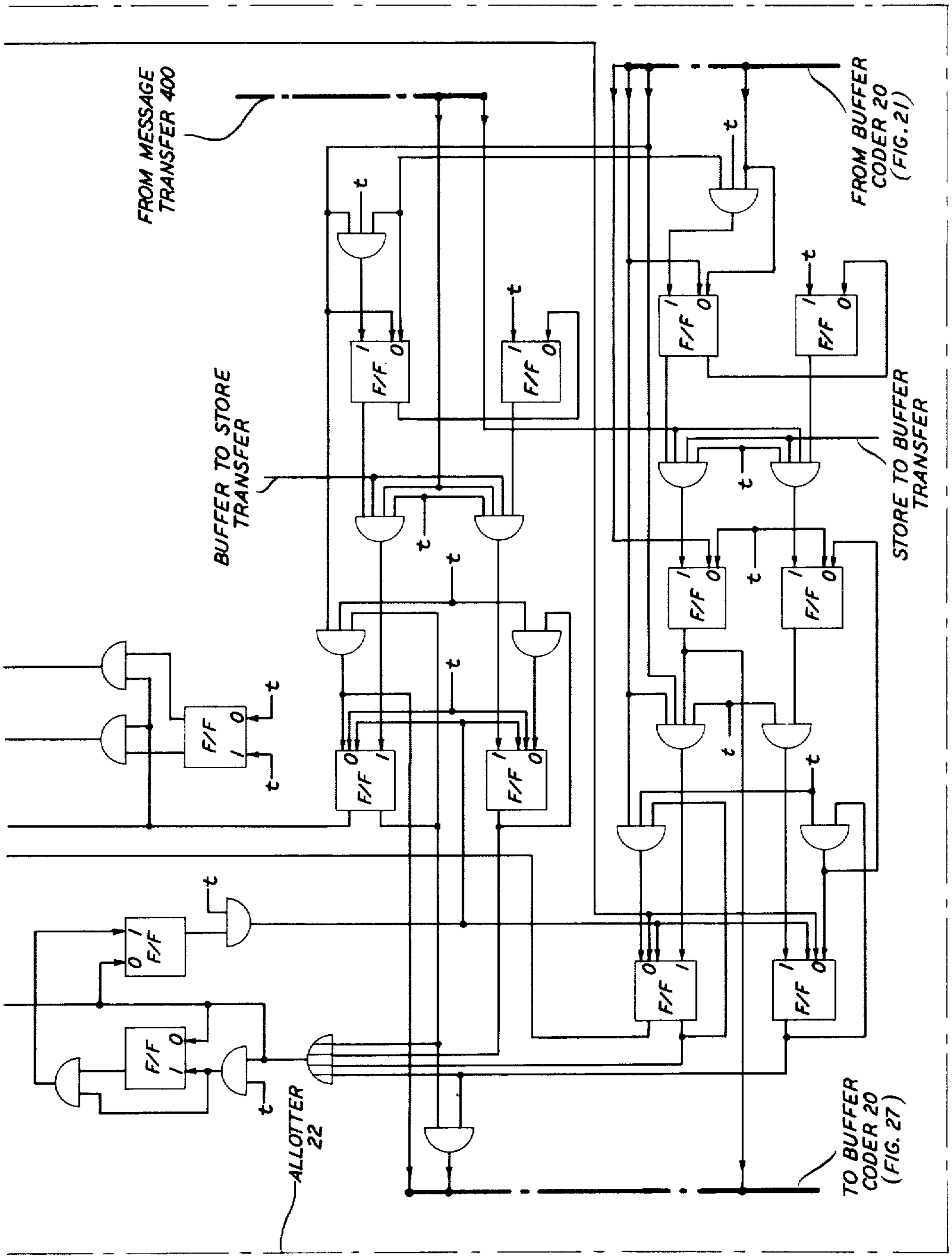

For outgoing messages the buffer coder 20 indicates to the allotter control circuit, FIG. 41, associated with each switch 23 that a message has been coded and is awaiting transmission. The allotter 22 control circuit at a particular switch 23 then determines the availability of storage space in the corresponding switch 23, and if space is available, a message is sent from the particular allotter control circuitry to the buffer coder 20 to make the buffer coder busy. Also, the corresponding switch 23 is prepared to receive the waiting message at the appropriate time in the switch's cycle. If, for some reason, the buffer coder has not assumed the busy condition, the allotter 22, upon further interrogation, discovers this situation and breaks the connection to the switch 23 thereby removing the ready condition of the switch 23.

If the buffer coder 20 tests busy, as desired, the switch 23 will signal the allotter 22 to start transfer of the message. This signal is transmitted to the allotter circuitry of FIGS. 37–39 associated with the buffer coder 20, where it starts the counter A1. The counter A1 in turn signals the buffer coder 20 through the allotter translator A2 to begin transfer of distinct portions of the message in parallel at discrete time intervals through the buffer to store transfer gates A3, FIG. 40. The text of the message is transferred first, followed by the destination address information.

The operation of the allotter 22 in handling incoming messages is substantially the same with the exception that messages in a switch 23 awaiting transfer to the buffer coder 20 must await a signal from the buffer coder 20 to the allotter 22 that the buffer coder is available to receive a message. At this time the allotter 22 busies the buffer coder 20 and later checks to assure that the buffer coder 20 is in fact in the busy condition. The allotter 22 then opens the store to buffer transfer gates A4, FIG. 40, permitting parallel transfer of the words of the message to the buffer coder 20 in sequence.

For transfer of extra long messages, the allotter 22 acts to inhibit the transfer of more than a specified number of destination address codes for each message. For example, a message of a fixed maximum length or less may have a predetermined number of addresses associated therewith. Any message longer than the prescribed maximum length is recognized by the allotter which then serves to limit the number of addresses accompanying this message by refusing one address for each additional text word in the message.

If for some reason, such as an equipment failure, a connection between the buffer coder 20 and the switch 23 is established for a time greater than required to complete transfer of a message, the allotter control circuitry associated with the transfer will recognize this condition, break the connection between the buffer coder and the switch, and alert the maintenance equipment of an improper action during a message transfer. Such an arrangement assures that the buffer coder 20 will not be permanently connected to any one of the switches 23, so that both the buffer coder and the switch involved would not be permanently disabled when only one of the two is out of order.

*Trunk scanner*

Figure 15:
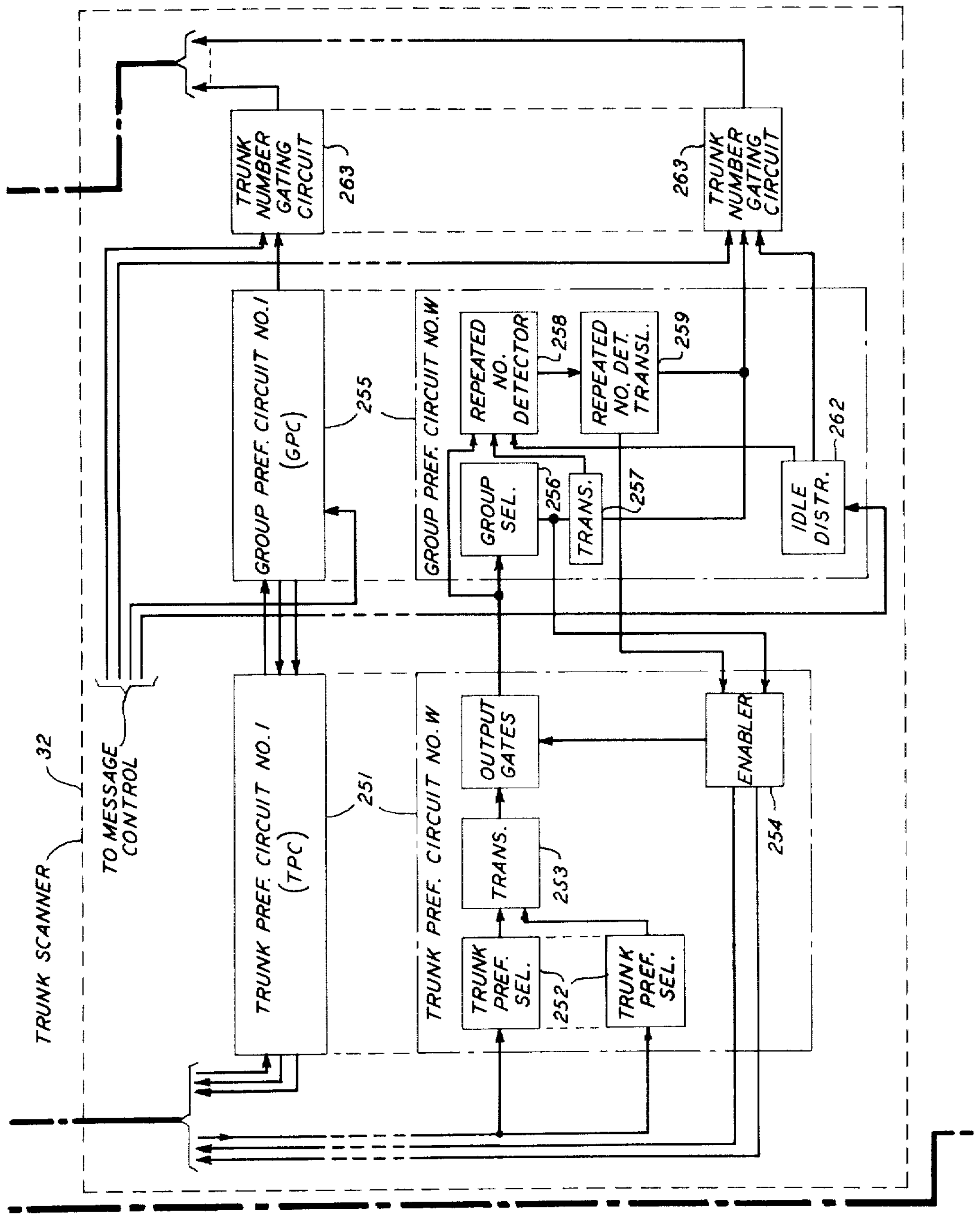

The trunk scanner 32 is illustrated in block diagram form in FIG. 15 and in detail in FIGS. 50–54 and comprises logic circuit components including flip-flop, AND and OR circuits. The primary function of the trunk scanner is to alert a switch 23 as to some particular service required of it by an incoming trunk 25. This function is accomplished by assigning to the service requesting trunk an available storage area in an available switch 23, which assignment is maintained until an entire message is received and the trunk is released.

Considering the circuit first with reference to the block diagram of FIG. 15, the incoming trunks 25 are arranged in distinct groups for interrogation by the trunk scanner 32. The selection of a trunk from a group and translation to a distinct coded designation for the selected trunk are accomplished in the trunk preference circuit 251. The trunk selector consists of a number of such trunk preference circuits 251, each accommodating a distinct plurality of incoming trunks.

In a particular time sequence, as described more fully hereinafter, a service request signal, generated in each trunk preference circuit, is gated to each of the associated incoming trunks. On reception of this signal the incoming trunk will initiate a service request if it has recognized a message start code and has not yet been assigned a particular storage area in a switch 23. Each trunk preference circuit 251 will select one of the associated trunks that is requesting service and identify it by a distinct code number. This selection and identification are accomplished in the group of trunk preference selectors 252 and the translator 253.

The group preference circuit 255 serves to select one of the trunk preference circuits 251 and to identify its selection. For purposes of reliability, a plurality of group preference circuits may be provided. Thus upon receipt of busy signals from one or more trunk preference circuits 251, indicating that one or more of the associated incoming trunks 25 is requesting service, the group preference circuit 255 will select a preferred one of the busy trunk preference circuits, gate an enabling signal to the selected trunk preference circuit, and identify it with another distinct code indication. Upon receipt of the enabling signal from the group preference circuit, the selected trunk preference circuit 251 will gate the code indication of the selected incoming trunk to the group preference circuit, which in turn will add the identifying code of the trunk preference circuit and transmit the combined code indication to each of the trunk number gating circuits 263, the latter each being associated with a particular switch 23.

Concurrently with these operations the switches 23 are being scanned by the idle distributor 262 which, upon finding idle storage space in a particular switch 23, will gate an incoming trunk request signal to the corresponding trunk number gating circuit 263. The group preference circuit 255 thereupon selects one switch 23 out of the switches having available space at that particular moment and gates a switch selection signal to the trunk number gating circuit 263 associated with the selected switch. Concurrent receipt of these signals permits the trunk number gating circuit 263 to generate a signal serving to busy the particular selected switch. This process of selecting from a group of switches indicating available storage space assures that all of the switches will be utilized even during periods of low message density.

Simultaneously with passage of the busy signal to the selected switch 23, the identifying code for the selected incoming trunk circuit 25 requesting service is transmitted through the associated trunk number gating circuit 263 to the bit control 28 of the selected switch 23. The switch 23 in turn translates the received incoming trunk circuit designation and transmits a trunk enable signal directly to the incoming trunk circuit 25, serving to inhibit the service request signal to the trunk scanner.

When all of the incoming trunks requesting service have been satisfied, a service request gate signal will again be generated in the service request enabler 254 of each trunk preference circuit and the entire operation repeated. The latter operation serves to activate those incoming trunks 25 which have been made busy but have not yet been recognized by the trunk scanner 32. Thus the provision of the service request enabler 254 prevents those incoming trunks having a low preference from being locked out by higher preference trunks.

The incoming trunks are connected to distinct small groups to corresponding trunk preference selectors 252 in the trunk preference circuit 251 at the input to the trunk scanner 32 such that if a failure occurs in one of the incoming trunks or in the scanner circuitry associated with the trunk group including this incoming trunk, only that group of incoming trunks will be taken out of service. The trunk scanner 32 transmits a scanner failure signal to the particular group of trunks involved so that these trunks can be busied to prevent receipt of subsequent messages. The circuitry is arranged such that any incoming trunk in the group in which a failure occurs and which is busied at the time will not be taken out of service until the message has been transmitted and the incoming trunk made idle.

Incoming trunk selection is actually accomplished in several stages. Subgroups of the trunks associated with each trunk preference circuit 251 are connected to distinct trunk preference selector circuits 252, the service request lead of each trunk terminating in a corresponding AND gate R1 and an OR gate R2, FIG. 50.

Selection is made on the basis of the output of the OR gate R2, this gate being activated whenever any of the associated incoming trunks are requesting service. An output from OR gate R3 indicates that there is a trunk associated with the trunk preference circuit 251 that is requesting service, and such output is applied to the group preference circuit 255 through output gate R5′ to indicate this condition.

In order to illustrate the sequential selection operation of the trunk preference circuit 251, assume first that no trunks are requesting service, so that none of the AND gates R1 or the OR gate R2 of the trunk selectors 252 are activated. In this situation none of the AND gates R4 are satisfied; also OR gate R3 is not activated so that output gate R5′ similarly will remain inactive.

Assume now that all trunks simultaneously request service, which action will activate all of the service request leads from the incoming trunks. The circuit is arranged such that a signal through OR gate R2 will enable one of the AND gates R1 of the particular trunk selector 252 illustrated in detail in FIG. 50. All of the other gates R1 and selectors 252 are inhibited. OR gate R3 also will be activated by the output of the enabled OR gate R2 and will in turn partially enable output gate R5′, provided certain failure conditions are not present, as discussed more fully hereinafter. The active AND gate R1 will in turn activate the translator 253 comprising OR gates to provide a four digit binary number identifying the selected incoming trunk. The outputs of translator 253 provide an input to each of the output gates R5.

Assuming for the moment that the trunk assignment has been completed, the incoming trunk will be reset, thus removing the activating signal from its service request lead. The corresponding AND gate R1 is thus disabled, and the next AND gate R1 in the sequence, by action of the inverter circuits I, will be activated. This sequential operation will be continued until all incoming trunks terminating in the particular trunk preference selector 252 are served, whereupon OR gate R2 no longer provides an output signal, and the next trunk preference selector 252 will have its AND gates R1 partially enabled by a signal through the corresponding AND gate R4.

On the basis of the busy signal received through OR gate R3 and the corresponding AND gate R5′, the group preference circuit 255 will provide an enable signal to a selected one of the trunk preference circuits 251, as detailed hereinafter. The enable signal from the group preference circuit 255 is transmitted directly to the output gates R5, FIG. 51, thus providing the final input to enable these gates and transmit the trunk designation to the group preference circuit 255 in parallel form.

When the scan of all trunks requesting service has been completed, the enabler 254 will have the circuit consisting of AND gates R8 and R9 and flip-flop R10 activated by a signal from the group preference circuit 255 and will be responsive to such a signal to enable the trunk service request registers in each incoming trunk circuit by providing a service request gate signal to each incoming trunk. A new sequence of service requests on all incoming trunks is thereby initiated.

Figure 51:
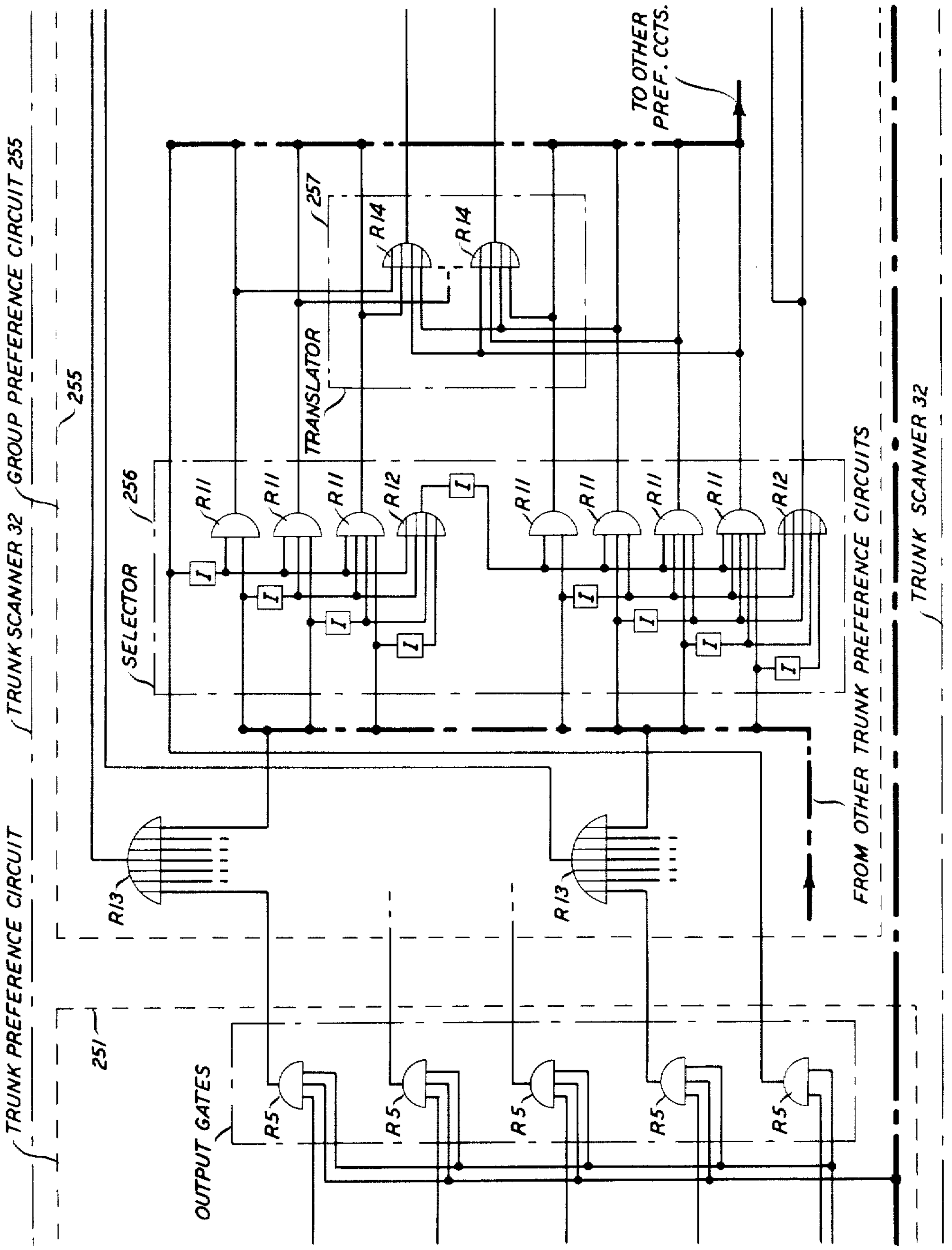
Figure 52:
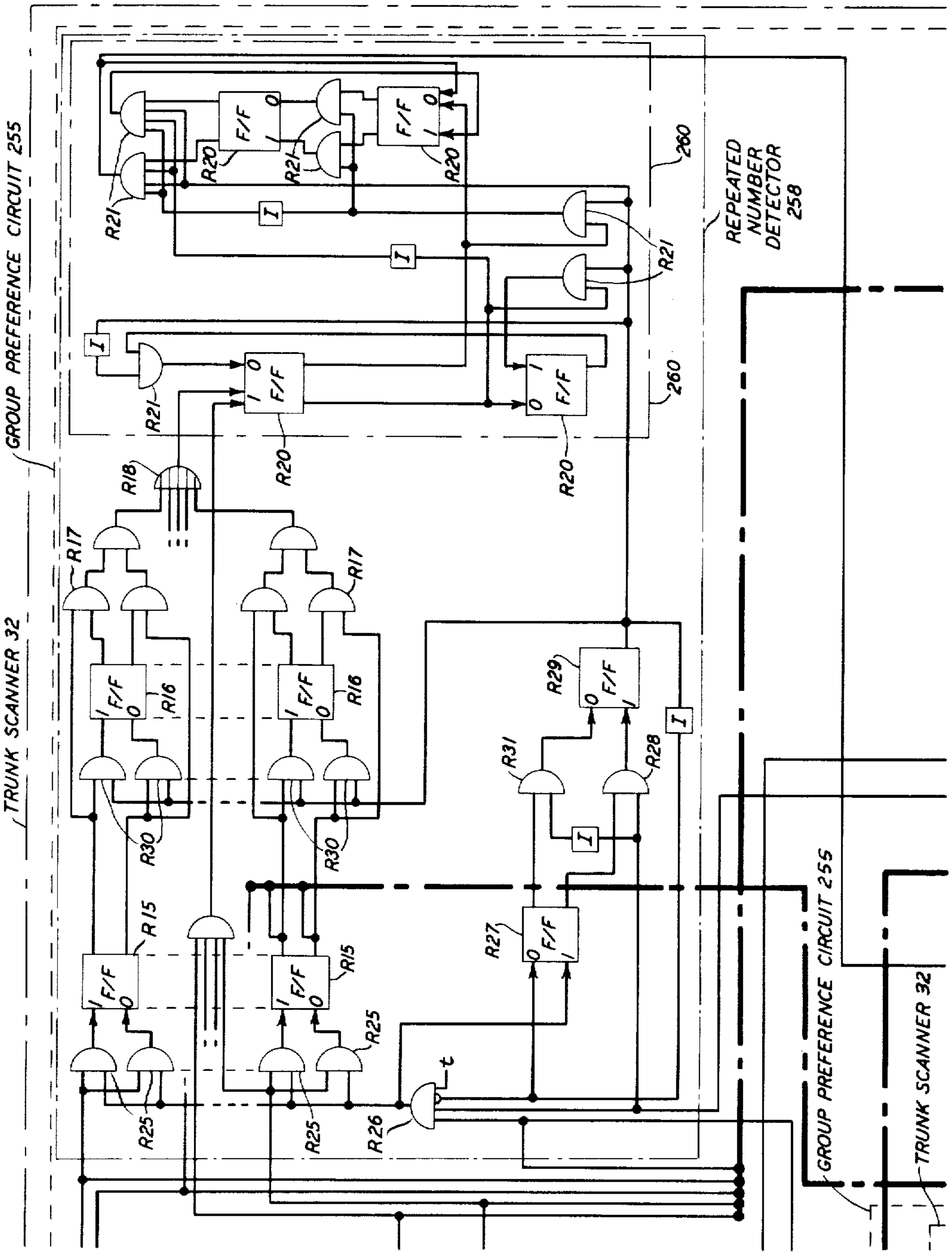
Figure 53:
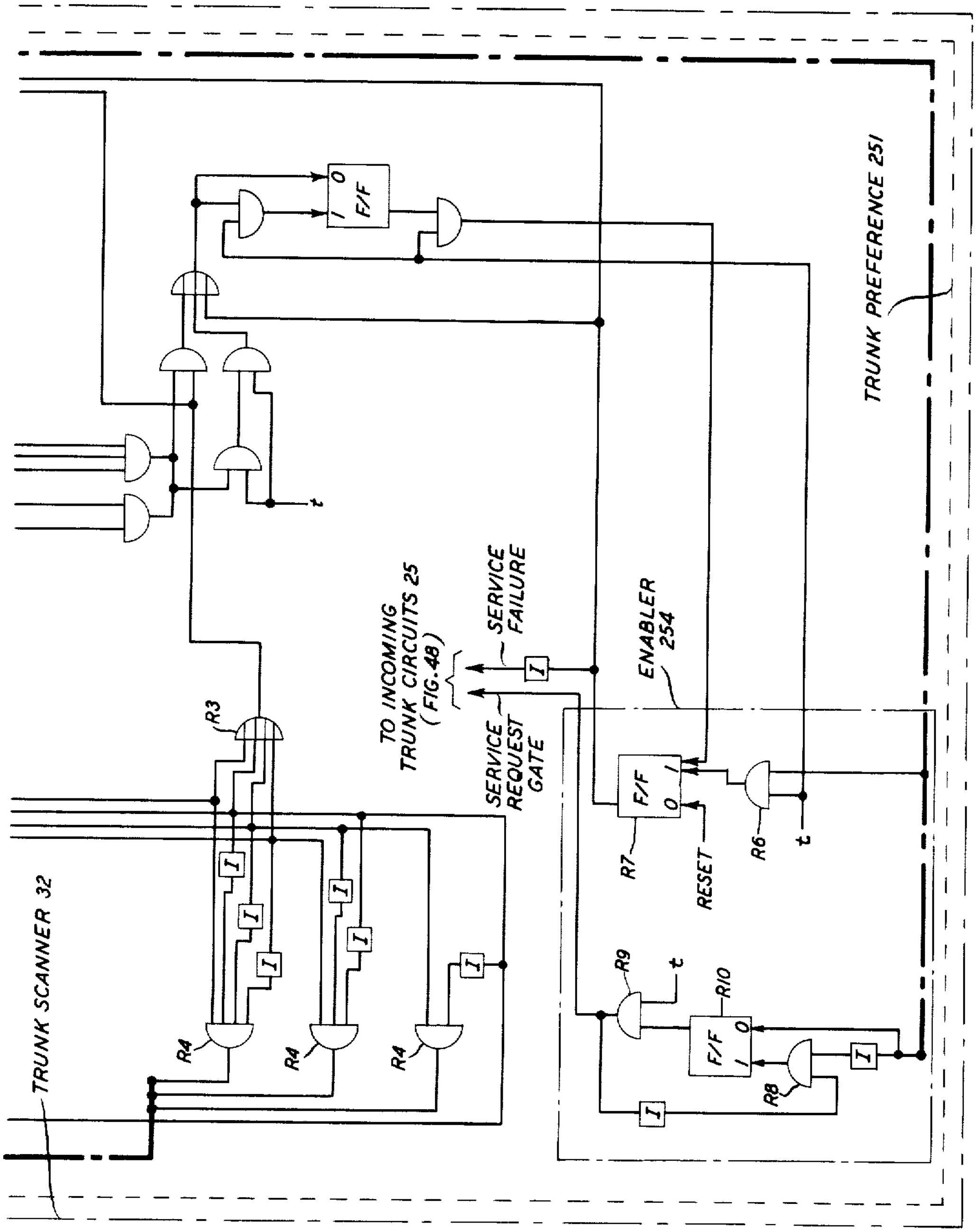

The group preference circuit 255 receives the busy indications from each of the associated trunk preference circuits 251 in group selector 256, FIG. 51, comprising AND gates R11 and OR gates R12. The selector 256 serves to select from among the busy trunk preference circuits 251 in sequence, similar to the selection operation conducted in the trunk selectors 252. The particular trunk selected by each busy trunk preference circuit 251 has the coded designation transmitted to the OR gates R13 by the operation of output OR gates R5. Thus, upon selection of a particular trunk preference circuit 251, its corresponding output gates R5 are enabled by a signal from the group selector 256 through the enabler 254, and the coded designation of the particular incoming trunk selected by that trunk preference circuit 251 is transmitted through the OR gates R13 of the group preference circuit 255. Simultaneously, a coded designation of the selected trunk preference circuit 251 is generated by the translator 257 consisting of OR gates R14. Thus a coded designation of the selected incoming trunk circuit and of the trunk preference circuit 251 at which it terminates is available in the group preference circuit 255 for distribution to the switches 23 via the repeated number detector 258, FIG. 52, and the trunk number gating circuits 263, FIG. 54, associated with the individual switches 23.

The repeated number detector 258 consists essentially of two registers comprising flip-flops R15 and R16, a comparison circuit including AND gates R17 and OR gate R18 and a binary counter 260 consisting of flip-flops R20 and AND gates R21. The incoming trunk number is received from the group preference circuit 255 and registered in the flip-flops R15 through AND gates R25 which are controlled by a signal from the selected trunk preference circuit 251 and a signal from the idle distributor 262 indicating an available idle-message slot through AND gate R26. The output of gate R26 also sets flip-flop R27, and upon termination of an idle-message slot signal from idle distributor 262, AND gate R28 is enabled to set flip-flop R29. The output of R29 thereupon enables AND gates R30 to register the incoming trunk designation in flip-flops R16.

This particular trunk has just been assigned the idle-message slot, and it is now the function of the repeated number detector to assure that this same trunk is not assigned a subequent idle-message slot. The output of the set flip-flop R29 serves to inhibit AND gate R26 and to reset flip-flop R27, thereby partially enabling AND gate R31. When the next idle message slot gate signal from idle distributor 262 appears, gate R31 will be fully enabled, thus resetting flip-flop R29 and inhibiting AND gates R30 from further setting the register flip-flops R16.

The resetting of flip-flop R29 also removes the inhibit input from AND gate R26. Upon receipt of the next service requesting trunk indication from the group preference circuit together with the idle message slot signal, AND gate R26 and in turn AND gates R25 are enabled so that the new incoming trunk number will be registered in the flip-flops R15. If the number registered in flip-flops R15 differs from that registered in flip-flops R16, the AND gates R17 will detect the difference and transmit a signal through OR gate R18 to the binary counter 260, thereby preventing its advance. However, if the register flip-flops R15 and R16 store identical numbers, the comparison AND gates R17 will fail to provide an output indication through OR gate R18, and the binary counter 260 will be advanced so as to provide an indication of having received the same trunk number twice in succession. This indication is transmitted to the AND gates R35 of the repeated number detector translator 259, FIG. 54, after detection of such a comparison for a predetermined number of trunk assignments. In this specific embodiment the signal is transmitted to the translator 259 if the same trunk number has been assigned to three distinct message storage areas in succession.

Figure 54:
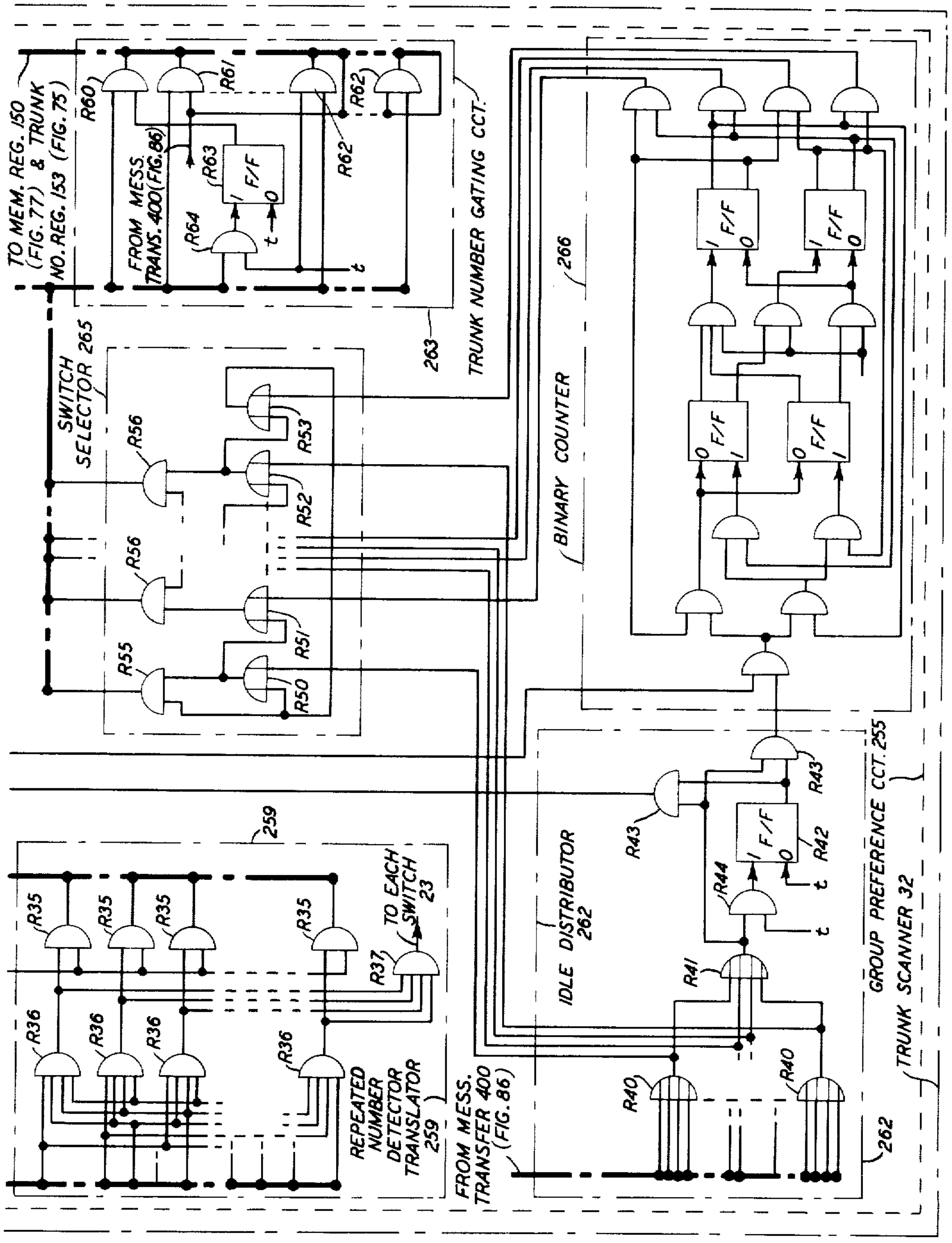

The repeated number detector translator 259, FIG. 54, comprises AND gates R36 which receive indications from the register flip-flops R15 sufficient to identify a particular trunk preference circuit 251 which is causing difficulty. These indications are translated into a single indication which is then gated through one of the AND gates R35 and AND gate R6 to flip-flop R7 in enabler 254, FIG. 53, of the trunk preference circuit 251. Setting of flip-flop R7 serves to disable the output gates R5 and to signal each of the incoming trunks of the existence of a failure condition in this trunk preference circuit such that no further incoming messages will be received through this circuit until the trouble has been cleared.

Repeated number detector translator 259 is also used to detect the transmission rate of the trunk associated with the number being gated to the idle-message storage space of the selected switch 23. Thus the output of the translator AND gates R36 is gated through OR gate R37 to each switch 23.

The idle distributor 262, FIG. 54, receives its inputs at OR gates R40 from the message control 27 in each of the associated switches 23, indicating the presence of idle-message storage areas therein. The switches are staggered in their timing such that the signals will be received at the OR gates R40 in succession. With more than four switches 23 employed, however, the timing of signals will overlap and the switch selector 265, FIG. 54, serves to distinguish the particular switch in which storage space is available. Thus the outputs of OR gates R40 are directed to the switch selector 265.

The repeated number detector 258 and switch selector 265 also require an indication that some switch 23 is requesting a trunk assignment. OR gate R41 in the idle distributor 262 provides this information. If flip-flop R42 is reset, AND gates R43 are satisfied every time such a request signal is received from a switch 23 through OR gate R41.

AND gate R44 checks the output of OR gate R41 during a predetermined time when no signals should be received from the switches 23. If a failure condition exists such as a permanent trunk assignment request signal, then AND gate R44 will be enabled upon appearance of the timing signal, thereby setting flip-flop R42 and providing a predetermined alarm indication.

The switch selector 265 consists of OR gates such as R50 through R53 and AND gates such as R55 and R56 and operates in conjunction with a binary counter 266. In this instance the binary counter 266 is illustrated as a two-stage counter which serves to alter the preference of switch selection with each assignment so that all of the switches 23 will be exercised during periods of low traffic density. Assume, for example, that the binary counter 266 is set in the condition providing an enabling signal through the OR gate R53 to partially satisfy AND gate R55. Assume, further, that during this interval the switch 23 assigned to the incoming lead terminating in OR gate R50 is idle, thus fully enabling AND gate R55 and providing an appropriate output signal to the associated trunk number gating circuits 263. Regardless of how many of the incoming leads from the idle distributor 262 are active, however, the particular switch selector 265 arrangement of AND and OR gates in conjunction with the binary counter 266 is such that only one output to the trunk number gating circuits can be active at any one time. The binary counter 266 is shifted sequentially among its four possible states upon receipt of signals from AND gate R43 in the idle distributor 262 and from OR gate R12 in the group preference circuit 255 providing the incoming trunk request indications.

The trunk number gating circuit 263 comprises AND gates R60, R61 and R62 which receive respectively signals indicating the switch 23 selected to be made busy, the transmission rate of the trunk being gated to the switch 23, and the particular trunk number as developed in the trunk and group preference circuits. As each of the trunk number gating circuits 263 corresponds to a switch 23, a signal from the message control of the corresponding switch 23 is applied to the AND gates R61 and R62 to indicate that an idle-message storage area is being scanned in that switch and the incoming trunk number may be gated thereto. Flip-flop R63 will be set when an incoming trunk request is received from the corresponding switch 23, thus satisfying AND gate R64. The switch selection output of the group preference circuit 255, together with the output of flip-flop R63, enables AND gate R60 at a predetermined time so as to activate the idle-busy indication in the message storage area of the selected switch.

*Outgoing trunk circuit*

Figure 14:
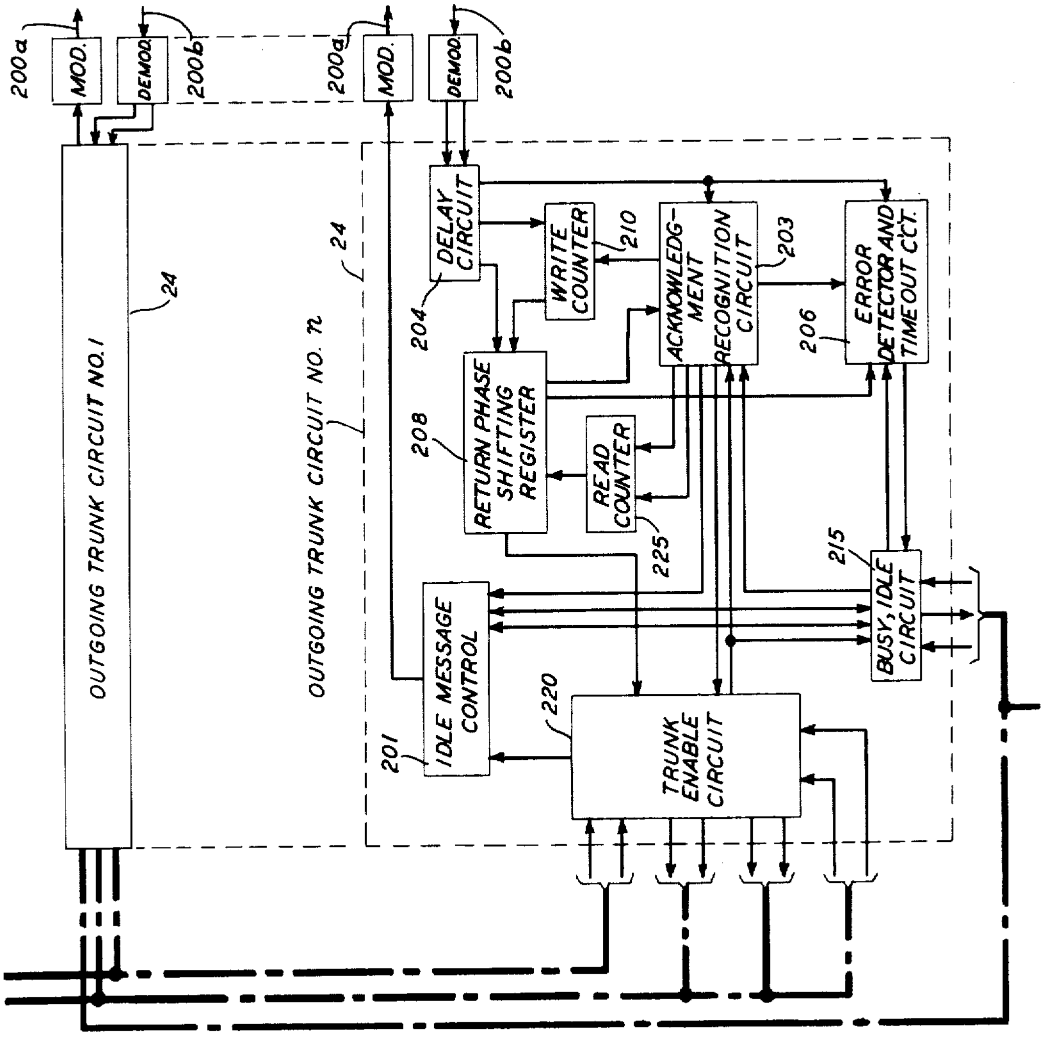

The outgoing trunk circuit 24 comprises flip-flop AND and OR circuits illustrated in functional blocks in FIG. 14 for convenience of description. The detailed circuitry is illustrated in FIGS. 42–45. One of the principal functions of the outgoing trunk circuit is the transmission of a signal to another terminal switching center indicating that the trunk is idle and available to receive a like idle indication from the remote terminal switching center during all times when the particular trunk is not being utilized to handle messages. The outgoing trunk circuit 24 checks the returning idle signal for errors, and when a predetermined number of errors are detected, the trunk will be made to appear busy to the corresponding terminal switching center.

The idle-message control 201 receives a distinct, repetitive signal from the clock designated IDLE GENERATOR. When the outgoing trunk 24 is in the idle state, the acknowledgement recognition circuit 203 enables the idle-message control 201 to transmit the idle signal over the forward line $200_a$, denoting an idle condition. This idle signal is received in the distant terminal switching center and a like signal returned to the originating switching center via reverse line $200_b$ of the trunk. Any errors which occur during this transmission to or from the distant control center should be present as errors in the signal received over reverse line $200_b$.

The delay circuit 204 receives the idle signal originated in the distant control center together with a timing signal having pulses in each bit interval corresponding to positive indications in the idle signal. Thus absence of a pulse on reverse line $200_b$ at the time a timing signal is received in delay circuit 204 is indicative of a binary zero or absence of a pulse in the returning data.

The returning data, in this instance the idle indication, is stored temporarily in the delay circuit 204 while the timing signal is utilized to activate the error detector 206 and the acknowledgment recognition circuit 203. One bit of the returning data is then gated into the return phase shift register 208 where it is stored for a distinct interval and then replaced by the succeeding bit. Thereafter, the write counter 210 is activated by the timing signal from the delay circuit 204 to enable the proper stage of the return phase shift register 208 to receive the next message bit.

The error detector 206 reads the return phase shift register 208 at specified intervals and records any errors in the idle signal, which errors are indicated by deviations in the specific code adopted for the idle signal. If more than a predetermined number of errors occur in a given time interval while the outgoing trunk is idle, the error detector 206 alerts the busy-idle circuit 215, which in turn transmits a busy indication to the trunk selector 31. The excess error detector 206 then continues to check the idle signal, and if during succeeding time intervals of the specified duration any errors are detected, the outgoing trunk circuit 24 continues to indicate the busy condition.

Subsequent to the first interval in which no errors are detected in the idle signal, the excess error detector 206 again signals the busy-idle circuit 215, and it in turn identifies the outgoing trunk circuit 24 to the trunk selector 31 as being idle. The busy condition indicated to the trunk selector 31 when handling an actual message remains in effect after the message is transmitted until the idle signal is again transmitted to the remote switching center, returned, and found free of error.

Messages are transmitted from the originating terminal switch 23 when an outgoing trunk circuit 24 is designated to perform this function by the trunk selector 31. The first indication that an idle outgoing trunk has been selected is a make busy signal received from the trunk selector 31 in the busy-idle circuit 215. The busy-idle circuit 215 in turn inhibits further counting of errors by the excess error detector 206, identifies the outgoing trunk as busy to the trunk selector 31, and directs the acknowledgment recognition circuit 203 to begin looking for a proper message acknowledgment Start code on the reverse line $200_b$, to remove the idle signal from the forward line $200_a$, and to begin monitoring the trunk enable circuit 220 to determine when the outgoing trunk should be returned to its idle state.

Several of the switches 23 have access to a particular outgoing trunk 24. The trunk number translator 29 determines which path to the trunk enable circuit 220 is followed by the proper message from the corresponding switch 23. The data bits are then received in the idle-message control 201 and gated out on the forward line $200_a$ at the proper bit rate.

The outgoing trunk circuit also receives and checks message acknowledgments from the distant switching center and transmits such message acknowledgments in proper phase to the corresponding switch 23. The acknowledgment is received over the reverse line $200_b$ and is gated into the return phase shift register 208 in similar fashion to that described for the idle signal. When the particular acknowledgment code is recognized, the write counter 210 is reset, the error detector 206 is alerted, and the idle-message control 201 is enabled to resume transmission of the idle signal.

The read counter 225 now begins to function preceded by an alerting signal to the corresponding switch 23 that the following information from the reverse line $200_b$ is an acknowledgment of the message just transmitted to the distant switching center. The write and read counters 210 and 225, respectively, function as their names imply to write the acknowledgment in the return phase shift register 208 and to read it therefrom after a time delay, to provide a desired phase shift.

Time-out circuits are provided such that if for any reason an acknowledgment of the transmitted message is not received from the distant switching center within a specified time from the end of the message transmission, the switch 23 automatically releases the outgoing trunk 24 by failure to provide further trunk enable signals to the trunk enable circuit 220.

Figure 42:
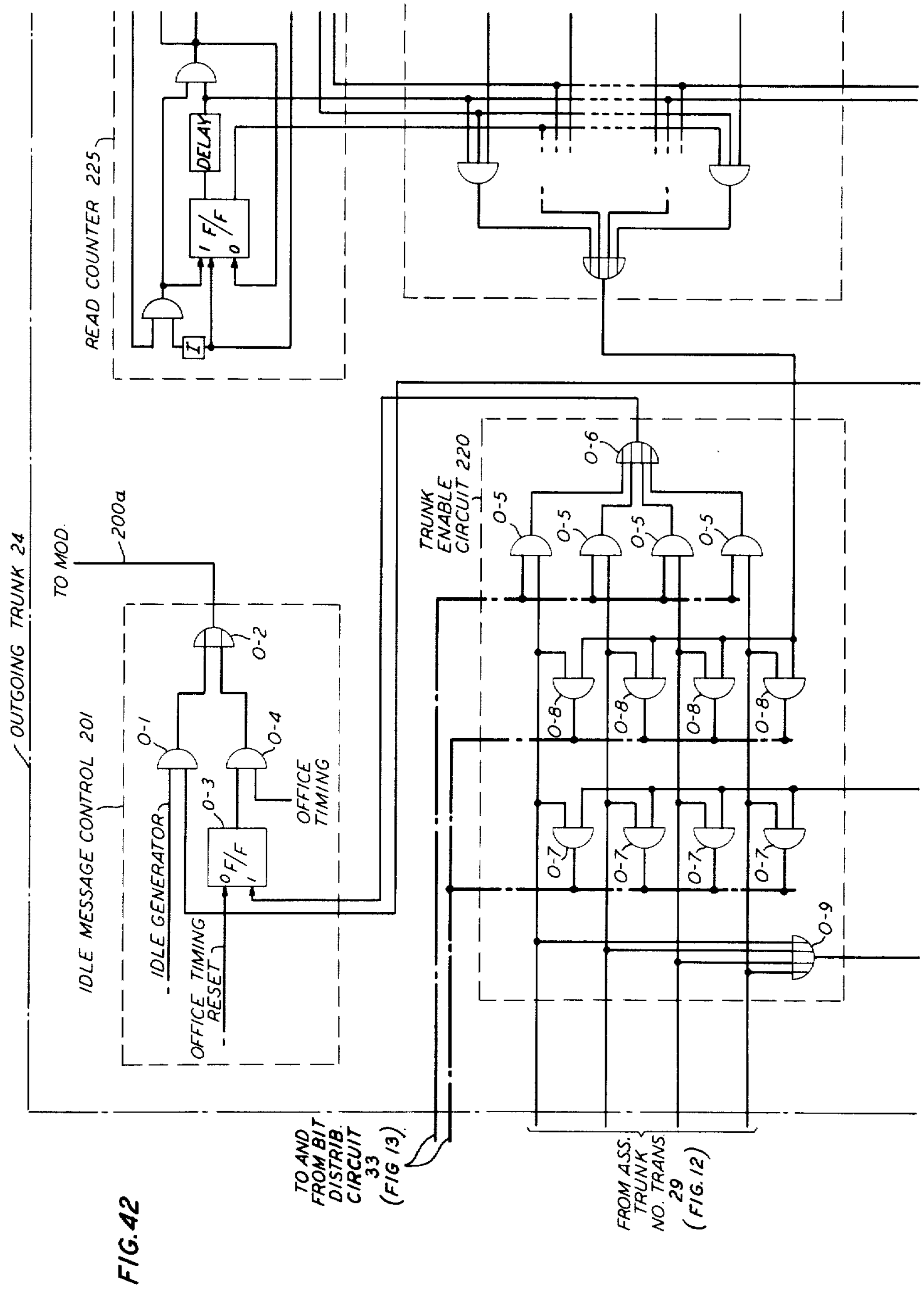

Considering now the logic elements in the detailed circuits of FIGS. 42–45, the idle-message control 201, FIG. 42, serves to connect the message output to either the idle generator signal input or to the message data input. The office timing signal occurs in each time interval, while the idle generator signal appears in every other time interval. With the outgoing trunk 24 in the idle state, and also during the time that a message is being acknowledged, the acknowledgment recognition circuit 203, FIG. 45, together with the idle generator signal, serves to enable AND gate O1. The output of AND gate O1 is transmitted through OR gate O2 and provides the idle signal on the outgoing message line **200*a*. During the idle state of the outgoing trunk, the idle generator signal is the only active signal circulating through the trunk circuit. If message data signals are received during this time, they will interfere with the idle signals in the modulator on the outgoing message line 200*a***. The modulator in this instance will provide an indication of such an error condition.

When the outgoing trunk 24 is activated to transmit a message, the acknowledgment recognition circuit 203 removes the enabling signal from AND gate O1, and intermediate receipt of office timing signals, message data signals are transmitted from the trunk enable circuit 220 to trigger flip-flop O3 and subsequently to enable AND gate O4 upon receipt of the next office timing signal. The message data output signals are thereupon transmitted through OR gate O2 to the outgoing message line **200*a*. Immediately following the office timing signal, an office timing reset signal serves to reset flip-flop O3 so that the idle-message control 201 is prepared for receipt of the next message data signal. Since the message data signals comprise binary indications reflected by the presence or absence of a positive signal, the binary indication corresponding to the absence of a signal fails to set flip-flop O3 in the proper time interval. Thus the forward line 200*a*** fails to transmit a positive signal during a data transmission interval, and the incoming trunk circuit in the remote switching terminal will reflect receipt of a distinct binary indication.

The trunk enable circuit 220 serves to gate information between the outgoing trunk circuit and the plurality of switches 23 connected thereto during transmission of a message. Gating is accomplished by signals from the trunk number translator 29 at the message data signal transmission rate incoming to the trunk enable circuit 220. There is a trunk enable input corresponding to each switch 23 and only one of these inputs is active for any one message to or from the corresponding switch 23.

Figure 44:
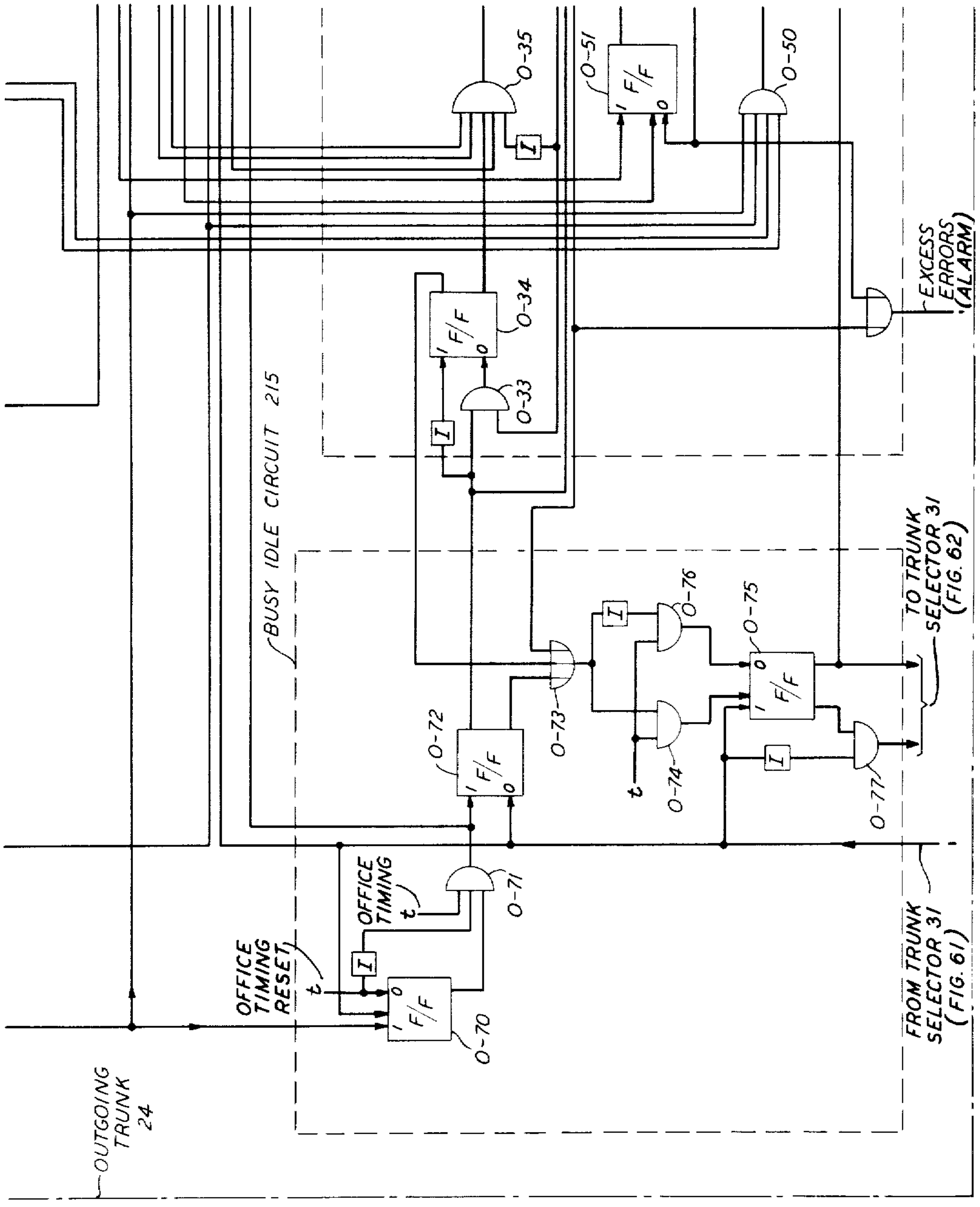
Figure 45:
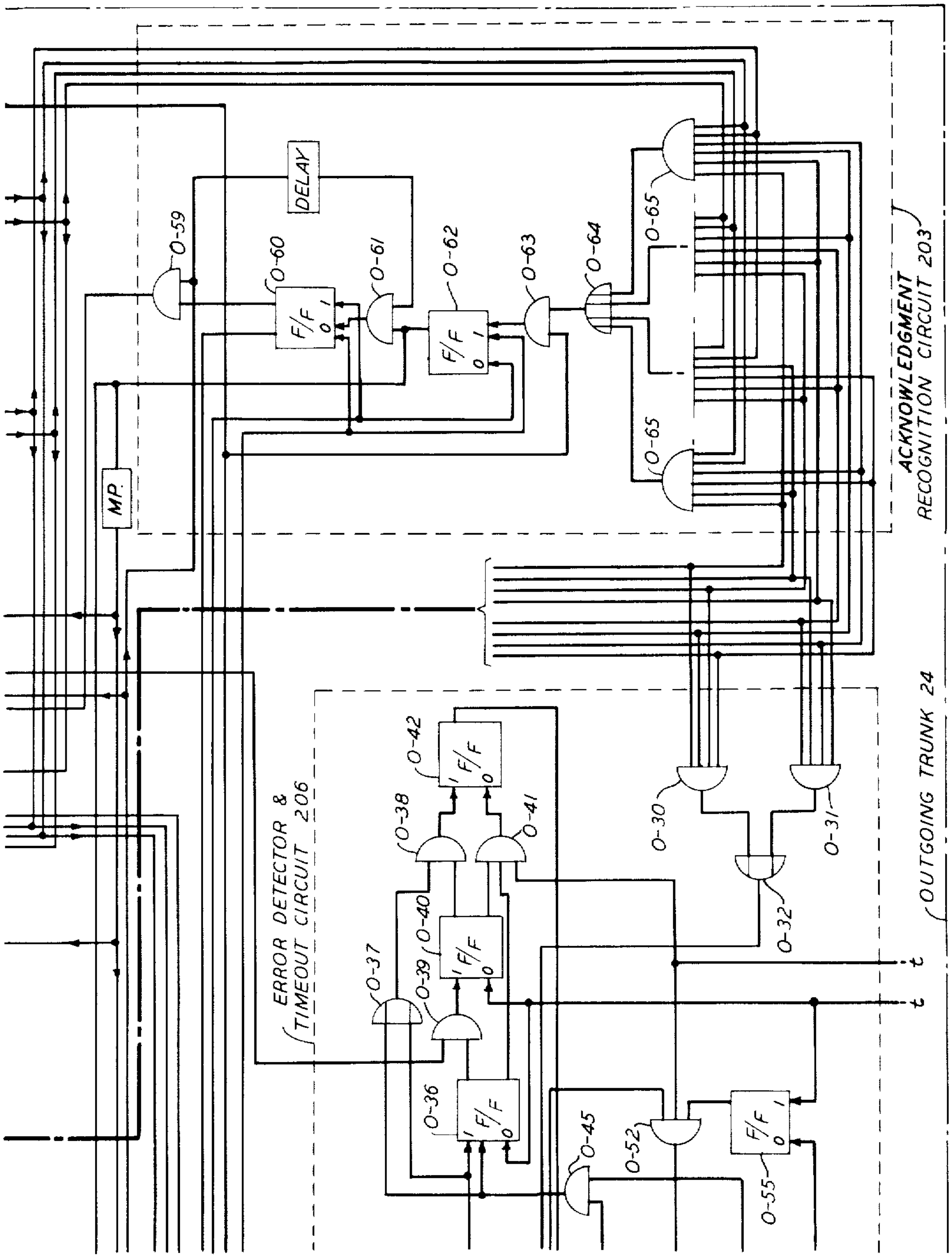
Figure 46:
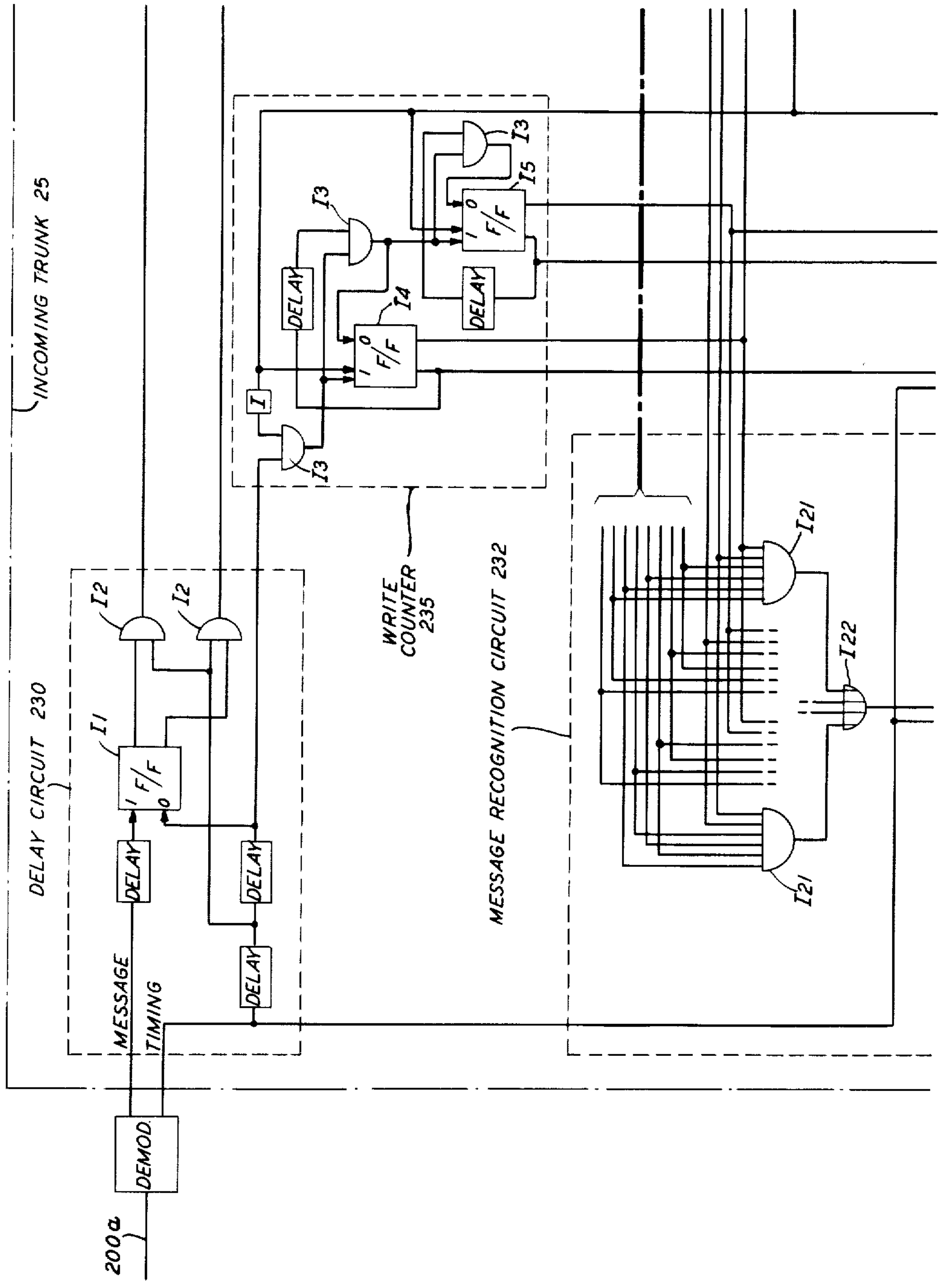
Figure 47:
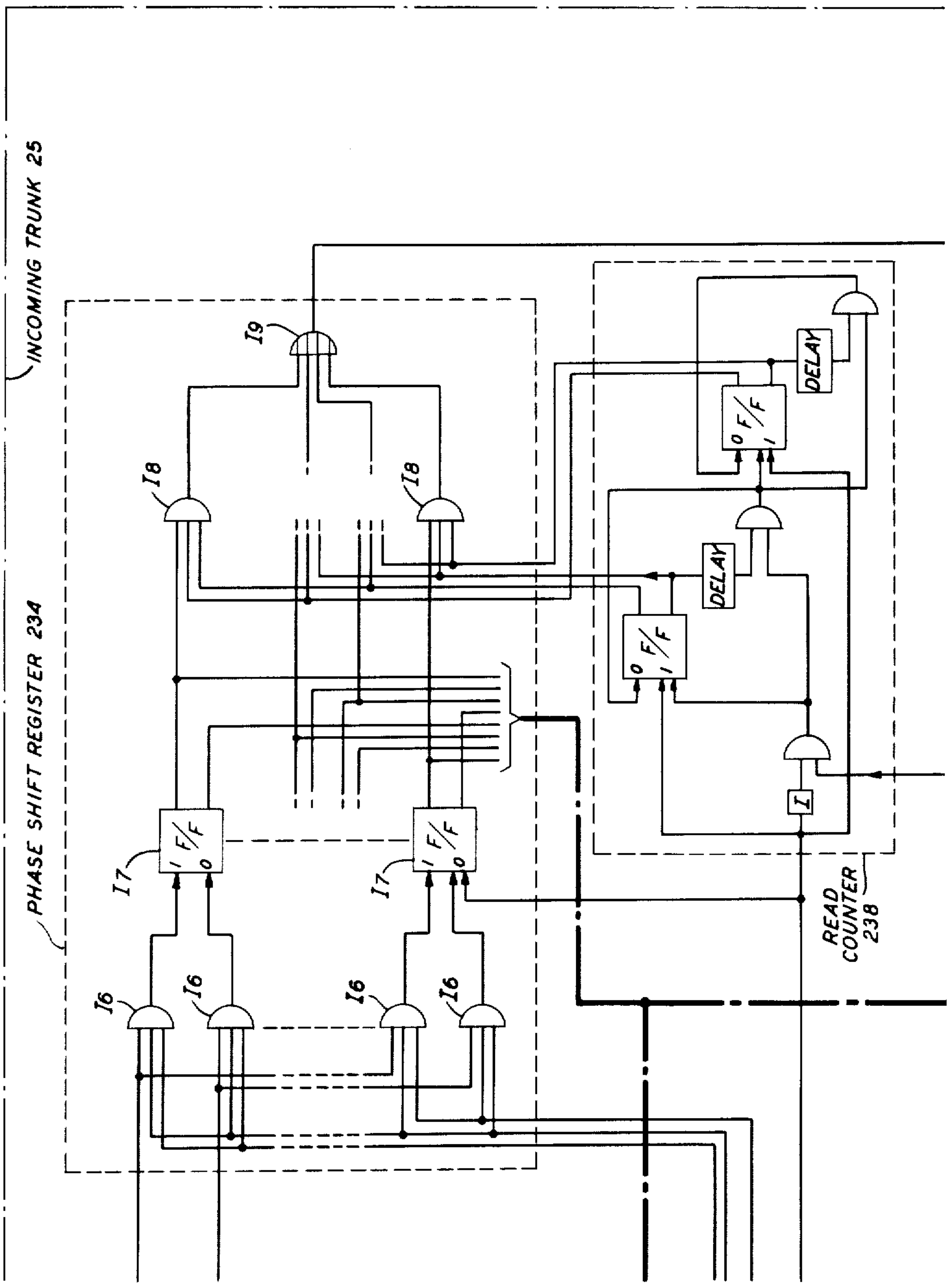
Figure 48:
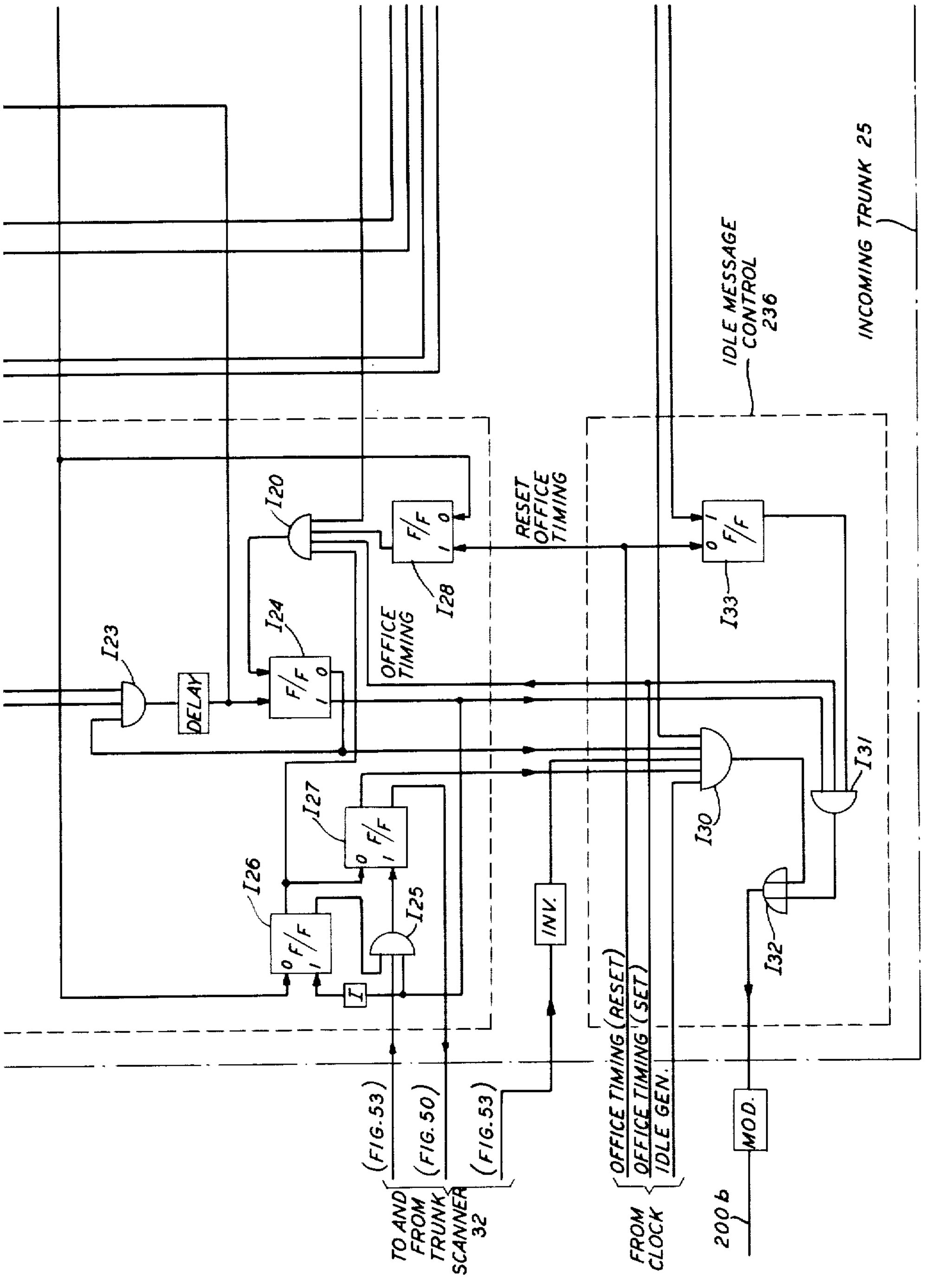
Figure 49:
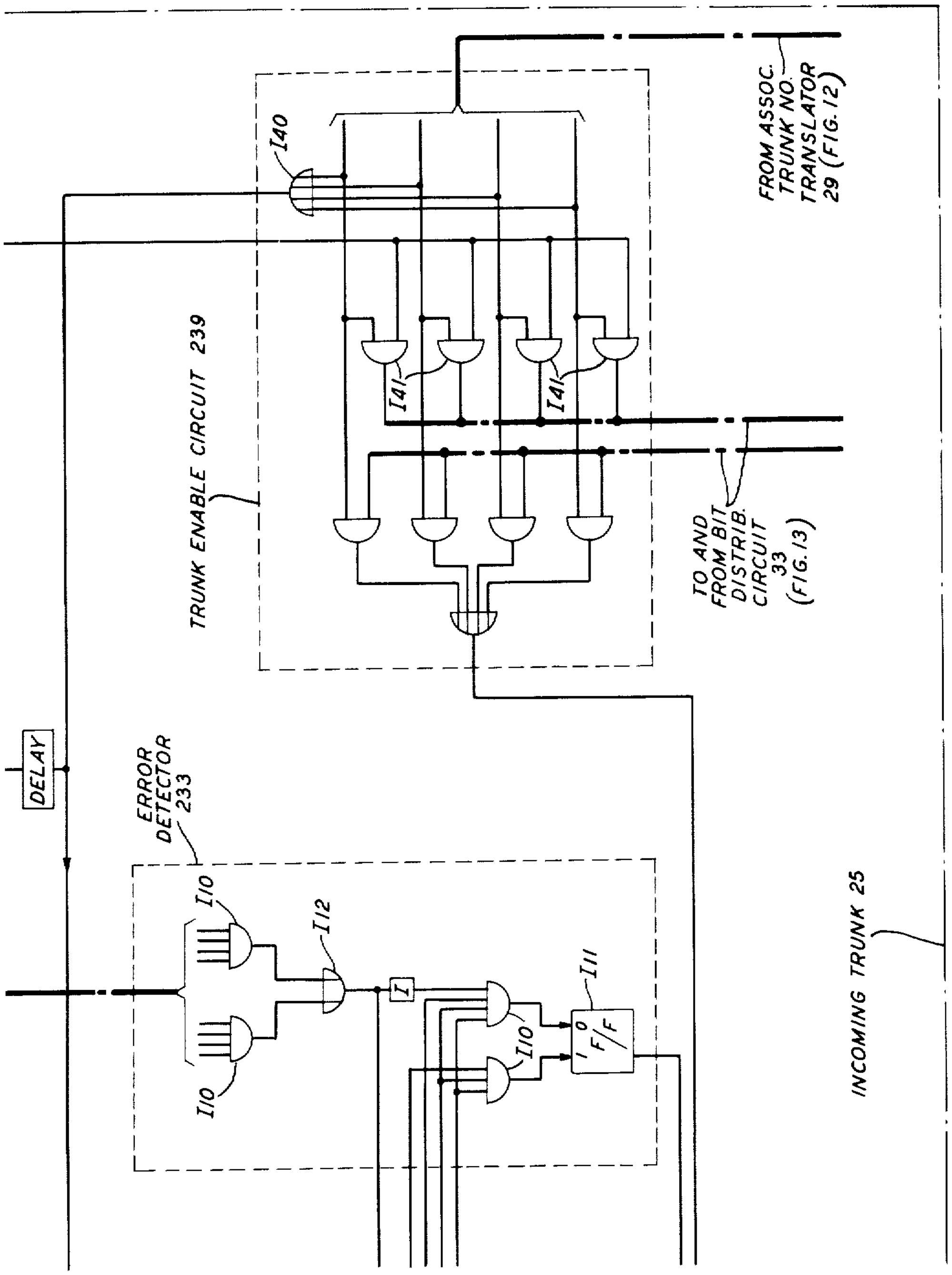
Figure 50:
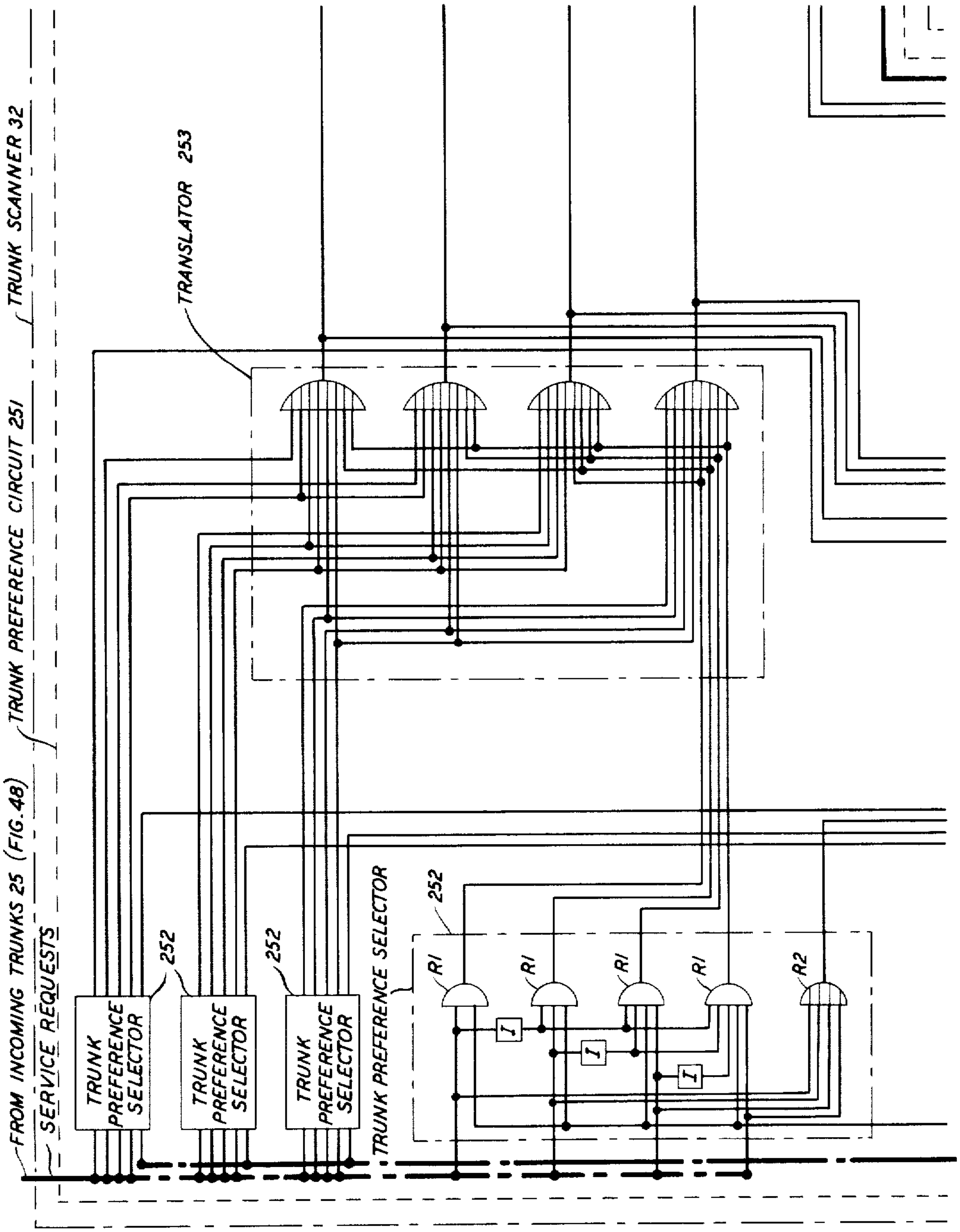

At the beginning of a message a busy signal is received in the busy idle circuit 215, FIG. 44, from the trunk selector 31. Upon receipt of an office timing signal, the first trunk enable signal serves to gate the message data into the idle-message control 201 through one of the AND gates O5 and the OR gate O6. The trunk enable signal also serves to gate a start-look signal and a return message signal from the outgoing trunk circuit to the bit control 28 of the corresponding switch 23 through one of the AND gates O7 and O8, respectively. The start-look signal is received from the acknowledgment recognition circuit 203 when an acknowledgment start code is recognized.

If a proper start code is not recognized before the switch 23 time-out period has elapsed, the start-look signal is transmitted to the trunk enable circuit 220 when the outgoing trunk is restored to the idle state. In this case the start-look signal will not be transmitted to any switch 23. The acknowledgment recognition circuit 203 removes the start-look signal upon receipt of the make busy signal preparatory to receipt of the next message in the outgoing trunk 24.

The return message line 200*b*, through the return phase shift register 208, continually presents return message signals to the trunk enable circuit 220 and changes the transmitted signals during the acknowledgment state immediately following each trunk enable signal. During the idle state these signals from the return phase shift register 208 are meaningless and are inhibited from transmission to the switches 23 by the AND gates O8, in the absence of the trunk enable signals. All trunk enable signals are also transmitted through OR gate O9 from which they are applied to the busy idle circuit 215, the excess error detector 206, FIG. 45, and the acknowledgment recognition circuit 203. The purpose of these signals will be considered in regard to detailed description of the particular logic blocks involved.

Figure 43:
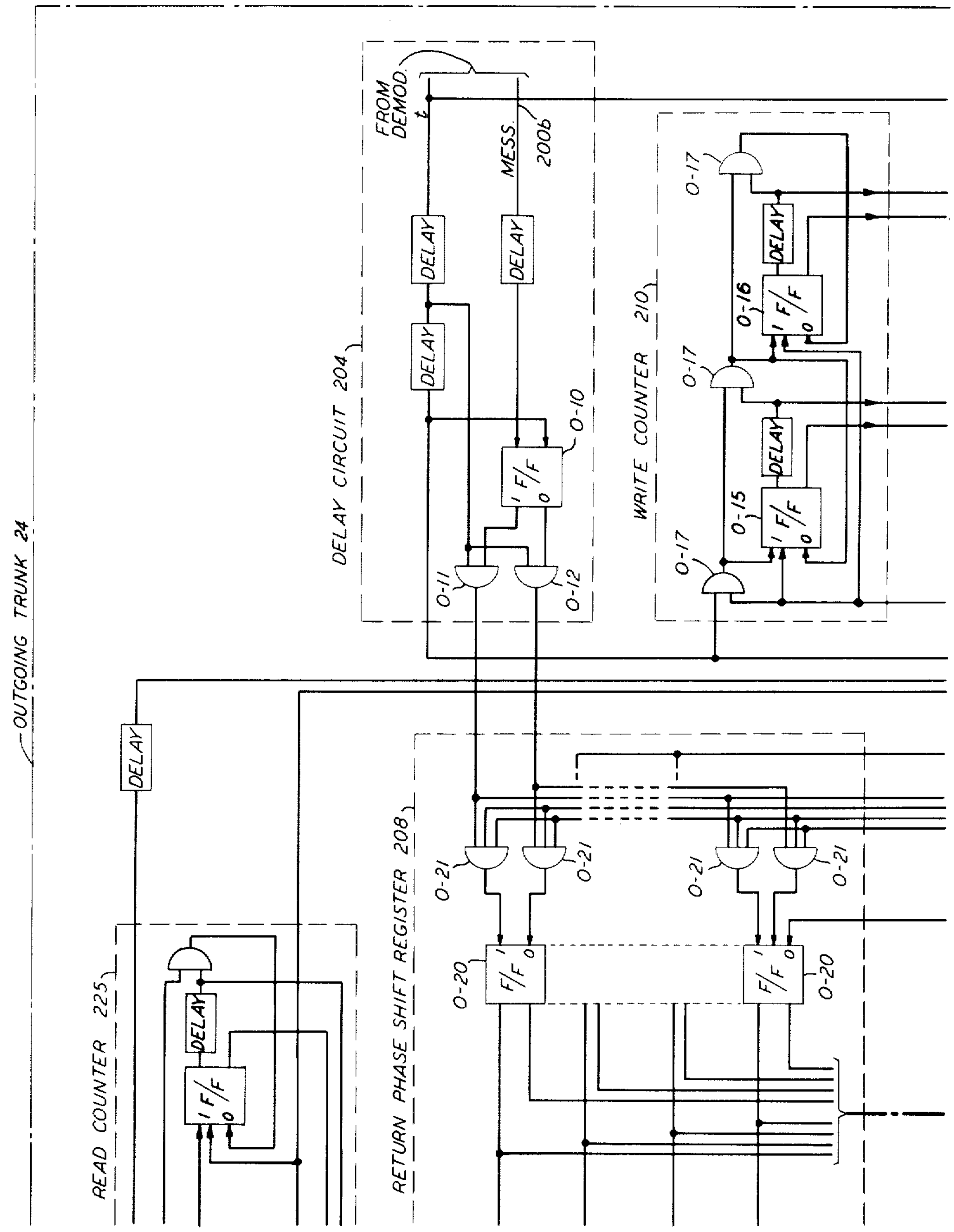

The delay circuit 204, FIG. 43, receives timing signals from the demodulator and data signals on the return message line 200*b*. Again the timing signals occur in each time interval while the message signals occur in alternate time intervals. Both signals are applied through delay elements, the message signals serving to set flip-flop O10, which temporarily stores the returning message data. The demodulator timing signals prior to delay are transmitted to the excess error detector 206 and the acknowledgment recognition circuit 203. Also, after appropriate delay, the demodulator timing signals serve to gate the return message information stored in flip-flop O10 through AND gate O11 or AND gate O12, the output of which is transmitted to return phase shift register 208. After further delay, the demodulator timing signals reset flip-flop O10 preparatory to receipt of subsequent return message data and are also applied to the excess error detector 206 and to the write counter 210, the latter signal serving to step the write counter 210.

The write counter 210 is a conventional counter circuit comprising flip-flops O15 and O16 and AND gates O17. It is a two-stage shift register which counts to four, recycles and steps once for each input signal from the delay circuit 204. The four distinct outputs of the write counter 210 are applied in sequence to the acknowledgment recognition circuit 203 and the excess error detector 206. In addition, the counter output enables the return phase shift register 208 each time a return message signal is received therein from the relay circuit 204. Upon recognizing the acknowledgment start code, the outgoing trunk 24 resets the write counter 210 by transmission of a signal from the acknowledgment recognition circuit 203 to flip-flops O15 and O16.

The read counter 225 operates substantially the same as the write counter 210 providing four distinct and sequential outputs corresponding to distinct phases. During the message state the read counter is reset by a signal from the acknowledgment recognition circuit 203, together with a trunk enable signal from circuit 220. Following the resetting operation the read counter 225 is stepped at regular intervals corresponding to subsequent trunk enable signals. Operation of the read and write counters is synchronized by operation of the acknowledgment recognition circuit 203.

The return phase shift register 208 receives the return message signals through the delay circuit 204 and stores them in one of the flip-flops O20, as determined by the AND gate O21 operated by the signals from the write counter 210. Thus the return message signals are stored in a normal predetermined sequence. The register 208 applies the acknowledgment start code to the acknowledgment recognition circuit 203 and the idle code to the excess error detector 206 upon receipt of each demodulator timing signal, followed by a signal from the write counter 210 to the proper flip-flop O20. The write counter 210 is then stepped preparatory to the next phase input to the register 208. The return message acknowledgment is transmitted through the trunk enable circuit 220 upon receipt of the trunk enable signal. The read counter 225 determines which flip-flops O20 will be read out to the trunk enable circuit 220. Such readout is inhibited while flip-flops O20 are receiving acknowledgment signals. This is assured by proper resetting of the read and write counters upon recognition of an acknowledgment start code. This sequence is described in conjunction with the acknowledgment recognition circuit 203 description.

The excess error detector 206 looks for errors in the idle code during the idle state. Upon detection of two successive errors, the particular outgoing trunk 24 at fault is made busy through the busy idle circuit 215 and an appropriate indication is forwarded to the maintenance equipment. A request for a message rerun is considered as one such error. Also if the outgoing trunk 24 fails to assume the idle state within a prescribed time after being made busy, a time-out circuit in the excess error detector again signals the maintenance equipment upon release of the outgoing trunk by the switch 23. All other excess error indications require a prescribed error-free interval before the outgoing trunk may be restored to the idle state.

Whenever the idle code is present in the return phase shift register 208, AND gates O30 or O31 provide an output indication through OR gate O32 which partially enables AND gate O33. AND gate 033 is then fully enabled upon receipt of a signal from the busy idle circuit 215 after release of the outgoing trunk circuit by the associated switch 23. AND gate O33 in turn resets flip-flop O34, partially enabling AND gate O35 and also advising the busy idle circuit 215 of this idle condition. Thus the outgoing trunk circuit must recognize idle code after a message transmission prior to assuming the idle condition or counting errors in the idle code.

AND gate O35 also has two inputs which are active when the write counter 210 is in one of its four possible states. Thus AND gate O35 serves to set flip-flop O36 once in each of four successive time intervals when the idle code is not present. The output of AND gate O35 is also transmitted through OR gate O37 to AND gate O38. AND gate O38 will provide an output to set flip-flop O42 if flip-flop O40 was also in the set state. However, if no other errors have occurred in a prescribed interval, flip-flop O40 will be in the reset state. Assuming this is the case, a signal from delay circuit 204 gates AND gate O39 so as to set flip-flop O40 upon the removal of the demodulator timing signal.

Upon storage of a new idle code indication in return phase shift register 208 it will be checked in the same fashion and if no errors are present, AND gate O35 will fail to provide an output signal in each fourth time interval. Should a second error occur in the prescribed time interval, flip-flop O40 will be in the set state when AND gate O38 is partially enabled by a signal from AND gate O35. Thus flip-flop O42 will be set and an excess error indication is transmitted to the busy idle circuit 215, causing the outgoing trunk to become busy and the maintenance equipment to be alerted as to the error condition in this trunk. An output of AND gate O45 also counts as an error, this being an indication that the message acknowledgment is a rerun request.

When the achknowledgment recognition circuit 203 first recognizes the start code, it sets flip-flop O51. After the fourth time interval of acknowledgment receipt the read counter 210 should partially enable AND gate O50. Then, while the start-look indication is being transmitted from the acknowledgment recognition circuit 203 to AND gate O50, the trunk enable signal enables AND gate O50, partially enabling AND gate O45 which, together with the output of flip-flop O51 in the set state, serves to set flip-flop O36 to store an error indication. If for some reason flip-flop O51 fails to be reset by a satisfactory message asknowledgment, time-out indications from the clock through AND gate O52 will serve to reset flip-flop O51.

Upon seizure of the outgoing trunk 24 by a switch 23, flip-flop O55 is set by a timing signal. Then if the outgoing trunk has not been restored to the idle condition in a prescribed time and if the outgoing trunk has been released by the switch 23, indicated by another input to AND gate O52, flip-flop O51 is reset and the maintenance equipment advised of the situation by the output of AND gate O52.

During the idle state the acknowledgment recognition circuit 203 serves only to enable the idle generator in the idle-message control 201. This enabling signal is provided from the set output of flip-flop O62. A make busy signal received through the busy idle circuit 215 serves to set flip-flop O60 and reset flip-flop O62. This removes the idle generator from the message line and also the signal from the start-look gates O7, as provided by flip-flop O60 in its reset state. AND gate O59 is now partially enabled. The trunk enable signals received thereafter activate AND gate O59 to reset the read counter 225 during each trunk enable signal and also, through delay means, step the read counter. Such signals continue to reset and step the read counter 225 for the duration of a message.

The specific acknowledgment start code is received from the return phase shift register 208 in AND gates O65, which in turn partially enables AND gate O63 through OR gate O64. The next demodulator timing signal gates AND gate O63 so as to set flip-flop O62. This serves to reset the write counter 210 as well as the return phase shift register 208. Flip-flop O62 in its set state also once again permits idle generator signals to be transmitted to the message line 200*a*.

As the write counter 210 steps through its four phases, AND gate O61 is activated by a delayed trunk enable signal so as to reset flip-flop O60. This serves to transmit the start-look signal to the AND gates O7 in trunk enable circuit 220. Circuit 203 remains in this condition through the balance of the acknowledgment state of the outgoing trunk and the entire following idle state.

With flip-flop O60 in the reset state, AND gate O59 will no longer be enabled to reset the read counter 225 upon receipt of subsequent trunk enable signals. By resetting and stepping the write and read counters in this manner, the demodulator timing signals may drift a prescribed amount, up to one time interval during an acknowledgment, before any errors due to improper phase shift will be possible. A similar phase shifting network is available in the incoming trunk circuit.

During the idle state of the outgoing trunk 24, the busy-idle circuit 215 will have flip-flops O70, O72 and O75 in the reset, set and reset states, respectively. Thus an idle signal is transmitted to the trunk selector 31 at this time. The output of flip-flop O75 in the set state serves to provide a busy indication to the trunk selector 31 and also an indication to flip-flop O55 in the error detector 206, serving to disable the time-out circuit. The output from the set flip-flop O72 enables the excess error detector 206.

During each office timing signal the output of AND gate O71 signals the acknowledgment recognition circuit 203, placing it in the prescribed idle state. Also during the idle state the inputs to OR gate O73 are from flip-flop O34 in its reset state, indicating that an idle signal has been received from the incoming trunk, from flip-flop O72 in its reset state, indicating that no switch 23 has selected this outgoing trunk, and finally from the output of the excess error detector flip-flop O42 in its reset state, indicating that no excess errors are present. If any of these inputs is active, AND gate O74 is enabled, thus setting flip-flop O75 upon receipt of the next office timing signal. This serves to reverse the busy and idle indications to the trunk selector, indicating that this outgoing trunk is now in the busy condition and should not be selected for message transmission.

A make busy signal from the trunk selector disables AND gate O77 and sets flip-flop O75, which in turn partially enables AND gate O77, reversing the idle output signal. Upon disappearance of the make busy signal AND gate O77 will provide the busy signal. The delay provided in this fashion avoids a race condition in the trunk selector 31. The make busy signal also serves to set flip-flop O70 and reset flip-flop O72, the latter assuring that flip-flop O75 remains in the set state for the duration of the message. The next office timing reset signal serves to reset flip-flop O70 and prevents AND gate O71 from being enabled in case office timing and reset signals should overlap. The first trunk enable signal will then again set flip-flop O70.

This sequence continues as long as trunk enable signals appear. Absent a trunk enable signal, flip-flop O70 is reset and AND gate O71 is enabled to set flip-flop O72. Thereafter, with all the inputs to OR gate O73 of the same prescribed polarity, AND gate O76 will be enabled to reset flip-flop O75, thereby applying the indication of the idle state of the outgoing trunk circuit to the trunk selector 31.

*Incoming trunk*

Figure 13:
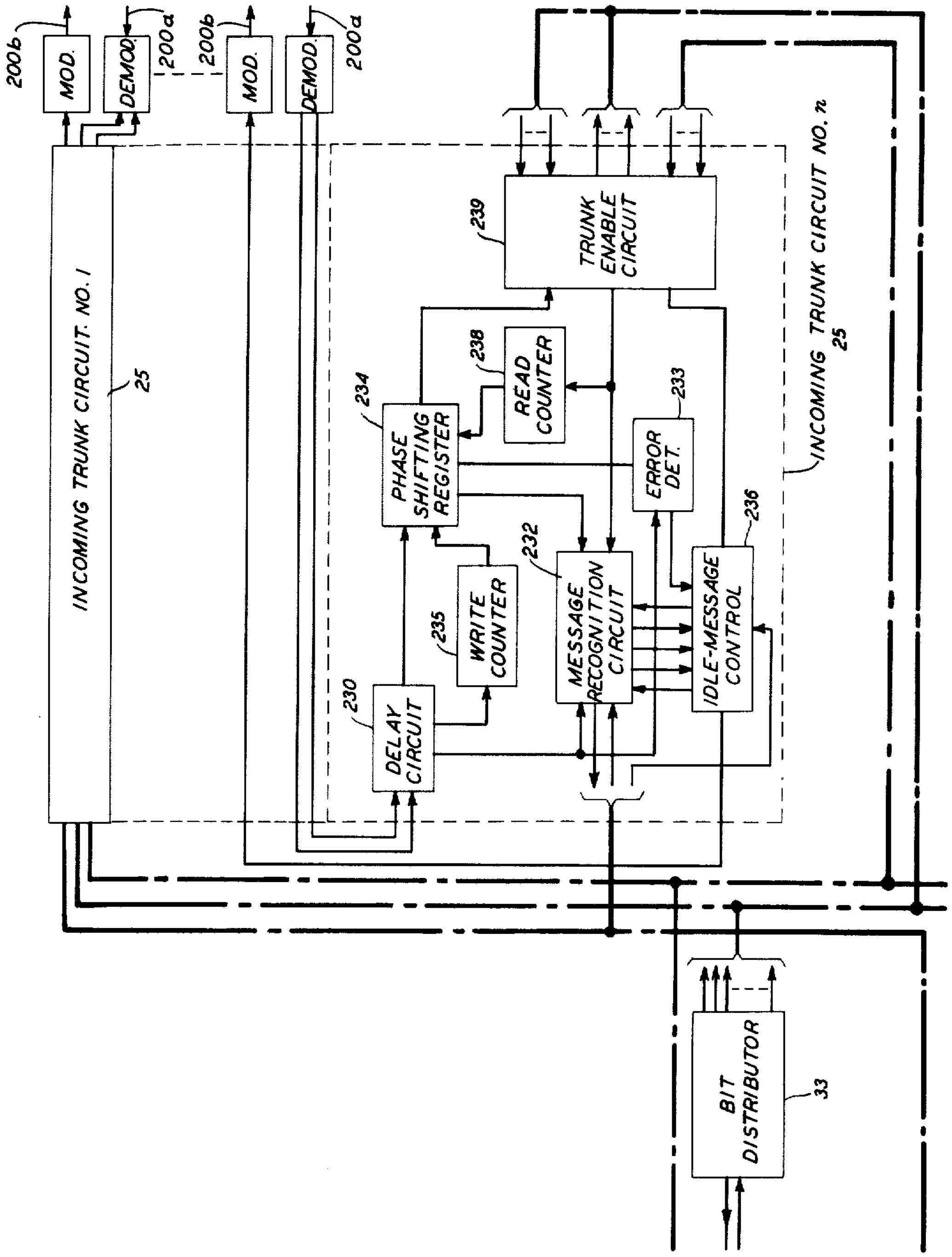

The incoming trunk circuit 25, FIG. 13, comprises a group of logic circuits arranged in functional blocks, the detailed circuitry of which is illustrated in FIGS. 46–49. Its principal functions are to receive and transmit a signal indicating an idle condition of the trunks at all times when messages are not being handled; to check the idle signal for errors, and when errors are found, to transmit an appropriate indication to the outgoing trunk at the originating terminal; to forward incoming messages to a switch 23; and to transmit acknowledgements from the switch 23 to the originating terminal.

Considering, first, the block diagram of FIG. 13, the delay circuit 230 continuously receives a repetitive timing signal from the demodulator connected to the forward line 200*a* of the incoming trunk. Also while the trunk is idle, idle signals are circulated through the forward and reverse lines 200*a* and 200*b* of the trunk. These timing and idle signals are identical with the inputs to the outgoing trunk circuit 24. The idle signal received over line 200*a* is stored in the delay circuit 230, and the timing signals from the demodulator are transmitted to the message recognition circuit 232 and the error detector 233, as well as being delayed in the delay circuit 230. After an appropriate delay, the timing signal gates the information, in this instance the idle signal, from the delay circuit 230 to the phase shift register 234 and after a further delay, steps the write counter 235.

The information recorded in the phase shift register 234 is also registered in the error detector 233, and the timing signal gates error information the error detector 233 to the idle-message control 236. If no errors are present, the idle-message control 236 will transmit a corresponding idle signal out on the reverse line 200*b* toward the outgoing trunk of the originating terminal. If one or more errors are detected, the idle-message control 236 will inhibit transmission of portions of the idle signal on line **200*b*, thereby producing an indication corresponding to the errors detected in the idle signal received on line 200*a***.

The transmission of independent idle signals over lines **200*a* and 200*b* during the idle state of the trunk obviates the need for an elaborate return phase shift network in the incoming trunk circuit, since indications from the associated terminating switch 23, acknowledging receipt of a message over line 200*a*, are not in phase with the idle signal received on the incoming message line 200*a*. Signals other than the idle signal will also be returned to the originating terminal over return line 200*b* if an indication of a failure in the associated trunk scanner is received in the idle-message control 236, or a start code signal, indicative of imminent transmission of a message, is provided by the message recognition circuit 232**.

When transmission of a message is to begin, a unique start code will be written in the phase shift register 234 as received over the forward line **200*a*. The start code is recognized in the message recognition circuit 232, and upon receipt of the next demodulator timing signal, the start code is gated from the message recognition circuit 232 to the idle-message control 236. This output also serves to reset both the write counter 235 and the read counter 238**.

The idle-message control 236 responds to receipt of the start code by connecting the reverse line **200*b* to the trunk enable circuit 239 receiving acknowledgement indications from the associated switch 23. The message recognition circuit 232, also upon recognition of the start code, transmits a request to the trunk scanner 32 for provision of message storage space in the store 26 of one of the switches 23 at the associated terminal. The trunk scanner 32 in turn selects a switch 23 having storage space available to receive the message and advises the corresponding trunk number translator 29 to acknowledge the availability of such space in a store 26 by transmitting appropriate signals to the trunk enable circuit 239. The first such signal received serves to inhibit transmission of the storage space request signal from the message recognition circuit 232 to the trunk scanner 32. Trunk enable output signals step the read counter 238 so as to read the message, as stored in phase shift register 234, through the trunk enable circuit 239 to the selected switch 23**.

When the switch 23 has accepted the complete incoming message, an appropriate acknowledgment is transmitted through the trunk enable circuit 239 and the idle-message control 236 to the reverse line **200*b*. Upon completion of the acknowledgment, all trunk enable signals are removed, which removal activates the message recognition circuit 232 to signal the idle-message control 236 to again connect the idle indication to the outgoing message lead 200*b*. However, before the idle signal is restored to the message lead, the error detector 233 must indicate that the idle signal is also present in the phase shift register 234 and that the scanner failure signal is not present. Under these conditions the incoming trunk circuit 25** is restored to the idle state.

Considering now the logic elements in the detailed circuit of FIGS. 46–49, the delay circuit 230 is seen to comprise flip-flop I1, which receives the message from the incoming message line **200*a*. Timing seignals from the demodulator, after appropriate delay, gate the message indications as recorded in the flip-flop I1 through AND gates I2 to the phase shift register 234 and then place flip-flop I1** in the reset condition.

The demodulator timing signal also serves to step the write counter 235, which is a conventional counter circuit comprising in this example AND gates I3 and flip-flops I4 and and I5, to provide four distinct phase indications. The output of the message recognition circuit 232 is applied to the flip-flop I4 and I5, serving to reset the write counter 235, and also to disable the AND gate I3 receiving the demodulator timing signal during the resetting of the write counter 235. Outputs of the write counter 235 are applied to the message recognition circuit 232, the error detector 233, and the phase shift register 234.

Operation of the phase shift register 234 is identical to that described for the phase shift register 208 of the outgoing trunk circuit 24. In essence, the AND gates I6 operate in conjunction with the outputs of the write counter 235 to gate the serially received message to the flip-flops I7 for storage in parallel form. After an appropriate delay, the read counter 238 will gate the content of the register flip-flops 17 through AND gates 18 and OR gate 19 to the trunk enable circuit 239 in the serial form in which the message was originally received from the forward line **200*a***.

The error detector 233 consisting of AND gates I10, flip-flop I11, and OR gate I12 recognizes the presence of the idle code in flip-flops I7 of the phase shift register 234. Absence of the idle code during predetermined intervals constitutes an error and results in the resetting of flip-flop I11. As the output of flip-flop I11 controls the presence of the idle signal on the reverse line **200*b*, the resetting of flip-flop I11** serves to inhibit the idle code.

During message transmission the idle signal is inhibited (AND gate I30 disabled) by a signal from the message recognition circuit 232. The write counter 235 applies a signal solely to the AND gate I10, which does not receive the idle indication, thus assuring that flip-flop I11 will be set in the next bit time after each resetting. In this fashion a single error will produce the idle code on the reverse line **200*b*** for two full bit times, followed by the absence of the idle code for the next two bit times.

Another output of OR gate I12 is applied to AND gate I20 in the message recognition circuit 232, which input prevents the incoming trunk circuit from recognizing a false start code before a valid idle code is recognized in the phase shift register 234. Any start code occurring before the idle code would be invalid since one round trip through the forward and reverse lines **200*a* and 200*b*** by the idle code is required after each message transmission before the outgoing trunk circuit can go idle.

When the start code for a message is present in the phase shift register 234, it is recognized by one of the AND gates I21 of the message recognition circuit 232. This in turn enables OR gate I22, the output of which enables AND gate I23 in conjunction with the demodulator timing signal, considering that the incoming trunk 25 is idle at this time. AND gate I23 provides an output after an appropriate delay, which sets flip-flop I24 and resets both the write and read counters 235 and 238, respectively, and the phase shift register 234.

With flip-flop I24 in the set state, AND gates I23 and I30 are disabled and AND gate I31 is enabled, the latter gate being the one through which the acknowledgment will pass from the switch 23 after the message transmission has been completed. With AND gate I30 disabled, the idle code is removed from the outgoing message lead **200*b*. Flip-flop I24 in its set state also enables AND gate I25 and removes the set input from flip-flop I26**.

Upon receipt of the next storage space request signal from the trunk scanner 32, AND gate I25 is enabled, thereby setting flip-flop I27. This action permits transmission of a storage space request signal to the trunk scanner 32, removal of one input to AND gate I30, and continued disablement of the idle code.

Within one bit time from the recognition of the start code by the incoming trunk 25, the first trunk enable signal is received from the translator 29 through OR gate I40 of the trunk enable circuit 239 and serves to reset flip-flop I26 in the message recognition circuit 232.

This also resets flip-flop 127, thereby removing the storage space request to the trunk scanner 32. The trunk enable signal also resets flip-flop 128, whereupon office timing AND gate 120 is disabled. The next reset office timing signal sets flip-flop 128. Subsequent trunk enable signals will also reset flip-flop 128 in this fashion until the switch 23 releases the incoming trunk circuit.

When the trunk enable signal is removed, flip-flop 128 will be in its set state when the office timing signal is received as an input to AND gate 120. This will reset flip-flop 124, again enabling AND gates 123 and 130, disabling AND gates 131 and 125, and setting flip-flop 126. The incoming trunk circuit is thus restored to the idle state.

Upon receipt of the first trunk enable signal, AND gates 141 and trunk enable circuit 239 are activated so as to write the start code in the store 26 at the selected switch 23. The same trunk enable signal after appropriate delay then steps the read counter 238 which, similar to the write counter 235, provides four distinct phase output signals. The write and read counters are synchronized by this trunk enable signal and by the output of the message recognition circuit 232 to always be separated by one or two phases. The read counter 238 is active only during transmission of a message, being activated by the output of message recognition circuit 232 and the trunk enable circuit 239.

The idle-message control 236 serves to connect return line **200*b* to the idle generator input from the clock, to the acknowledgment input from the trunk enable circuit 239 or to inhibit both of these inputs. During the idle state of the incoming trunk 25, AND gate 130 is enabled by a combination of signals; viz., the idle generator signal, the output of flip-flop 127 in its reset state, indicating that no storage space request signal is being transmitted, the output of flip-flop 124 in its reset state, guaranteeing the existence of the idle state in the incoming trunk 25, and the output of flip-flop 111 in its set state, indicating that the idle code is being received correctly from the originating terminal over the message input line 200*a*. Absent any of the above signals, AND gate 130 prevents transmission of the idle generator signal over the message output line 200*b***.

Also during the idle state, OR gate 132 is activated by the output of AND gate 130. AND gate 131 controls the transmission of acknowledgment indications from the switch 23 to the reverse line **200*b*. Its inputs are the office timing signal and the outputs of flip-flop 124 and 133 in their set state. When the start code is received, flip-flop 124 is set, thereby enabling AND gate 131** upon receipt of each office timing signal.

The message transmitted over lead **200*b* will be a sequence of identical signals until the acknowledgment is transmitted from the switch 23. At this point flip-flop 133 will store each bit of the acknowledgment which will subsequently be read out through AND gate 131 by the office timing signals. Flip-flop 133 is always reset by the reset office timing signal immediately after the office timing signal has enabled AND gate 131. In this fashion the message acknowledgment is delivered from the switch 23 to the reverse line 200*b***.

One other input to AND gate 130 is a scanner failure signal from trunk scanner 32. This signal is inverted such that if a fault is detected in the trunk scanner, the resultant signal upon inversion inhibits the idle generator output of AND gate 130. This assures that if a failure condition appears during a message, that message can be acknowledged through the incoming trunk 25.

*Trunk selector*

Figure 16:
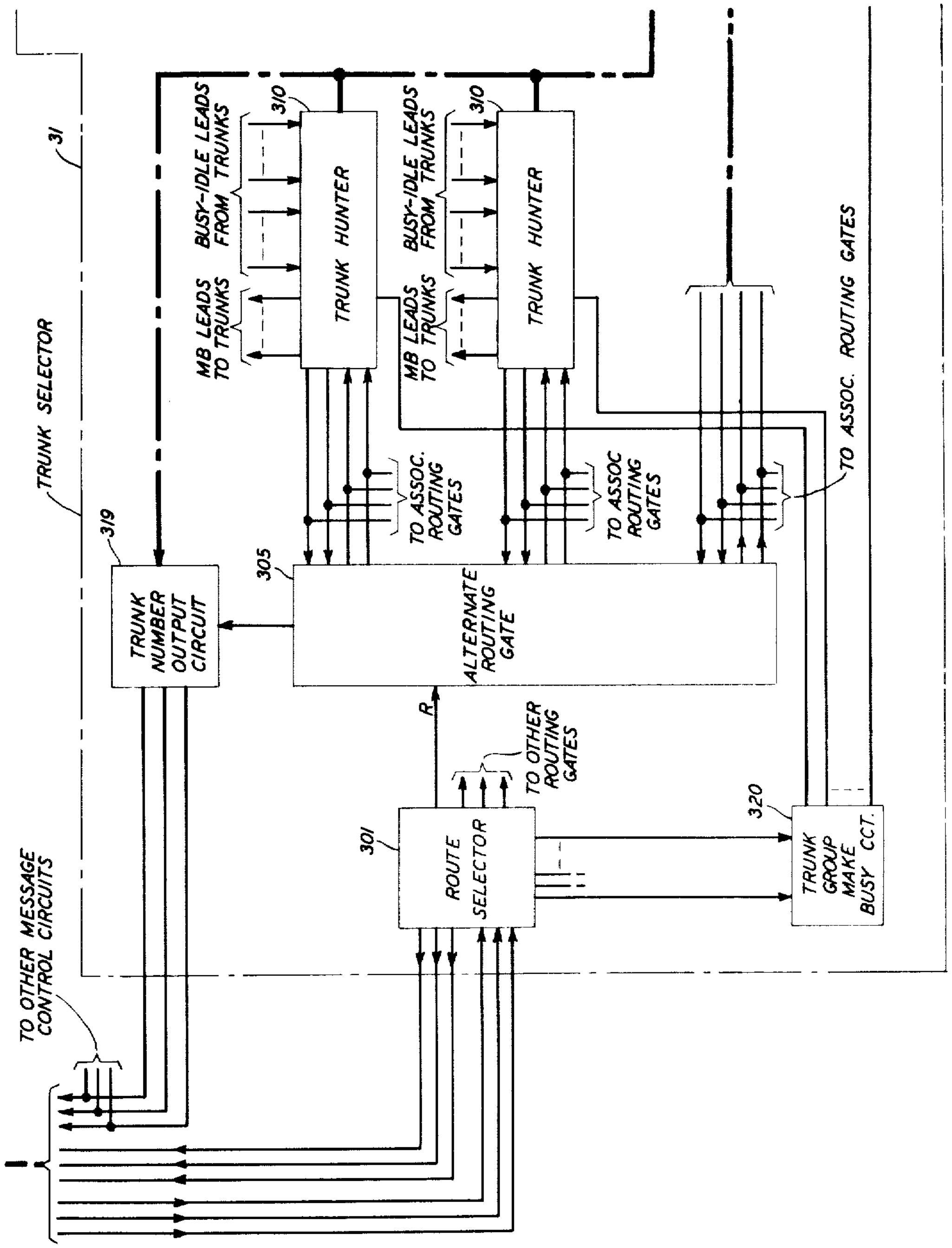
Figure 17:
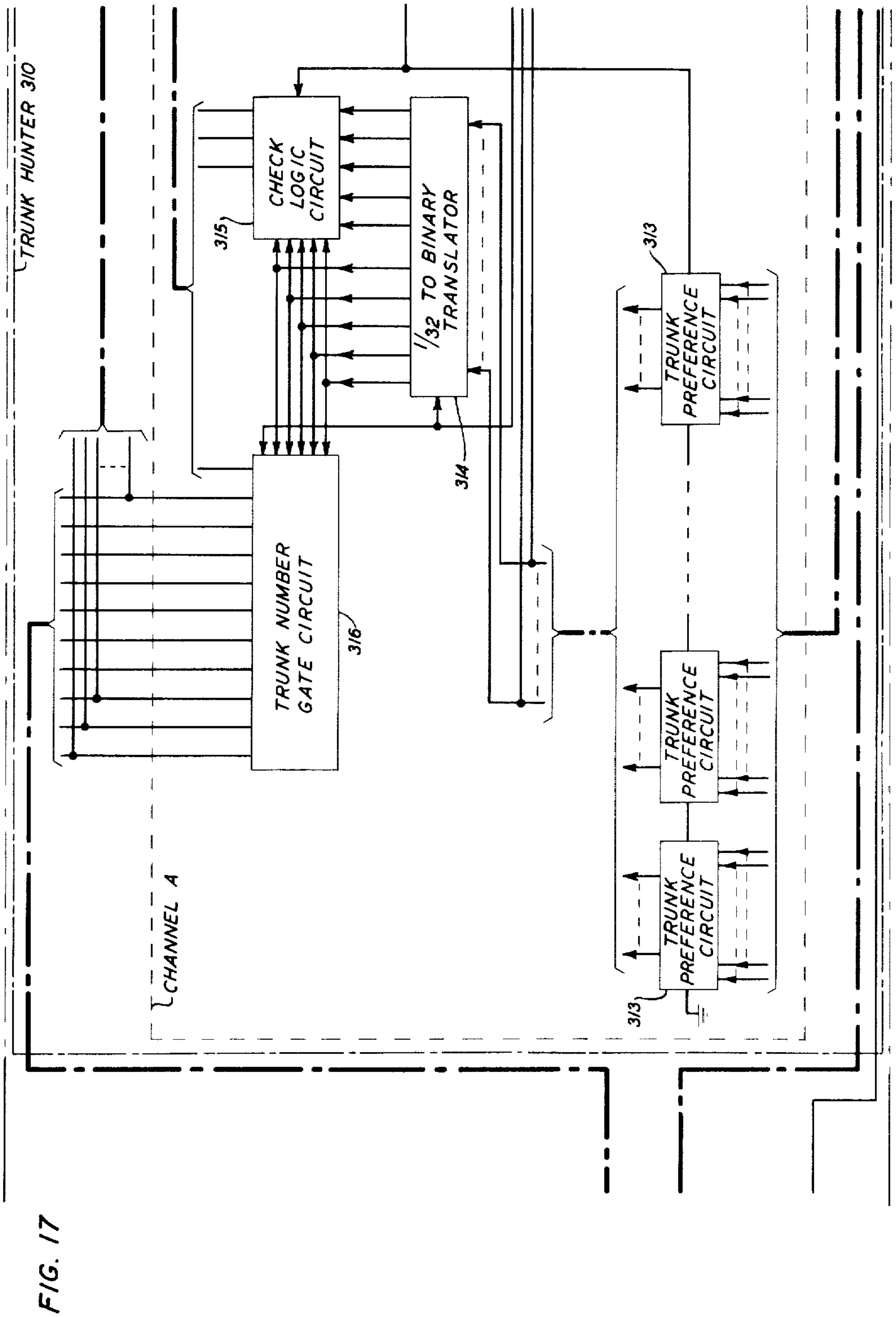
Figure 18:
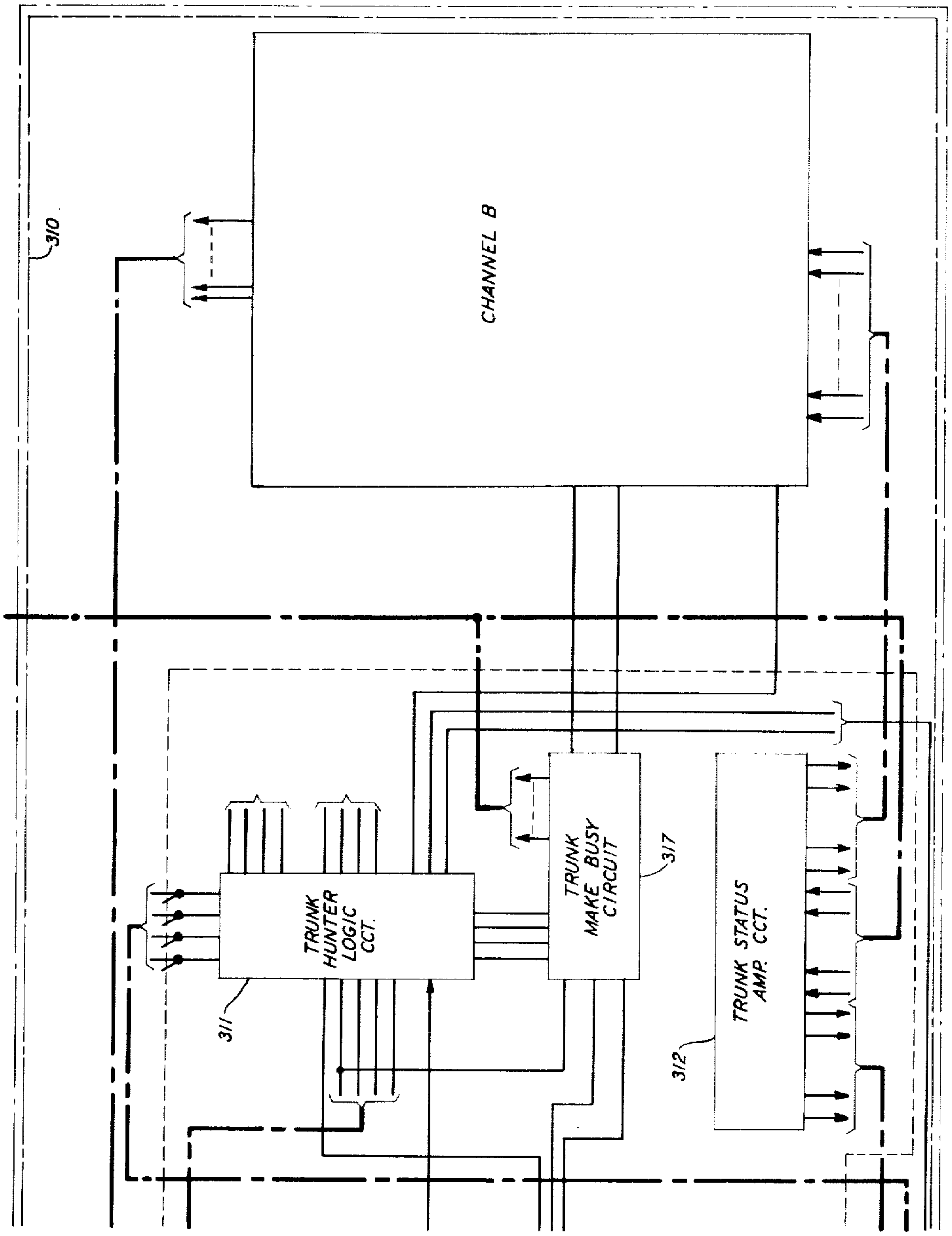

The trunk selector 31, FIGS. 16–18, serves to translate message addresses into trunk numbers identifying particular outgoing trunks terminating at the desired destination. The trunk selector operates in response to destination address information received from the message control 27 of each of the switches 23 and completes connections in accordance with received signals which identify busy and idle conditions of the outgoing trunks 24. Thus the trunk selector 31 in essence is a translator which accepts message addresses and indications of the busy and idle conditions of trunks and translates such information into indications of particular outgoing trunks suitable for terminating calls.

Incoming information to the trunk selector 31 is received in the route selector 301. This information comprises the destination address, a trunk group indication and a start signal. The destination address is translated into a route plan comprising a selected trunk group and a particular trunk in the selected trunk group. When a priorly selected trunk group is unable to complete the call, the identity of this group, as provided by the message control 27, is translated in the route selector 301 and used to compel selection of a trunk in a different trunk group. Thus the trunk group indication prohibits selection of a trunk in a priorly selected trunk group for the same call.

Each destination address is permitted a number of distinct alternate routes to the call destination. Such alternate routes for each address may be referred to as the "routing plan" for the address. Thus, for example, an address identifying a particular destination may have access to any one of three distinct trunk groups for completion of the call. The route selector 301 will select the trunk group from the possible groups assigned for that address in a preferential order. A first choice trunk group will be selected unless it is busy on a prior call, in which event the second choice trunk group will be selected, etc. The route selector 301 serves to convert the destination address into the routing plan, with the outputs transmitted to the alternate routing gates 305.

One route selector 301 is provided for each switch 23 in the system. The balance of the trunk selector 31 is common to all of the switches 23. It is essential, therefore, that provision be made to lock out all but one route selector 301 at a given time to prevent simultaneous operation of the balance of the trunk selector 31 by more than one of the switches 23. Such lockout is accomplished by operating the route selectors 301 in sequence in distinct time intervals.

The appearance of a signal at an alternate routing gate 305 from a route selector 301 is treated as a request for an outgoing trunk translation, the alternate routing gate serving to steer the request for service signal to an appropriate trunk hunter 310. Each trunk group is associated with a corresponding trunk hunter 310, and thus if each routing plan consists of three outgoing trunk groups, each alternate routing gate 305 will connect to three trunk hunters 310.

The trunk hunter serves to choose an idle trunk out of its associated trunk group, to translate this choice into a binary number, and to indicate to all alternate routing gates 305 with which it is associated in their respective routing plans whether or not all trunks in its corresponding group are busy. From this information the alternate routing gate 305 is able to determine on the basis of the associated trunk hunter preference and busy conditions, which one will be utilized upon request by the route selector 301 for service.

Actual requests for service, received in a trunk hunter 310, cause the activated trunk hunter 310 to read out the binary number defining a trunk into the trunk number output circuit 319 which repeats the data so received to the message control 27 in each of the switches 23. In this fashion an idle trunk available to serve a particular message is selected and identified to the switches 23.

As indicated hereinbefore, a trunk group lockout feature is provided in order to prevent selection of a trunk group which was unable to complete a call on a previous attempt. To implement this feature the message control 27 transmits the trunk designation through the route selector 301 to the trunk group make busy circuit 320 which, as its name infers, busies the trunk hunter associated with the trunk group represented by its active input. This particular trunk hunter thereafter appears busy to all associated alternate routing gates 305.

The trunk hunter 310, one of which is indicated in functional block form in FIGS. 17 and 18, comprises a logic circuit 311 which receives the request for readout of a trunk number from the associated alternate routing gate 305. In response to a request for service, the logic circuit 311 will provide a signal on leads to alternate channels A and B comprising identical circuitry. These two channels are associated with a scheme of alternate preference of trunk circuits which will be described hereinafter. Only one of these channels is allowed to read out a trunk identification number in response to any particular request.

Trunk availability indications of the busy or idle condition of the outgoing trunk circuits 24 are transmitted into the trunk preference circuits 313 in both channels A and B. These preference circuits serve to select a preferred idle trunk out of a distinct group assigned to each channel.

In the event that all trunks are busy, an indication of this condition is transmitted by the trunk preference circuits 313 to the trunk hunter logic circuit 311. The trunk preference circuits 313 in channel B perform in the same way as those in channel A except that their preference is arranged to begin wth the highest numbered trunks whereas the preference in channel A begins with the lowest numbered trunks. This arrangement of opposite preference is utilized in accordance with this invention as an error detecting scheme without causing loss of service of the entire trunk hunter.

The outputs from a trunk preference circuit 313 serve to operate translator 314 which in turn generates the selected binary trunk number. The output of the translator 314 is applied to check logic circuit 315 and to trunk number gate circuit 316. In addition the check logic circuit 315 obtains the complement of the trunk number from the translator 314. By comparison of the trunk number and its complement the check logic circuit 315 performs a validity check on the translator 314 output and input.

The trunk number gate circuit 316 serves to gate out of the trunk hunter the number of the selected trunk and the number of the trunk group corresponding to this particular trunk hunter 310.

The trunk make busy circuit 317 functions to busy a trunk when it has been selected by the trunk hunter 310. When the trunk hunter logic circuit 311 has completed reading out a chosen trunk number, it transmits an appropriate make busy signal to the make busy circuit 317. Inputs to circuit 317 also include the output of the trunk preference circuits 313 from both channels A and B. In response to a signal from channel A or B, a make busy signal is read into the appropriate outgoing trunks. When a trunk responds to this signal, the input condition of the trunk preference circuits 313 is changed, causing a corresponding change in the outputs of the translator 314. This change is registered in the check logic circuit 315, causing it to reset and restore to service any trunk hunter 310 removed from service due to a failure condition.

Figure 58:
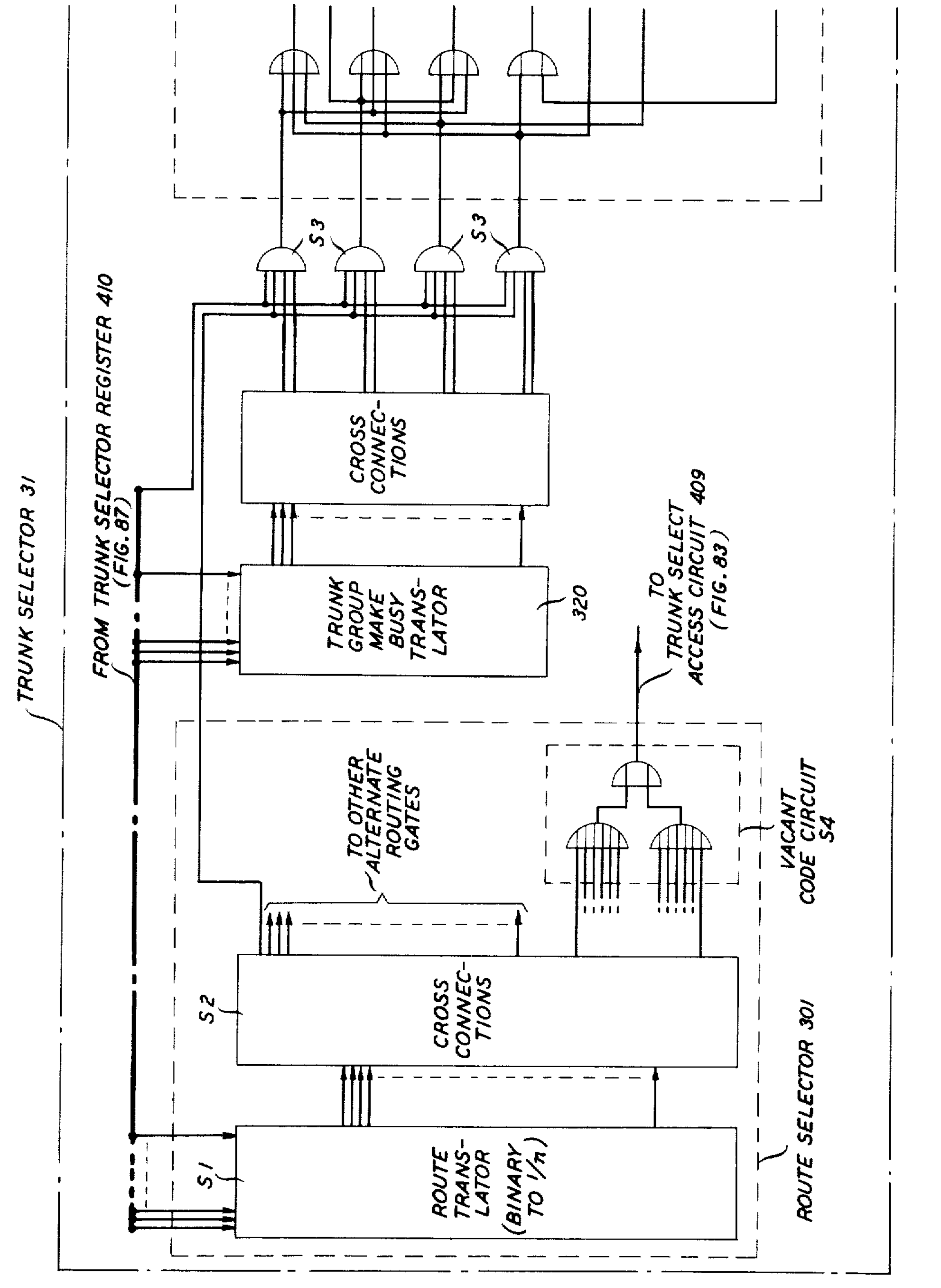

Considering now the particular logic elements involved in the trunk selector circuit as detailed in FIGS. 55–62, the route selector 301, FIG. 58, comprises a first binary number to one out of *n* translator S1. This translator receives the message destination address from the message control 27 of an associated switch 23. The various possible translator outputs are cross connected through circuit S2, where they are associated with particular routing gates 305 through AND gates S3. Gates S3 in turn are enabled by an output of the translator S1 in conjunction with a start signal from the message control 27 and an output of the trunk group make busy circuit 320.

Circuit 320 also comprises a binary number to one out of *n* translator, which serves to translate a trunk group number received from the message control 29. Such a trunk indication is one which is not to be used for a given request. Thus an active output of this translator serves to partially enable a particular AND gate S3 which is associated with a particular trunk group to be by-passed in the search for an idle outgoing trunk circuit.

The cross connections S2 are also arranged such that a vacant code circuit S4 will receive addresses from the translator S1 which cannot be reached from this particular terminal switching center. The output of the vacant code circuit S4 is transmitted to the message control 27, indicating that this particular request cannot be serviced.

Figure 59:
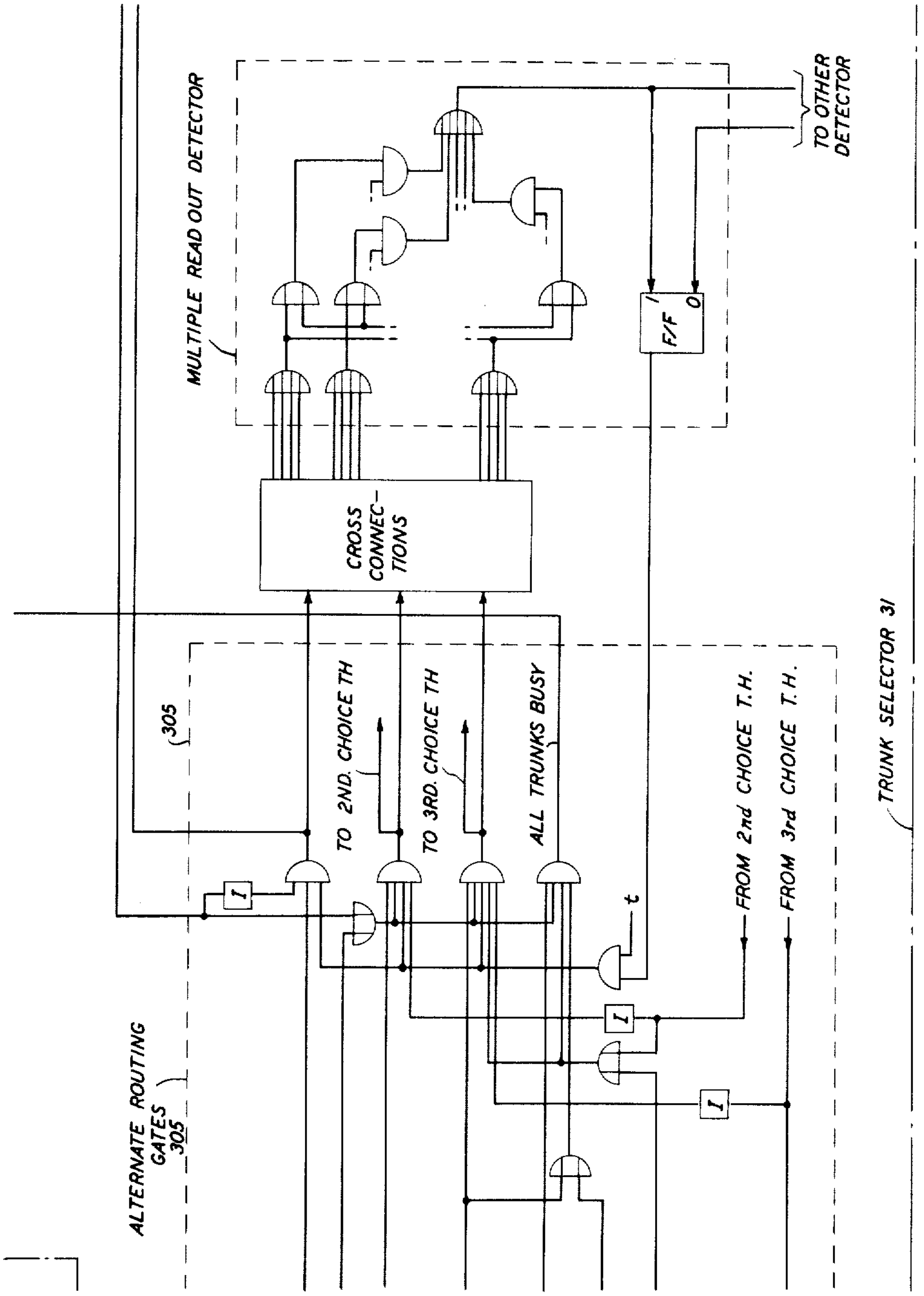
Figure 60:
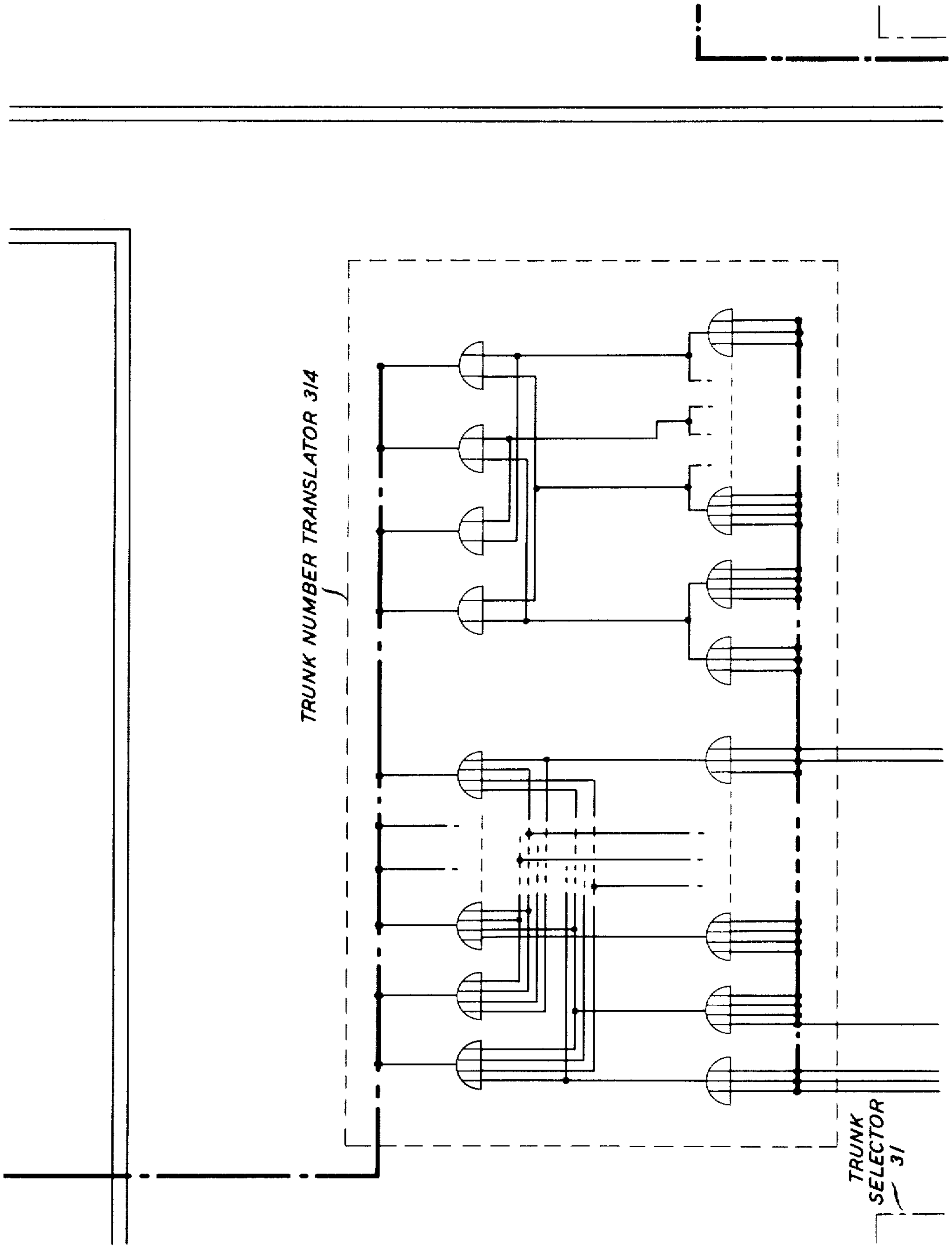
Figure 61:
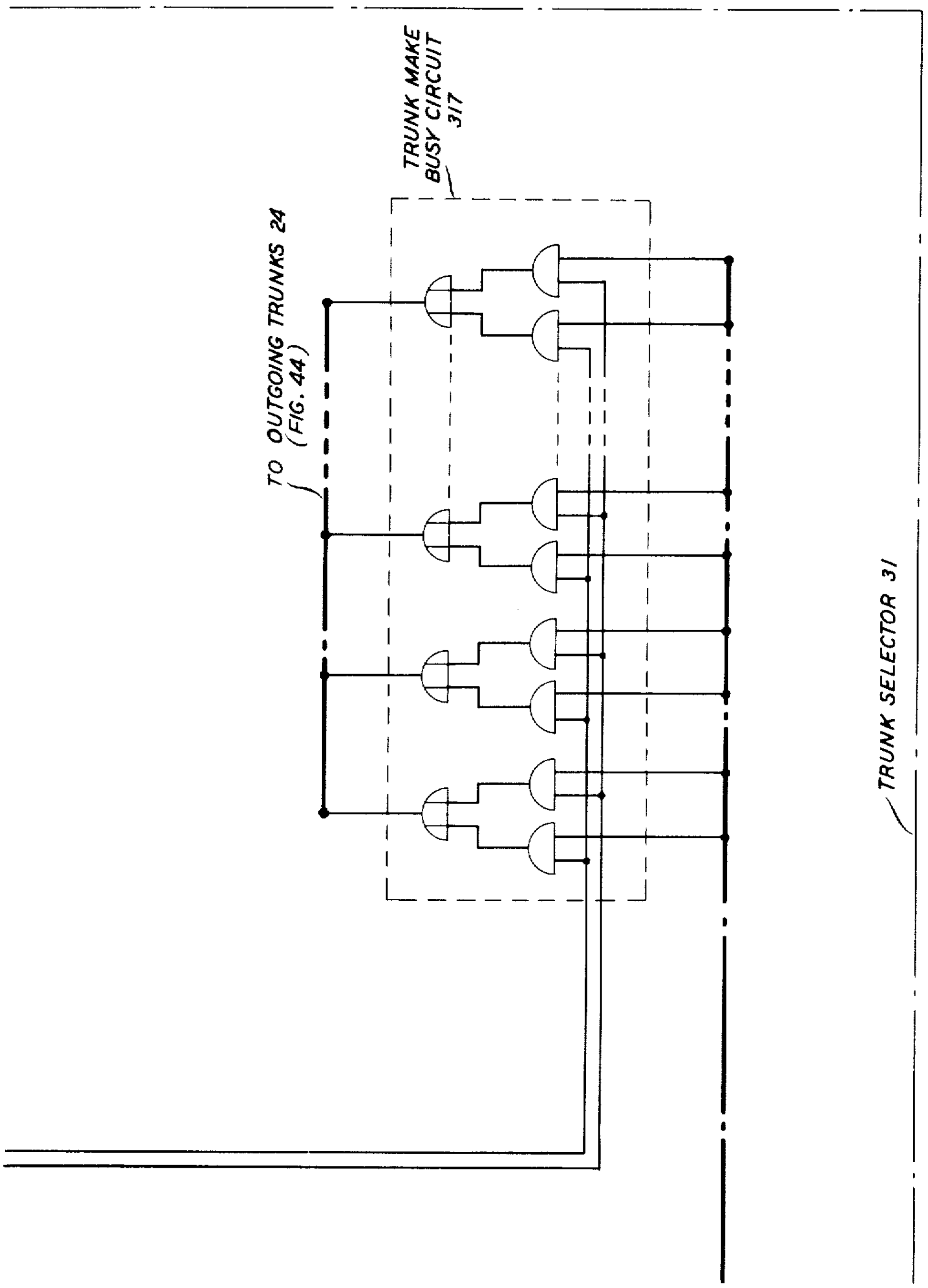
Figure 62:
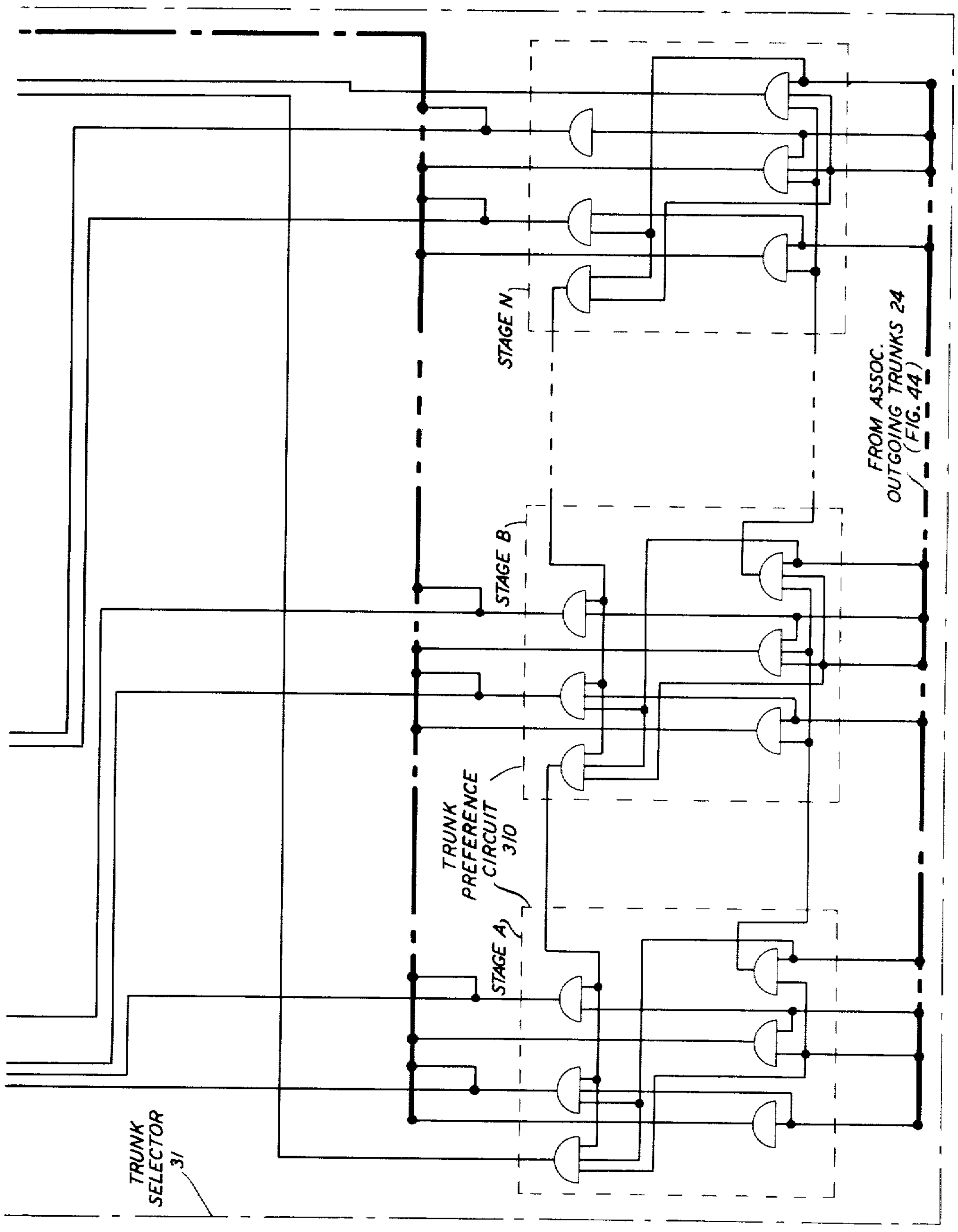

The alternate routing gate circuit 305, comprising a plurality of AND and OR gates, FIG. 59, serves to select a trunk hunter 310 in its routing plan which has an available trunk and to forward a request to that trunk hunter. A request for a trunk assignment is received in alternate routing gate circuit 305 on one of a plurality of leads from AND gates S3.

A request received over one of these leads causes the alternate routing gate circuit 305 to select a trunk hunter in a predetermined order of preference from the group of trunk hunters available to it for selection. A request received over another of the input leads causes the alternate routing gate circuit 305 to again select a trunk hunter in the predetermined order of preference but excluding the choice corresponding to the lead through which the request is received. The cross connections between the translator in the trunk group make busy circuit 320 and the AND gates S3 are such that the AND gate S3 providing an output will correspond to a particular trunk group to be by-passed in the subsequent selection process.

The trunk hunters 310 one of which is depicted in detail in FIGS. 55–57, 60–62, are monitored by the alternate routing gates 305 for indications of all trunks busy conditions. Such a condition will cause the alternate routing gate circuit 305 to alter the order of preference and bypass the trunk hunter having all trunks busy. Upon selection of an available trunk hunter 310 the alternate routing gate 305 transmits a signal to the trunk hunter logic circuit 311, FIG. 57, in the selected trunk hunter 310.

The trunk preference circuit 313 monitors the trunks of the corresponding trunk group to determine the busy or idle condition of the trunks. The preference circuit 313 performs this function by translating busy and idle input signals from the trunks, each stage of the preference circuit receiving signals from a distinct pair of trunks. Also the preference chain is divided such that channel A of the trunk hunter 310 offers first preference to the lowest numbered trunk and the least preference to the highest numbered trunk, while the preference circuit in channel B indicates its preference in the reverse order. The output of the trunk preference circuit 313, which will be an indication of the first idle trunk in the preference sequence, is transmitted to the trunk number translator 314, FIG. 60, which serves to generate a binary number corresponding to the selected idle trunk. The trunk preference circuit output is also transmitted to the make busy circuit 317, FIG. 61, alerting this circuit to the imminent selection of a trunk to be made busy. If all of the trunks in the group assigned to this trunk hunter are busy, an appropriate indication of this condition is transmitted from the trunk preference circuit 313 through the logic circuit 311 to the associated alternate routing gate circuit 305.

Figure 55:
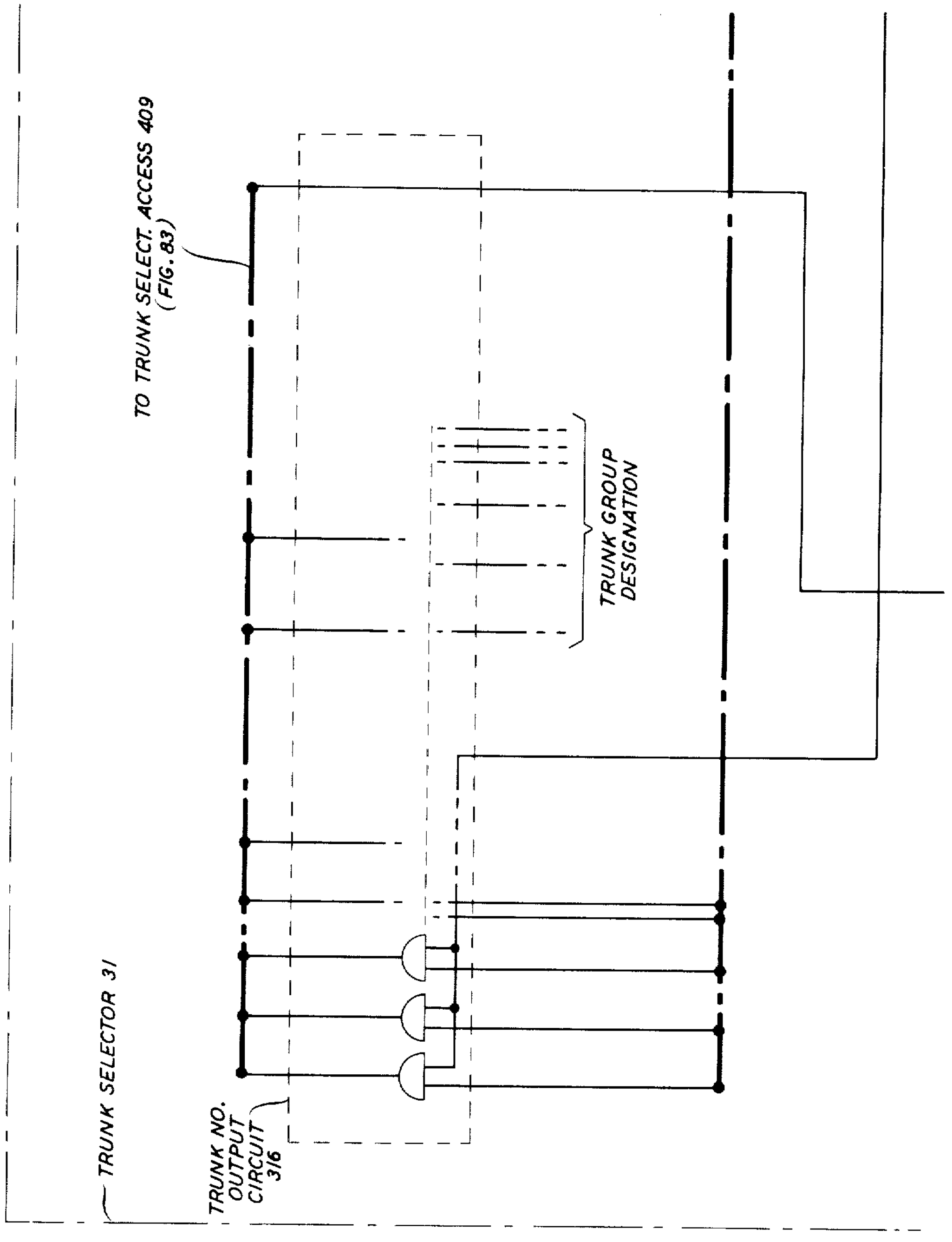
Figure 56:
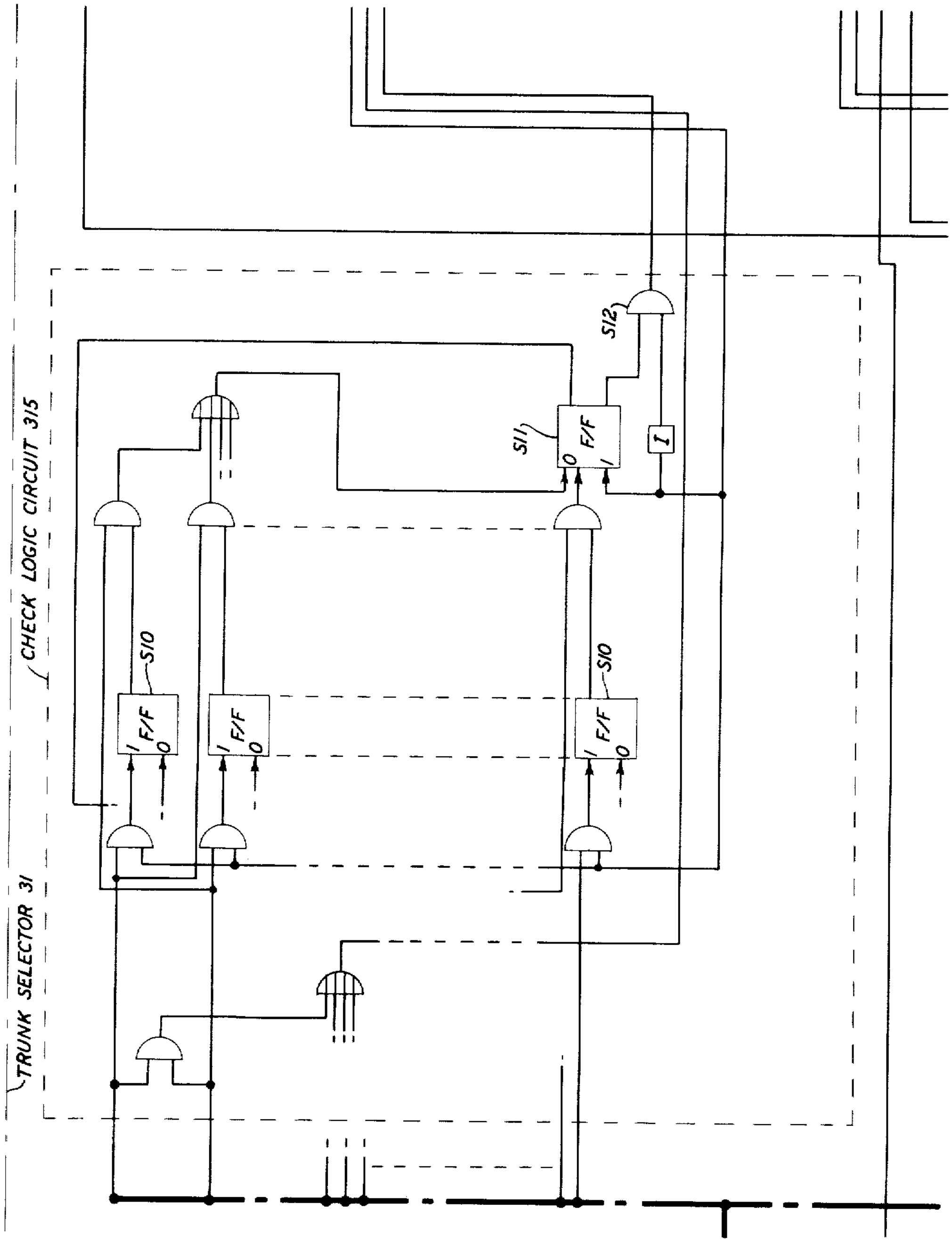
Figure 57:
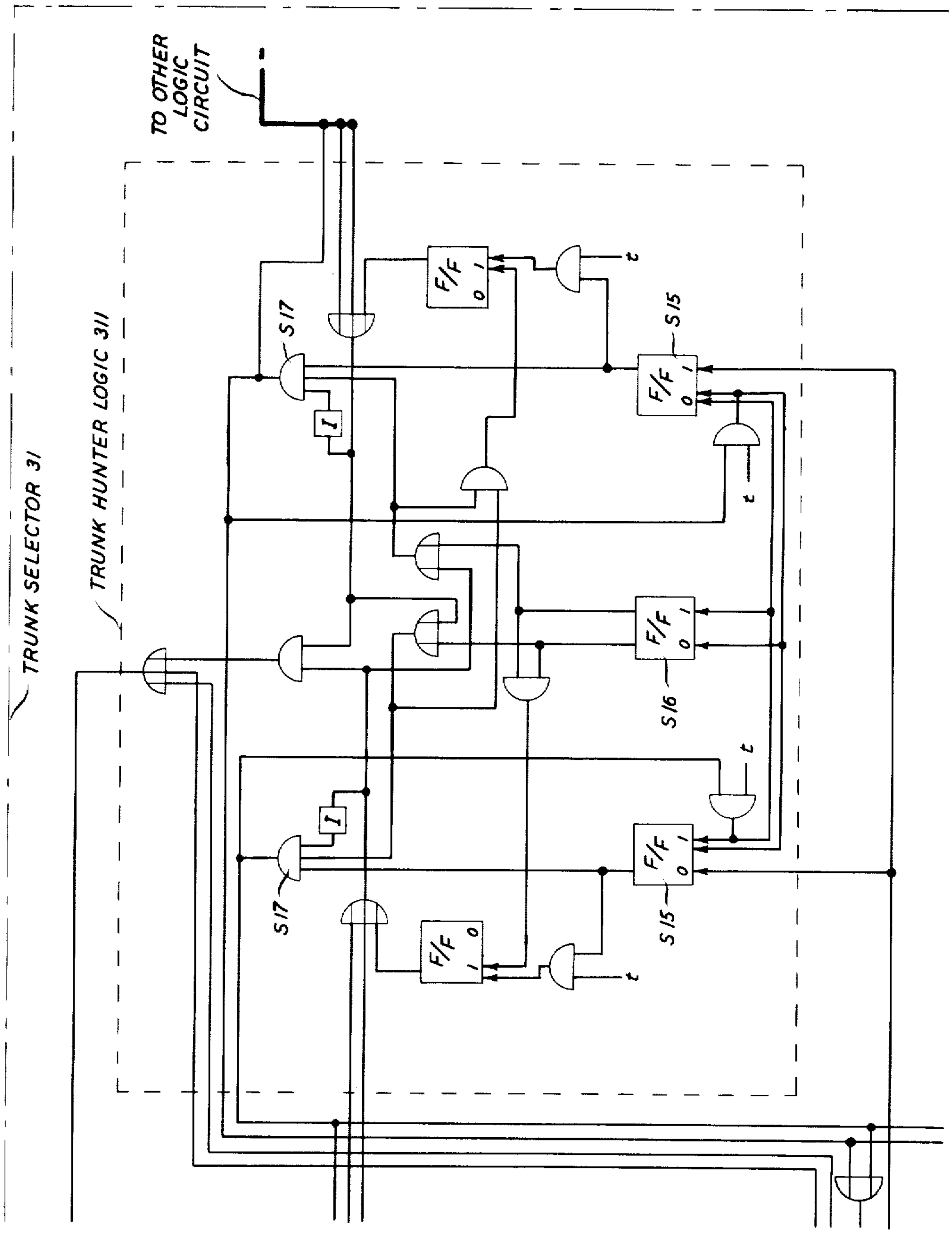

Considering that an idle trunk is available, the trunk number translator 314 will provide the identifying trunk number to the check logic circuit 315, FIG. 56, and to the trunk number output circuit 316, FIG. 55. The check logic circuit 315 comprises a series of flip-flop, AND and OR gates which serve to monitor the binary numbers generated by the trunk number translator 314 in order to detect possible invalid combinations. Such an invalid combination could arise from a failure in the trunk preference circuit 313 or in the trunk number translator 314. All such failure indications are resolved into an error signal provided by the check circuit 315 to the trunk hunter logic circuit 311. Such a check circuit 315 is duplicated in channels A and B of the trunk hunter 310.

The register in the check logic circuit 315, comprising flip-flop S10, contains the number of the previous trunk in the preference chain which is gated in from the translator 314 by a read-out signal from the logic circuit 311. Thereafter, a failure check signal is transmitted from flip-flop S11 through AND gate S12 to the logic circuit 311, serving to block the use of this channel of the trunk hunter as long as a failure check continues. If an error is discovered, the failure check signal will be superseded by the error signal, maintaining this channel incapacitated.

The selected trunk number received in the trunk number output circuit 316 from the trunk number translator 314 is gated out together with an internally generated trunk group number and a proper bit rate indication upon receipt of the read-out signal from the logic circuit 311. The output circuit 316 serves to distribute the generated trunk information to each of the switches 23 in the associated terminal switching center.

As indicated in regard to the other circuits of the trunk hunter 310, the logic circuit 311 serves as a clearing house for trouble indications. If no trouble condition is encountered, the logic circuit 311 routes a request for a trunk from the alternate routing gate 305 to the identical channels A and B alternately. Should a trouble condition arise in one channel, the logic circuit 311 serves to route requests through the trouble-free channel only. The presence of trouble conditions in both channels simultaneously or an all trunks busy condition, will result in the provision of an all busy signal to the alternate routing gate 305.

The request for a trunk is received from the alternate routing gate 305 in flip-flops S15, each serving a corresponding channel A or B. If there are no malfunctions present, an alternating circuit including flip-flop S16 has enabled that channel which was not used on the previous request. The enabled channel then sends a read-out request through the corresponding AND gate S17 to the make busy circuit 317, the check logic circuit 315, and the output gates 316. A timing signal terminates the read-out request and resets the flip-flops in logic circuit 311, changing the state of the alternating circuit in preparation for receipt of the next request.

The trailing edge of the read-out signal serves to gate a make busy signal from the logic circuit 311 to the make busy circuit 317. The particular channel A or B providing the make busy signal will enable the corresponding AND gates of the make busy circuit 317 so as to gate a busy indication to the particular outgoing trunk to be made busy.

*Trunk number translator*

The function of the trunk number translator is to translate a binary trunk number into a signal that will enable a set of gates associated with the particular trunk denoted by the binary trunk number. Such a translator 29 in each switch 23 provides the associated switch 23 with access to all outgoing and incoming trunks 24 and 25, respectively, for transmission of data. Timing of the trunk number translator operation is provided through the bit control 28.

The translator 29 receives the binary trunk number from trunk number register 153 in the bit control 28, a portion of which denotes a particular trunk group and another portion of which denotes the particular trunk within the group to be enabled. The distinct portions of the trunk number received by the translator 29 provide coordinate access to a translator matrix, each crosspoint of which represents a distinct trunk. The particular binary trunk number is translated by the trunk number translator 29 immediately upon its receipt in the trunk number register of the bit control 28. However, the output of the translation is held disabled until a time determined by the bit control 28.

Inputs to the trunk number translator 29 (not shown) are also provided from the message control 27 for particular timing operations in conjunction with alarm circuitry.

*Bit distributor*

The bit distributor 33 is linked with the bit control 28 in order to transfer data, including acknowledgments, between the trunks 24 and 25, and all switches 23.

For incoming data one lead from each incoming trunk is connected to an input of a plurality of paralleled gates. At any one time only one of these leads receives a signal from the particular trunk enabled by the trunk number translator 29. These gates thereupon enable subsequent circuitry to transmit data from the trunks to the bit control 28. Such a trunk to switch data link is provided in the bit distributor 33 for each switch 23.

Outgoing data is transferred through the bit distributor 33 from each switch 23 to all trunks. The circuitry allocated to this function comprises an amplifier and cable driver circuit per switch.

*Switch store*

The store 26 or memory comprises in this illustrative embodiment of the invention a twistor matrix in an information unit and a core matrix in an access unit, which units are made to function together by means of a timing control unit. Information is written into the information unit of the store 26 by means of input leads from the memory register 150 corresponding in number to the number of bits in a word of information.

The inputs are applied to a corresponding number of twistor pairs. In accordance with the twistor operation, as disclosed in the aforementioned patent of A. H. Bobeck, these twistor pairs are treated as a set of transmission lines on which information is stored by longitudinal currents and removed or read out as transverse signals. The information is read out in parallel form a word at a time and either destroyed or stored in the memory register 150.

The access circuitry advantageously comprises a magnetic ore matrix which is interrogated on a coincident current basis by signals from the address register 155. The signals are applied through coordinate translators so as to select the particular one of a plurality of crosspoints which in turn will energize a selected portion of the information unit. The operation of the store 26 may be readily understood from consideration of the circuitry in FIG. 74 in conjunction with the timing chart in FIG. 101.

The central timing control initiates the operation by the application of a start read-write cycle signal to set flip-flops C1 and C2 and to activate a delay line to provide timing signals $t1$–$t5$. Flip-flop C2 in its set state activates the translators serving the access unit so as to permit an address from the address register 155 to be registered in the access unit, thereby determining the particular portion of the information unit which will be immediately concerned in subsequent portions of the read-write cycle.

A nondestructive read-out signal is applied to AND gate C5 concurrent with timing signal $t1$ if it is contemplated that the information to be read out of the store will be registered in the memory register 150. The output of AND gate C5 serves to set flip-flop C4 which in turn enables read-out gates 161. Thus the information stored in the particular area of the information unit indicated by the access unit is read out through AND gates 161 to the memory register 150 at this time.

Timing signal $t2$ then serves to reset flip-flop C4, thereby concluding the read-out operation. Timing signal $t3$ resets flip-flop C2 thereafter so as to cut off the address applied to the access unit. Correspondence of the timing signal $t4$ with the output of flip-flop C1 in the set state enables AND gate C7 to set flip-flop C3. C3 in the set state activates the write gates 162, permitting the memory register 150 to rerecord the word previously read out of the store. The writing operation is concluded by the resetting of flip-flop C3 upon receipt of timing signal $t5$. $t5$ also serves to reset flip-flop C1 such that all flip-flops are now reset preparatory to the next read-write cycle.

As described more fully in connection with the bit control operation, information read out of the store during a particular read-write cycle is destroyed and a complete new word may be written in the information unit by the memory register 150. This destructive read-out is inherent in this type of store. The absence of the nondestructive read out signal at one input of AND gate C5 upon receipt thereat of timing signal $t1$ will prevent recording of the store output in the memory register 150. Thus flip-flop C4 is not set, and the read-out gates 161 are not enabled.

The bit allocation of a typical message contained in a message slot of the store is shown in FIG. 99. The first column indicates the word address information which is applied to the access unit of the store at the outset of each read-write cycle in order to assure that the desired word as contained in the rows designated in FIG. 99 will be addressed. The first word of the message contains control information including a trunk number to or from which the message is being transferred, an indication as to whether or not this particular message slot is busy or idle, and word and bit counter indications for later determination of the particular word of the message text to be addressed as well as the particular bit in that word which is to be transferred to or from the store. The second row of the message slot contains additional control information. Alternative information is indicated, depending upon whether an incoming or outgoing message is involved. Subsequent rows may contain information serving to direct the message to particular destinations. The remaining rows in the message slot are devoted to the actual text of the message.

*Bit control*

Operation of the switch 23 involves transfer of messages by the bit control 28 between the store 26 and the trunks 24 and 25 and also involves message transfer between the store 26 and the data processor 11 by the message control 27. The bit control 28, shown in block form in FIG. 11 and in detail in FIGS. 63–79, effects a multiplexed transfer of multibit messages, one bit of each message per office cycle, while the message control 27 transfers entire messages in parallel form.

A complete cycle of operation of a switch 23, termed an office cycle, FIG. 98, consists of an interval of operation of the bit control, followed by an interval of operation by the message control. During the former, one bit of each message is transferred to or from the trunks as the service demands, and during the latter, an entire message may be transferred to or from the data processor. Thus a succession of office cycles corresponding to the number of bits in a message will be required to complete the transfer of each message to and from the trunks. Advantageously, the time required for one office cycle equals the reciprocal of the transmission path bit rate.

The interval of operation of the bit control 28 during each office cycle, termed the bit control operate time, FIG. 98, is divided into a plurality of bit transfer intervals corresponding in number to the number of distinct storage areas or message slots, FIG. 99, available in a store 26. Each busy or idle message slot in the store 26 commands the attention of the bit control 28 once during each office cycle.

The bit transfer interval, or the time devoted to interrogation of a particular message slot, in turn consists of four read-write cycles, FIG. 98. Thus the interrogation of each message slot to either store or remove a bit of information requires four distinct operations of the bit control circuitry. In the first read-write cycle a first control word stored in the message slot being interrogated is read out, registered in various circuits of the bit control and, after a predetermined interval, is rewritten in the store 26 in the same position from which it was earlier removed. In the second read-write cycle the same control word is read out of the store, inhibited at the read out gates, and this time is replaced by a revised control word. In the third read-write cycle a second control word containing a message acknowledgement is read out and subsequently rewritten in the identical area of the store 26. During the fourth and final read-write cycle the particular message storage area in which a message bit is to be stored or removed is addressed and the desired transfer completed.

In this fashion one bit of one message is transferred to or from the trunks in the prescribed bit transfer interval. The switch 23 then proceeds through the office cycle performing similar operations in successive bit transfer intervals for other messages being transferred, after which this particular interval will again appear in the office cycle, and another bit of the message will be transferred. The particular timing of the operation will be discussed subsequent to consideration of the bit control components and their operation.

Figure 11:
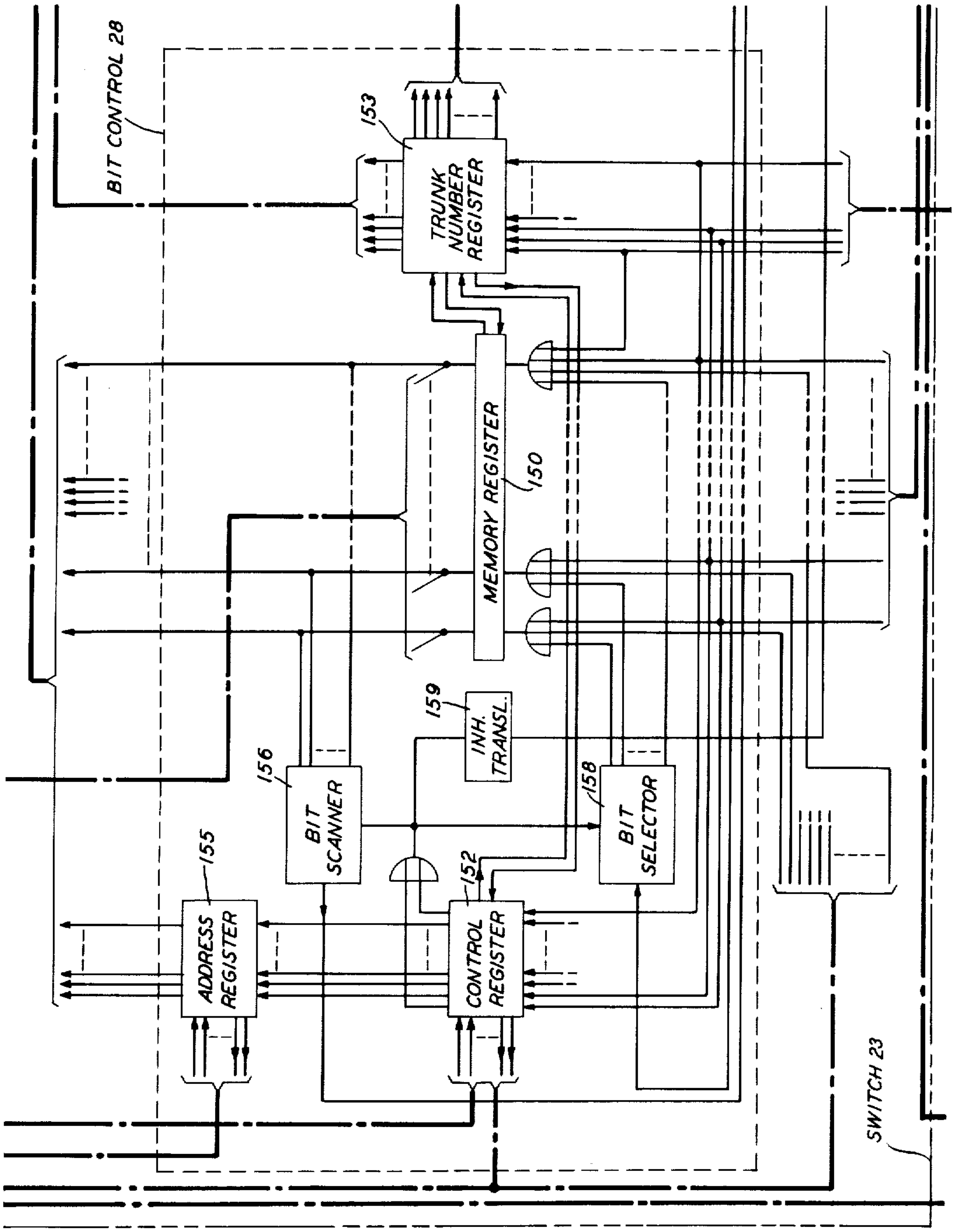
Figure 12:
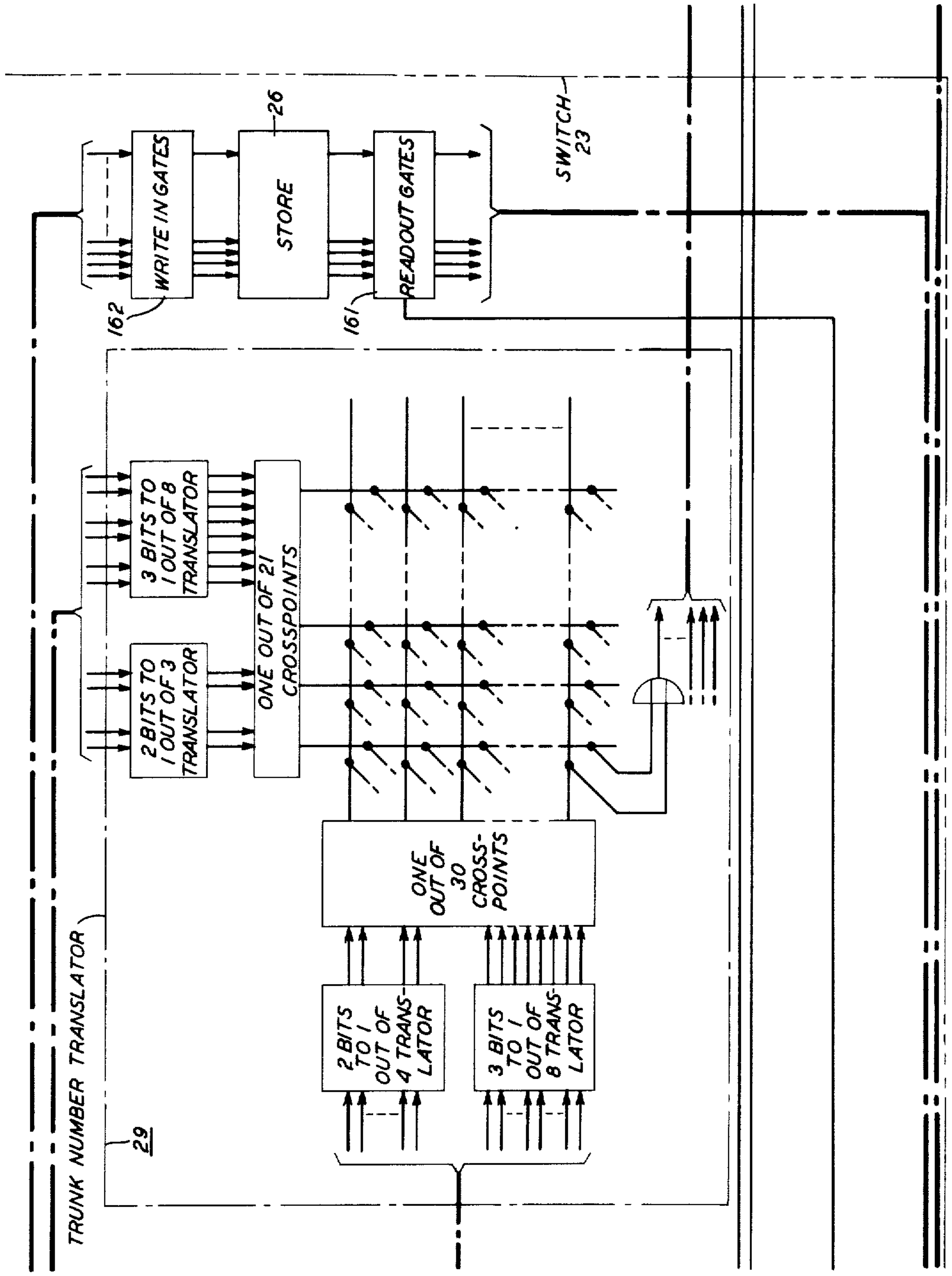

The principal components of the bit control, FIG. 11, are the memory register 150, the control register 152, the trunk number register 153, the address register 155, the bit scanner 156, the bit selector 158, and the inhibit translator 159.

The memory register 150 serves as a buffer between the store 26 and the balance of the circuitry in the bit control 28. It is set directly by the store read-out gates 161 and in turn drives the store write gates 162. Any information to be registered in or removed from the store 26 is first stored in the memory register 150.

The control register 152 and trunk number register 153 are utilized to place a first control word in the memory register 150 indicative of the time required for the bit control 28 to operate on a particular message slot. The memory register 150 then operates on a second control word which contains acknowledgment and control information for the particular message, as well as on the data words themselves.

When the store 26 is requested to read out information, the particular desired word in the designated message slot, as specified by the address register 155, is read out. The address provided by the address register 155 in this instance consists of a designation of the particular storage area and also a designation of the particular word within this storage area.

The bit scanner 156 is utilized to steer outgoing message bits from the proper message slot through the memory register 150 to the bit distributor 33 under direction of the control register 152.

The bit selector 158 steers incoming message bits into the memory register 150, and during this operation the inhibit translator 159 prevents the store 26 from transferring information into the memory register 150. These circuits also are directed by the control register 152.

The particular timing signals necessary to operate all of the circuits in the bit control 28 at the correct time in the cycle are provided by a sequence control circuit linked to the clock 34 and comprising well known logic circuitry. In this particular embodiment of the invention the bit transfer interval is divided into twenty distinct intervals or time slots, B$t$1–20, FIG. 99, each of the four read-write cycles, FIG. 98, comprising five time slots, B$t$1–5, etc. A sequence control circuit serves to generate signals marking each of the time slots, which signals are made available to the various bit control circuits during each bit transfer interval as required.

Figure 74:
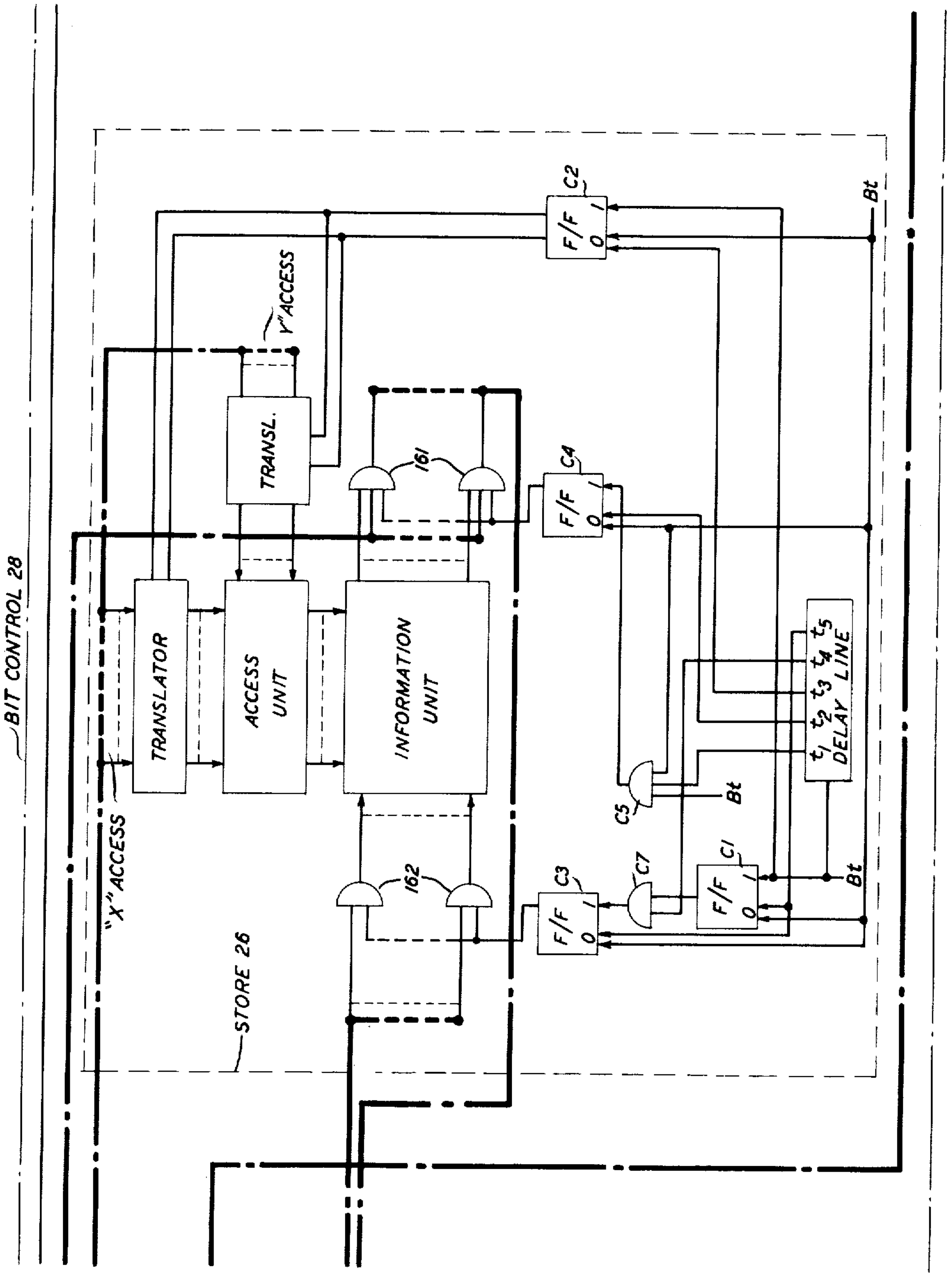

A signal generated at B$t$1 sets flip-flop C1, FIG. 74, in the store 26 to initiate a read-write cycle. This action follows a cycle of operation of the message control 27. In B*t*2 the content of the store 26 is gated through the read-out gates 161, FIG. 74, to the corresponding flip-flops B1–B*n* of the memory register 150, each flip-flop corresponding to a particular bit of the word read out of the store 26 in parallel form.

Figure 68:
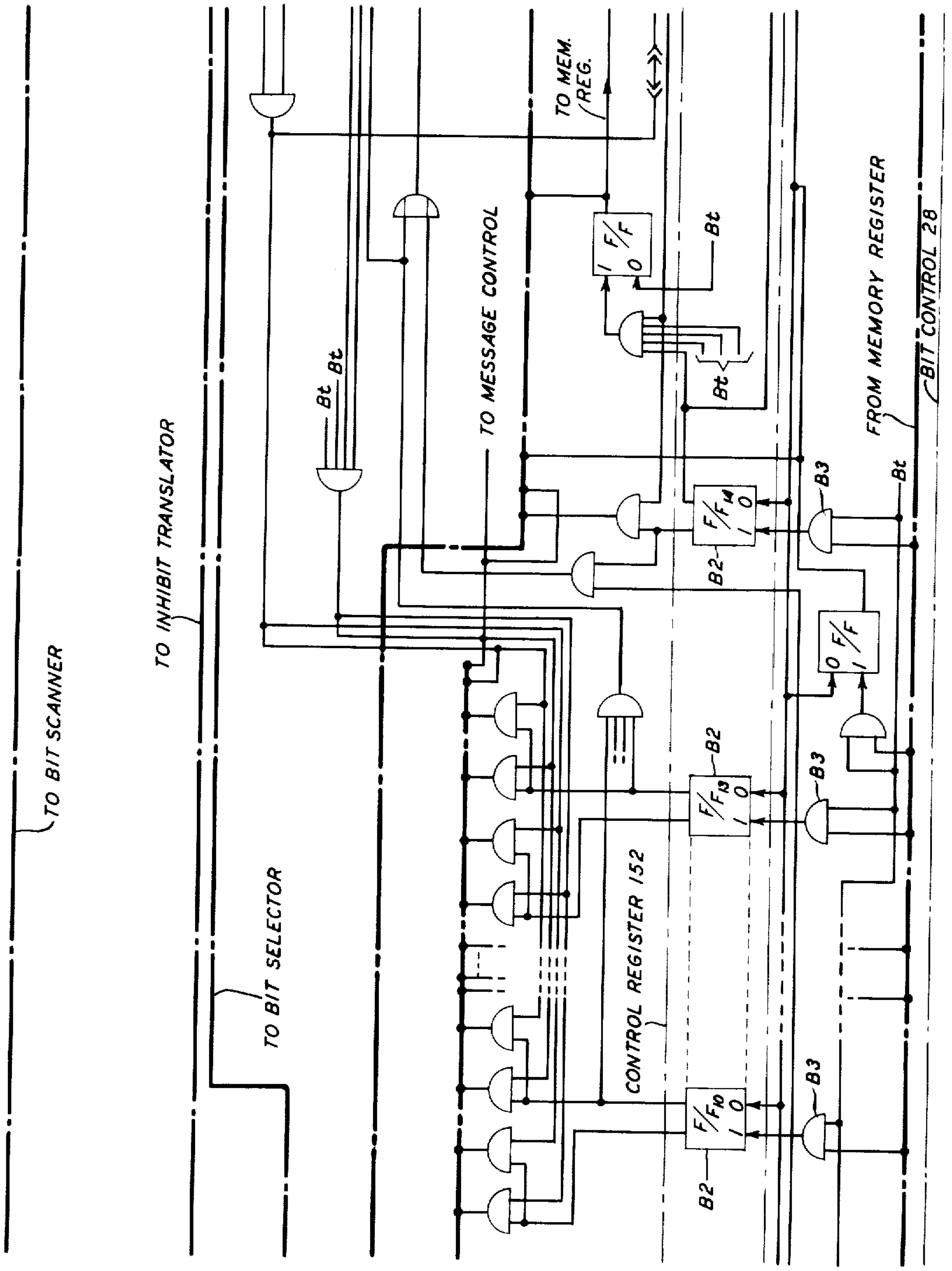
Figure 69:
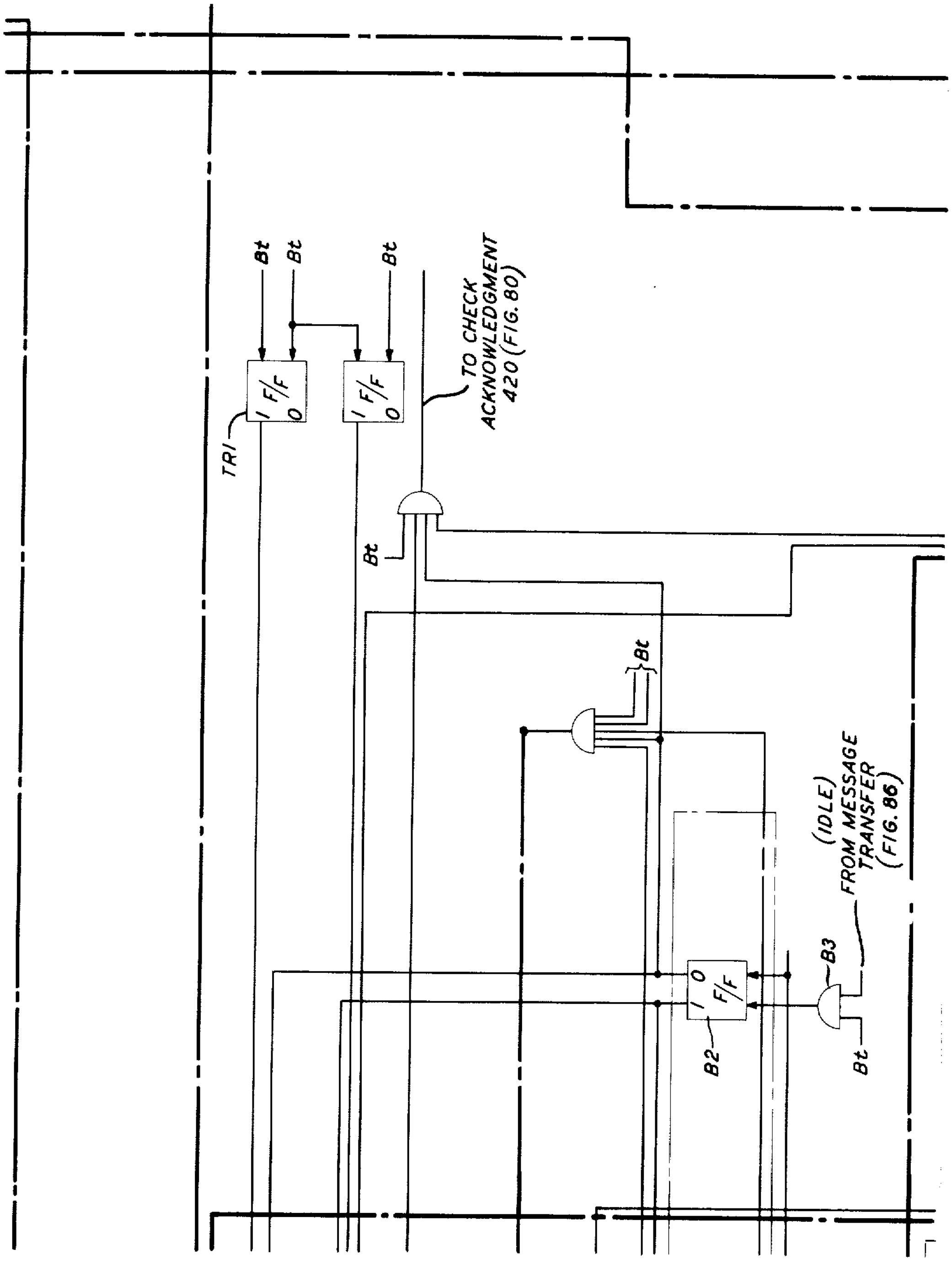
Figure 70:
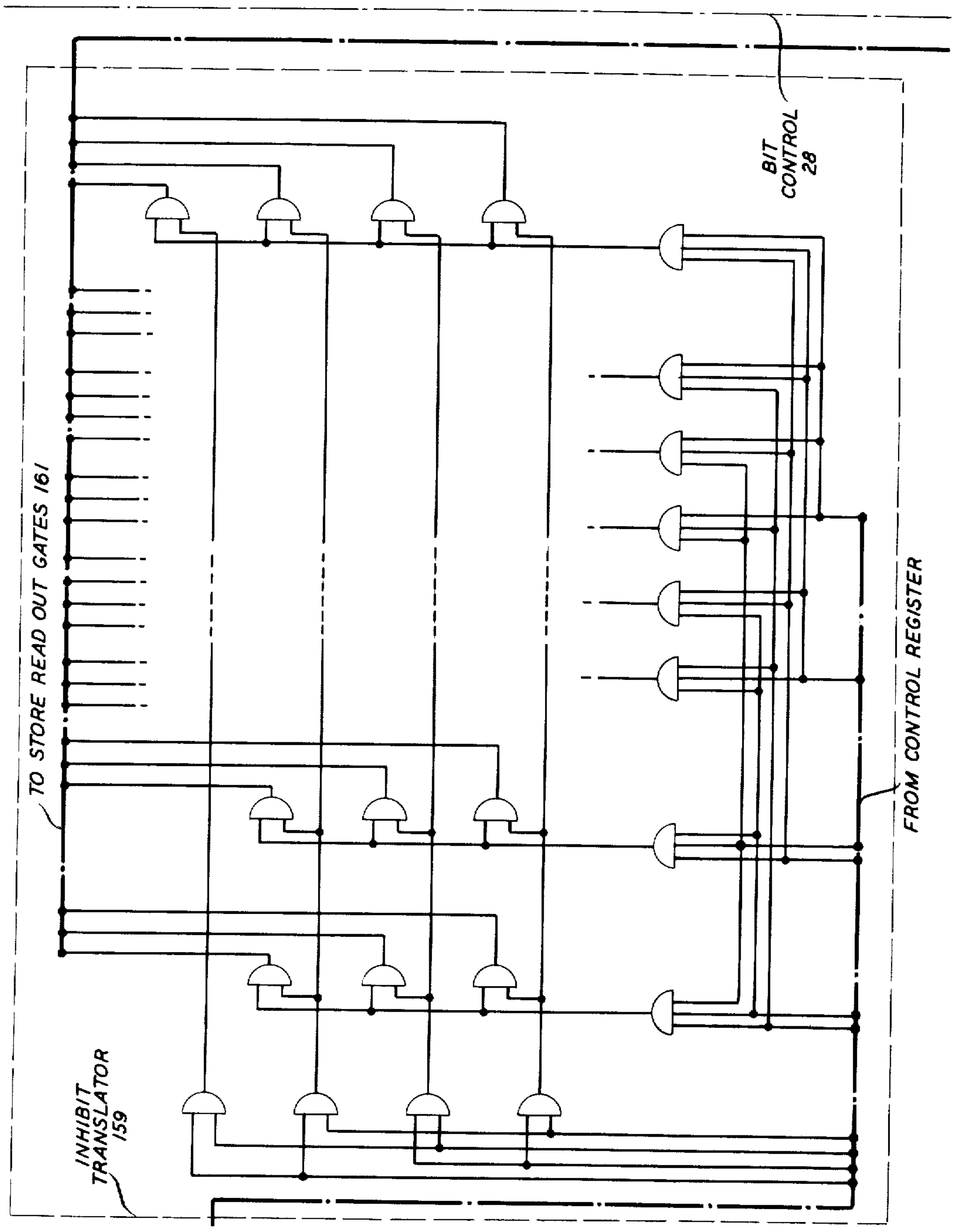
Figure 71:
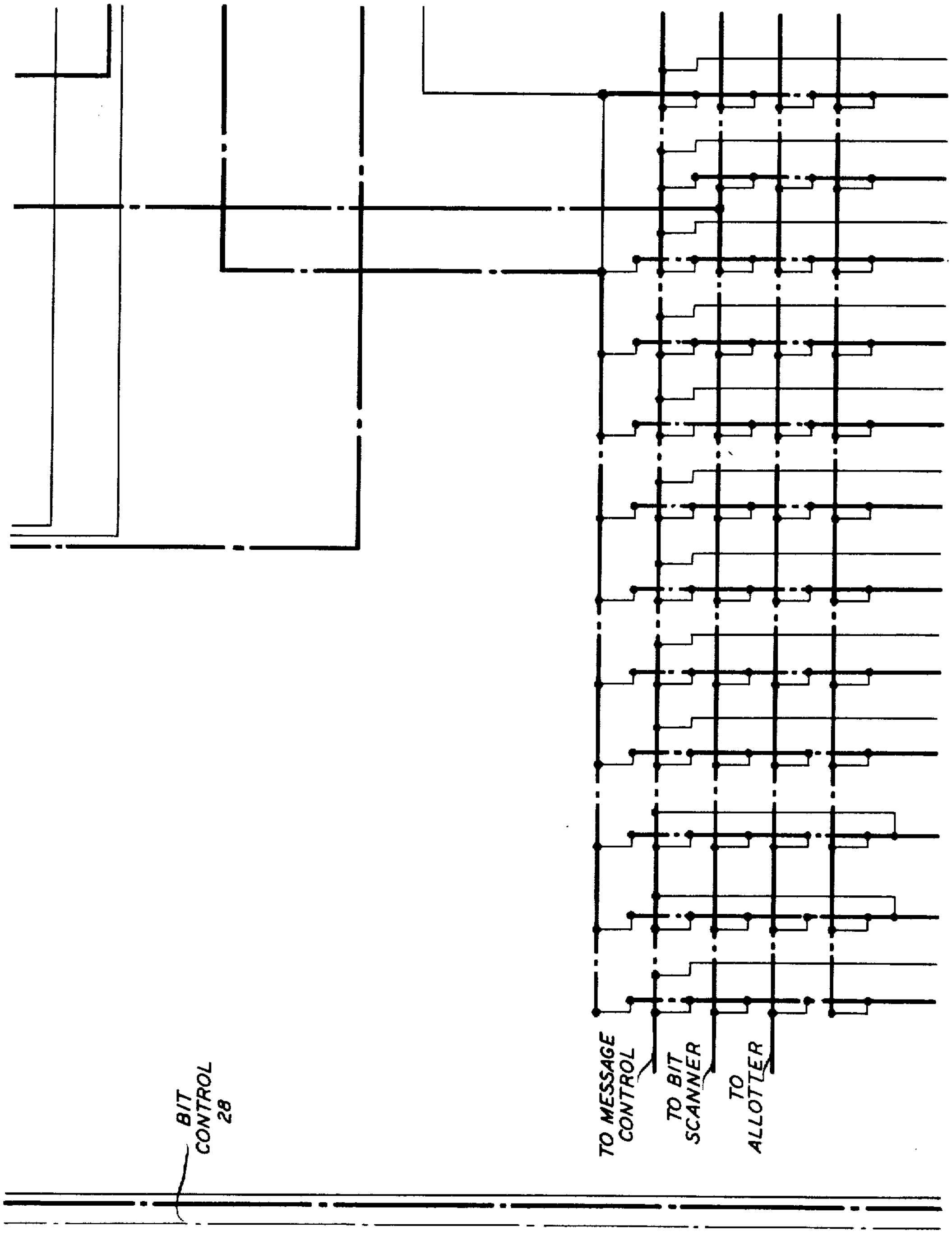
Figure 72:
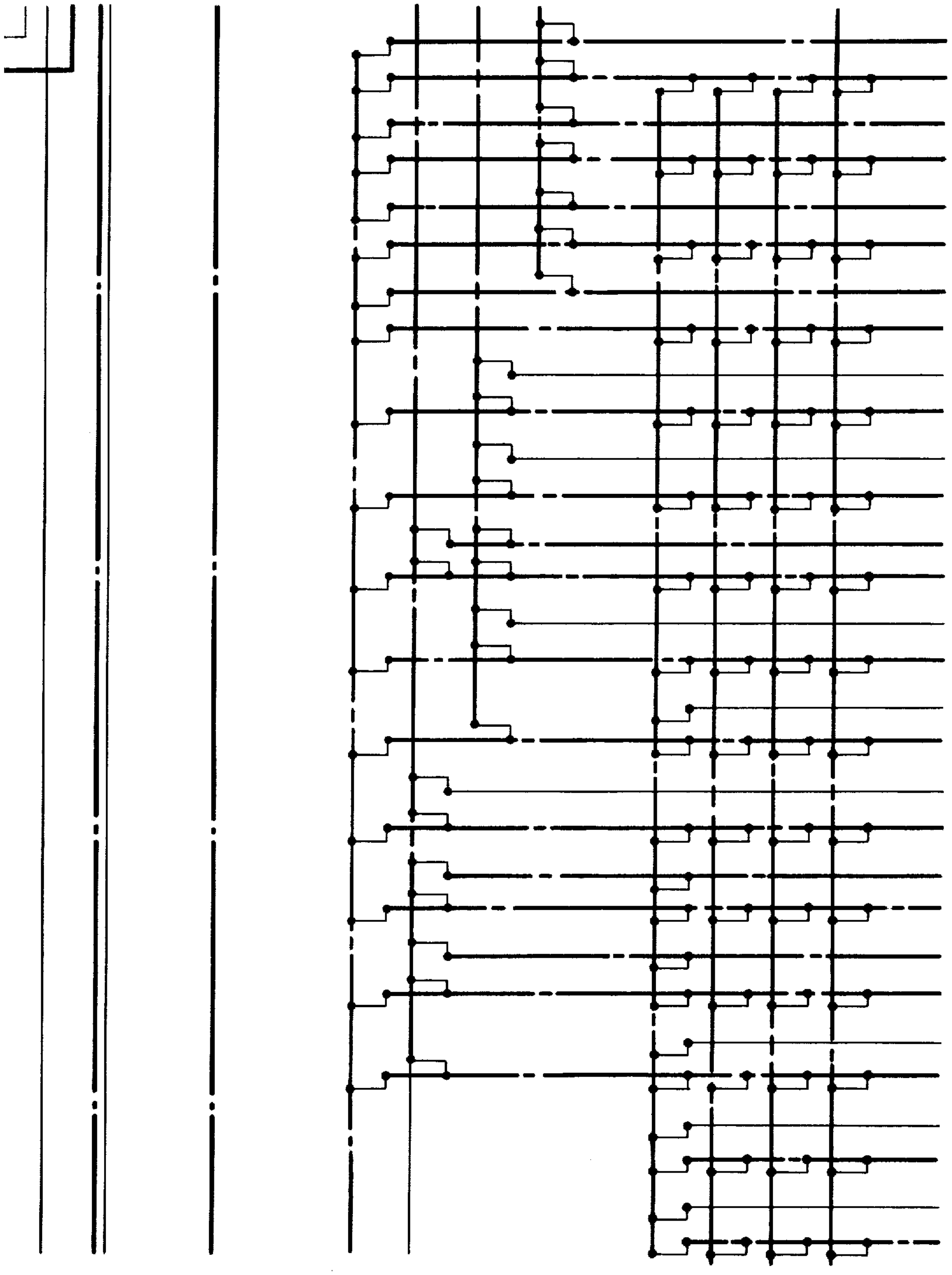
Figure 73:
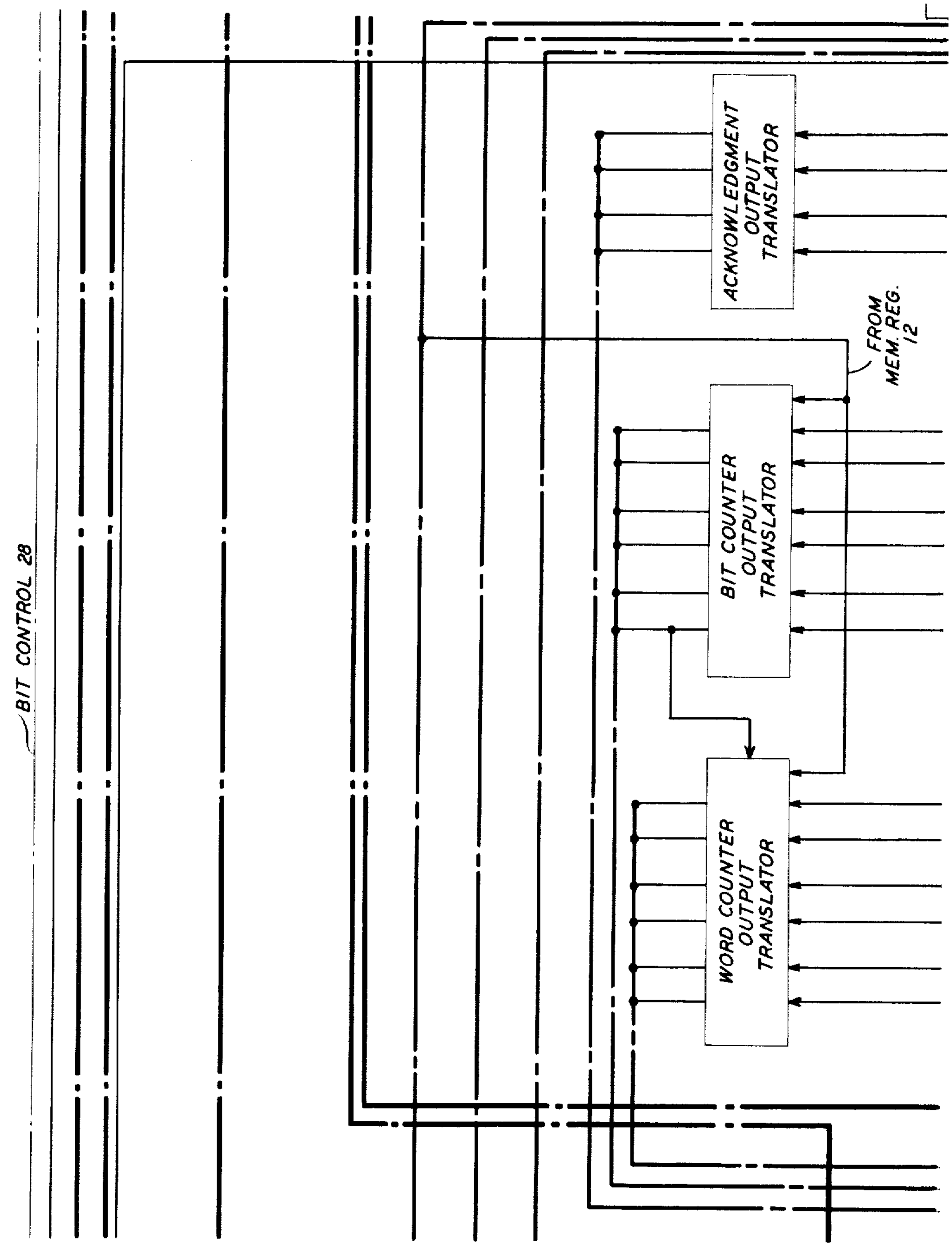
Figure 75:
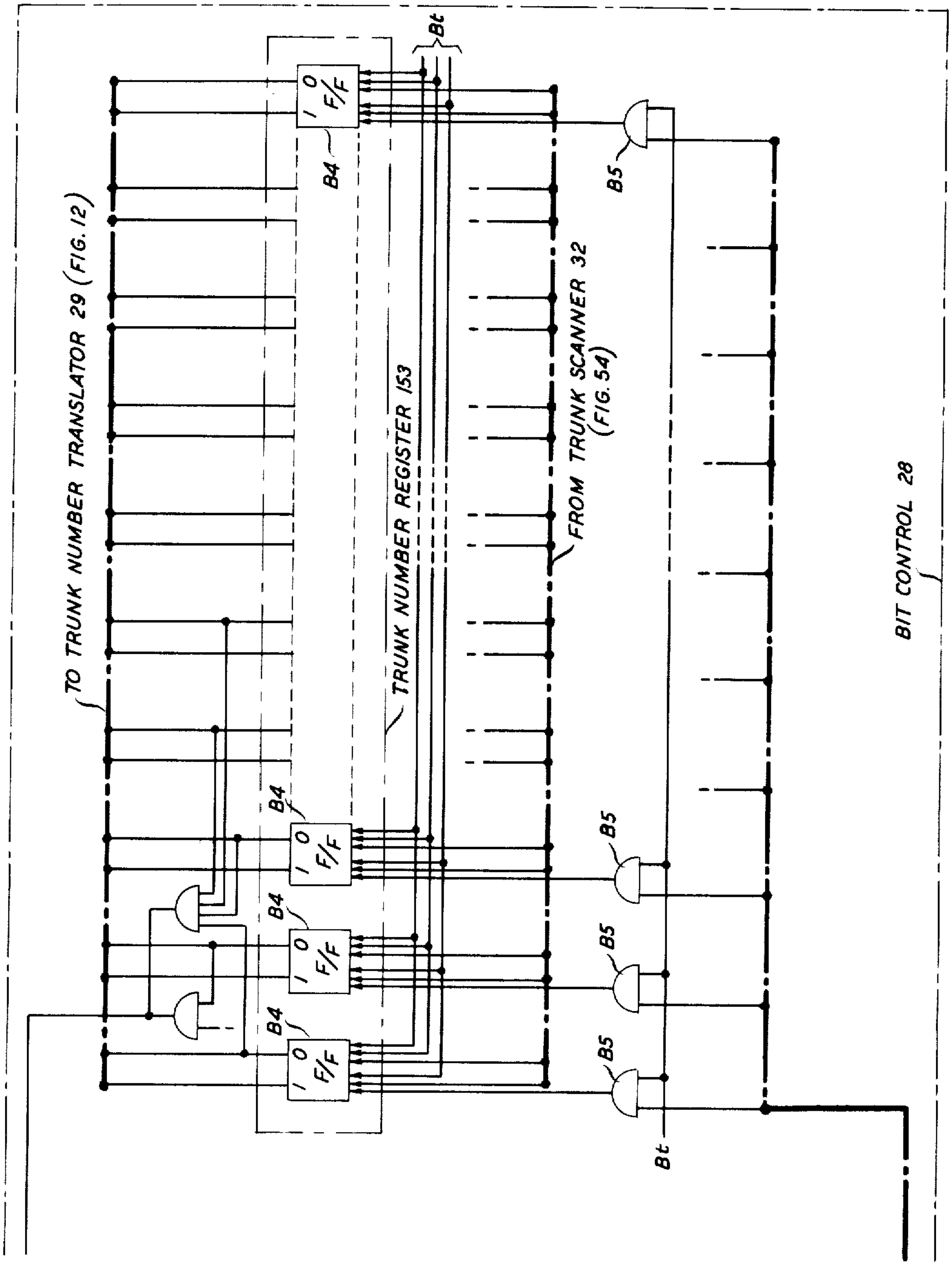

Portions of the control word, as registered in the memory register 150, must also be recorded in the control register 152 and in the trunk number register 153. Thus the B*t*1 timing signal resets all but one flip-flop of the control register 152. Immediately following this resetting operation, in B*t*1–3, the control register input gates B3, FIG. 68, are enabled so as to permit the control portion of the word stored in the memory register 150 to also be registered in the control register 152. In similar fashion during B*t*2 the trunk number register flip-flops B4, FIG. 75, are reset, and the input gates B5 are enabled during B*t*3–4, permitting the trunk number stored in the memory register 150 to also be recorded in the trunk number register 153.

The sequence of operations performed in the bit control is carefully timed in order to assure that the proper message slot is being interrogated and that a particular word of the message and bit in the word are read out as well as the appropriate acknowledgement bit being sent or received. These operations are controlled by the message slot counter including certain flip-flops B7, FIG. 64, of the address register 155 comprising a true rank and the flip-flops B8 comprising a false rank.

The principle of the true and false rank counter is that a bit of the counter changes from one binary indication to the other such as from a zero to a one only when all bits of lesser significance are one's. The less significant bits are set to zero each time the more significant bit is set to a one. The true rank stores the actual count, associated logic circuitry decides which bits are to be changed to one's, the false rank stores the result of the logic circuitry decision, and additional logic circuitry implements the decision by actually changing the recorded count in the true rank. Thus in the case of the message counter, the stored count is advanced by one each time a message slot has been serviced and the prescribed message slot interval has elapsed.

The message counter will recycle after counting all of the store message slots. Thus it is necessary to advance the message counter at the end of each bit transfer interval, and in order to prepare for this operation, the count recorded in the true rank of the message counter is gated from the true rank flip-flops B7 to the false rank flip-flops B8 in B*t*1 upon application of a timing signal to the false rank input gates B9.

Summarizing briefly, the operations in B*t*1–3 of the bit transfer interval include the transfer of the first control word of a message to the memory register 150, the recording of the trunk number portion of this control word in the trunk number register 153, and the storage of the balance of the first control word in the control register 152. Also the message counter is prepared for advancement.

The indication contained in bit position 12 of the first control word, FIG. 99, is the busy or idle state of this message slot. Having transferred the first control word to the memory register 150, this busy or idle indication will be available there for interrogation, which operation is performed by setting the appropriate flip-flop B1 during B*t*3. If the message slot is idle, an appropriate indication is transmitted to the message control 27. Also, as indicated earlier, one of the control register flip-flops B2, FIG. 68, does not receive an indication from the memory register 150. Instead, during B*t*3, this flip-flop is set upon receipt of an indication from the message control 27 that this particular message slot is receiving an incoming message from the trunks. This indication of an incoming message, coupled with the indication from the memory register 150 that the message slot is idle, also directs a signal to the trunk scanner 32 in order to determine a particular incoming trunk 25 desiring to utilize this particular message slot.

Figure 79:
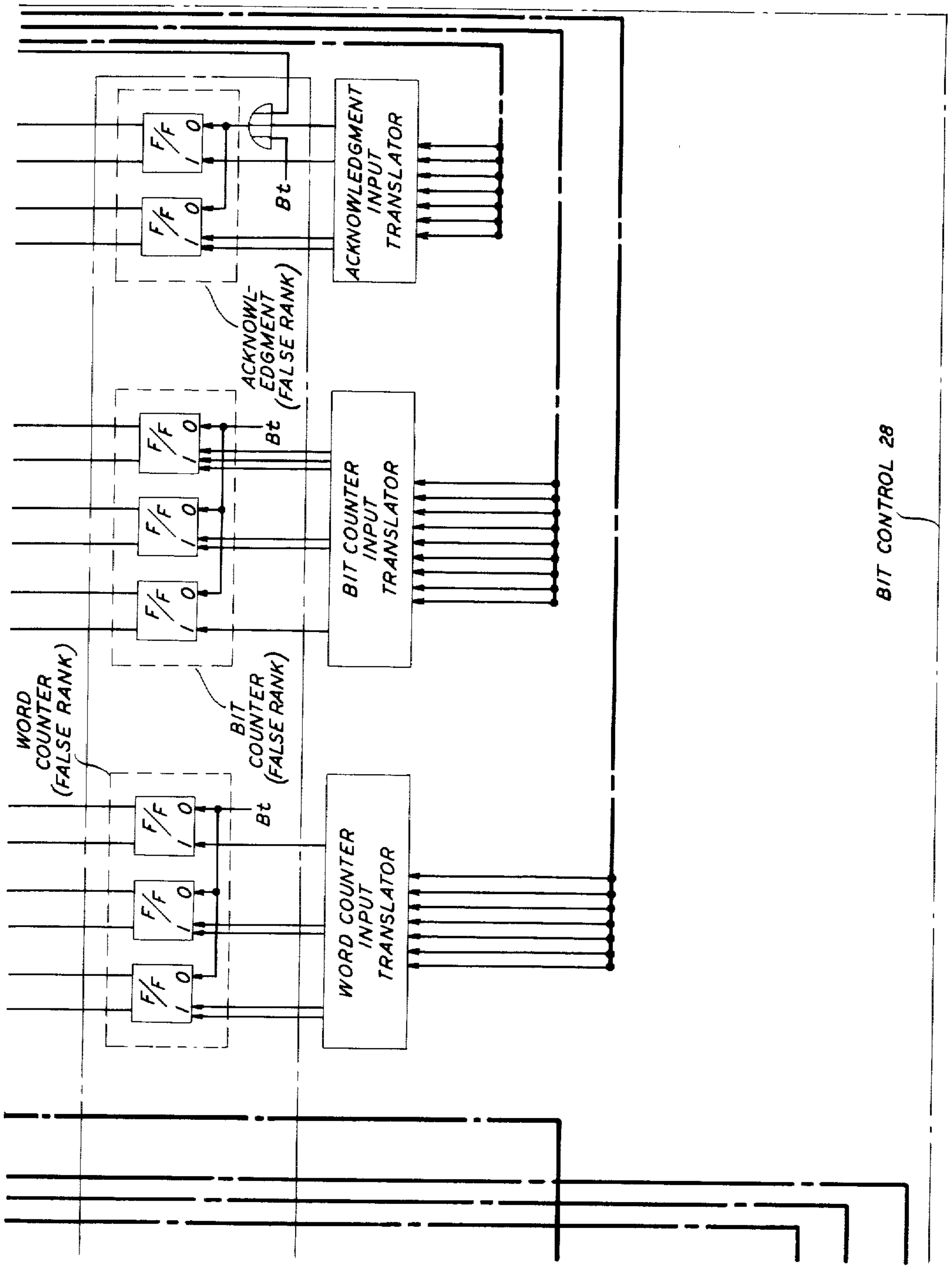

Also during B*t*3, the count registered in the true rank of each of the acknowledgement, word, and bit counters, comprising certain of the flip-flops B1 of the memory register 150, is transferred to the respective counter false ranks including flip-flops B10, B11 and B12, FIG. 79.

The bit counter will be advanced each message slot interval and will recycle upon completion of the count of the number of bits in each stored word. The word counter will advance each time the bit counter recycles but will continue to advance after cycling through all of the stored words in a particular message slot for a number of message slot intervals corresponding to the time required for the message control 27 to transfer a complete message in parallel form between the store 26 and the data processor 11. However, functions usings the word count are inhibited from operating when this count has exceeded that corresponding to the number of words in a message slot. The period after this limit is referred to as the time-out interval.

Figure 63:
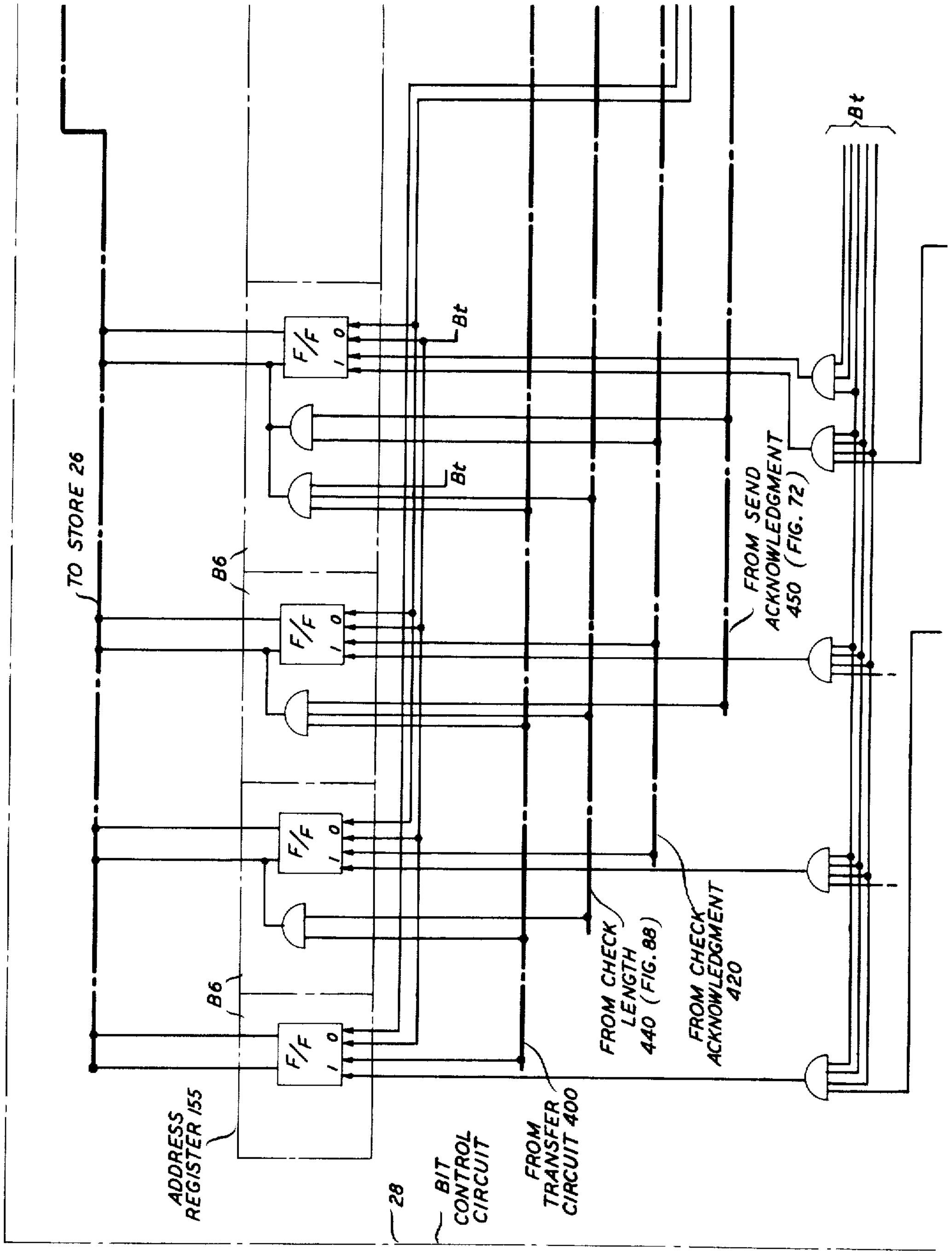
Figure 64:
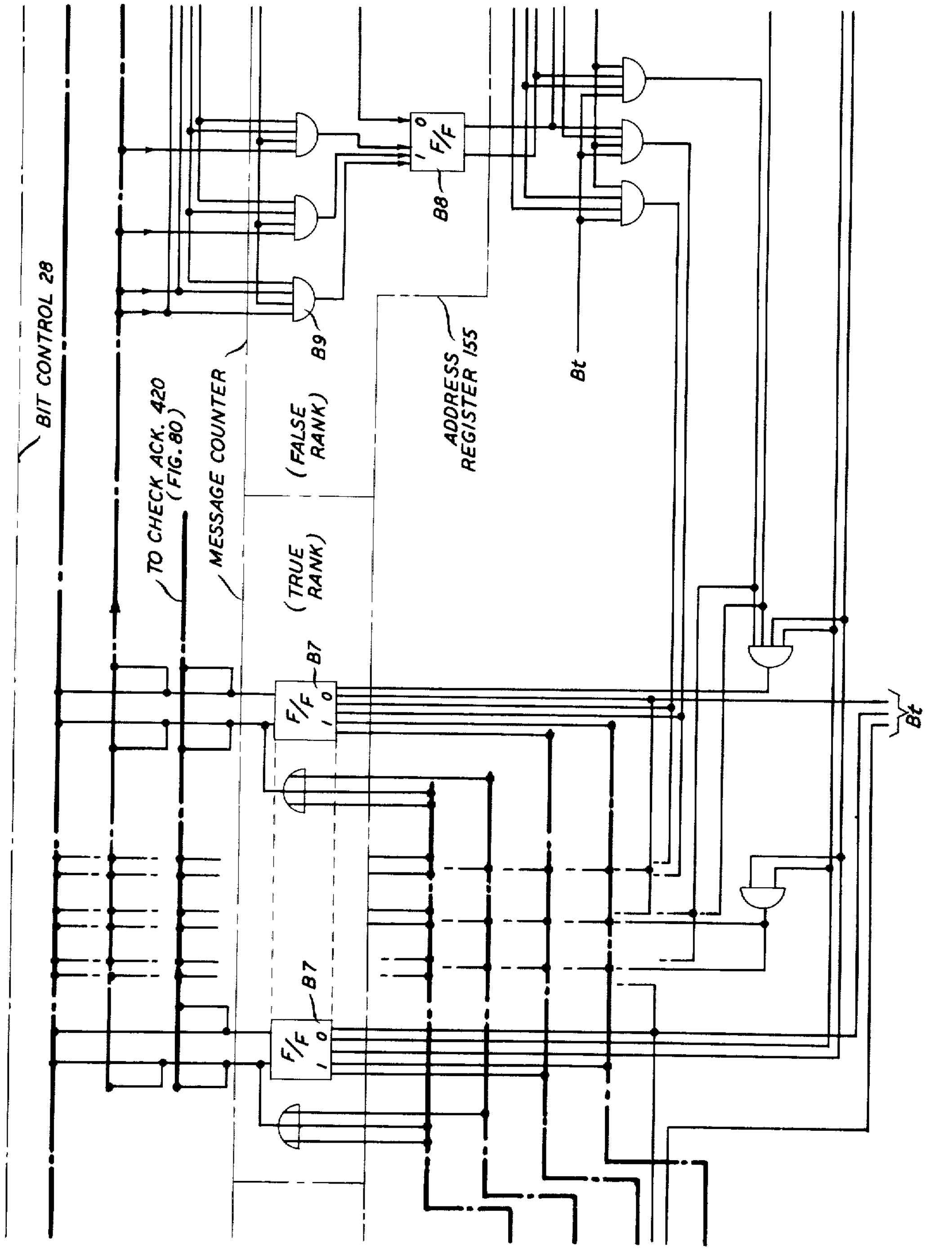
Figure 65:
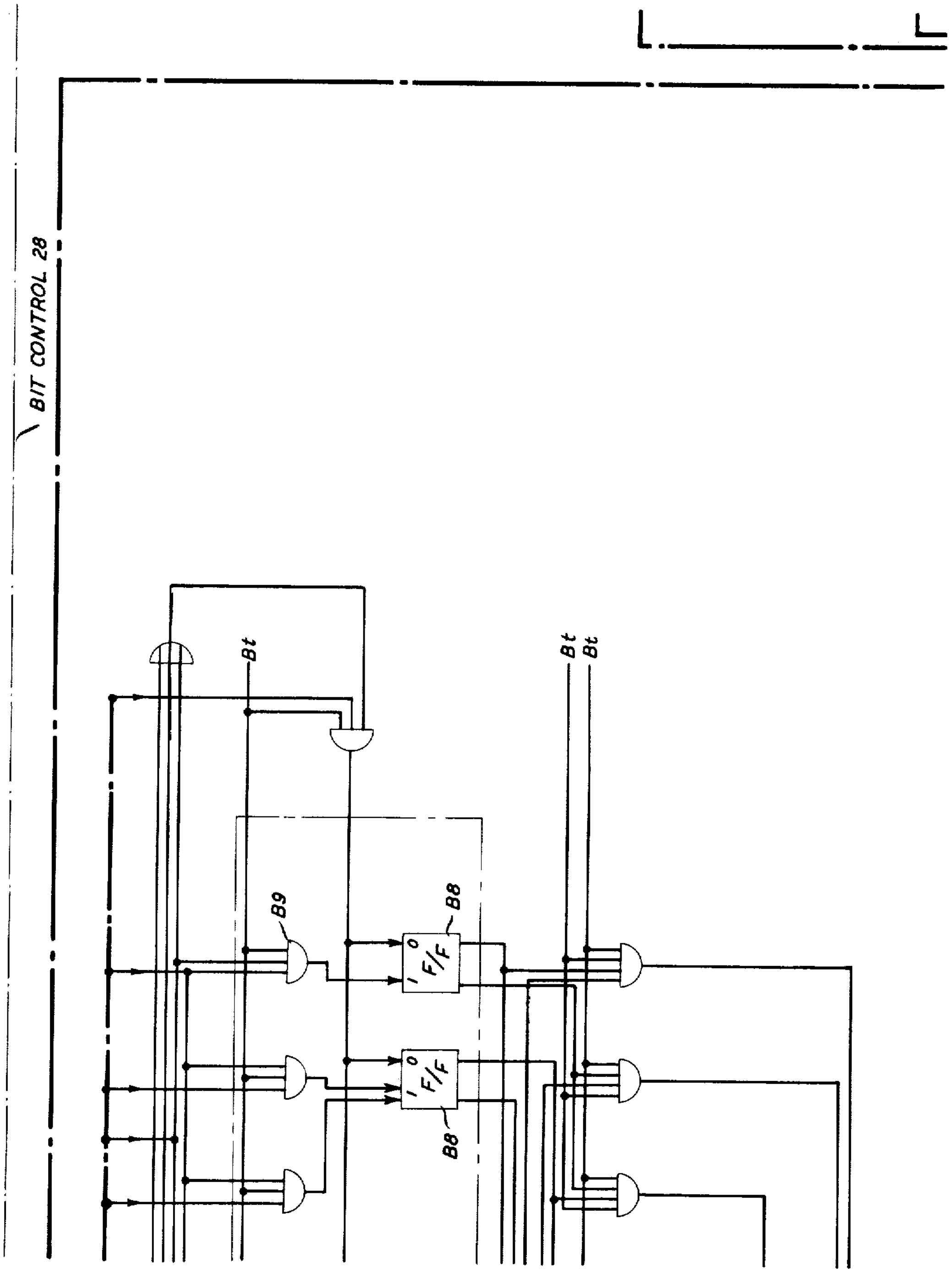
Figure 66:
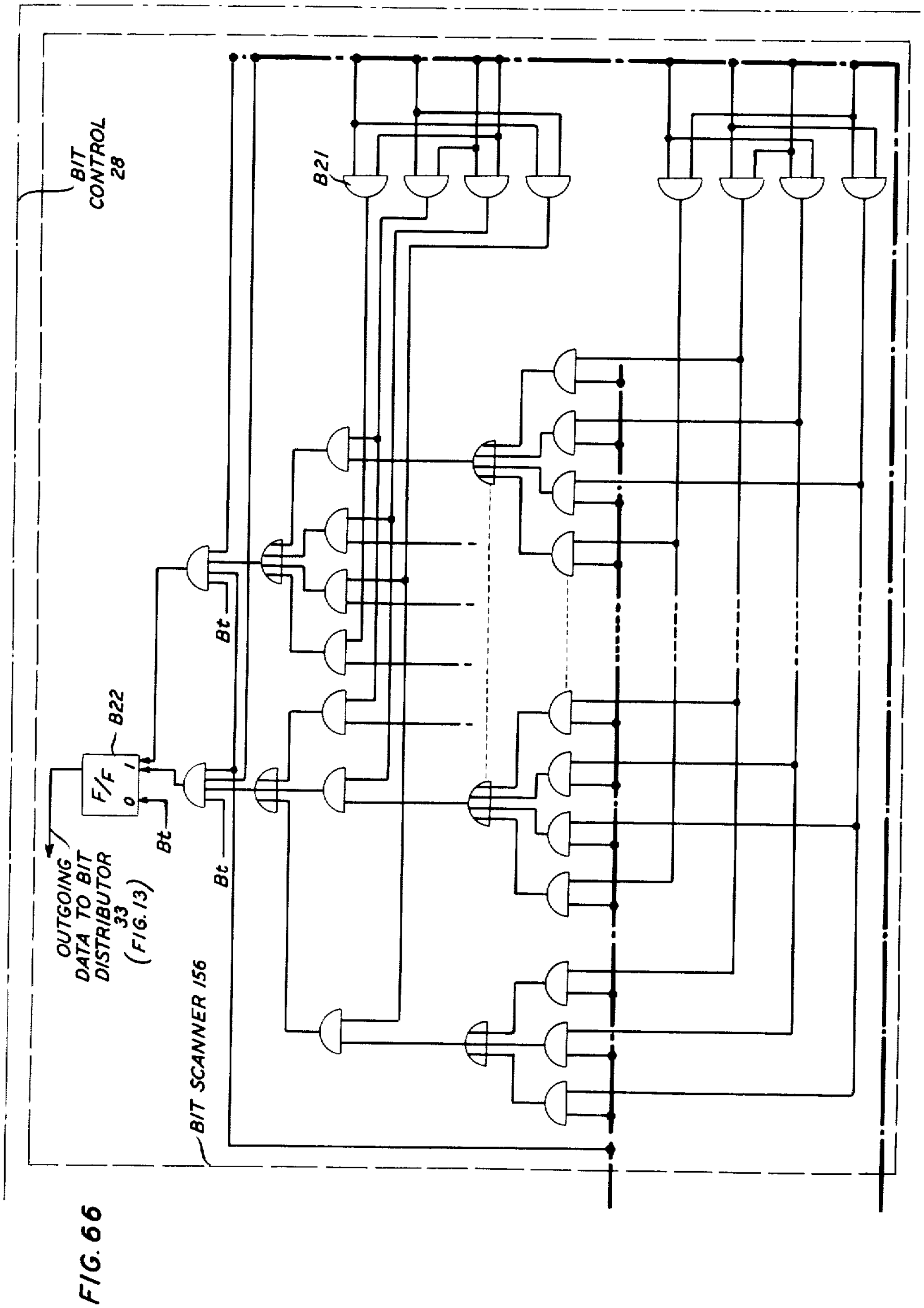
Figure 67:
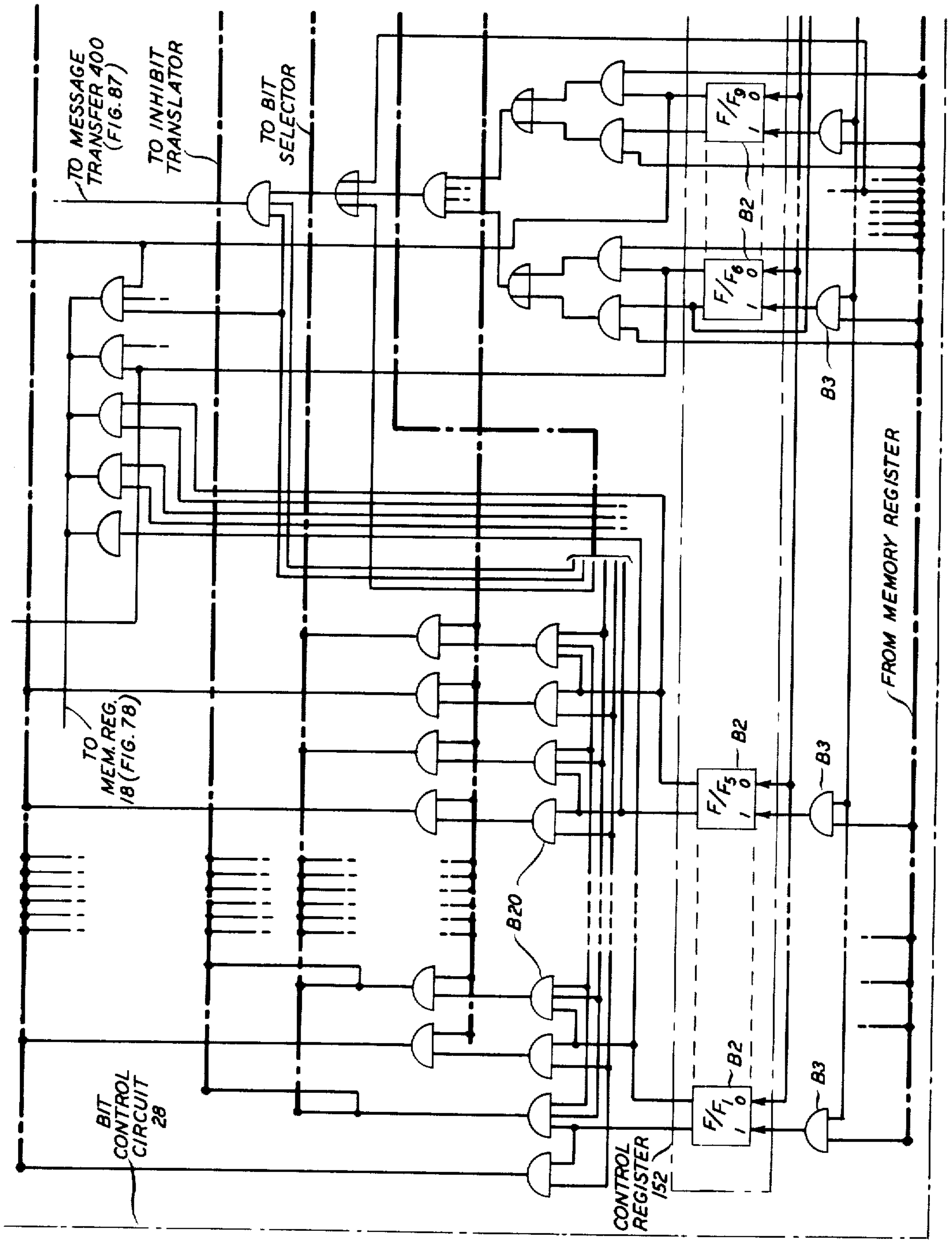

The flip-flops B6, FIG. 63, in the address register 155 are reset in B*t*4. Also the trunk number translator 29 is enabled in B*t*4 to receive the particular trunk number recorded in the trunk number register 153. If the time-out interval has been reached, indicating that all of the words have been interrogated in sequence or if a complete acknowledgment has been received, as indicated by the acknowledgment counter, an appropriate signal is transmitted to the message control 27. In B*t*5 the bit, word, and acknowledgment counters gate the information stored in the false rank into the true rank through the counter output gates B15, FIG. 79.

This completes the first read-write cycle of the bit transfer interval. At this point the bit control has the first control word of a message slot recorded in the memory register 150 with appropriate portions of that control word also recorded in the control register 152 and trunk number register 153. Knowledge of the condition of this particular message slot, including its busy or idle condition, whether it is handling an incoming message or an outgoing message, whether, by means of the various counter operations, time-out has occurred, and whether an acknowledgment is in the process of being sent or received or just completed, is contained in the first control word. Appropriate indications of the above conditions have been transmitted to the message control 27, trunk number translator 29 and trunk scanner 32.

As we proceed into the second read-write cycle beginning with B*t*6 it will be assumed, first, that the message slot is handling incoming data. A signal from the trunk scanner 32, in conjunction with a timing signal in B*t*6, sets the busy bit and initial count stored in the memory register 150 into the bit and word counters, respectively. Also in B*t*6, the memory register 150 is reset in conjunction with an idle message slot indication, an acknowledgment completed indication, or an indication that time-out has been reached.

Finally in B*t*6, flip-flop C1, FIG. 74, is set, thereby starting the second read-write cycle. In this instance, however, the start of the read-write cycle is not coupled with the nondestructive read-out signal which served to gate the output of the store 26 into the memory register 150 during the first read-write cycle. Thus, lacking this signal, the first control word stored in the message slot, which is again being interrogated, is destroyed.

An opportunity is now provided to transfer a new first control word from the memory register 150 to the appropriate portion of the message slot in the store 26. In B*t*9 the word part of the address register 155 stored in flip-flops B6, FIG. 63, is reset such that in B*t*10 a new address word may be recorded therein. Also in B*t*10 the memory register 150 is again reset.

In summary, then, the second read-write cycle provided an opportunity in effect to revise the first control word stored in the message slot being interrogated. As indicated in the description of the store 26 operation, the content of the memory register 150 is automatically written into a particular addressed area of the store during each read-write cycle. Since the address was not changed until B$t$10, the content of the memory register 150 during the second read-write cycle was written into that portion of the message slot occupied by the first control word. With the message slot handling incoming data, the content of the memory register 150 which is written into the store 26 will be such that the stored first control word will be changed in order to record the new bit and word count, an indication that the acknowledgment count is completed or time-out has been reached and the message slot busy or idle condition. If a new trunk number was just assigned, it will have been recorded in the memory register 150 and replaced in the trunk number portion of the first control word in the store 26.

The bit control operation now proceeds to the second control word in the message slot during the third read-write cycle of the message slot interval, the address register having been advanced so as to interrogate the second control word. The new address is transmitted from the address register 155 to the X and Y access translators, FIG. 74, which in turn provide the inputs to the access unit of the store 26. The access unit now directs the read and write operation through the particular word stored in the information unit to be interrogated.

The sequence of operations during the third read-write cycle B$t$11–15 corresponds to those performed during the first read-write cycle, in this instance serving to read out the second control word, store it in the memory register 150, and rewrite it in the store 26. If receipt of the incoming message has been completed, the second control word as recorded in the memory register 150 will reflect this condition and will transmit an appropriate signal to the message control 27 during B$t$12. Also in B$t$12 the acknowledgment count recorded in the control register 152 is transferred through the output gates B20 to the translator gates B21 of the bit scanner 156.

Thereafter in B$t$13 the bit scanner 156 sets the outgoing data flip-flop B22, and the message control 27 is advised to check the length of the message being received. The appropriate information concerning the message length is recorded in the memory register 150 during the message transfer interval and is made a part of the second control word.

The address register flip-flops B6 are again reset in B$t$14, and the memory register 150 is reset in B$t$15. The control register 152 still contains the content of the first control word which it recorded during the first read-write cycle of the message slot interval. This first control word contained the present word count, which count is gated into the address register flip-flops B6 from the control register 152 in B$t$15. At the same time the bit scanner 156 is disabled.

Summarizing the third read-write cycle, the second control word was stored in the memory register and was available to determine whether or not the message was complete and to allow a request for a check of the message length, as well as to determine the extent of the acknowledgment received. Having completed this determination, a new word address has been recorded in the address register preparatory to the interrogation of a particular word of the actual message text in the fourth read-write cycle. As in the first read-write cycle, the second control word stored in the memory register 150 is rewritten in the store 26.

In B$t$16, beginning the fourth read-write cycle, the bit count is transferred from the control register 152 to the bit selector 158 and to the inhibit translator 159. Also if the trunk scanner has assigned a new trunk number, a start code is set in the appropriate flip-flops B1 of the memory register 150 subsequent to the transfer of the appropriate message word from the store to the memory register 150. The false rank of the bit word and acknowledgment counters is reset in B$t$18, and the address register flip-flops B6 are reset in B$t$19. Also in B$t$19 the count in the false rank of the message counter flip-flops B8 is transferred to the true rank flip-flops B7. Finally, in B$t$20 the memory register 150 is reset after having rewritten the message word in the store 26.

Figure 76:
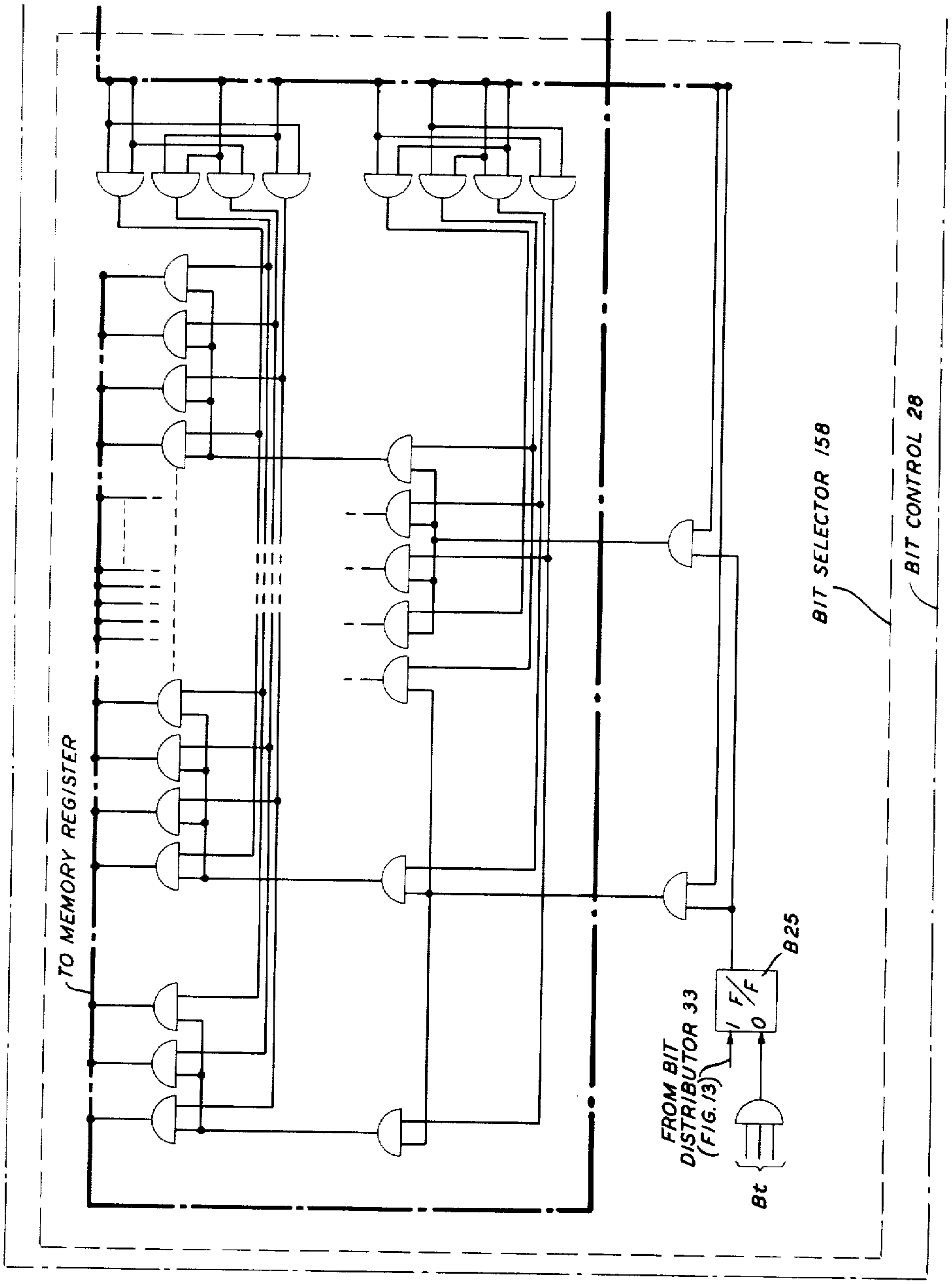
Figure 77:
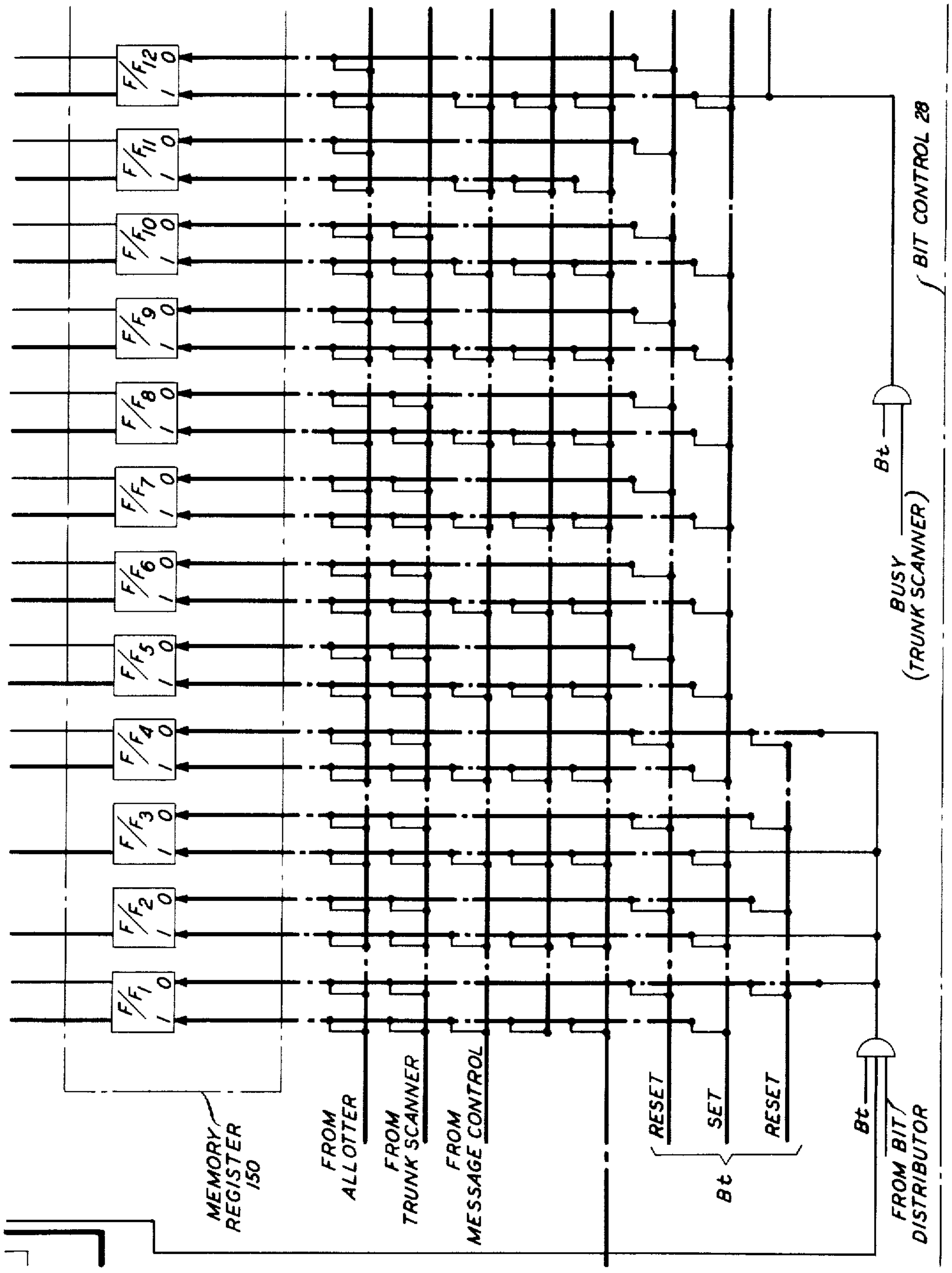
Figure 78:
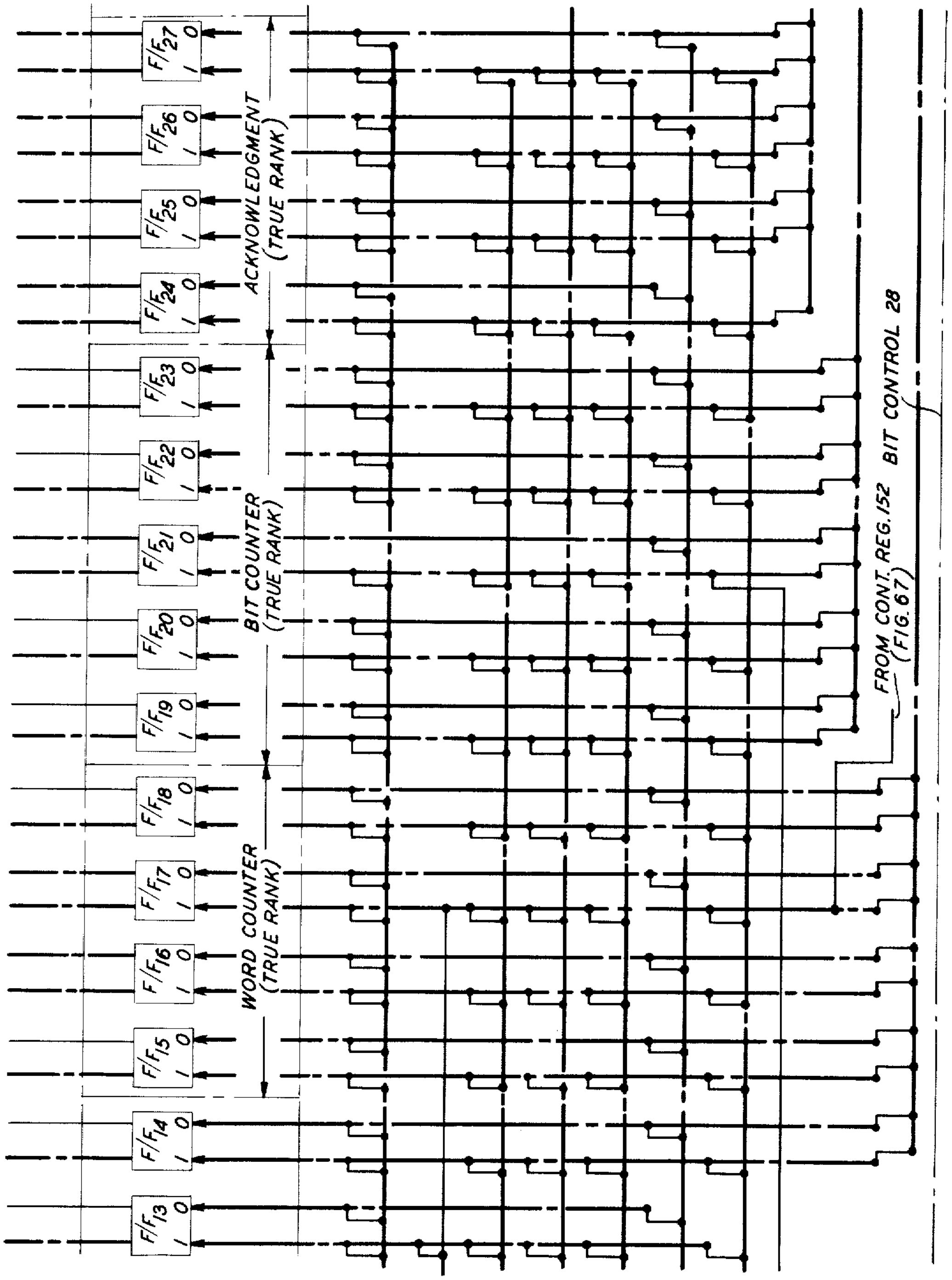

The operation that occurred in the fourth read-write cycle involved the writing into an appropriate flip-flop of the memory register 150 of an incoming data bit from the bit distributor 33 through the flip-flop B25, FIG. 76. This information is directed to the appropriate memory register flip-flop by the bit count recorded in the control register 152 and translated by the bit selector 158 at the appropriate time. Thus when the message word is rewritten in the store 26, it includes the new message bit of the incoming message. This sequence of operations will be repeated once in each complete office cycle. After all message slots have been interrogated and the message transfer interval has elapsed, this particular message slot will again be interrogated and another bit of the incoming message recorded in the store 26.

The transmission of an outgoing message involves operations of the bit control which are substantially the same as those involved during receipt of an incoming message, the primary distinction being one of timing. Thus where an incoming message requires the transmission of an acknowledgment in the third read-write cycle, the outgoing message requires the reception of the acknowledgment during the same period. In order to prepare for receipt of this acknowledgment, an appropriate binary digit is written in the least significant digit position of the acknowledgment counter flip-flops in the message register 150 during B$t$6 provided a start of message signal was just recognized on the return side of the trunk, the number of which is stored in the trunk number register 153. Thereafter in B$t$11, the beginning of the third read-write cycle, the acknowledgment count is transferred from the control register 152 to the bit selector 158 and the inhibit translator 159 and the start code or acknowledgment available on the return side of the outgoing trunk is transmitted through the bit selector and stored in the memory register 150.

The sequence of operations continues in the manner described for an incoming message until the final read-write cycle when the particular message bit is read out of the store 26 and transmitted over the outgoing trunk. This operation is facilitated by transfer of the bit count from the control register 152 to the bit scanner 156 in B$t$17 and enablement of the outgoing data flip-flop B22 of the bit scanner 156 in B$t$18.

*Message control*

The message control 27 transfers an entire message between the store 26 and the buffer coder 20 during a distinct portion of a single office cycle known as the message transfer interval, in this example 140$\mu$ seconds, as contrasted with the bit control 28 which transfers one bit of each message between the store 26 and trunks 24, 25 during successive 20$\mu$ second intervals in the balance of an office cycle.

In the case of an outgoing message, the data processor 11 generates the message and alerts the buffer coder 20 which in turn accepts the message, encodes it, and under control of the message control 27, transfers it a word at a time into a predetermined message slot in the store 26 during the message transfer interval. Other circuitry is activated concurrently in order to select an idle outgoing trunk to handle the message. The number of the selected trunk is placed in the first control word of the selected message slot in the store 26. Thereafter, the bit control 28 transfers the message bit by bit from the store 26 to the selected outgoing trunk 24 as the message slot containing this message is interrogated in each succeeding office cycle.

At the destination this message is received on an incoming trunk 25 which alerts the trunk scanner 32 that a message is being received. The trunk scanner 32 selects a switch 23 containing an idle incoming message slot. The bit control 28 then proceeds to transfer this message a bit per office cycle into the corresponding store 26. Upon completion of this transfer, the following functions are performed at the receiving terminal. The message control 27 transfers the message from the store 26 into the buffer coder 20 during the message transfer interval; i.e., that portion of the office cycle allocated to transfer of one entire message. The buffer coder 20 determines whether or not the message was received properly and informs the message control 27 of this status. The message control 27 in turn generates an acknowledgment that is recorded in the store 26 and is subsequently transmitted to the originating terminal. The message control 27 at the originating terminal initiates retransmittal of the message when a bad acknowledgment has been returned by the receiving terminal and causes the message storage area in the store 26 to become idle upon receipt of a satisfactory acknowledgment.

The content of a typical message slot is illustrated in FIG. 99. The word having the address 0000 is designated as the first control word and contains information necessary to guide the message through the terminal switching center. The first control word includes the number of the particular trunk assigned to carry the message to or from this message slot in the store 26. In this instance the trunk number occupies ten binary digit or bit storage areas in the word. Other information stored in the first control word includes an indication at bit 12 of the busy or idle condition of this message slot. Also various counter indications are recorded to keep track of the particular bit storage area being interrogated at any given time during message transfer.

For an incoming message, the second control word, identified in this instance by the address 0001 (incoming message), contains appropriate acknowledgments as to satisfactory receipt of the message at the destination and information concerning the length of the message. For outgoing messages the second control word 0001 (outgoing message) also contains message acknowledgments but is not concerned with the length of the message. Instead, information concerning the availability of trunks to the destination and the number of times the same message is transmitted is recorded in this control word. Subsequent words contain the destination address or addresses for a particular message and finally the message text itself.

The message transfer interval is programmed according to FIG. 100, program A, to accommodate a buffer to store transfer and according to FIG. 100, program B, to accommodate a store to buffer transfer. In this specific embodiment program A requires 120$\mu$ seconds and program B requires 130$\mu$ seconds, the two types of message transfer operation being performed during the same time interval in alternate office cycles.

*Buffer to store transfer*

Considering FIGS. 6 through 10 and the detailed circuits in FIGS. 83 through 91, the operations involved in transferring an outgoing message from buffer to store will be examined first, such operations being performed in the period M*t*41–120 of the message transfer interval according to program A, FIG. 100.

The bit control 28 continually examines the store 26 to determine the availability of message slots. Upon locating such available space, indicated by the busy bit in the first control word, the bit control 28 signals the message transfer circuit 400, shown in block from in FIG. 9 and in detail in FIGS. 86, 87 and 89, in the message control 27. This signal, together with the message address contained in the address register 155, is received in the slot number translator 401, FIG. 86, which in turn determines whether the current idle message slot is designated to receive incoming or outgoing messages. Advantageously, optional wiring is provided in translator 401 to permit establishment of a fixed ratio between message slots designated as incoming and those designated as outgoing, the selected ratio being determined primarily by traffic conditions.

If it is an idle incoming message slot that is available, the slot number translator 401 signals the trunk scanner 32. If it is in idle outgoing slot, translator 401 pulses the multivibrator 402, and the message slot number is gated into the idle message slot register 403 for later use. At the same time the multivibrator 402 indicates to the allotter 22 that this particular switch 23 has an idle ougoing message slot.

The allotter 22 is continuously surveying all of the switches 23 and immediately notifies the buffer coder 20 upon location of an idle outgoing slot in any one of the switches 23. If the data processor 11 has a message ready for transmission, the buffer coder 20 now accepts the message, encodes it, and waits for the switch 23 to reach the point in its cycle of operation; viz., the program A message transfer interval, at which the message control 27 can begin to transfer the message into the idle message slot in the store 26. This time occurs in alternate cycles after the bit control 28 has serviced all of the messages available for transmission between the trunks and the store.

Figure 9:
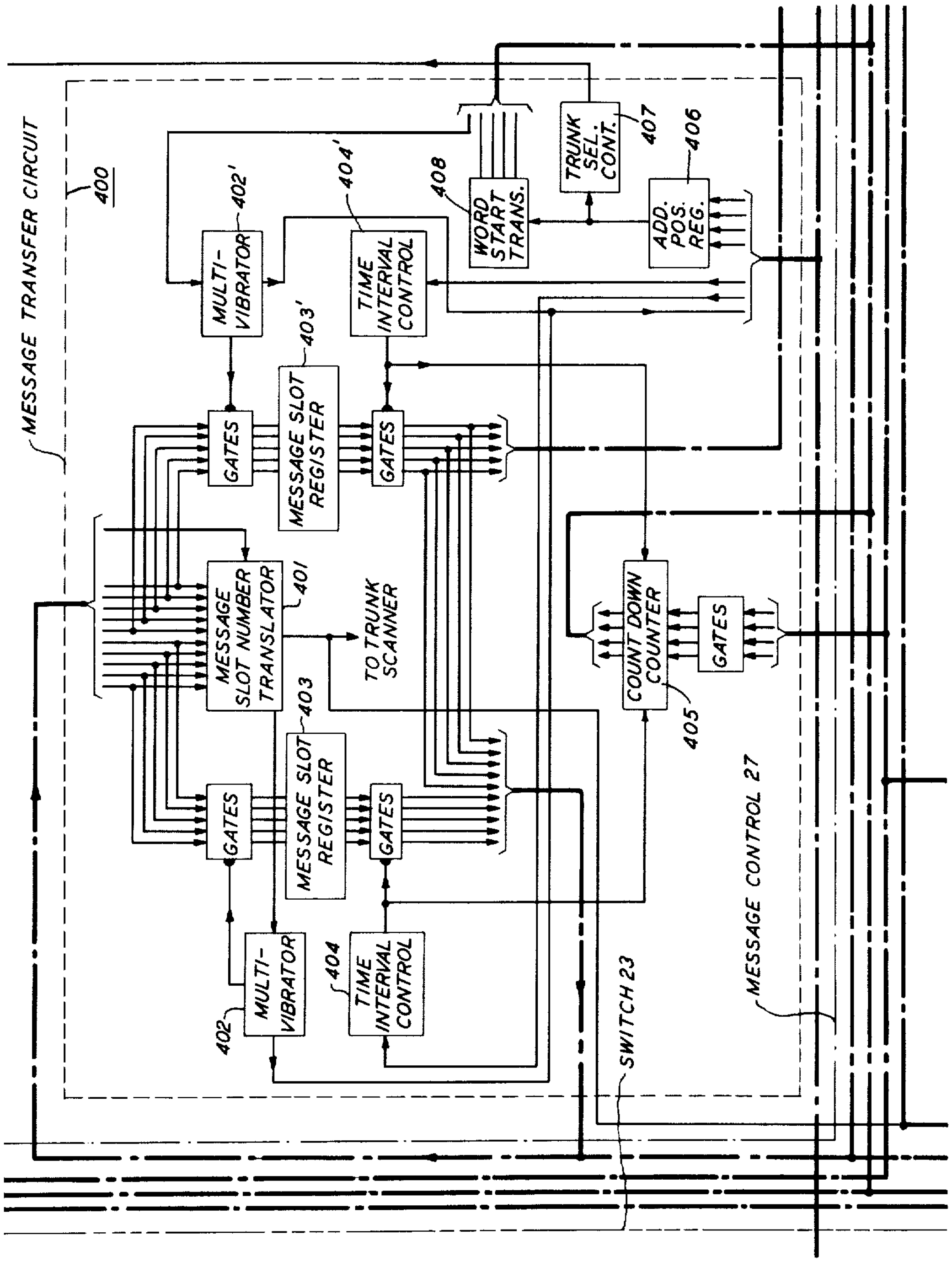
Figure 10:
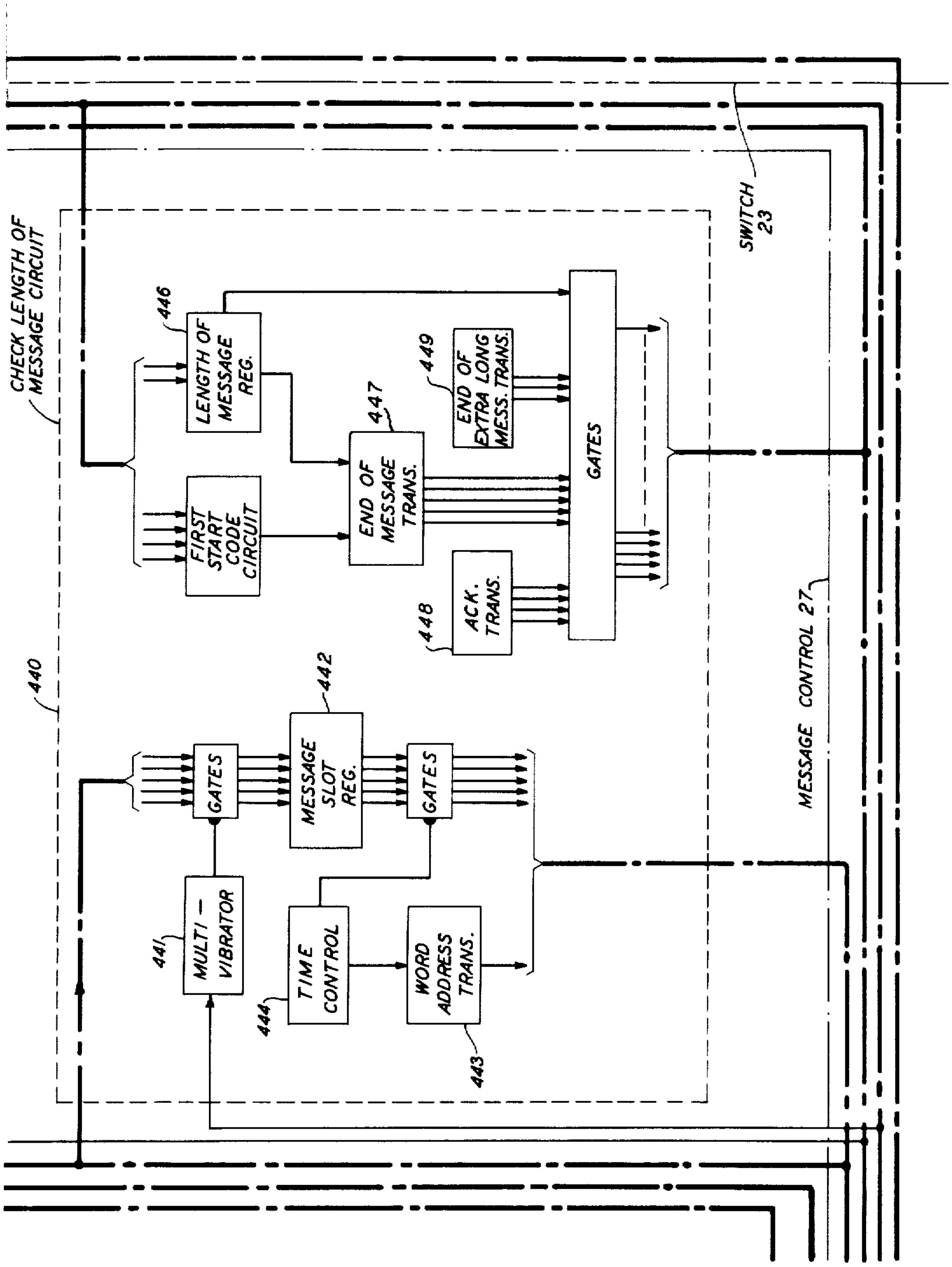

At M*t*39 of program A, the allotter 22 signals the time interval control 404, FIG. 9, that a message is ready for transfer. This serves to gate the content of the message slot register 403 into the message portion of the address register 155, FIG. 11, at the discrete time in the office cycle assigned for beginning a message transfer.

Figure 89:
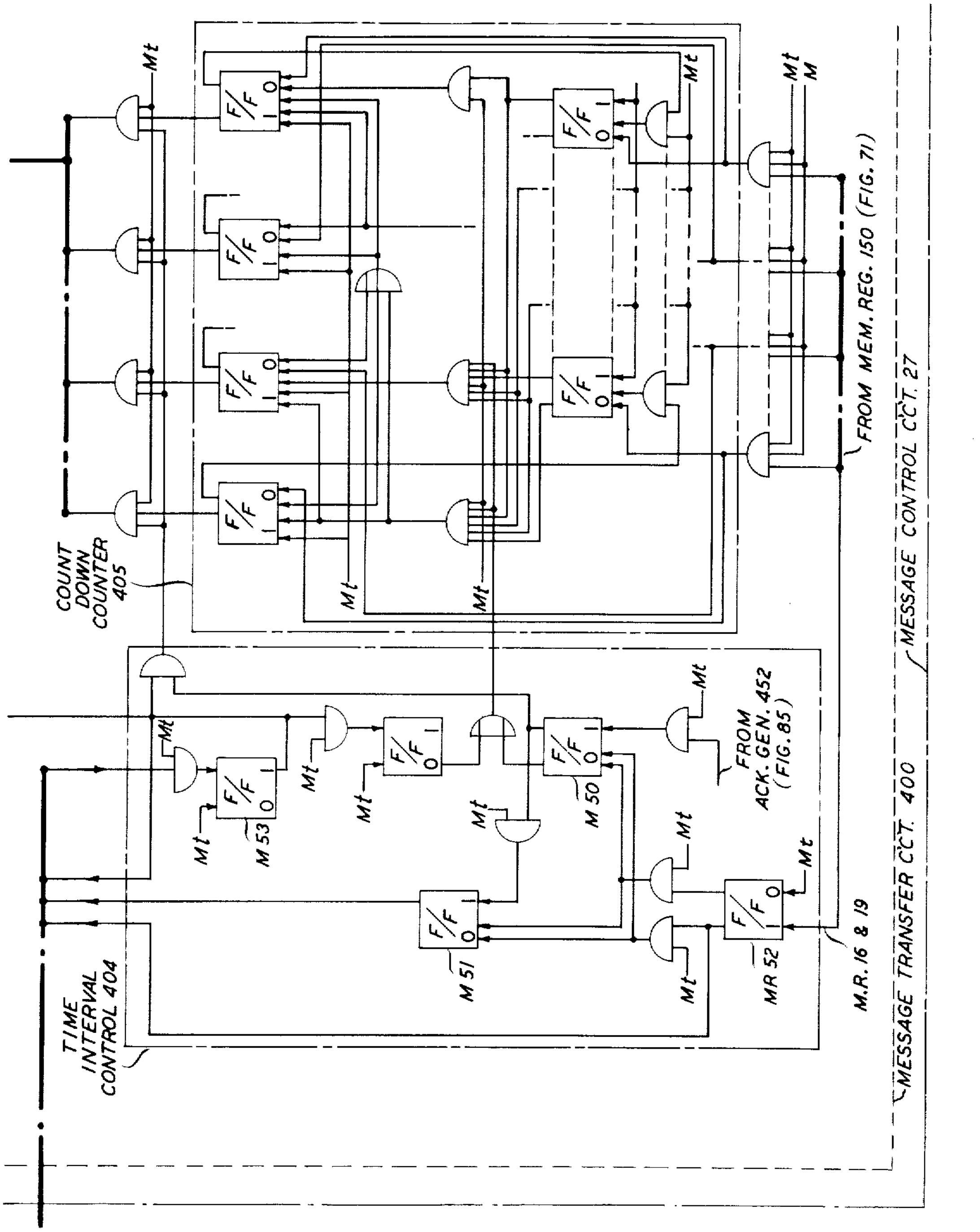
Figure 90:
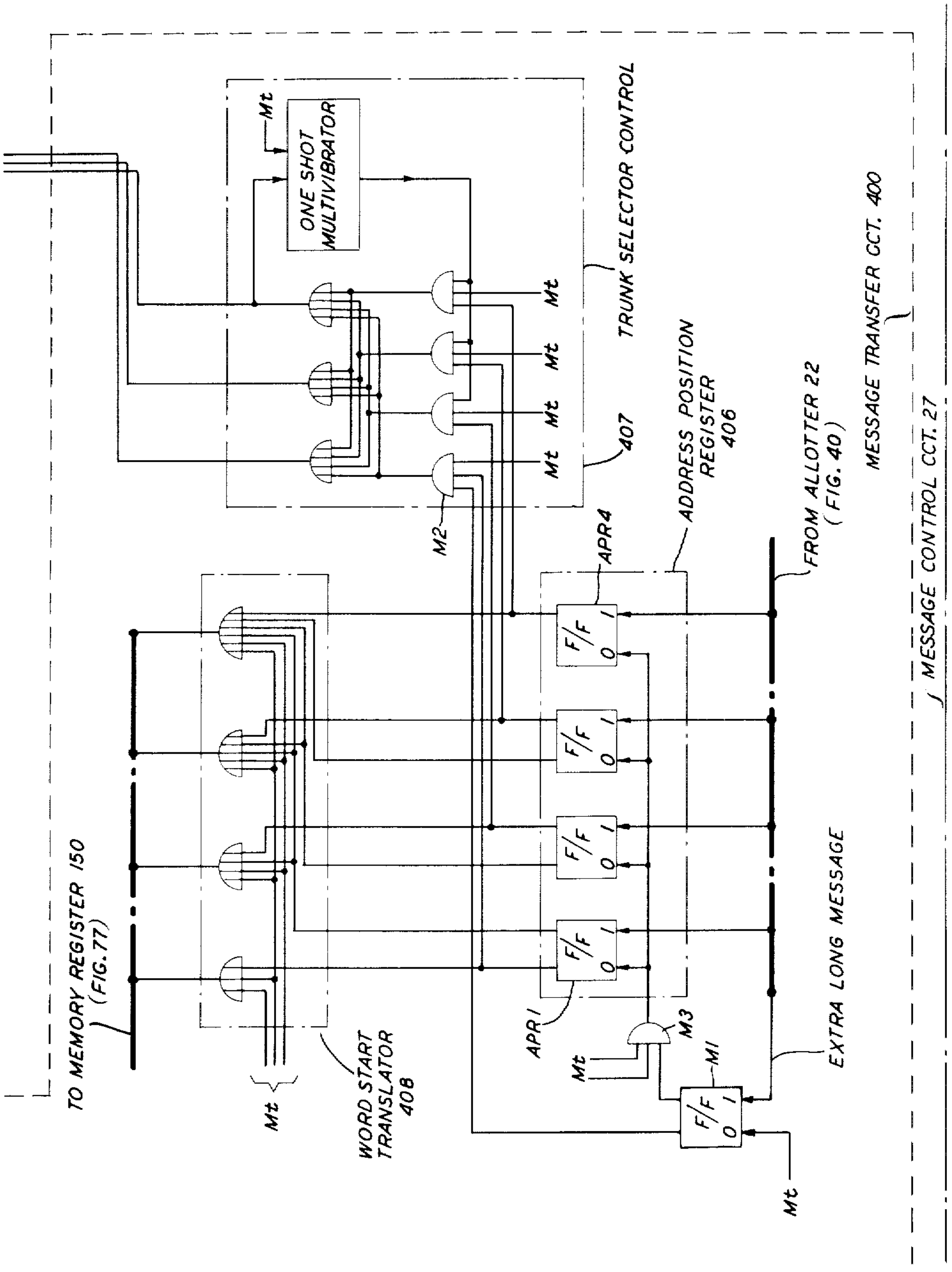

The text of the message is transferred into the store 26 in reverse order; i.e., the last word is transferred into the message slot first. The count down counter 405, FIG. 9, is utilized to address the proper word in the store 26 through the word portion of the address register 155. The counter, consisting of a true rank and a false rank of flip-flops, FIG. 89, is preset into a particular stage and then energized by appropriate timing signals to count down and to alter the content of the address register 155 so as to address a different word in the store message slot in successive word time intervals.

Transfer of a word from the buffer coder 20 to the store 26 involves five bit time intervals. For example, at M*t*39 of program A flip-flop M53, FIG. 89, in the time interval control 404 signals the allotter 22 that a message transfer is ready to start. At M*t*40 the content of the count down counter 405 containing the desired address of the last text word storage area, FIG. 99, in the store 26 is gated into the word portion of address register 155. At M*t*41 allotter 22 sets the last text word of the message into the memory register 150. At M*t*42 the true rank of the count down counter 405 is gated into the false rank, and at M*t*44 the true rank is changed to the count designating the next to the last text word storage space in the message slot of the store 26. The cycle is then repeated to transfer each word in reverse order from the buffer coder 20 to the store 26.

Upon completion of the transfer of all text words in this manner, the allotter is prepared to transfer the first message destination address designating one of the selected destinations for this particular message. At the same time, M*t*91, the address position register 406, FIG. 9, is set by the allotter to designate which destination address is about to be transferred. The original relative position of the destination addresses, as provided to the buffer coder 20 by the data processor 11, must be maintained in order to derive the proper information for the data processor 11 at the receiving terminal. For this reason destination address position information is transmitted from the buffer coder through the allotter 22 to the address position register 406.

The first destination address transferred into the store 26 is also selected for trunk hunting at this time by an examination of the information as stored in the address position register 406. This is accomplished by the trunk selector control 407, FIG. 9, which gates the destination address position information to the trunk selector register 410, FIG. 6, at M*t*91. Subsequent destination addresses are gated to the store 26 at M*t*96, 101, and 106.

The destination address position information also indicates where the bit control 28 should start its operation; i.e., the last stored destination address would be the first information to be transmitted over the outgoing trunk. The particular word in the store 26 containing this destination address is determined by the word start translator 408, FIG. 9.

Figure 6:
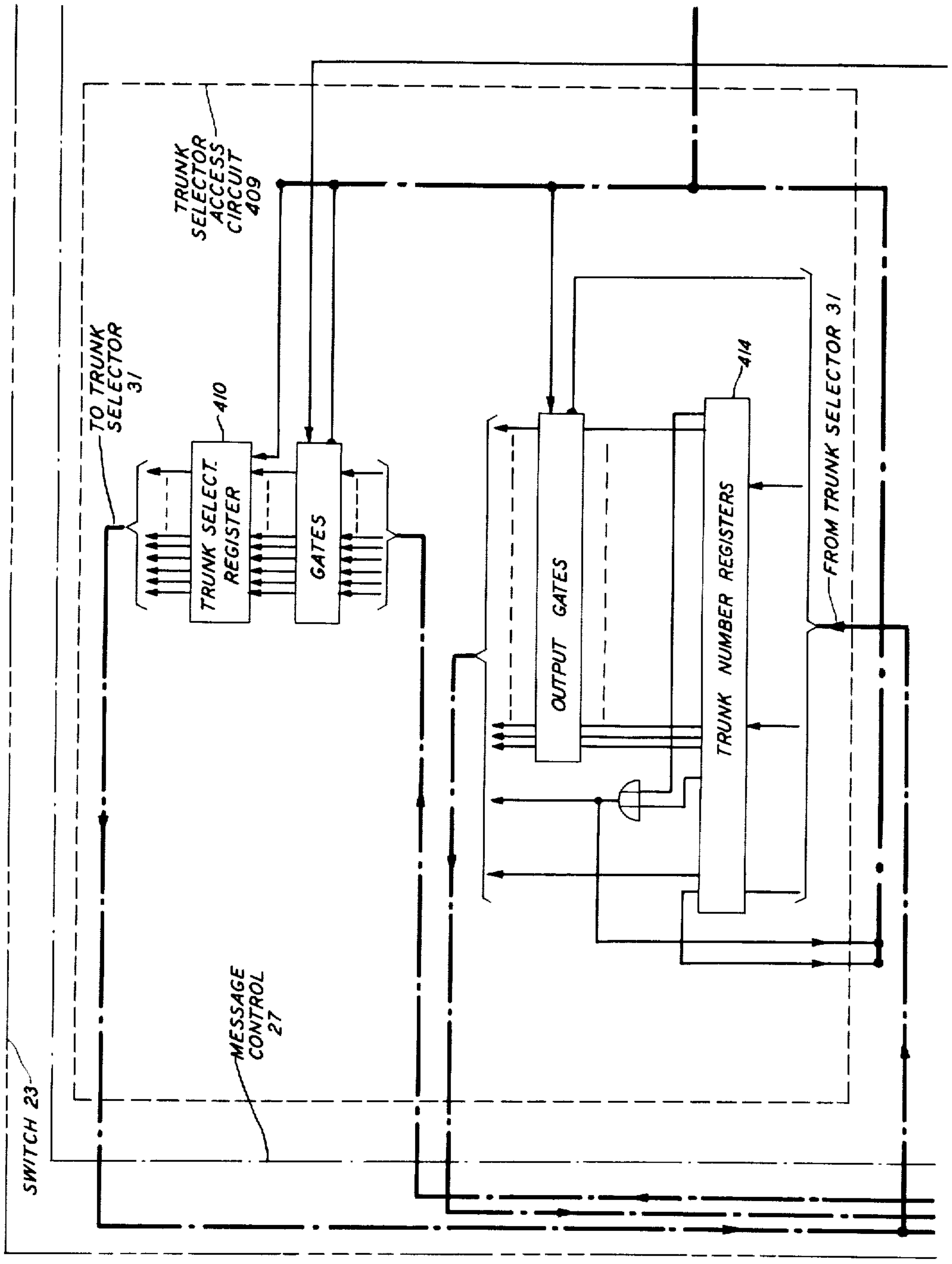

After all of the text words and all of the addresses have been recorded in the store 26, the message control 27 orders the trunk selector 31 to trunk hunt on the address previously sent to the trunk selector access circuit 409, FIG. 6.

Figure 93:
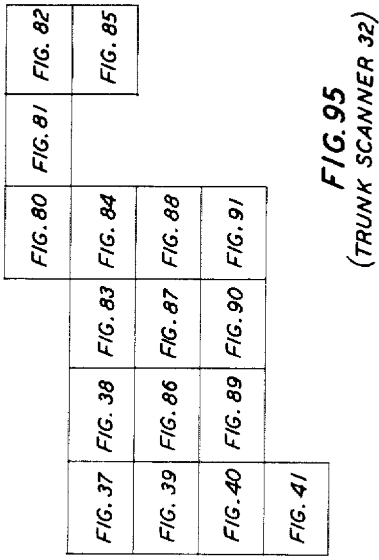
Figure 95:
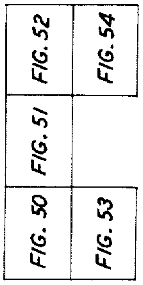
Figure 97:
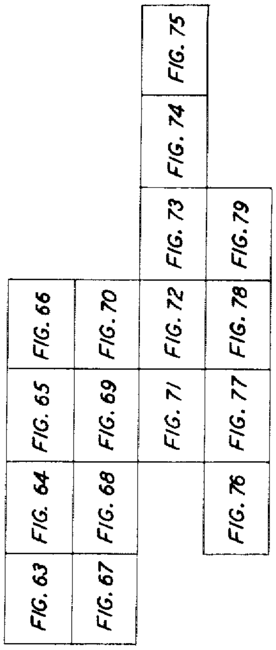

A trunk number is requested from the trunk selector 31 for outgoing new messages and for messages that are unacceptable to the receiving terminal and must be rerun. For this operation the trunk selector control circuit 407, FIG. 93, provides a particular coded output at the time the first destination address is in the process of being transferred into the store 26. This output, together with appropriate timing signals, serves to transfer the destination address into trunk selector register 410, FIG. 6.

If the trunk is to be requested for a rerun of a message, a distinct set of gates is utilized to transfer the destination address into the register 410 under control of signals generated by the check acknowledgment circuit 420, FIG. 7, to be discussed hereinafter. In the case of a message rerun, the trunk group number of the trunk used in the previous transmission must be presented to the trunk selector 31 at the same time as the destination address. This information is gated into a register comparable to the trunk selector register 410 at M*t*9, during the check acknowledgment interval in program B.

Figure 87:
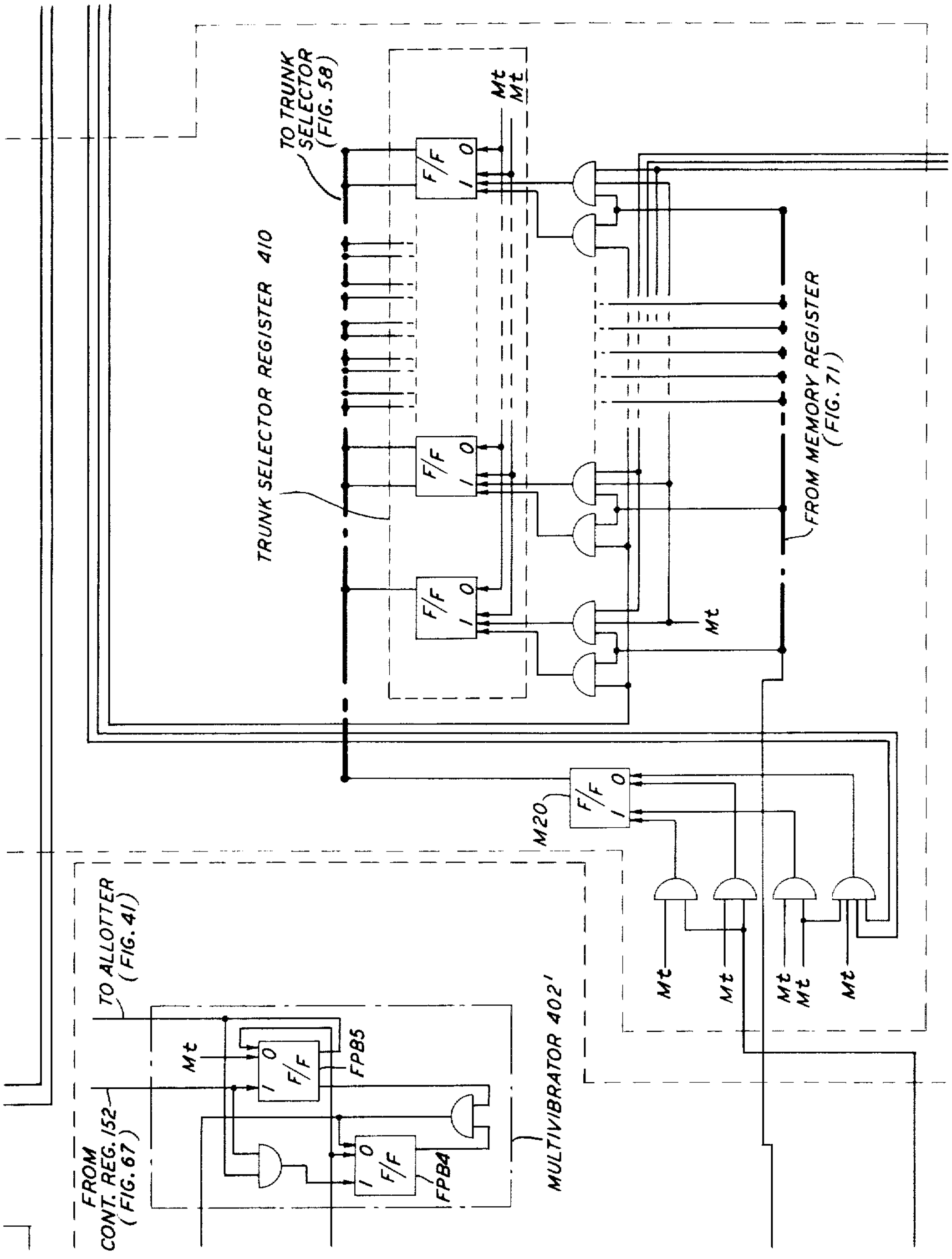
Figure 88:
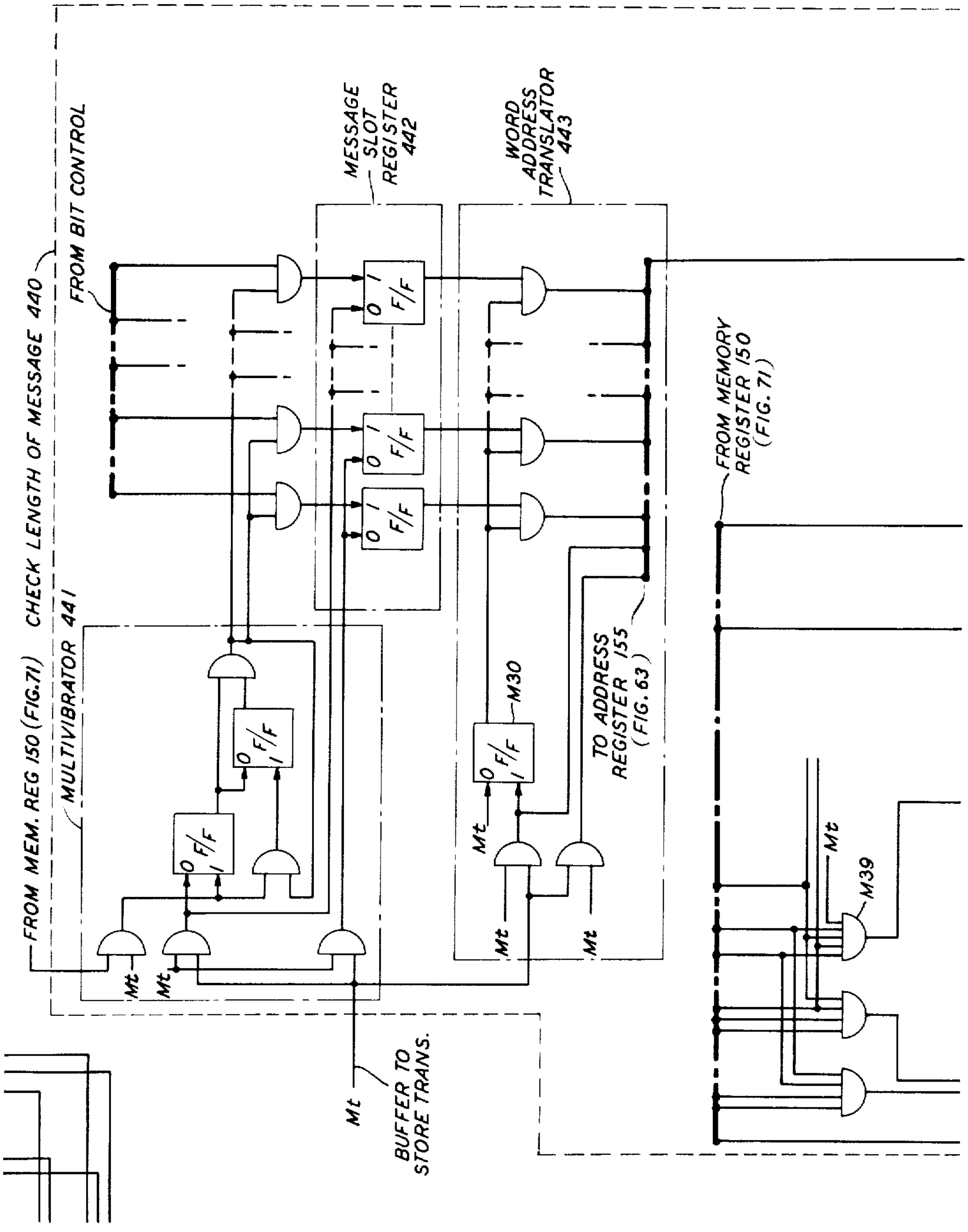

A start signal is sent to the trunk selector 31 upon the setting of flip-flop M20, FIG. 87. If this is a new message, flip-flop M20 is set for an interval M*t*111–113, program A, during the actual message transfer. However, if the trunk number being requested is to be used for the retransmission of a message, flip-flop M20 is set during an interval M*t*31–33 preceding the actual message transfer. The circuit is arranged such that the trunk number assigned to the particular destination address is returned by the trunk selector 31 within three bit intervals after receipt of the start signal.

Figure 83:
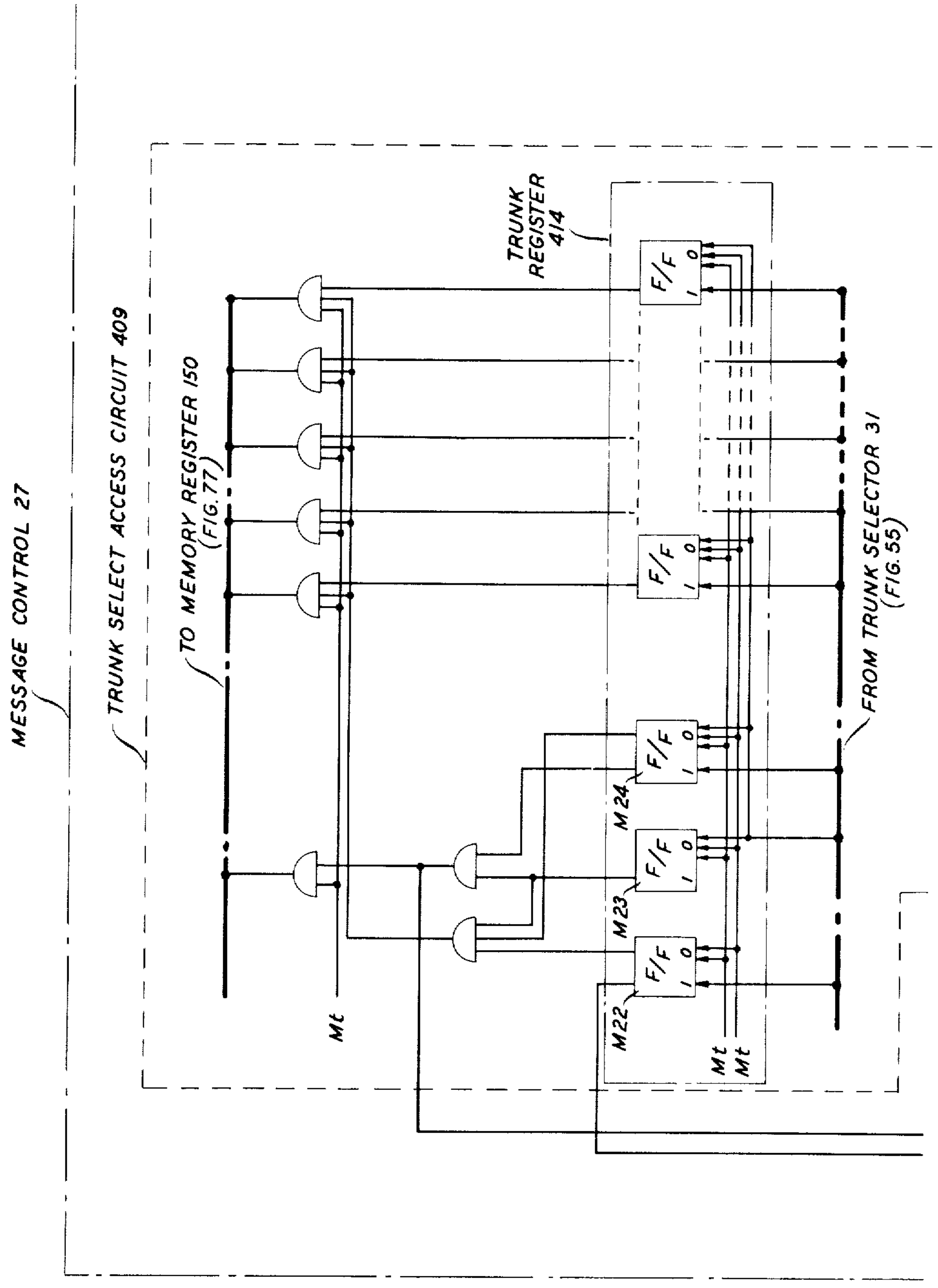

The assigned trunk number is set in the trunk register 414, FIGS. 6 and 83, in parallel. If the trunk selected is a slow speed trunk, flip-flop M23, FIG. 83, will be set. If all trunks to the destination prescribed by the address are busy, flip-flop M24 is set, and if the trunk selector 31 fails to identify the address presented to it, flip-flop M22 is set.

When the all trunks busy condition occurs, as reflected by flip-flop M24 in the set condition, the request for a trunk number is repeated by the message control circuit at a later time. This is accomplished by the output of flip-flop M24 placing an appropriate indication in the least significant bit of the acknowledgment counter designation in the first control word of the message slot, FIG. 99. The acknowledgment counter in the bit control 28 will then complete a prescribed count, and the message control 27 will be alerted to again try to obtain a trunk number assignment. This operation is assured by the cooperative effort of flip-flops M23 and M24, FIG. 83, in conjunction with appropriate timing signals.

During the period of hunting by the trunk selector 31, the store 26 is addressed at M*t*111, program A to the second control word in the message slot. If plural buffer coders are utilized, an indication of the buffer coder used on this message is inserted therein via the memory register 150. At the same time the portion of the memory register 150 designated for receipt of the trunk number to be stored in the first control word of the message slot is cleared of any prior message in anticipation of accepting the trunk number which will be provided by the trunk selector 31 through the trunk register 414, FIG. 6. The trunk number is gated into the memory register 150, FIG. 11, at M*t*116 of program A as part of the first word of the message slot currently recorded therein. Simultaneously, the output of the word start translator 408, FIG. 9, designating the location of the first destination address in the message slot, and the acknowledgment translator 427, FIG. 7, designating a busy message slot are gated into the memory register 150 at the appropriate positions in the first control word.

In accordance with our invention, various message lengths may be transmitted through the system; e.g., a four word, seven word, or ten word message. Longer messages must necessarily restrict the number of destination addresses which can be provided in order to assure a uniform size of message storage slot in the store 26. Thus extra long messages are transmitted with a reduced number of destination addresses. The allotter 22 activates flip-flop M1, FIG. 90, sometime during the next transfer when an extra long message will be transferred; otherwise the message control will react as if a fixed number of message words were presented. The setting of flip-flop M1 serves to inhibit gate M2 in the trunk selector control 407 and partially enables the input gate M3 to the flip-flops of the address position register 406. Gate M3 is enabled at M*t*91 of program A so that the address position register 406 is reset and the additional word of text read into the store 26 instead of the first destination address normally read in at M*t*91. Thereafter, the address position register 406 is set in the manner described above to permit the available addresses to be inserted in the store 26.

At the end of the message transfer portion of the office cycle wihch occurs at M*t*120 in program A, after transfer of all text words, necessary addresses and the two control words, all flip-flops in the message control 27 are reset preparatory to the next bit transfer interval.

*Store to buffer transfer*

This completes the function of the message control 27 in the actual transfer of a message from a buffer coder to a message slot in the store. The reverse operation performed at the receiving terminal again requires the assistance of the message control in transferring a message registered in the store 26 to a buffer coder 20. This operation, performed in M*t* 51–130 of the message transfer interval according to program B, FIG. 100, is initiated by the bit control 28 finding a complete message in one of the message slots of the store 26 and thereupon activating the multivibrator 402′, FIG. 9, in the message transfer circuit 400. The output signal of this one shot circuit serves to gate the designation of the message slot containing the incoming message from the address register 155 into the message slot register 403′ for later use.

At M*t*30 in program B, via another output of multivibrator 402′, the allotter is notified that the message control 27 is prepared to transfer a message. If a buffer coder 20 is available, the allotter will provide a signal to set either flip-flop M10, or M11, FIG. 85, in the acknowledgment generator 452, FIG. 8. Either of these flip-flops being set at M51, the beginning of the actual message transfer interval, will in turn set flip-flop M50, FIG. 89, of the time interval control 404, FIG. 9, which serves to initiate the action of the message transfer circuit in performing the store to buffer transfer.

The first action that must take place in the store to buffer transfer is the reading of the second control word stored in the message slot. This is done in order to obtain the stored length of message information, bits 16 and 19, FIG. 99, and the end of message plus one indication, bits 24–27. The manner in which this information is derived will be described in connection with the check length of message circuit 440.

Figure 7:
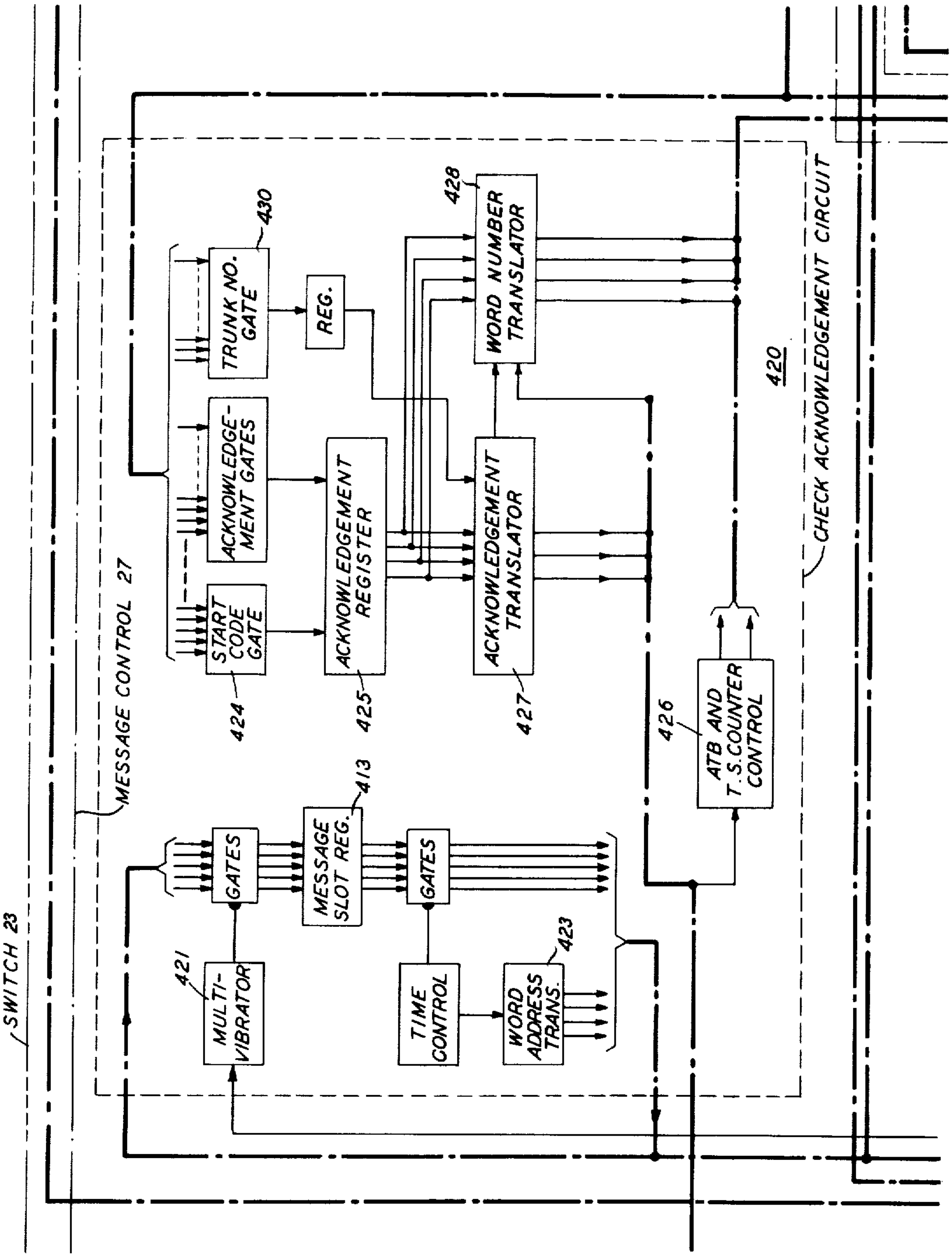
Figure 80:
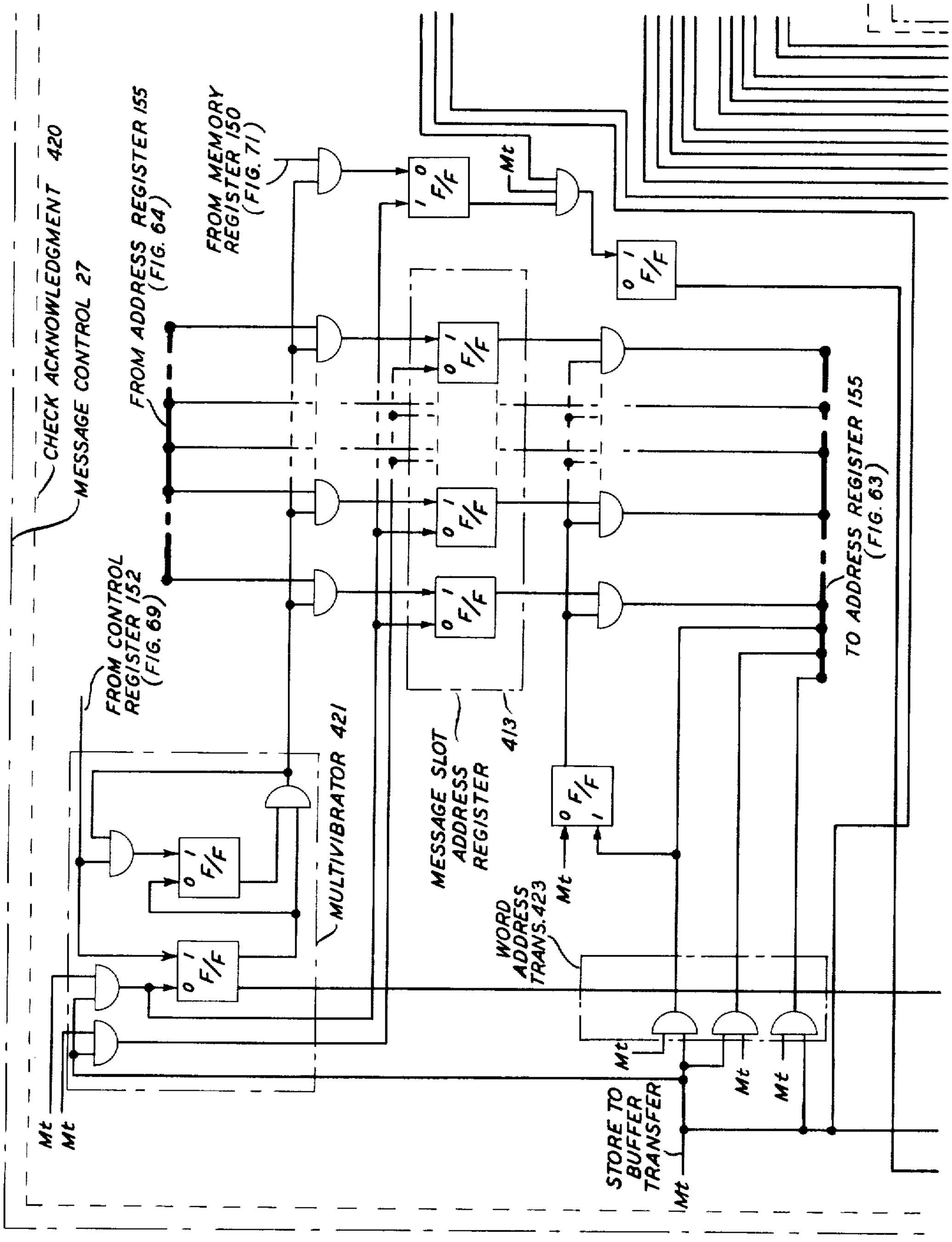

At M*t*51 the message slot designation is gated from the message slot address register 413, FIG. 7, to the address register 155, FIG. 11, in the bit control 28. To accomplish this, flip-flop M61, FIG. 80, is set at M*t*50, marking the beginning of a store to buffer message transfer. The length of message bits are read from the memory register 150 into the message transfer circuit 400, FIG. 9, which was discussed in connection with the buffer to store transfer of a message. If this is an extra long message, flip-flop M52, FIG. 89, in the time interval control 404, FIG. 9, is set at M*t*53. At the same time the end of message plus one indication contained in the second control word is gated into the count down counter 405, FIG. 9. In this instance the word is gated into both the true and false ranks of the counter 405 in order to accomplish a count down of one immediately. This action serves to place the word address for the last text word of the message in the true rank of the count down counter 405.

The counter 405 operates in the manner described hereinbefore with the exception that for the program B message transfer, the output is controlled by flip-flop M50, FIG. 89, of time interval control 404 in the set state. Also flip-flop M50 being set, serves to set flip-flop M51 at M*t*55, which in turn signals the allotter 22 that the last text word will be transferred through the allotter in the next word interval. At the same time the last text word address is gated from counter 405 to the address register 155.

The last text word is read from the store at M*t*56, program B. Upon completion of this readout the count down counter 405 is advanced in the manner previously discussed, and the next to last word of text is read from the store. This procedure continues until a prescribed number of words constituting the usual message length have been transferred to the buffer coder. If the message is shorter than the usual length, it will still be treated as if it were the usual length, but start signals will only be sent to the store for the actual words to be transferred. This function is controlled by the length of message circuit.

If the message contains a prescribed number of words or less, flip-flop M52, FIG. 89, will be in its reset state at M*t*101, program B, whereupon it will reset flip-flops M50 and M51. This action in turn inhibits further action of the counter 405 and at the same time informs the buffer coder that the message transfer is complete. However, if the message has more than the prescribed number of words, flip-flop M52 will be found in the set state at M*t*101. Its output thus will reset flip-flops M50 and M51 at M*t*106, one word count later, and it will also inform the buffer coder that an extra long message is being transferred.

During the program B message transfer time, three more operations must be performed. These include signalling the buffer as to which destination address was received, checking to determine that the correct destination address was received, and removing all supervisory information used by the bit control to determine when a message is complete.

While the length of the incoming message is being determined, the identity of the destination address received with this message is also being determined, and if warranted, a good acknowledgment is generated and stored in the second control word of the message slot. A portion of this acknowledgment contains the particular destination address, and the allotter 22 is designed to accept this destination address in a distinct coded form during the time interval M*t*111–115.

In order to transfer this destination address to the allotter, the second control word of the message slot must be interrogated. This is accomplished by placing in the address register 155 at M*t*110 the address for the second control word (incoming). Thereafter, at M*t*111 the information in the second control word concerning the completed short message, bit 17, and the end of message plus one, bits 24–27, is cancelled at M*t*113. This particular supervisory information, removed from the second control word, is used by the bit control 28 to generate an indication that a complete message has been transferred from the store to the buffer.

At M*t*116 the fourth destination address is read from the store for checking purposes. This procedure will be considered hereinafter in connection with the send acknowledgment circuitry of FIGS. 8, 82 and 85. At M*t*121 erasing of supervisory information is completed by reading the first control word out of the store.

This completes the store to buffer message transfer operation, program B, except for the resetting of all flip-flops in the message transfer circuit, which operation is performed by particular timing signals at the end of the message transfer interval.

*Check length of message*

At the receiving terminal when the start code of an incoming message appears in the incoming trunk circuit 25, the trunk scanner 32 notifies the bit control 28 that an incoming message is in progress. The bit control 28 in turn transfers the message a bit at a time from the incoming trunk 25 into a preselected message slot of the store 26 at the terminal location The check length of message function is the first function performed by the message control on the incoming message. This is effected in M*t*1–30 of the program A message transfer interval, FIG. 100, in the check length of message circuit 440 shown in block form in FIG. 10 and in detail in FIGS. 88 and 91. The first message text word is completely stored in the message slot, after which the bit control 28 notifies the message control 27 to begin the message length check. This is initiated by the storage of an appropriate signal in bit 18 of the second control word (incoming message), signifying that a length of message check should begin. This particular bit is interrogated each time the second control word of the message slot is read out, and when a length of message check is required, it serves to activate multivibrator 441, FIG. 88. The output of this one shot circuit transfers the particular message slot number from the message portion of the address register 150 into message slot register 442.

Beginning at M*t*1 of the next program A transfer time, the length of this incoming message will be checked. The store 26 is addressed by word address translator 443, FIG. 88, to the third, second and first destination address locations and to the first text word location in the message slot in consecutive word time invervals, as indicated in FIG. 100. This particular program is used to determine the location of the text start code and length of message bits. The address of the word which contains this information in turn defines the position of the destination address received for this message from the originating terminal.

As the message slot is interrogated in the above sequence, it may be seen from consideration of FIG. 99 that there are four intervals in which the unique text start code may be discovered. When the store 26 is addressed to the particular word in the message slot containing the text start code, multivibrator 445, FIG. 91, is set, and its output permits the storage in register 446 of the text start position according to the particular time the output is received therein.

Length of message bits, contained in the same word of the massage slot, separate the text start code from the actual text and must be translated into a code for use in the length of message check circuit. This is accomplished by the output of multivibrator 445 also setting flip-flops M40 and M41, FIG. 91, of register 446 in accordance with the particular length of message bits encountered.

During the aforementioned sequence of addresses to each word in the message slot, if a text start code is not found, multivibrator 445 will not be activated. In this instance trouble flip-flop M42 will be set at M*t*20, resulting in disablement of output gates to the memory register 150 and indicating that a trouble condition exists in this message.

All of the information required to determine the address for the last word of text is now available in register 446. A translation from this information to the information needed in the second control word of the message slot is provided by end of message translator 447, FIG. 91. This information is gated from the translator 447 to the memory register 150 at M*t*21, while the second control word is contained therein, provided that trouble flip-flop M42 remains in its reset condition. The information required in the second control word (incoming message), as shown in the message slot bit allocation in FIG. 99, is an acknowledgment that a message was received, an indication of receipt of a complete short message, length of message check information, and end of message indications.

The acknowledgment translation is performed in accordance with the particular received destination address and its position in the message slot of the store at the transmitting terminal, thus forming a distinct acknowledgment corresponding to the particular received address.

If the message in question is a short message and the first address was the one received, the message is now complete and an indication of this condition is provided by flip-flops M40 and M41, FIG. 91, in their reset state, coupled with an appropriate translation which serves to set the complete short message indication in bit position 17 of the second control word at M*t*21, program A.

The length of message indications for the second control word are required for the subsequent store to buffer transfer of the message, and these indications are provided by flip-flops M40 and M41 in their respective set states, through translator 447 to bit positions 16 and 19 of the second control word at M*t*21.

At the time of transfer, the message control 27 must know when the end of an extra long message will occur, since the subsequent transfer of the message from the store to a buffer coder begins with the last word of the message. Another set of output gates from the translator 447 satisfies this function in transferring such indications from the appropriate flip-flops in register 446 to bit positions 20–23 of the second control word in the memory register 150.

The end of message plus one indication is used by the bit control to compare with the word location currently being processed. When the comparison is made, the bit control so notifies the message control. The end of message plus one indication is derived from the information stored in register 446 by appropriate translation in translator 447 and is stored in bit positions 24–27 of the second control word.

The check length of message function is completed at M*t*25 after cycling through the possible location of message destination addresses, the first text word and the second control word, unless a text start code is not found. In the latter case a "no good" acknowledgment is returned to the sending terminal by placing an appropriate signal in the least significant bit of the acknowledgment counter so as to begin transmission of the acknowledgment. This is accomplished when flip-flop M42, FIG. 91, is set. The check length of message circuitry is restored to normal upon completion of its cycle of operation by the appropriate resetting of all flip-flops.

*Send acknowledgment*

Figure 8:
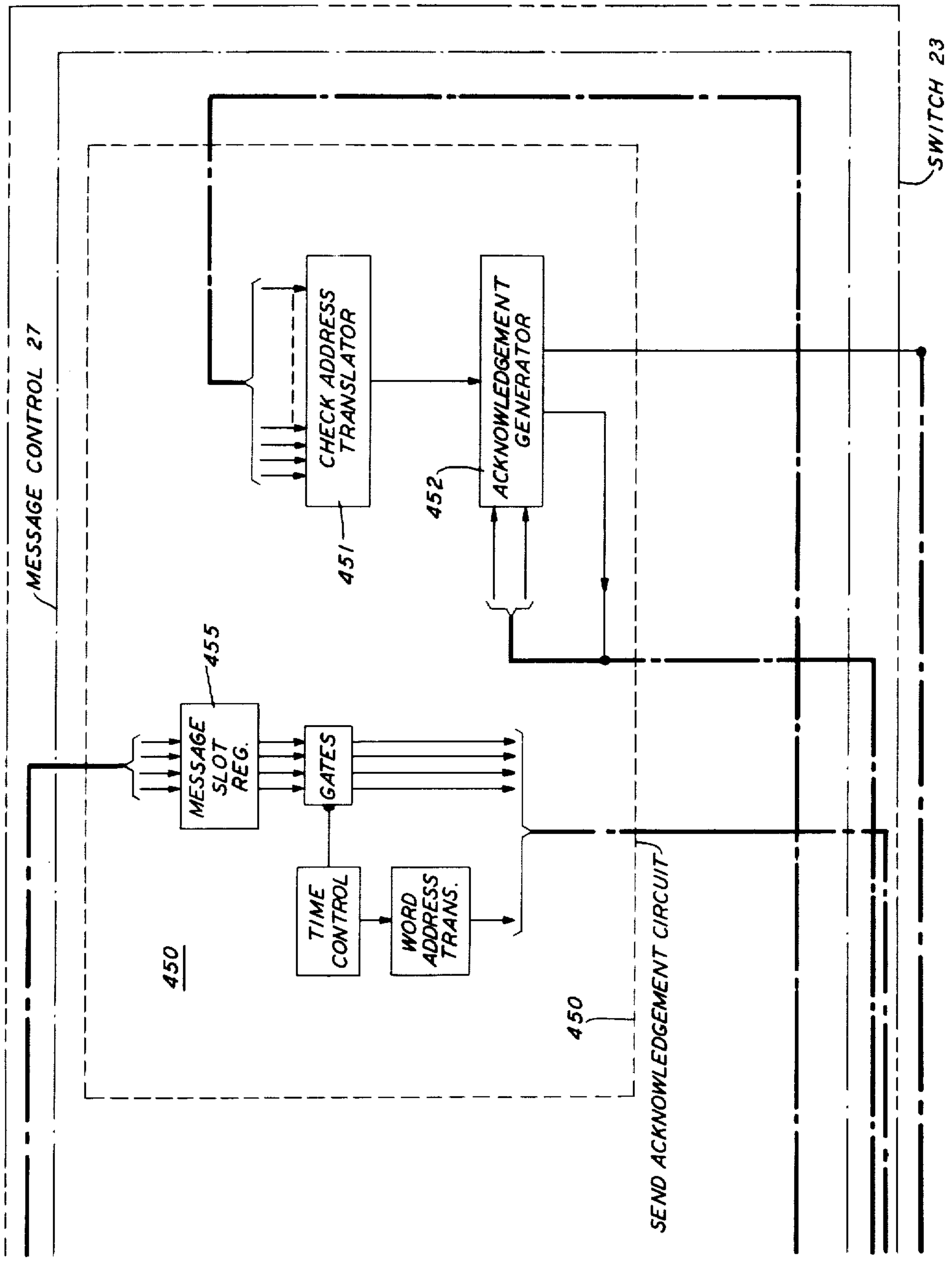
Figure 82:
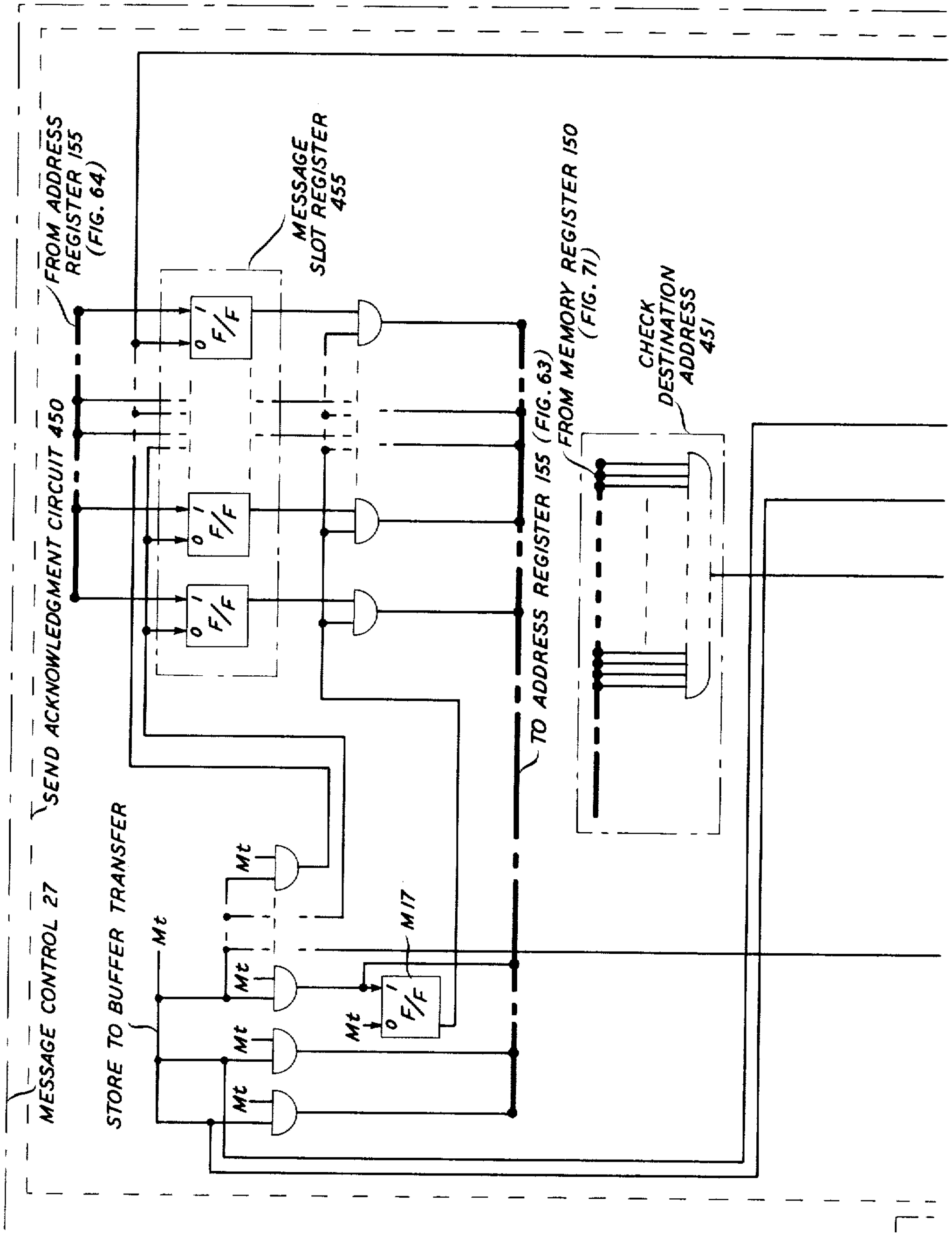
Figure 85:
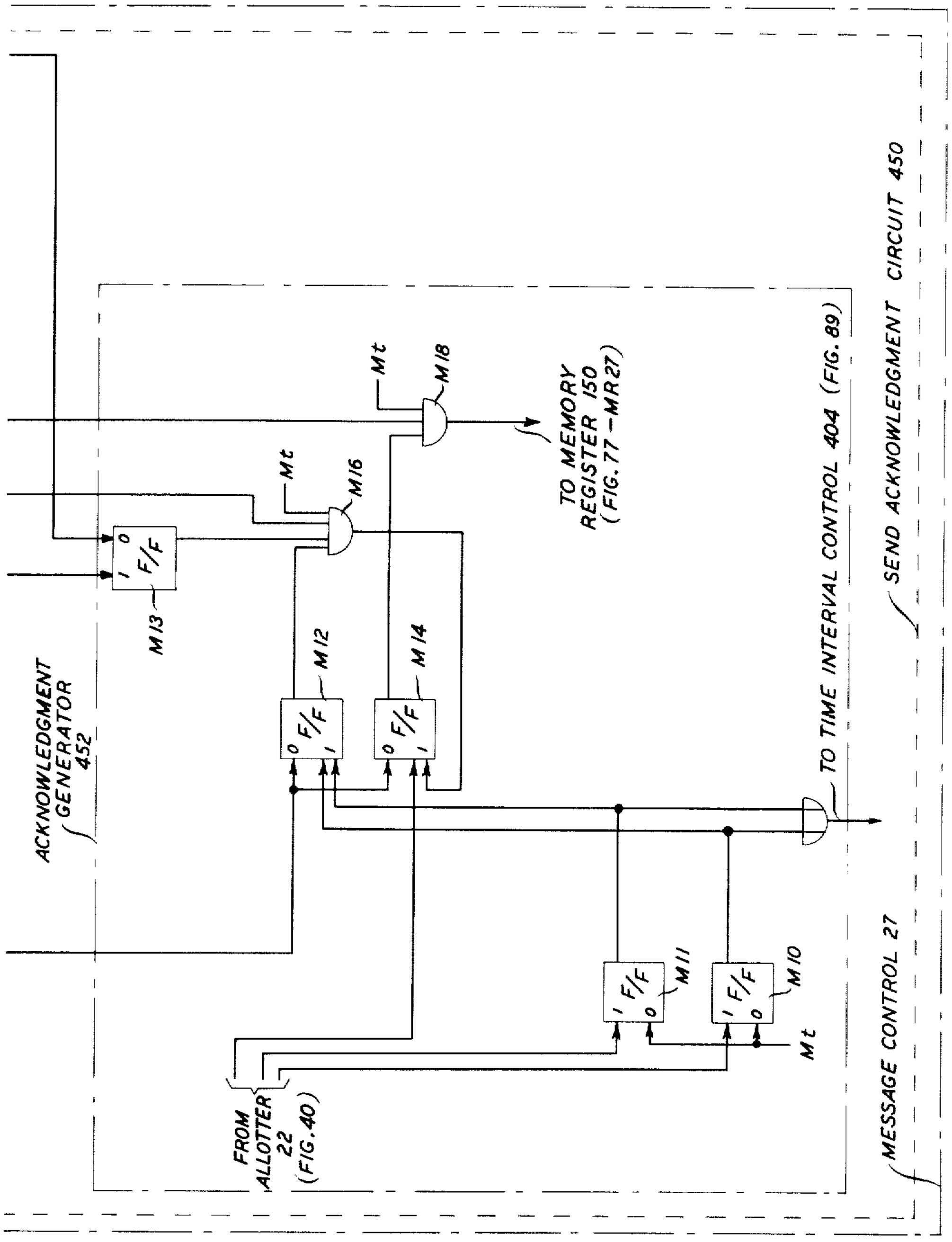
Figure 86:
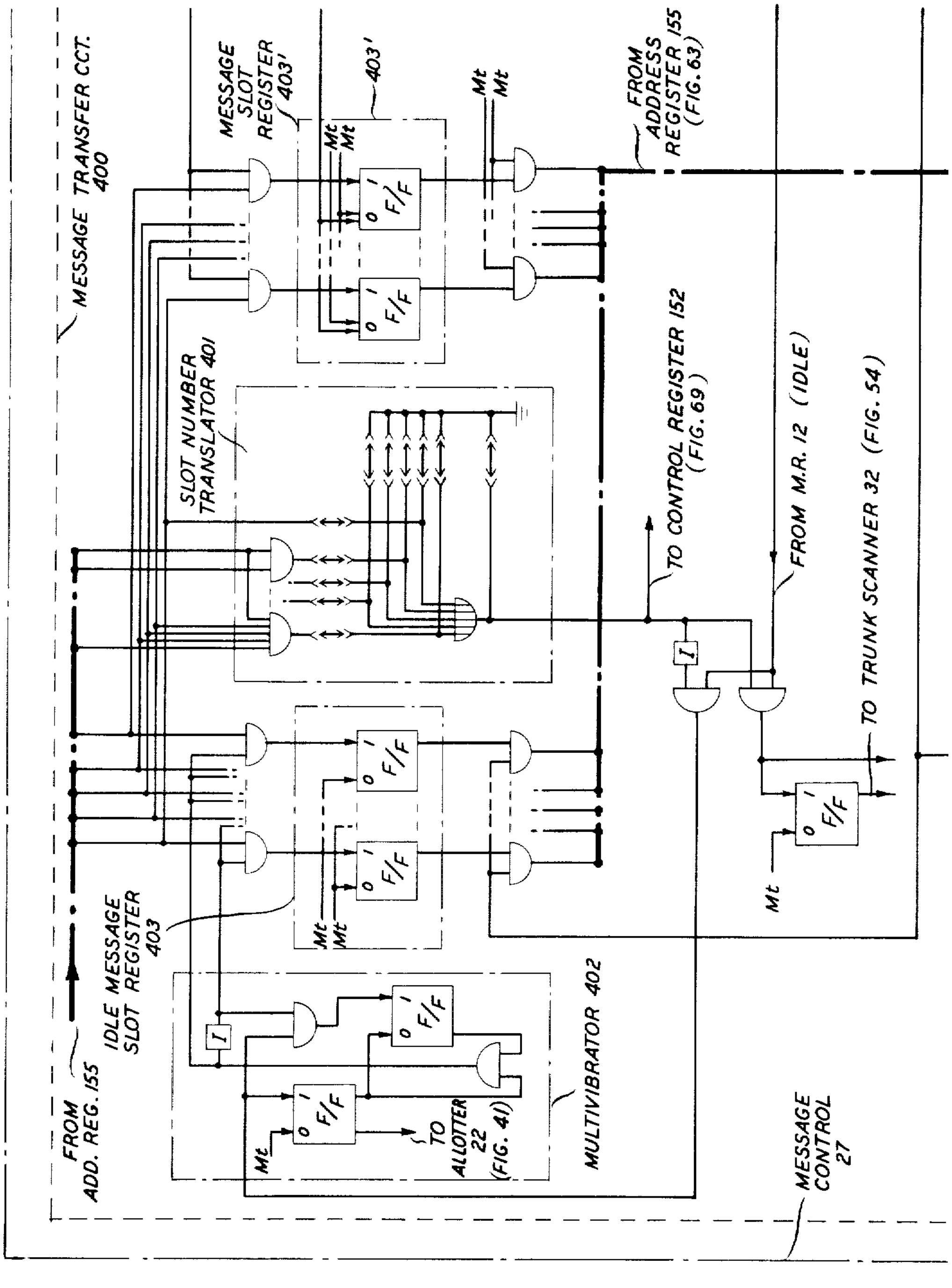

During transfer of a message from store to buffer at the receiving terminal, the designation of the message slot containing the complete incoming message is stored in message slot register 455 of the send acknowledgment circuit shown in block form in FIG. 8 and in detail in FIGS. 82 and 85. At the same time, either flip-flop M10 or M11, FIG. 85, is set, in turn setting flip-flop M12. If a correct destination address is present, flip-flop M13, FIG. 85, will be set at M*t*118 in the program B transfer interval and the allotter informed of this result at M*t*120. Upon receipt of such an indication, the allotter will advise the buffer coder, which in turn will perform the message check and return an acknowledgment of this check. This acknowledgment is provided through the allotter and serves to set flip-flop M14, FIG. 85, if the message is not received in satisfactory condition.

If the destination address is unsatisfactory after an acknowledgment check in the message control circuit, gate M16, FIG. 85, will be activated to set flip-flop M14 by virtue of flip-flops M12 and M13 being in their set state. This condition is present between the store to buffer transfer interval, program B, and the send acknowledgment period M*t*31–40 in the program A message transfer portion of the succeeding office cycle. Thus at M*t*30 in program A, the message control 27 is in a position to provide a good or bad acknowledgment of the message and its destination address to the transmitting terminal.

The second control word of the message slot is addressed by the provision of the appropriate word address in the address register 155 and the setting of flip-flop M17, FIG. 82, the latter enabling the message slot designation to be gated from the message slot register 455 to the address register 155. If the acknowledgment received from the buffer coder indicates satisfactory receipt of the message, the second word of the message slot will be read nondestructively at this time. However, if the reverse is true, the second word of the message slot is destroyed so that an unsatisfactory acknowledgment may be generated and recorded therein.

The acknowledgment start code is placed in the first portion of the second control word by the action of gate M18, FIG. 85. Gate M18 provides an output at M*t*31, program A, if flip-flop M14 is in the reset state, and this output is transmitted to the bit control circuit 28 for generating the start code. Thereafter, at M*t*36, the first control word is read from the store 26, and an appropriate indication written into the least significant bit of the acknowledgment counter portion of this word.

*Check acknowledgment*

Figure 81:
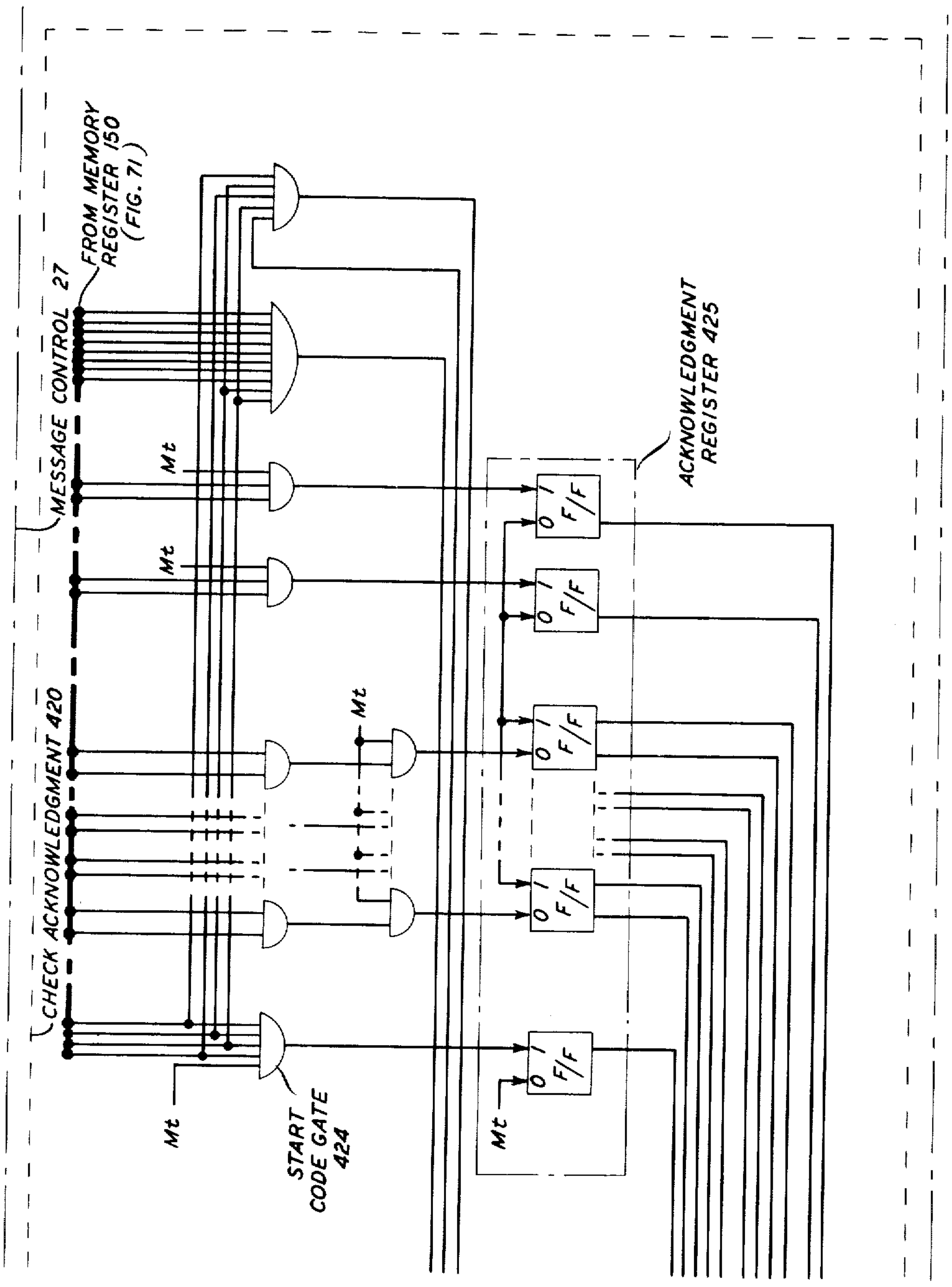
Figure 84:
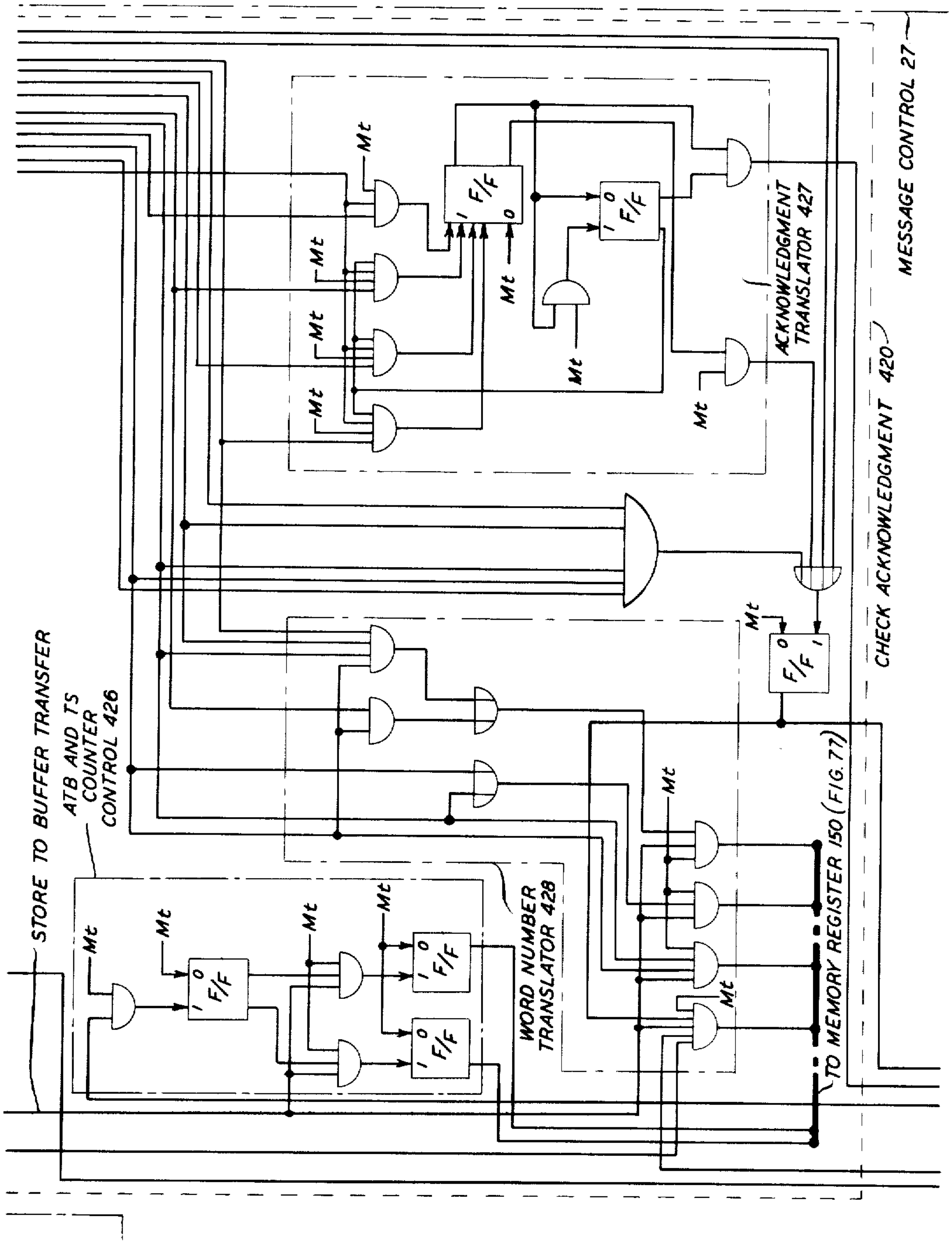

The check acknowledgment circuit 420 is shown in block form in FIG. 7, and in detail in FIGS. 80, 81 and 84. This portion of the message control 27 is particularly concerned with the satisfactory receipt of a message at the appropriate destination terminal switching center. Thus it checks to assure that an acknowledgment of the message is received at the originating terminal switching center, and lacking a satisfactory acknowledgment, it initiates action to assign a different trunk for retransmission of the message.

An all trunks busy condition encountered on a previous attempt to retransmit the message, or a message slot time out condition occurring when the message is not acknowledged in a predetermined time also require the attention of the check acknowledgment circuit. Thus, indications of the presence of these conditions are also conveyed through the check acknowledgment circuit 420. The procedure followed by the check acknowledgment circuit for determining which of the three conditions is present, as performed in the interval M*t*1–50 of program B, FIG. 100, includes reading the second control word (outgoing) of the message slot, FIG. 99, to obtain the acknowledgment if one is present and subsequently reading the first control word of the message slot to determine the presence of a trunk number. If the acknowledgment is present, the check acknowledgment function is to be performed. If there is no acknowledgment and no trunk number present, an all trunks busy condition exists. Finally, if there is no acknowledgment present but a trunk number is found, the time out condition exists.

The operation is begun prior to the message transfer interval when the acknowledgment portion of the memory register 150 has reached its maximum count indicating receipt of a message acknowledgment. At that time multivibrator 421, FIG. 7, is activated by a signal from control register 152, FIG. 11. Its output enables transfer of the designation of the message slot containing the acknowledgment from the address register 155, FIG. 11, into message slot register 413, FIG. 7, where it is retained for the duration of the acknowledgment check.

At M*t*1 the store 26 is addressed to the second control word. The content of the message slot address register 413 is then gated into the address register 155. Thereafter, the acknowledgment contained in the second control word of the message slot is read from the store 26, examined, and the results recorded in the acknowledgment register 425, FIG. 7.

The times sent count indication, also contained in the second control word, is registered in the acknowledgment register 425 so that when the message has been transmitted a predetermined number of times it will be destroyed. Similarly, when the all trunks busy condition, as also contained in the second control word, is encountered a predetermined number of times, it is recorded in the acknowledgment register 425, and the message is destroyed.

All pertinent information contained in the second control word of the message slot has now been sampled and stored in the acknowledgment register 425. Translation of the registered information is conducted subsequently in the acknowledgment translator 427 and word number translator 428 to determine the necessity for conducting the acknowledgment check. If a good acknowledgment or no acknowledgment is found, an appropriate signal is transmitted from the word number translator 428 to the control register 152, FIG. 11, indicating this condition.

At M*t*6 the first control word is read from the store 26 to determine the presence of a trunk number assigned to this message on the previous transmission. The trunk group identification contained in the trunk number portion of the first control word is gated to the trunk selector register 410, FIG. 6, in order to inhibit the use of a trunk in this group for the next transmission of the message. The trunk number portion of the first control word is transmitted through the trunk number gate 430, registered, and made available to acknowledgment translator 427, FIG. 7, where it is determined whether in fact a trunk number is present.

If the acknowledgement indicates that retransmission of the message is required, the message destination address will be sent to the trunk selector register 410. To do this it must first be determined which destination address is present in the store 26. Thus the store 26 is interrogated in the following sequences: At M*t*10 of program B the location in the message slot of the fourth destination address is examined. At M*t*15 the third destination address location is examined, the second address at M*t*20 and the first address at M*t*25. This sequence may be understood by reference to the message slot bit allocation of FIG. 99. The particular timing of this sequence is controlled by gates in the word address translator 423, FIG. 7.

The first four bits of the fourth destination address word, comprising a start code, are received in the acknowledgment register 425 through the start code gate 424, FIG. 7, at M*t*11. Thereafter, acknowledgment translator 427 determines from this registered start code whether a destination address is present in this particular address word location. The acknowledgement register 425 thus provides the acknowledgment translator 427 and word number translator 428 with the no-good acknowledgement and the identity of the destination address to which retransmission of the message is required. With this combination of information the translators 427 and 428 notify the memory register 150, FIG. 11, and trunk selector access circuit 409, FIG. 6, to transmit this destination address to the trunk selector register 410.

If during this first operation the acknowledgment register 425 had indicated the presence of a good acknowledgment or the absence of a destination address in the word being examined, an output to the trunk selector register 410 would not be provided. The foregoing operation is repeated for the third, second and first destination address locations in sequence beginning at M*t*16, M*t*21 and M*t*26 respectively.

At M*t*31 after examination of all possible destination address locations, the first control word again is read from the message slot, and the destination address and trunk group number stored in the trunk selector register 410, FIG. 6, are gated to the trunk selector 31 for selection of a new trunk. At M*t*36 the first control word is again read from the store 26, and the new trunk number, if one has been obtained by the trunk selector 31, is recorded in the first ten bits of the memory register 150. At the same time the designation of the word containing the destination address to be retransmitted must be generated and placed in bit positions 15 through 18 of the first control word. The word translator 428, FIG. 9, which provides this word address, comprises a series of gates which are selectively energized in accordance with the prescribed order in which the destination addresses are to be transmitted. The output of the translator 428 is applied directly to stages 15 through 18 of the memory register 150 and results in the storage of the requisite destination of the number of the word containing the destination address to be transmitted.

The message slot is made busy at M*t*36 by placing the appropriate binary digit in bit position 12 of the first control word present in the memory register 150 at this time. This function is performed when a signal is received in the word translator 428, FIG. 7, from the trunk register 414, FIG. 6, indicating that a trunk to the designated destination has been assigned.

The designation of the number of times a message is sent is recorded in the second control word, and upon receipt of the new trunk number, this counter indication must be increased by one. However, if an all trunks busy indication was returned instead, the all trunks busy counter indication, also in the second control word, must be increased by one.

These functions are implemented by the reading of the second control word of the message slot at M*t*41 in order to obtain the previous count of both the times sent counter and the all trunks busy counter. If an all trunks busy condition has been encountered, counter control 426 will have been alerted by trunk number register 414 at M*t*36. Thereafter, at M*t*44 counter control 426 is fully enabled and the appropriate portion of the memory register 150 is activated by its output. If the all trunks busy condition is not present, the times sent counter in the memory register 150 will be activated by the output of counter control 426. In either case the old count is changed during the period M*t*44–47, and the new count is written into the store 26.

*Originating data message*

Having thus described the various control circuits for connecting the data terminals and trunks to the data store, the manner in which a message is transmitted through this specific embodiment of a data switching system in accordance with our invention will now be considered, begining initially with a request for service being received from an originating terminal through the data processor 11. The description of this operation may readily be understood with reference to the block diagram of FIGS. 4 through 18, reference also being made to FIGS. 19 through 91 for detailed consideration of the various exemplary circuit elements depicted therein.

The text of the message, together with the addresses signifying the desired destinations, is originated as a single message in the data processor 11. The buffer coder 20 is then alerted as to the presence of a waiting message, and it in turn signals the allotter 22 to seize the idle switch 23. The message control 27 in each of the switches 23 continually observes its corresponding store 26 and is notified immediately upon the availability of an idle outgoing message slot which may be utilized for the instant message.

Upon seizure of the particular switch 23 by the allotter 22, this information as to the presence of an idle outgoing message slot is transmitted via the memory register 150 of the bit control 28 to the message control 27. The buffer coder 20 is thereupon notified by the message control 27 to begin processing the instant message. The selected switch 23 is held until the entire message is transferred to the switch.

The text and addresses of the message are checked and encoded, and a determination is made as to whether the message is to be directed to a number of destinations, in which case the message is transmitted repetitively, each transmission containing the distinct destination address, followed by the text. The particular message containing text and appropriate address is read into the store 26 through the memory register 150 of the bit control 28, during a prescribed portion of the next office cycle, beginning with the last word of the message. At the same time particular address is sent to the trunk selector 31 by the message control 27 which, in effect, requests assignment of an idle outgoing trunk circuit 24. Upon selection, the outgoing trunk circuit 24 is made busy, and the idle signal circulating through the associated outgoing trunk is terminated. The trunk selector 31 thereupon returns the number of the selected trunk, together with the number of the group of trunks including the selected trunk, to the message control 27.

The trunk selector 31 has furnished the trunk group number and idle outgoing trunk number to the message control 27 by the time the two control words associated with the instant message are read into the store 26. In succeeding office cycles during the bit transfer interval to which the storage area containing this message is assigned, the two control words and the first destination address word are read from the instant stored message. The two control words are augmented to assure that the proper bit corresponding to the beginning of the destination address is detected and directed correctly. The trunk number selected for transmission of this message is sent concurrently to the trunk number translator 29, and the first bit of the address word is thereupon gated through the bit distributor 33 to the selected outgoing trunk 24, which trunk is enabled by the trunk number translator 29 at the correct time to receive a single bit of the message.

In each succeeding office cycle an additional bit of the instant message is read out of the particular message slot in its assigned bit transfer interval. Preparatory to transmission of each successive bit of the instant message, the two control words and the addressed word are reread and augmented in the bit control circuit so that the proper bit of the message is directed through the bit distributor 33 to the proper outgoing trunk circuit 24.

The first few bits preceding the destination address make up the address start code which will serve to alert the incoming trunk circuit 25 at the receiving terminal switching center 10 that a message is about to be received. Following the start code, a destination address word or group of address words will be received prior to the actual text words. The entire message, however, is retained in the outgoing message slot of the store 26 preparatory to a rerun via a different trunk if an acknowledgment is returned from the receiving terminal that a message was not received in acceptable condition.

Considering now that the terminal switching center depicted in FIG. 2 is receiving the instant message, one bit per office cycle, the message control 27 continually observes the store 26 to determine the availability of idle incoming message slots. This information is relayed by the message control 27 to the trunk scanner 32. Upon recognition by the trunk scanner 32 that a start code for the instant message has been received by one of the incoming trunk circuits 25, the bit control 28 is requested to provide an idle incoming message slot, the message control 27 having indicated to the trunk scanner 32 that such an idle slot is available. The incoming trunk number is then recorded in the selected message slot.

During the next office cycle, when the bit transfer interval assigned to the idle incoming message slot arrives, the incoming trunk circuit 25 is enabled by the bit control 28 through the trunk number translator 29 to provide the first bit of the message for storage in the selected incoming message slot. Again the two control words in the particular message slot are read and augmented so that the next incoming bit is recorded properly. The first addressed word is then read out of the store 26, and one bit of the start code of the instant message is recorded therein.

The operation is repeated in succeeding office cycles upon appearance of the bit transfer interval assigned to the selected message slot, so that succeeding bits of the message are recorded in the store 26. In each instance the two control words are read and augmented; the addressed word is read from the store, the next bit of the message entered, and the word rewritten in the store. The message bits are entered in the store as they come to the incoming trunk 25, one bit in each succeeding office cycle, until the entire message is placed in the selected message slot.

Upon storage of the entire message in the incoming slot of the store 26, the message control 27 is alerted, and during a succeeding office cycle, the entire message is transferred from the store to the buffer coder 20 through the allotter 22. The message is decoded and checked for errors in the buffer coder 20, and, if satisfactory, it is sent on to the corresponding data processor 11. The message control 27 then is signaled to provide an appropriate acknowledgment to the transmitting terminal switching center, whereupon all equipment associated with the transmission of the message is restored to normal.

*Message acknowledgment*

In the event that the received message is unsatisfactory, the buffer coder 20 will discard the message as received and signal the message control circuit to return an unsatisfactory acknowledgment to the transmitting terminal switching center so that the message may be retransmitted. The appropriate acknowledgment as formed in the message control 27 is stored in the same message slot of the store 26 during the message transfer interval. The acknowledgment is then transmitted to the originating terminal switching center bit-by-bit after the fashion of the actual message transmission. Thus the first control word is read and augmented in the bit control circuit so that the proper bit of the acknowledgment is read and directed correctly. Thereafter the acknowledgment itself is read out, one bit in each succeeding office cycle, in the bit transfer interval assigned to the particular message slot involved.

At the appropriate time in each office cycle a signal from the bit control 28 permits the trunk number translator 29 to enable the appropriate incoming trunk circuit 25 which just completed reception of the instant message. Meanwhile, the incoming trunk circuit 25 has activated the acknowledgment line of the trunk, which in this instance is the reverse line, directing information from the incoming trunk circuit 25 in the receiving terminal switching center to the outgoing trunk circuit 24 of the originating terminal switching center. The acknowledgment is thereupon transmitted bit-by-bit over the reverse line. After the acknowledgment is transmitted from the receiving terminal switching center, the particular message slot which stored the acknowledgment is idled, as is the remainder of the equipment in the receiving terminal switching center associated with this message.

Turning again to the originating terminal switching center, the acknowledgment is received via the outgoing trunk circuit 24 which handled the instant message. Its start code is recognized, whereupon the outgoing trunk circuit 24 alerts the bit control 28 to determine, through the trunk number translator 29, the particular outgoing trunk concerned. The trunk number translator in turn enables the particular outgoing trunk at the appropriate time in each office cycle to receive the successive bits of the acknowledgment in the switch 23.

The bit control 28 then transmits a start code to the store 26 to initiate storage of the acknowledgment therein. The receiving terminal switching center is advised, upon completion of the storage acknowledgment, by the transmission of an idle signal from the outgoing trunk circuit 24. The trunk circuit 24 checks this idle signal and informs the trunk selector 31 that the trunk is idle.

In the next office cycle during the message transfer period, the start code and acknowledgment are sent to the message control 27. If the acknowledgment is satisfactory, the message which has been retained in the store 26 in the assigned message slot will be disregarded, and the slot will be made idle. However, if the acknowledgement is unsatisfactory the message will be retransmitted via a different trunk. In this instance the operation as outlined for transmission of the message is repeated, with the trunk selector 31 choosing a new outgoing trunk circuit 24 and corresponding trunk group to accommodate the message. This operation may be repeated in succeeding instances in which an unsatisfactory message transmission is encountered.

It is to be understood that the above-described arrangements are illustrative of the application of the principles of the invention. Numerous other arrangements may be devised by those skilled in the art without departing from the spirt and scope of the invention.

What is claimed is:

1. A data communication system comprising a plurality of switching centers, a plurality of trunks interconnecting said switching centers for transferring messages each having a plurality of data bits between said switching centers, means for connecting a source of data to a first one of said switching centers, said first switching center comprising storage means, means for transferring messages in bulk form from said source to discrete portions of said storage means, means for transferring one bit of each stored message to corresponding preselected trunks in selected discrete time intervals of a recurrent cycle of time intervals, and means for transferring to said storage means one bit of each incoming message transmitted over said trunks in other selected discrete time intervals of said recurrent cycle.

2. In a system for transmitting data between a source and one of a plurality of remote destinations, a switching system comprising a data store, first means for transferring a complete outgoing message in bulk form from said source to said store during a first interval in a repetitive cycle and for transferring a complete incoming message from said store to said source during said first interval in a succeeding cycle, and second means for recording a distinct portion of each of a plurality of incoming messages from said plurality of remote destinations in said store during other intervals in said repetitive cycle and for transferring a distinct portion of each of a plurality of stored outgoing messages to said plurality of remote destinations during said other intervals in said repetitive cycle.

3. A data transmission system comprising a switching center including storage means, a plurality of data sources, means for selectively connecting said data sources to said switching center during a first interval in a repetitive cycle, means for transferring a complete message from a data source to said storage means during said first interval in one cycle and for transferring a complete message from said storage means to a data source during said first interval in another cycle, a plurality of trunks to other switching centers, and means for transferring a distinct portion of a plurality of messages contained in said storage means to corresponding preselected ones of said trunks during other distinct intervals in each of said repetitive cycles and for transferring a distinct portion of a plurality of messages received over said trunks to said storage means during said other intervals in each of said repetitive cycles.

4. A data communication system comprising a switching center including a data store, a plurality of data terminals, means comprising a buffer coder circuit for selectively connecting said data terminals to said switching center to transfer a complete message between one of said terminals and said store during a distinct message transfer interval in a recurrent cycle, trunks to other switching centers, and means for transferring a discrete portion of each of a plurality of messages between said store and said trunks during each recurrent cycle.

5. A data communication system in accordance with claim 4 wherein said buffer coder circuit comprises a text register, means for applying message data to said text register and means for checking the accuracy of the registered messages comprising means for generating parity checking data, first means for applying selected portions of the message stored in said text register to said generating means, second means for applying the resultant parity checking data to the input of said generating means, and means connected to the output of said generating means for acknowledging the status of the message stored in said text register in response to the signal generated by the applied parity checking data.

6. A data communication system in accordance with claim 5 wherein said generating means comprises a translator circuit and means for disabling said first means and enabling said second means concurrently.

7. A data communication system in accordance with claim 4 wherein said buffer coder circuit comprises a text register, means for applying incoming message data to said text register and means for checking the accuracy of the incoming message comprising means for receiving the parity checking data accompanying the incoming message, a parity translator, third means for applying the received parity checking data to said parity checking translator, and means connected to the output of said parity translator for acknowledging the status of the message stored in said text register.

8. A data communication system in accordance with claim 5 and further comprising a destination address register, means for applying the destination addresses for outgoing messages to said address register and means for checking the accuracy of the registered address data comprising means for generating address parity checking data, means for applying selected portions of the address stored in said address register to said address parity generating means, means for applying the resultant address parity checking data to the input of said address parity generating means, and means connected to the output of said address parity generating means for acknowledging the status of the destination address stored in said address register.

9. A data communication system in accordance with claim 8 and further comprising a steering circuit connected to said last-mentioned means for determining the number of error-free destination addresses received and for applying the error-free destination addresses for a single message to said data store.

10. A data communication system in accordance with claim 9 and further comprising means for registering an indication of an erroneous incoming message and means connected to said last-mentioned means for checking the accuracy of the parity checking circuitry comprising means for activating said second and third means in sequence.

11. A data communication system comprising a plurality of switching units each including a data store, a plurality of data terminals, means comprising an allotter circuit for selectively connecting said data terminals to said switching units to transfer a complete message between one of said terminals and one of said stores during a distinct message transfer interval in a recurrent cycle, trunks to other switching units, and means for transferring a discrete portion of each of a plurality of messages between said one of said stores and said trunks during each recurrent cycle.

12. A data communication system in accordance with claim 11 wherein said connecting means further comprises a buffer coder circuit, said allotter circuit comprising first and second circuits connected to said buffer coder circuit, said first circuit comprising counter and translator circuitry connected in common to said switching units and said second circuits comprising gating circuitry each connected to a corresponding one of said switching units.

13. A communication system comprising a plurality of switching centers including storage means, a plurality of trunks interconnecting said switching centers, a source of data, means for connecting said source of data to said storage means in one of said switching centers, means for transferring a block of data from said source to said storage means during a first interval in a recurrent cycle, and means for transferring a portion of each stored data block to corresponding preselected ones of said trunks during other distinct intervals in said recurrent cycle.

14. A communication system in accordance with claim 13 and further comprising means for transferring to said storage means a portion of each data block received over said trunks during said other distinct intervals in said recurrent cycle.

15. A communication system in accordance with claim 14 and further comprising means for transferring a block of data from said storage means to said source during said first interval in said recurrent cycle.

16. A data communication system comprising a plurality of switching centers including storage means, a plurality of trunks interconnecting said switching centers, a source of data, means for connecting said source of data to said storage means in one of said switching centers, means for transferring a message comprising a plurality of data bits from said source to said storage means during a distinct message transfer interval in a recurrent cycle of time intervals, and means comprising a bit control circuit for transferring a data bit of each stored message to corresponding preselected trunks and of each message received from said trunks to said store in discrete bit transfer intervals of said recurrent cycle.

17. A data communication system according to claim 16 wherein said bit control means comprises a memory register and means activated during each bit transfer interval in said recurrent cycle to transfer a plurality of words in a regular sequence between said memory register and said store.

18. A data communication system according to claim 17 wherein said bit control means further comprises a control register, means for transferring a message control word from said store to said control register at the beginning of each bit transfer interval, an address register connected to said store, means for applying a portion of the content of said control register to said address register to alter its content, and means connecting said address register to said store to transfer preselected words between said store and said control register during the balance of the bit transfer interval.

19. A data communication system according to claim 17 wherein said bit control means further comprises a trunk number register, means for transferring a portion of said message control word from said store to said trunk number register at the beginning of each bit transfer interval, and means for connecting the registered trunk to a distinct portion of said memory register later in the same bit transfer interval.

20. A data communication system according to claim 19 wherein said last-mentioned means comprises a bit scanner connected between the output of said memory register and said outgoing trunks and means connected to said control register for enabling said bit scanner to transmit a single data bit.

21. A data communication system according to claim 19 wherein said last-mentioned means comprises a bit selector connected between the input to said memory register and said incoming trunks and means connected to said control register for enabling said bit scanner to transmit a single data bit.

22. A data communication system according to claim 19 wherein said last-mentioned means comprises an inhibit translator and means connected to said control register for activating said inhibit translator to block the transmission of a predetermined data bit from said store to said memory register.

23. A data communication system according to claim 19 wherein said bit transfer interval is divided into four distinct read-write cycles and further comprising control means operative during a first read-write cycle to transfer a first message control word between said store and said memory register and a distinct portion of said first message control word from said store to said control register.

24. A data communication system according to claim 23 wherein said control means comprises means operative during a second read-write cycle to remove said first message control word from said store and transfer a revised control word from the memory register to the store.

25. A data communication system according to claim 23 wherein said control means comprises means operative during a third read-write cycle to transfer a second message control word between said store and said memory register.

26. A data communication system according to claim 23 wherein said control means comprises means operative during a fourth read-write cycle to transfer a message text word between the store and said memory register and to change one data bit in the message text word during the transfer.

27. In a data communication system comprising a plurality of switching centers each having means for storing data including text start and length of message codes in distinct message slots, means for selecting trunks interconnecting said switching centers for selective transfer of data between the corresponding data stores and a plurality of data terminals associated with each of said centers, means comprising a message control circuit for transferring messages between a selected one of said data terminals and said data store, said message control circuit comprising a counter and translation means for determining the designation of an idle message slot in said storage means to receive one of an incoming and an outgoing message, a word address register for addressing said store to a selected plural data bit word storage area in a selected message slot, means for setting a particular word address in said word address register, means for transferring a discrete word of an outgoing message from said selected data terminal to the addressed word storage area, means for advancing said counter, and means for altering the content of said address register in accordance with the count in said counter.

28. In a data communication system, the combination according to claim 27 and further comprising trunk selection means and means connected to said address register for enabling said trunk selection means in response to receipt in said address register of the address of a store word position allocated for the storage of a destination for the outgoing message.

29. In a data communication system, the combination according to claim 28 wherein said message control circuit further comprises means for requesting a retransmission of said outgoing message including means for recording in said trunk selection means a designation of the first trunk through which said outgoing message was transmitted and means activated by the output of said trunk selection means to inhibit retransmission over said first trunk.

30. In a data communication system, the combination according to claim 27 wherein said message control circuit comprises extra long message control means connected to said address register and means for activating said extra long message control means during transfer of a message from said selected data terminal to said store to direct said address register to a text word position in said store following the last text word position of a normal length message.

31. In a data communication system, the combination according to claim 27 wherein said message control circuit comprises extra long message control means connected to said counter and means for activating said extra long message control means during transfer of a message from said store to said selected data terminal to enable said counter to count beyond the number of words in a normal length message.

32. In a data communication system, the combination according to claim 27 wherein said message control circuit comprises means for checking the length of an incoming message, means for recording the address of a designated incoming message slot in said store, means activated by said recording means to address predetermined word locations in said incoming message slot in consecutive time intervals and means responsive to detection of the text start and length of message codes in one of the addressed word locations for registering said codes.

33. In a data communication system, the combination according to claim 32 wherein said means for checking the length of an incoming message further comprises translation means connected to said code registering means and means for enabling said translation means at a predetermined time to transfer information derived from said codes to predetermined positions in a control word of said incoming message slot.

34. In a data communication system, the combination according to claim 32 and further comprising acknowledgment circuitry, said means for checking the length of an incoming message comprising means activated upon completion of said addressing of predetermined word locations in consecutive time intervals without detection of said text start code to enable said acknowledgment circuitry to generate an acknowledgment indicating receipt of a defective message.

35. In a data communication system, the combination according to claim 27 wherein said message control circuit comprises means for detecting the destination address of an incoming message registered in said store, means for checking said detected destination address, means for recording the result of a message check and the destination address check, and means responsive to the output of said recording means for acknowledging receipt of the message and the necessity for retransmission.

36. In a data communication system, the combination according to claim 27 wherein said message control circuit comprises means for checking the acknowledgment of a transmitted message as received in the corresponding acknowledgment register, means for transferring the acknowledgment from said store to said acknowledgment register, an acknowledgment translator, and means including said translator for directing the assignment of an outgoing trunk circuit to handle said message directed to the same destination switching center when the acknowledgment contained in said acknowledgment register indicates a prior unsatisfactory transmission.

37. In a data communication system, the combination according to claim 36 wherein said last-mentioned means further comprises gating means for rewriting the destination address of the message in the store and means connected to said acknowledgment translator for inhibiting said gating means in response to an acknowledgment in said acknowledgment register indicating a prior satisfactory message transmission.

38. A data communication system comprising a plurality of switching centers including storage means, a plurality of trunks interconnecting said switching centers, means for connecting a source of data to said storage means in one of said switching centers, means comprising a message control circuit for transferring a message comprising a plurality of data bits from said source to said storage means during a distinct message transfer interval in a recurrent cycle of time intervals, and means comprising a memory register for transferring a data bit of each stored message to corresponding preselected trunks and for transferring a data bit of each message received from said trunks to said storage means in discrete bit transfer intervals of said recurrent cycle.

39. A data communication system according to claim 38 wherein said message control circuit comprises means activated during the message transfer interval to transfer all of the text and destination address words in a message between said memory register and said store.

40. A data communication system according to claim 38 wherein said message control circuit comprises means for determining the direction of transfer of a message between the source and the store, and means for implementing the selected type of transfer in accordance with a distinct program during the message transfer interval of an office cycle.

41. A data communicating system comprising a first switching center including a data store, a plurality of data terminals, means for selectively connecting said data terminals to said first switching center to transfer a complete data message between one of said terminals and said store during a distinct message transfer interval in a recurrent cycle of transfer intervals, a plurality of remote switching centers, a plurality of trunks connecting said first switching center to each of said remote switching centers, and means comprising trunk circuits for transferring a distinct portion of each of a plurality of messages between said store and corresponding selected trunks during each of said recurrent cycles.

42. A data communication system in accordance with claim 41 wherein said trunks each comprise a forward line and a reverse line and said trunk circuits comprise means for assuring that said trunks are fault free prior to assignment for message transfer, said trunk circuit means comprising means for circulating an idle signal through said forward and reverse lines of idle ones of said trunks.

43. A data communication system according to claim 42 wherein said trunk circuit means further comprises means for busying said idle trunks upon detection of a signal other than said idle signal.

44. A data communication system according to claim 43 wherein said trunk circuit means further comprises error checking means, and means for selecting an alternate trunk for transmission of a message in response to a signal from said error checking circuit.

45. A data processing system comprising a switching unit including storage means, a data source, means for connecting said data source to said switching unit to transfer a plural character message between said source and said storage means during a distinct message transfer interval in a repetitive cycle, trunks to remote switching units, and means comprising a plurality of trunk circuits for transferring a character in each of a plurality of said plural character messages between said storage means and said trunks during each repetitive cycle.

46. A data communication system in accordance with claim 45 wherein said trunks each comprise a forward line and a reverse line and wherein said trunk circuits comprise distinct outgoing trunk circuits having a source of a distinct idle signal, an idle signal control circuit for connecting said idle signal source to the forward line of a corresponding one of said trunks, means for receiving signals from the reverse line of said corresponding trunk, an error detector circuit connected to said signal receiving means, a busy condition indicating circuit, and means connected to the output of said error detector circuit for enabling said busy condition indicating circuit upon receipt of an erroneous idle signal in said signal receiving means.

47. A data communication system in accordance with claim 46 wherein said outgoing trunk circuit further comprises a trunk enable circuit, and means comprising said busy condition indicating circuit for activating said trunk enable circuit to transmit a message to said corresponding trunk upon receipt of a correct idle signal in said signal receiving means.

48. A data communication system in accordance with claim 47 wherein said outgoing trunk circuit further comprises a circuit connected to said signal receiving means for recognizing an acknowledgment of a transmitted message, a register, means for applying the output of said acknowledgment recognition circuit to said register, means for transferring said acknowledgment from said register to said trunk enable circuit after a phase adjusting time delay, and means for applying the output of said acknowledgment recognition circuit to said idle signal control circuit to restore the idle signal to said forward line.

49. A data communication system in accordance with claim 48 wherein said output applying means comprises a write counter circuit for transferring the data received over the reverse line of the trunk from said signal receiving means to said register and said acknowledgment transferring means comprises a read counter circuit for transferring the data from said register to said trunk enable circuit.

50. A data communication system in accordance with claim 49 wherein said trunk circuits comprise distinct incoming trunk circuits having means for registering information including the idle signal received from the trunks, means for detecting errors in the received idle signal, means for controlling the application of information to the trunks and means for generating the idle signal.

51. A data communcation system in accordance with claim 50 wherein said incoming trunk circuits further comprise an idle signal control circuit for connecting said idle signal generator to said control means and means for applying the output of said error detecting means to said control means to inhibit application of the idle signal from said generator to the trunks.

52. A data communication system in accordance with claim 51 wherein said incoming trunk circuits further comprise a message recognition circuit connected to said information registering means for recognizing the start code of an incoming message, means for applying an output of said message recognition circuit to said bit control circuit to request the assignment of message storage space and means for applying another output of said message recognition circuit to said idle control circuit to inhibit the application of the idle signal from said generator to the trunks.

53. A data communication system in accordance with claim 52 wherein said incoming trunk circuits further comprise means for enabling said information registering means to transmit message information to said store and means for enabling said idle signal control circuit to transmit information from said store to said trunks.

References Cited by the Examiner

UNITED STATES PATENTS

| | | | |
|---|---|---|---|
| 2,265,339 | 12/1941 | Blanton et al. | 340—147 |
| 2,635,229 | 4/1953 | Gloess et al. | 340—167 |
| 2,677,119 | 4/1954 | Luck | 340—147 |
| 2,680,162 | 6/1954 | Brehm et al. | 340—147 |
| 2,995,729 | 8/1961 | Steele | 340—147 |
| 3,007,136 | 10/1961 | Tryrlick | 340—147 |
| 3,025,498 | 3/1962 | Blodgett | 340—147 |
| 3,029,414 | 4/1962 | Schrimpf | 340—147 |
| 3,056,110 | 9/1962 | Cypser et al. | 340—172.5 |

NEIL C. READ, *Primary Examiner.*